US012509852B2

(12) United States Patent
Horii et al.

(10) Patent No.: US 12,509,852 B2
(45) Date of Patent: Dec. 30, 2025

(54) WORKING MACHINE

(71) Applicant: KUBOTA CORPORATION, Osaka (JP)

(72) Inventors: Hiroshi Horii, Osaka (JP); Masaaki Ueda, Osaka (JP); Yoichi Nishigori, Osaka (JP); Kazuyuki Hatta, Osaka (JP); Kazuaki Syobu, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 278 days.

(21) Appl. No.: 18/205,831

(22) Filed: Jun. 5, 2023

(65) Prior Publication Data

US 2023/0323629 A1 Oct. 12, 2023

Related U.S. Application Data

(63) Continuation of application No. PCT/JP2021/049027, filed on Dec. 29, 2021.

(30) Foreign Application Priority Data

Jan. 27, 2021 (JP) ................................ 2021-011444
Jan. 27, 2021 (JP) ................................ 2021-011445
(Continued)

(51) Int. Cl.
*E02F 9/08* (2006.01)
*B60H 1/00* (2006.01)
(Continued)

(52) U.S. Cl.
CPC ....... *E02F 9/0866* (2013.01); *B60H 1/00378* (2013.01); *B60H 1/3222* (2013.01);
(Continued)

(58) Field of Classification Search
CPC . E02F 9/0866; B60H 1/00378; B60H 1/3222; B60H 1/3228; B60H 1/3229; B60H 1/00485; B60K 15/067
See application file for complete search history.

(56) References Cited

U.S. PATENT DOCUMENTS 3,555,846 A * 1/1971 Harbeck et al. ... B60H 1/00378 55/504
3,844,202 A * 10/1974 Ferguson ........... B60H 1/00378 55/385.3
(Continued)

FOREIGN PATENT DOCUMENTS

CN 204837074 U 12/2015
EP 0 734 898 A2 10/1996
(Continued)

OTHER PUBLICATIONS

Office Action issued in Japanese family member application No. 2021-214943, dated Mar. 19, 2024, along with an English translation thereof.

(Continued)

*Primary Examiner* — Jacob B Meyer
(74) *Attorney, Agent, or Firm* — GREENBLUM & BERNSTEIN, P.L.C.

(57) ABSTRACT

A working machine includes a machine body, a cabin on the machine body, an air conditioner body for air conditioning in the cabin, and a prime mover room to contain a prime mover on the machine body. The air conditioner body is disposed above the prime mover room.

17 Claims, 99 Drawing Sheets

(30) Foreign Application Priority Data

| | | | |
|---|---|---|---|
| Dec. 28, 2021 | (JP) | ................................. | 2021-214940 |
| Dec. 28, 2021 | (JP) | ................................. | 2021-214941 |
| Dec. 28, 2021 | (JP) | ................................. | 2021-214942 |
| Dec. 28, 2021 | (JP) | ................................. | 2021-214943 |

(51) Int. Cl.
*B60H 1/32* (2006.01)
*B60K 15/067* (2006.01)

(52) U.S. Cl.
CPC ......... *B60H 1/3228* (2019.05); *B60H 1/3229* (2013.01); *B60K 15/067* (2013.01); *B60H 1/00485* (2013.01)

(56) References Cited

U.S. PATENT DOCUMENTS

| | | | | | |
|---|---|---|---|---|---|
| 3,908,900 | A * | 9/1975 | Smith | B60H 1/16 | 237/12.3 A |
| 3,924,524 | A * | 12/1975 | Whisler | B60P 3/00 | 454/158 |
| 4,072,487 | A * | 2/1978 | Irwin | B60H 1/00378 | 454/151 |
| 4,098,093 | A * | 7/1978 | Czyl | B60H 1/3226 | 62/243 |
| 4,120,527 | A * | 10/1978 | Lawrence | B60H 1/00378 | 454/158 |
| 4,344,356 | A * | 8/1982 | Casterton | B62D 33/0617 | 454/158 |
| 4,352,456 | A * | 10/1982 | Brandenburg, Jr. | B60H 1/03 | 122/26 |
| 4,365,541 | A * | 12/1982 | Marques | F24F 8/10 | 55/482 |
| 4,612,975 | A * | 9/1986 | Ikari | B60H 1/00378 | 62/244 |
| 4,815,550 | A * | 3/1989 | Mather | E02F 9/0866 | 180/68.1 |
| 4,874,036 | A * | 10/1989 | Masuda | B66F 9/07595 | 237/12.3 A |
| 4,989,500 | A * | 2/1991 | Anliker | B60H 3/0616 | 454/158 |
| 5,308,279 | A * | 5/1994 | Grinberg | B60H 1/00378 | 454/151 |
| 5,857,350 | A * | 1/1999 | Johnson | F28D 5/00 | 261/106 |
| 5,906,411 | A * | 5/1999 | Stauffer | B60N 2/3011 | 49/40 |
| 5,911,624 | A * | 6/1999 | Stauffer | B60H 1/00378 | 62/298 |
| 6,223,807 | B1 * | 5/2001 | Asche | B60H 1/00378 | 454/156 |
| 6,766,774 | B1 * | 7/2004 | Kussmann | F04D 29/582 | 123/41.12 |
| 6,966,355 | B2 * | 11/2005 | Branham | B60H 1/00535 | 165/41 |
| 7,314,106 | B2 * | 1/2008 | Rini | B60K 13/02 | 180/68.1 |
| 7,426,909 | B2 * | 9/2008 | Keane | F01P 11/10 | 165/41 |
| 7,874,391 | B2 * | 1/2011 | Dahl | B60K 11/04 | 280/783 |
| 8,376,820 | B2 * | 2/2013 | Stough | B60H 3/0641 | 454/158 |
| 8,556,014 | B2 * | 10/2013 | Smith | B60K 11/04 | 180/68.1 |
| 8,561,740 | B2 * | 10/2013 | Taylor | B60H 1/26 | 180/68.1 |
| 8,770,329 | B2 * | 7/2014 | Spitler | F01P 11/10 | 180/68.1 |
| 9,212,465 | B2 * | 12/2015 | Miyachi | B60K 11/06 | |
| 9,238,397 | B2 * | 1/2016 | Burkhardt | B60H 1/00028 | |
| 9,238,989 | B2 * | 1/2016 | Tsuchihashi | F01N 13/1811 | |
| 9,243,383 | B2 * | 1/2016 | Inada | B60K 13/04 | |
| 9,297,144 | B2 * | 3/2016 | Hanada | E02F 9/0866 | |
| 9,359,931 | B2 * | 6/2016 | Sugano | F01N 13/14 | |
| 9,518,373 | B1 * | 12/2016 | Ueda | E02F 9/0891 | |
| 9,662,969 | B2 * | 5/2017 | Nishimura | F01N 3/24 | |
| 9,663,919 | B2 * | 5/2017 | Hwang | E02F 9/18 | |
| 9,707,821 | B2 * | 7/2017 | Hill | B60H 1/244 | |
| 10,344,452 | B2 * | 7/2019 | Yamashita | E02F 9/0858 | |
| 10,377,227 | B2 * | 8/2019 | Kawazoe | B60K 13/04 | |
| 10,427,493 | B2 * | 10/2019 | Smith | B60H 1/00007 | |
| 10,543,733 | B2 * | 1/2020 | Eckelberg | B60H 1/3233 | |
| 11,155,981 | B2 * | 10/2021 | Tatsuta | B60H 1/00285 | |
| 11,590,824 | B2 * | 2/2023 | Jha | B60H 1/245 | |
| 11,866,907 | B2 * | 1/2024 | Parry-Jones | E02F 3/325 | |
| 11,976,440 | B2 * | 5/2024 | Ganitzer | E02F 9/0866 | |
| 12,017,514 | B2 * | 6/2024 | Minter | B60H 1/00378 | |
| 2014/0144717 | A1 * | 5/2014 | Nakashima | F01N 3/05 | 180/9.1 |
| 2015/0114748 | A1 * | 4/2015 | Hanada | B60K 11/06 | 180/309 |
| 2015/0165875 | A1 * | 6/2015 | Uchida | E02F 9/163 | 62/239 |

FOREIGN PATENT DOCUMENTS

| | | | | | |
|---|---|---|---|---|---|
| JP | 61-130659 | U1 | | 8/1986 | |
| JP | 1995076210 | A | | 3/1995 | |
| JP | 1995-018925 | U | | 4/1995 | |
| JP | 8-268091 | A | | 10/1996 | |
| JP | 2001-081812 | A | | 3/2001 | |
| JP | 2001-288778 | A | | 10/2001 | |
| JP | 2013-024078 | A | | 2/2013 | |
| JP | 2013-044098 | A | | 3/2013 | |
| JP | 2013-244910 | A | | 12/2013 | |
| JP | 2015-086615 | A | | 5/2015 | |
| JP | 2017-160639 | A | | 9/2017 | |
| JP | 2018144666 | A | * | 9/2018 | |
| JP | 2019-065464 | A | | 4/2019 | |
| JP | 2020-002720 | A | | 1/2020 | |
| JP | 2020132046 | A | | 8/2020 | |
| JP | 2021-004482 | A | | 1/2021 | |
| JP | 2021-143614 | A | | 9/2021 | |
| WO | 2016/020987 | A1 | | 2/2016 | |
| WO | WO-2016189939 | A1 | * | 12/2016 | B60H 1/00 |

OTHER PUBLICATIONS

Office Action issued in Japanese family member application No. 2021-214940, dated Apr. 2, 2024, along with an English translation thereof.
Office Action issued in Japanese family member application No. 2021-214941, dated Apr. 16, 2024, along with an English translation thereof.
Office Action issued in Japanese family member application No. 2021-214942, dated Apr. 16, 2024, along with an English translation thereof.
International Search Report issued Mar. 22, 2022 in International application No. PCT/JP2021/049027, with English language translation.
Written Opinion issued Mar. 22, 2022 in International application No. PCT/JP2021/049027, with English language translation.
Supplementary Partial European Search Report, dated Dec. 4, 2024, issued in European Patent Office (EPO) Patent Application No. 21923307.9.
Office Action, dated May 15, 2025, issued in Chinese family member Appl. No. 202180078084.9 with an English translation thereof.

* cited by examiner

WORKING MACHINE

CROSS REFERENCE TO RELATED APPLICATIONS

This application is a continuation application of International Application No. PCT/JP2021/049027, filed on Dec. 29, 2021, which claims the benefit of priority to Japanese Patent Application No. 2021-011444, filed on Jan. 27, 2021, Japanese Patent Application No. 2021-011445, filed on Jan. 27, 2021, Japanese Patent Application No. 2021-214940, filed on Dec. 28, 2021, Japanese Patent Application No. 2021-214941, filed on Dec. 28, 2021, Japanese Patent Application No. 2021-214942, filed on Dec. 28, 2021, and to Japanese Patent Application No. 2021-214943, filed on Dec. 28, 2021. The entire contents of each of these applications are hereby incorporated herein by reference.

BACKGROUND OF THE INVENTION

1. Field of the Invention

The present invention relates to working machines, such as backhoes.

2. Description of the Related Art

Known working machines in the related art are disclosed in Japanese Unexamined Patent Application Publication No. 2020-2720, Japanese Unexamined Patent Application Publication No. 2017-160639, Japanese Unexamined Patent Application Publication No. 2013-44098, and Japanese Unexamined Patent Application Publication No. 2021-4482.

The working machine disclosed in Japanese Unexamined Patent Application Publication No. 2020-2720 includes an air conditioner body for air-conditioning the inside of a cabin equipped in a machine body. The air conditioner body is disposed below an operator's seat.

In the working machine disclosed in Japanese Unexamined Patent Application Publication No. 2020-2720, the machine body supported in a swivelable manner on a traveling device is equipped with a swivel motor that swivels the machine body.

The working machine disclosed in Japanese Unexamined Patent Application Publication No. 2020-2720 also includes a support base equipped in the machine body and a fuel tank supported by the support base.

The working machine disclosed in Japanese Unexamined Patent Application Publication No. 2017-160639 includes an exhaust gas purifier that purifies exhaust gas discharged from a prime mover, and releases the exhaust gas discharged from the exhaust gas purifier outward via an exhaust pipe.

The working machine disclosed in Japanese Unexamined Patent Application Publication No. 2013-44098 includes a cooling fan that delivers cooling air toward a prime mover, and has an air cleaner disposed downstream of the cooling air for the prime mover. An intake hose connected to an intake port of the air cleaner is routed from the air cleaner toward the suction side of the cooling fan.

The working machine disclosed in Japanese Unexamined Patent Application Publication No. 2021-4482 has a hood that covers a prime mover and a cooling unit disposed laterally to the prime mover, and is provided with an outside-air intake portion that introduces outside air toward the opposite side of the cooling unit from the prime mover within the hood. A cooling fan is provided between the prime mover and the cooling unit. The outside air is introduced through the outside-air intake portion by suction of the cooling fan, and the introduced outside air flows into the prime mover via the cooling unit.

SUMMARY OF THE INVENTION

The air conditioner body being disposed below the operator's seat, as in the related art, is problematic in terms of reduced foot space for the operator.

The swivel motor normally does not have other devices disposed thereabove but has an empty space provided thereabove for, for example, maintenance.

Since the fuel tank is secured to the machine body, it may be difficult to perform maintenance on the fuel tank or a device disposed near the fuel tank.

The technology according to Japanese Unexamined Patent Application Publication No. 2017-160639 may be problematic in that, when the exhaust gas discharged from the exhaust gas purifier is directly released outside the machine body via the exhaust pipe, the exhaust gas at high temperature and released with great force may kill plants, or loud exhaust noise may leak from a prime mover room that accommodates the prime mover.

The technology according to Japanese Unexamined Patent Application Publication No. 2013-44098 may be problematic in that the intake hose connected to the intake port of the air cleaner may hinder the flow of the cooling air flowing around the prime mover.

The technology according to Japanese Unexamined Patent Application Publication No. 2021-4482 may be problematic in that the sound in the prime mover room may leak outside through the outside-air intake portion.

Preferred embodiments of the present invention provide working machines that can increase the foot space for the operator.

Preferred embodiments of the present invention provide working machines that can effectively utilize the space above the swivel motor.

Preferred embodiments of the present invention provide working machines that can facilitate maintenance.

Preferred embodiments of the present invention make it possible to achieve reduced exhaust temperature and reduced exhaust noise of a working machine.

Preferred embodiments of the present invention make it possible to improve the flow of the cooling air.

Preferred embodiments of the present invention make it possible to suppress sound leaking outward from the prime mover room.

A working machine according to an aspect of the present invention includes: a machine body; a cabin on the machine body; an air conditioner body for air conditioning in the cabin; and a prime mover room to contain a prime mover on the machine body, wherein the air conditioner body is disposed above the prime mover room.

The working machine may further include: an operator's seat disposed inside the cabin. The cabin may include a plate member disposed behind the operator's seat, the plate member having the air conditioner body disposed thereon. The plate member may be disposed above the prime mover room with a distance from the prime mover room and is supported by the machine body in a vibration-proof manner via at least one mount member.

The plate member may include a front portion disposed inside the cabin and a rear portion protruding rearward from a rear surface of the cabin.

The working machine may further include: a cooling fan to introduce air outside the prime mover room into the prime mover room; a compressor to be driven by power from the prime mover to compress a cooling medium; and a route for a cooling medium pipe connected to the compressor, the route having an entrance and an exit, the entrance being in communication with an upper portion of the prime mover room and configured to allow hot air from the prime mover room to enter the route, the exit being in communication with an outside of the prime mover room and configured to allow the hot air having entered the route through the entrance to be discharged.

The working machine may further include a compressor placement portion for placement of the compressor. The route may include a pair of side walls facing each other with a distance therebetween in a machine-body width direction, a bottom wall closing a gap between lower ends of rear portions of the pair of side walls, and a cover wall closing a gap between upper ends of the pair of side walls and a gap between front ends of the pair of side walls. The entrance may be defined by the bottom wall and the cover wall. The exit may be provided at a rear portion of the cover wall. The compressor placement portion may be provided lower than the entrance and is in communication with the entrance.

The compressor placement portion may include a main portion and an openable-closable cover, the main portion having an inspection opening facing forward and being in communication with a space between the pair of side walls, the openable-closable cover being configured to close the inspection opening. The openable-closable cover may be attachable and detachable together with the cover wall.

A condenser and a receiver may be disposed laterally to a front portion of the cabin and in front of the compressor, the condenser being configured to dissipate heat of the cooling medium from the compressor to liquefy the cooling medium, the receiver being configured to store the cooling medium liquefied by the condenser. The compressor, the condenser, and the receiver may be removable together with the cabin from the machine body.

The working machine further may include a compressor placement portion for placement of the compressor. The compressor placement portion may be disposed closer to one of opposite sides of the machine body in a machine-body width direction than the cabin is such that the compressor is accessible from an inside the cabin.

The machine body may include a substrate, a first vertical rib, and a second vertical rib, the first vertical rib being provided on a first portion of the substrate that is closer to the one of the opposite sides of the machine body in the machine-body width direction than a second portion of the substrate is and extending from a front portion toward a rear portion of the substrate, the second vertical rib being provided on the second portion of the substrate that is closer to the other of the opposite sides of the machine body in the machine-body width direction than the first portion is and extending from the front portion toward the rear portion of the substrate. The working machine may further include: a hydraulic actuator to be driven by hydraulic fluid; a hydraulic fluid tank to store hydraulic fluid; a hydraulic pump to deliver hydraulic fluid from the hydraulic fluid tank; a control valve to control a flow rate of hydraulic fluid supplied from the hydraulic pump to the hydraulic actuator; and a hydraulic hose connecting the hydraulic pump and the control valve to each other. The hydraulic fluid tank may be disposed closer to the other of the opposite sides of the machine body in the machine-body width direction than the second vertical rib is. The control valve may be disposed closer to the other of the opposite sides of the machine body in the machine-body width direction than the second vertical rib is and in front of the hydraulic fluid tank. The hydraulic pump may be disposed closer to a rear of the machine body than a front end of the hydraulic fluid tank is. The hydraulic hose may be routed between the second vertical rib and the hydraulic fluid tank.

The prime mover room and the inside of the cabin may be separated from each other by a double-walled structure including a partition and an outer wall of the cabin, the partition separating the prime mover room and the outside of the prime mover room from each other. The hydraulic fluid tank may define a portion of the partition.

The working machine may further include a fuel tank to store fuel for the prime mover. The fuel tank may be disposed above the first vertical rib and across the first vertical rib in the machine-body width direction.

The exit may be provided on one of opposite sides of the machine body in a machine-body width direction. The working machine may further include an intake structure to introduce air into the prime mover. The intake structure may be configured to allow outside air to enter the prime mover from the other of the opposite sides of the machine body in the machine-body width direction.

The working machine further may include a traveling device, the machine body supported in a swivelable manner on the traveling device, a swivel motor to swivel the machine body, a tank disposed near the swivel motor, and a support base supporting the tank. The tank may include a tank body and an overhanging portion overhanging above the swivel motor from the tank body, and is supported by the support base in a movable manner to retract the overhanging portion from above the swivel motor.

The working machine may further include a support base equipped in the machine body, and a tank supported by the support base in a movable manner in a horizontal direction between an installation position and a withdrawn position withdrawn from the installation position.

The working machine may further include a cooling fan to deliver cooling air toward the prime mover, a discharge portion to fluidly connect an inside and an outside of the prime mover room to each other at a bottom of the machine body, an exhaust gas purifier to purify exhaust gas discharged from the prime mover, an exhaust pipe to discharge the exhaust gas discharged from the exhaust gas purifier to an internal space of the prime mover room, and a flow straightener to guide a gas mixture having a mixture of the exhaust gas discharged from the exhaust pipe and the cooling air to the discharge portion.

The working machine may further include a cooling fan to deliver cooling air toward the prime mover, an air cleaner disposed downstream of the cooling air relative to the prime mover, a hood defining the prime mover room accommodating the prime mover, an air intake portion provided in the hood at an opposite side of the prime mover from the cooling fan, and a connection duct connecting the air intake portion and the air cleaner to each other.

The working machine may further include an openable-closable hood defining the prime mover room accommodating the prime mover, a cooler disposed between the prime mover and the hood and having a cooling unit and a cooling fan, a stationary duct protruding toward the hood from the cooler, and an openable-closable duct protruding toward the cooler from the hood. The openable-closable duct and the stationary duct are connected to each other by closing the hood, and outside air taken in from outside the machine body is introduced to the cooler via the openable-closable duct and the stationary duct.

A working machine according to another aspect of the present invention includes: a traveling device; a machine body supported in a swivelable manner on the traveling device; a swivel motor to swivel the machine body; a tank disposed near the swivel motor; and a support base to support the tank, wherein the tank includes a tank body and an overhanging portion extending from the tank body and overhanging the swivel motor, and is supported by the support base in a movable manner to retract the overhanging portion from a space above the swivel motor.

The overhanging portion may overhang the swivel motor to obstruct a motor removal path defining a path along which the swivel motor is removed upward from the machine body.

A cabin equipped in the machine body may be provided. The swivel motor may be disposed below the cabin, and the motor removal path is provided between the cabin and the support base.

The support base may have a pair of placement sections supporting the tank in a slidable manner in a tank movement direction as a direction for moving the tank. The pair of placement sections may be disposed side-by-side with a distance therebetween in the horizontal direction that is orthogonal to the tank movement direction. The tank may have a protrusion protruding between the pair of placement sections from the tank body.

An attachment frame extending upward from the support base and an attachment stay provided at an upper portion of the tank may be provided. The attachment frame may have a stay attachment section to which the attachment stay is detachably attached.

A support frame supporting devices equipped in the machine body may be provided. The attachment frame may have a frame attachment section attached to the support frame.

A prime mover equipped in the machine body may be provided. The tank may be a fuel tank storing fuel for the prime mover.

A working machine according to a further aspect of the present invention includes: a machine body; a support base on the machine body; and a tank supported by the support base in a movable manner in a horizontal direction between an installation position and a withdrawn position in which the tank is located when withdrawn from the installation position.

A securing device configured to secure the tank in the installation position and the withdrawn position may be provided.

The securing device may include a securing band unit having a band to secure the tank in the installation position.

The securing band unit may have a hook member disposed near a lower portion of the tank, a securing piece disposed opposite the hook member to sandwich the tank, the band extending from the hook member to the securing piece via an upper surface of the tank, a band hooking member provided at one longitudinal end of the band and hooked onto the hook member, and a band securing member provided at the other longitudinal end of the band and secured to the securing piece by tensioning the band.

The securing device may include an engaging section provided at the support base, and a first engagement section and a second engagement section provided away from each other in the tank in a movement direction of the tank. The first engagement section may be engaged with the engaging section when the tank is in the installation position so as to restrict movement of the tank in a pulling direction extending from the installation position toward the withdrawn position and in a pressing direction extending from the withdrawn position toward the installation position. The second engagement section may be engaged with the engaging section when the tank is in the withdrawn position so as to restrict the movement of the tank in the pulling direction and the pressing direction.

The engaging section may be a roller provided at a placement section where the tank is placed on the support base. The first engagement section and the second engagement section may be recesses that are provided in a bottom surface of the tank and to which the roller is fitted.

The first engagement section may have a first restriction surface configured to restrict the movement of the tank in the pressing direction by abutting on a front side of the engaging section in the pulling direction when the tank is in the installation position, and a first guide surface configured to restrict the movement of the tank in the pulling direction by abutting on a rear side of the engaging section in the pulling direction when the tank is in the installation position and inclined toward the pressing direction as the first guide surface extends downward from an apex of the recess. The second engagement section may have a second restriction surface configured to restrict the movement of the tank in the pulling direction by abutting on the front side of the engaging section in the pressing direction when the tank is in the withdrawn position, and a second guide surface configured to restrict the movement of the tank in the pressing direction by abutting on the rear side of the engaging section in the pressing direction when the tank is in the withdrawn position and inclined toward the pulling direction as the second guide surface extends downward from the apex of the recess.

The securing device may include a stay member provided at the tank and movable together with the tank, a first securing section and a second securing section provided at the machine body and away from each other in the movement direction of the tank, and a first securing member configured to secure the stay member to the first securing section when the tank is in the installation position and to secure the stay member to the second securing section when the tank is in the withdrawn position.

The securing device may include a third securing section and a fourth securing section provided at the machine body and away from each other in the movement direction of the tank, a second securing member configured to secure the stay member to the third securing section when the tank is in the installation position, and a third securing member configured to secure the stay member to the fourth securing section when the tank is in the installation position. The fourth securing section may be disposed toward the pulling direction, extending from the installation position toward the withdrawn position, relative to the third securing section. The stay member may be secured to the fourth securing section by the third securing member when the tank is in the withdrawn position.

The tank may include a tank body and a protrusion protruding downward from a bottom of the tank body.

A prime mover equipped in the machine body may be provided. The tank may be a fuel tank storing fuel for the prime mover.

The working machine according to still a further aspect of the present invention includes: a machine body, a prime mover on the machine body; a prime mover room to contain the prime mover; a cooling fan to deliver cooling air toward the prime mover; a discharge portion to fluidly connect an inside and an outside of the prime mover room to each other at a bottom of the machine body; an exhaust gas purifier to purify exhaust gas discharged from the prime mover; an exhaust pipe to discharge the exhaust gas discharged from the exhaust gas purifier at a position in an internal space of the prime mover room; and a flow straightener to guide a mixture of the exhaust gas discharged from the exhaust pipe and the cooling air to the discharge portion.

The flow straightener may have a cylindrical flow straightener body to take in the gas mixture from the exhaust pipe and release the gas mixture near the discharge portion.

The cooling fan may deliver the cooling air from one side toward the other side in a machine-body width direction. The flow straightener body may be inclined downward from the exhaust pipe toward the discharge portion as the flow straightener body extends toward the other side, and has an inlet opening oriented toward the one side, that is, toward the exhaust pipe, and taking in the cooling air. An outlet for the exhaust gas from the exhaust pipe may be disposed near the inlet opening or inside the cylindrical flow straightener body.

The exhaust pipe may be oriented such as to blow the exhaust gas onto an inner surface of the flow straightener body.

The machine body may have a weight defining a rear portion of the machine body. The discharge portion includes a first discharge portion provided at the weight. The flow straightener may have a guide plate extending toward the first discharge portion from the flow straightener body and guiding the gas mixture released from the flow straightener body to the first discharge portion.

The machine body may have a substrate on which the prime mover is installed. The discharge portion includes a second discharge portion provided in the swivel substrate. The flow straightener may have an extension plate extending above the second discharge portion from the flow straightener body and guiding the gas mixture released from the flow straightener body to the second discharge portion.

The cooling fan may deliver the cooling air from one side toward the other side in a machine-body width direction. The flow straightener body may have a first component body and a second component body connected to a position at the other side of the first component body, and also may have a gap provided in a connection area between the first component body and the second component body and taking the cooling air into the second component body from the one side and from outside the first component body.

A working machine according to still a further aspect of the present invention includes: a machine body; a prime mover on the machine body; a cooling fan to deliver cooling air toward the prime mover; an air cleaner disposed downstream of the prime mover in a direction of a flow of the cooling air; a hood defining the prime mover room to contain the prime mover; an air intake portion provided in the hood at an opposite side of the prime mover from the cooling fan; and a connection duct connecting the air intake portion and the air cleaner to each other.

The air intake portion may include an air intake box defining an air intake chamber configured to take in air outside the hood. The connection duct is connected to the air intake box.

The air intake portion may include an air inlet through which the air outside the hood is taken into the air intake chamber. The connection duct has a suction port configured to suction air inside the air intake chamber into the connection duct. The suction port may be provided in the air intake chamber at a position offset horizontally or upward from the air inlet.

The connection duct may have an insertion section inserted in the air intake chamber. The insertion section may be offset horizontally or upward from the air inlet. The suction port may be provided in a wall of the insertion section located opposite the air inlet.

The insertion section may be offset in the horizontal direction from the air inlet. The suction port extends through the wall and is oriented upward from a lower end of the wall. The insertion section may have a lower wall defining a lower surface of an internal space of the insertion section. The lower wall has a cutout communicating with a lower end of the suction port.

The air intake box may have an opening oriented toward the hood and communicating with the air inlet, and an opening edge defining the opening is secured to an inner surface of the hood.

The air intake box may have a bottom wall defining a lower surface of the air intake chamber. The bottom wall may have a first edge defining the opening edge and a second edge opposite the first edge, and is inclined downward as the bottom wall extends from the second edge toward the first edge. The hood may have a drain section configured to allow water moving on the bottom wall to travel outward from the hood.

The hood may have a hole that faces the opening and around which the opening edge is secured, and a plate member disposed to externally cover the hole and provided with the air inlet. The drain section may include a gap between a lower edge of the plate member and a peripheral wall surrounding the hole.

The connection duct may have a first duct member connected to the air intake portion, a second duct member connected to the air cleaner, and a third duct member composed of an elastic material and connecting the first duct member and the second duct member to each other.

A working machine according to still a further aspect of the present invention includes: a machine body; a prime mover on the machine body; a hood openable and closable and defining the prime mover room to contain the prime mover; a cooler disposed between the prime mover and the hood and including a cooling unit and a cooling fan; a stationary duct located on the same side of the cooler as the hood; and an openable-closable duct located on the same side of the hood as the cooler, wherein the openable-closable duct and the stationary duct are configured such that, when the hood is closed, the openable-closable duct and the stationary duct are connected to each other and outside air from outside the machine body enters the cooler via the openable-closable duct and the stationary duct.

The hood may have a side wall disposed laterally to the cooler and an upper wall connected to an upper portion of the side wall. An outside-air intake portion configured to take outside air into the openable-closable duct from outside the machine body may be provided in the upper wall at a position higher than the stationary duct. The openable-closable duct may be provided over the side wall and the upper wall, guide the outside air taken in from the outside-air intake portion downward along the side wall, and then cause the outside air to flow through the stationary duct connected to the inner side of the openable-closable duct in a machine-body width direction.

The openable-closable duct may be defined by the side wall, the upper wall, and a partition member disposed at an inner side of the machine body relative to the side wall and the upper wall. The partition member may have an opening provided at a position corresponding to the cooler and configured to allow outside air to flow to the stationary duct.

A seal member may be provided to seal a connection area between the openable-closable duct and the stationary duct when the hood is closed.

A dust-proof net may be provided near the connection area between the stationary duct and the openable-closable duct to collect refuse contained in the outside air flowing from the openable-closable duct toward the stationary duct.

The dust-proof net may be attachable to and detachable from the stationary duct or the openable-closable duct by opening the hood.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
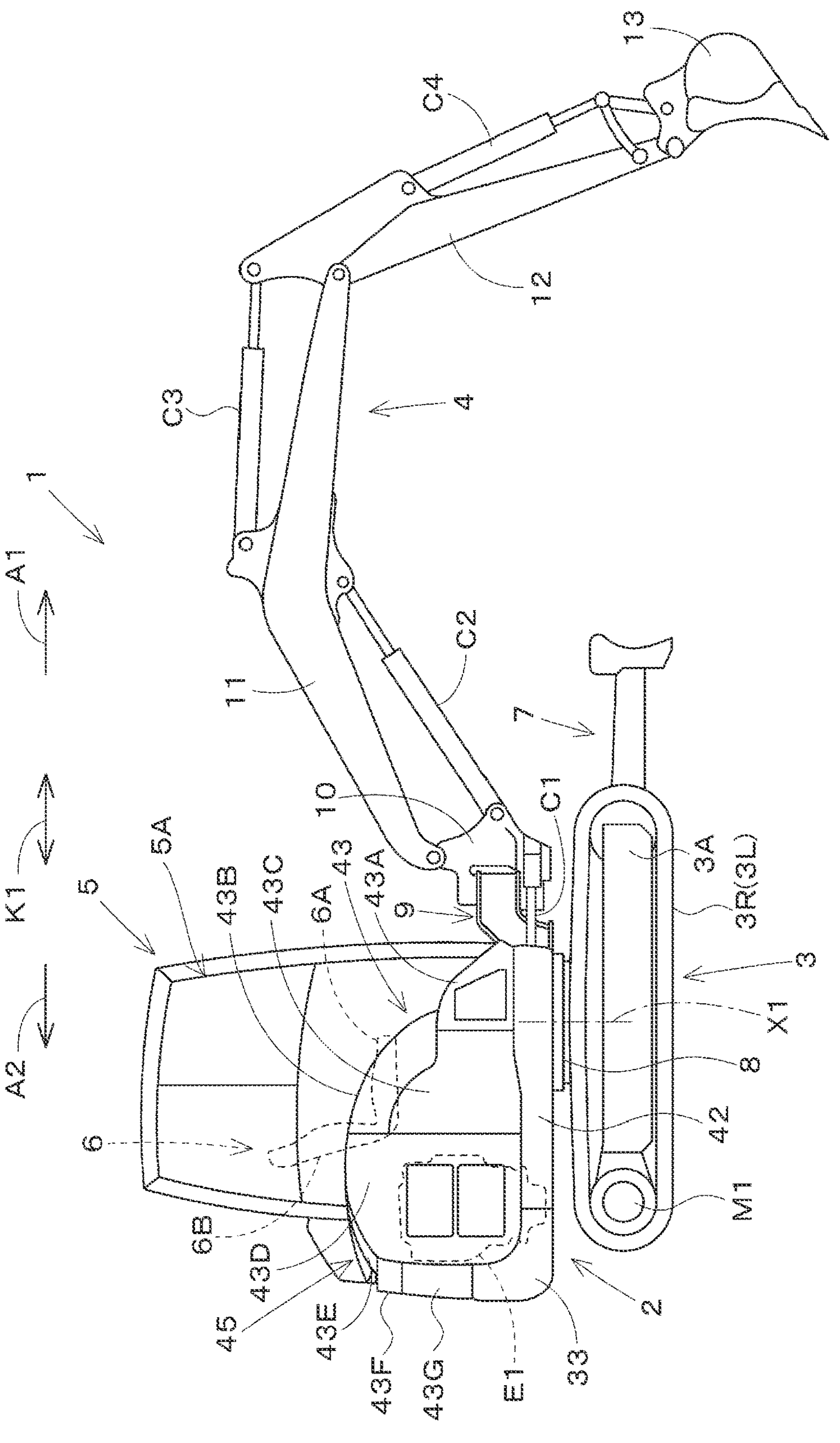
FIG. 1 is a schematic side view illustrating the overall configuration of a working machine according to an embodiment.

The preferred embodiments will now be described with reference to the accompanying drawings, wherein like reference numerals designate corresponding or identical elements throughout the various drawings. The drawings are to be viewed in an orientation in which the reference numerals are viewed correctly.

Embodiments of the present invention will be described below with reference to the drawings, where appropriate.

Figure 2:
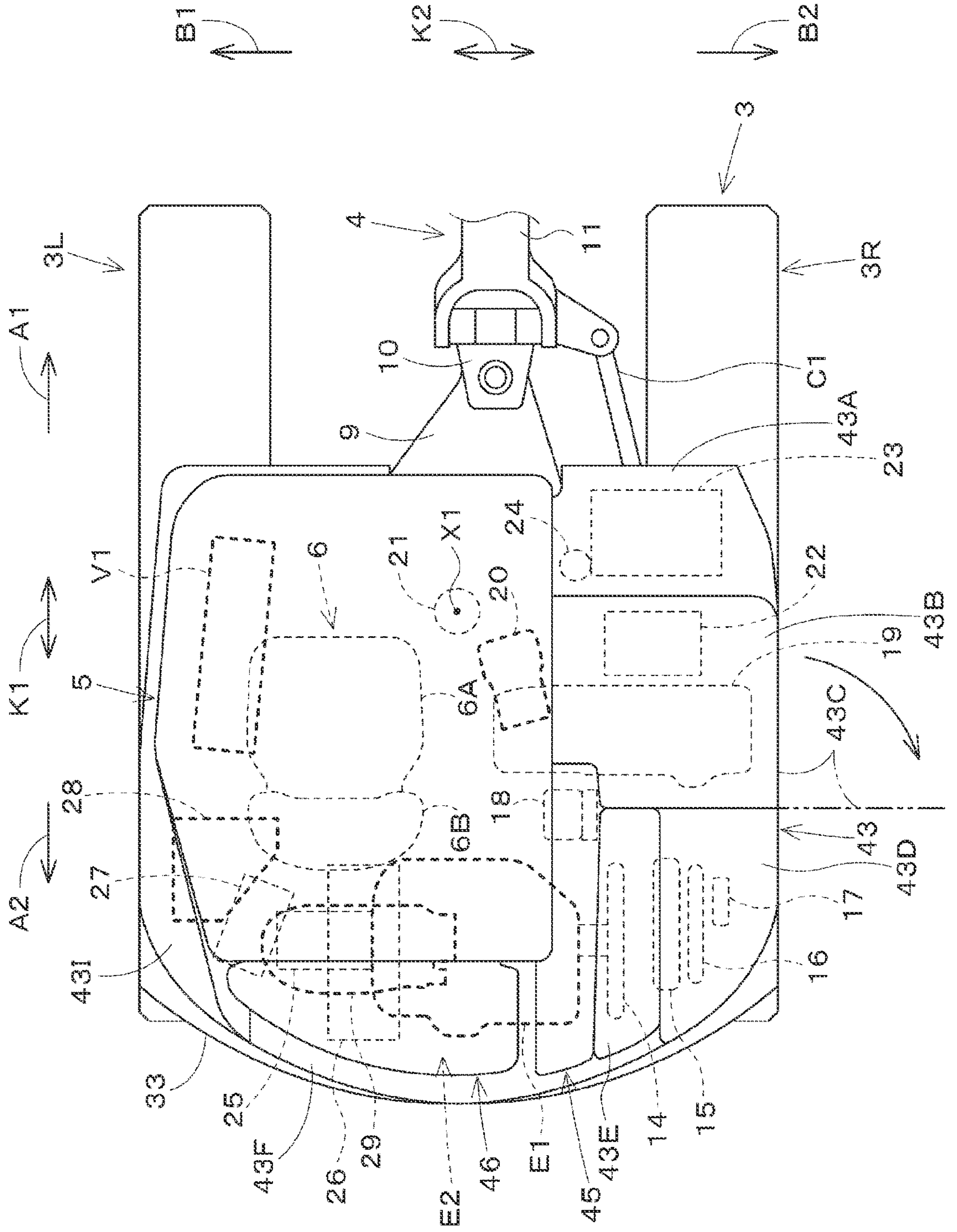
FIG. 2 is a schematic plan view of the working machine according to the embodiment.

FIG. 1 to FIG. 34 illustrate an embodiment. FIG. 1 is a schematic side view illustrating the overall configuration of a working machine 1 according to the embodiment. FIG. 2 is a schematic plan view of the working machine 1. In this embodiment, a backhoe serving as a swivel working machine is exemplified as the working machine 1.

As illustrated in FIG. 1 and FIG. 2, the working machine 1 includes a machine body (swivel base) 2, a traveling device 3, and a working device 4. The machine body 2 is equipped with a cabin 5. An operator's seat 6 where an operator (driver) sits is provided inside the cabin 5. In other words, the operator's seat 6 is surrounded by the cabin 5. The operator's seat 6 has a seat portion 6A on which the operator sits (is seated) and a backrest portion 6B that supports the operator's back.

In this embodiment, a direction (indicated by an arrow A1 in FIG. 1 and FIG. 2) extending forward from the operator sitting in the operator's seat 6 of the working machine 1 will be described as a forward direction (machine-body forward direction), and a direction (indicated by an arrow A2 in FIG. 1 and FIG. 2) extending rearward from the operator will be described as a rearward direction (machine-body rearward direction). A direction indicated by an arrow K1 in FIG. 1 and FIG. 2 will be described as a front-rear direction. A direction (toward the far side in FIG. 1 and indicated by an arrow B1 in FIG. 2) extending leftward from the operator will be described as a leftward direction, and a direction (toward the near side in FIG. 1 and indicated by an arrow B2 in FIG. 2) extending rightward from the operator will be described as a rightward direction.

Furthermore, the horizontal direction extending orthogonally to the front-rear direction (machine-body front-rear direction) K1 will be described as a machine-body width direction K2 (see FIG. 2). A direction extending rightward or leftward from the widthwise center of the machine body 2 will be described as a machine-body-widthwise outward direction. In other words, the machine-body-widthwise outward direction extends away from the widthwise center of the machine body 2 in the machine-body width direction K2. A direction extending opposite from the machine-body-widthwise outward direction is described as a machine-body-widthwise inward direction. In other words, the machine-body-widthwise inward direction extends toward the widthwise center of the machine body 2 in the machine-body width direction K2.

Although the operator's seat 6 is described as being disposed within the cabin 5 (cabin-specific) in this embodiment, the embodiment is not limited to this. The operator's seat 6 may be exposed to the outside in the front-rear direction K1 and the machine-body width direction K2 and may have the upper side thereof covered with a roof (canopy) (canopy-specific), or the operator's seat 6 may be exposed to the outside in the front-rear direction K1 and the machine-body width direction K2 and also have the upper side thereof exposed to the outside.

As illustrated in FIG. 1 and FIG. 2, the traveling device 3 is of a crawler type that supports the machine body 2 in a travelable manner, and has a traveling frame 3A, a first traveling device 3L provided at the left side of the traveling frame 3A, and a second traveling device 3R provided at the right side of the traveling frame 3A. The first traveling device 3L and the second traveling device 3R are driven by a traveling motor M1 defined by a hydraulic motor (hydraulic actuator). The traveling device 3 used in this embodiment is not limited to the crawler type and may be a traveling device of a wheel type. A dozer 7 is attached to the front portion of the traveling device 3.

As illustrated in FIG. 1, the machine body 2 is supported on the traveling device 3 via a swivel bearing 8 in a swivelable manner around a swivel axis X1 extending in the up-down direction. As illustrated in FIG. 2, the cabin 5 is disposed toward the left and the front of the machine body 2.

As illustrated in FIG. 1, the machine body 2 has, at the front portion thereof, a support bracket 9 and a swing bracket 10 that support the working device 4. The support bracket 9 protrudes forward from the machine body 2. The swing bracket 10 is attached to the front portion of the support bracket 9 in a swingable manner around a vertical axis (axis extending in the up-down direction).

As illustrated in FIG. 1, the working device 4 has a boom 11, an arm 12, and a bucket 13. The base of the boom 11 is pivotally supported by the upper portion of the swing bracket 10 in a rotatable manner around a horizontal axis (axis extending in the machine-body width direction K2). The arm 12 is pivotally supported by the distal end of the boom 11 in a rotatable manner around a horizontal axis. The bucket 13 is provided at the distal end of the arm 12 in such a manner as to be capable of moving in a shoveling motion and a dumping motion. A shoveling motion involves swinging the bucket 13 toward the boom 11 and is performed when, for example, shoveling soil. A dumping motion involves swinging the bucket 13 away from the boom 11 and is performed when, for example, dropping (releasing) the shoveled soil.

In place of or in addition to the bucket 13, another working tool (hydraulic attachment) that can be driven by a hydraulic actuator may be attached to the working machine 1. Examples of such another working tool include a hydraulic breaker, a hydraulic crusher, an angle broom, an earth auger, a pallet fork, a sweeper, a mower, and a snow blower.

The swing bracket 10 is swingable in accordance with extension and retraction of a swing cylinder C1. The boom 11 is swingable in accordance with extension and retraction of a boom cylinder C2. The arm 12 is swingable in accordance with extension and retraction of an arm cylinder C3. The bucket 13 is capable of moving in a shoveling motion and a dumping motion in accordance with extension and retraction of a bucket cylinder C4. The swing cylinder C1, the boom cylinder C2, the arm cylinder C3, and the bucket cylinder C4 are hydraulic cylinders (hydraulic actuators).

The arrangement of main devices equipped in the working machine 1 will now be schematically described with reference to, for example, FIG. 2.

Figure 5:
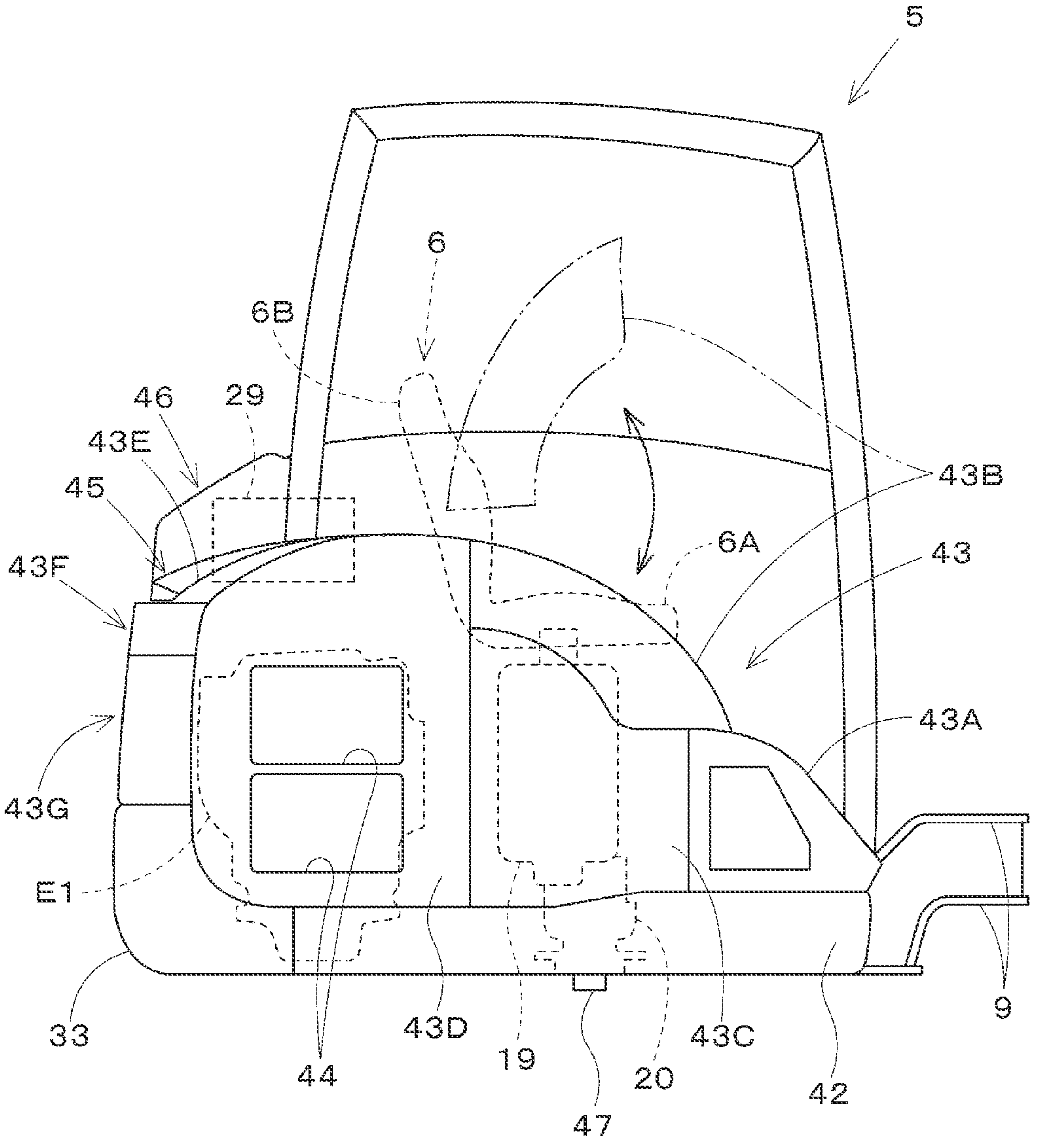
FIG. 5 is a right side view of the machine body and a cabin.
Figure 6:
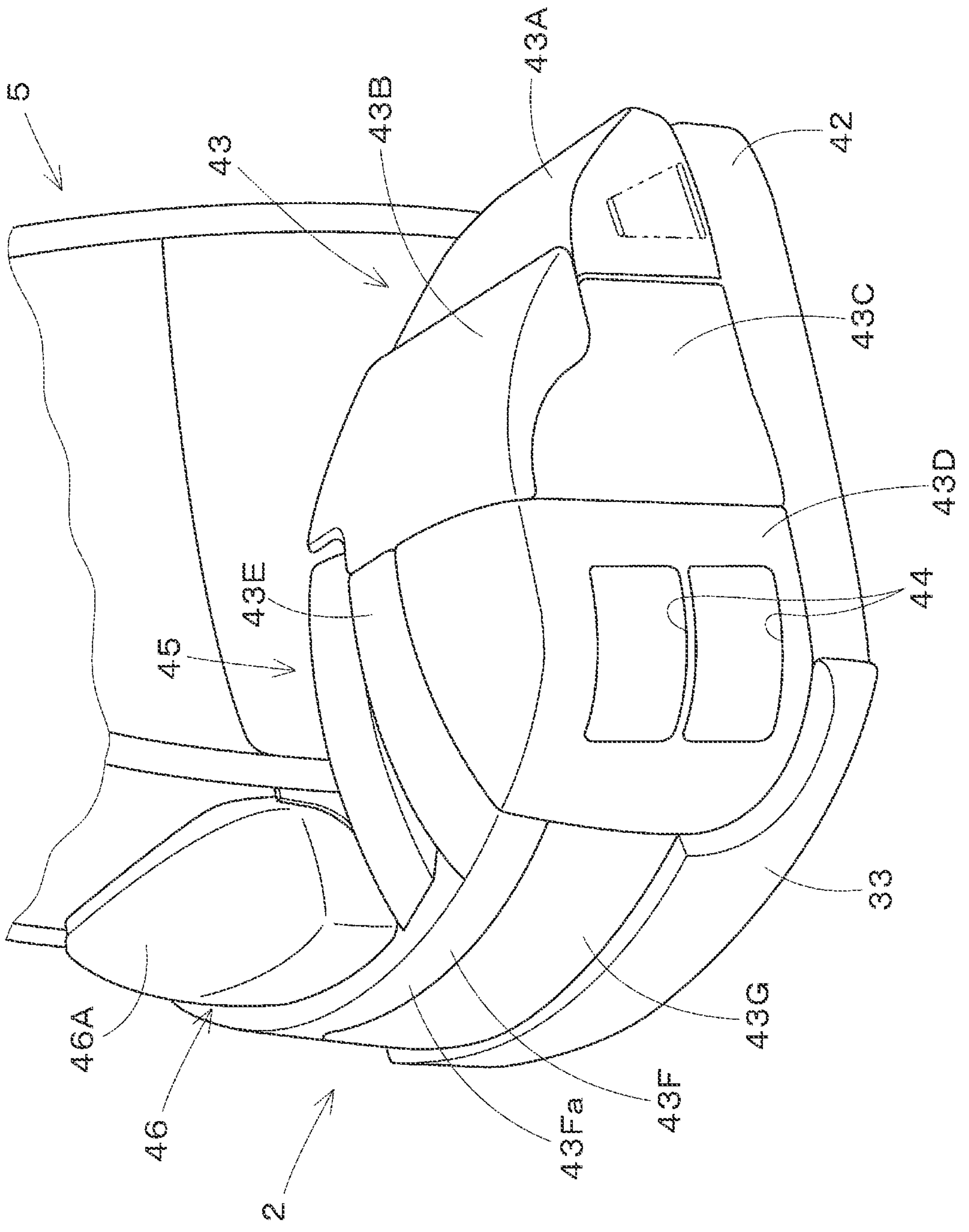
FIG. 6 is a perspective view of the machine body and the cabin, as viewed from the right rear side.

As illustrated in FIG. 2, the rear portion of the machine body 2 is equipped with a prime mover E1 (see FIG. 5). The prime mover E1 is a diesel engine. The prime mover E1 may be a gasoline engine or an electric motor, or may be of a hybrid type having an engine and an electric motor. A cooling fan 14 is attached to the right portion of the prime mover E1. The cooling fan 14 is driven by the prime mover E1 and generates cooling air flowing from right to left, that is, toward the prime mover E1 from outside the machine body 2. Specifically, the cooling fan 14 is a suction fan that suctions air (outside air) from the right side of the machine body 2 and causes the air to flow toward the prime mover E1.

A radiator 15, an oil cooler 16, and a fuel cooler 17 are disposed to the right of the cooling fan 14. The radiator 15 is a cooling unit for cooling a coolant that cools the prime mover E1. The oil cooler 16 is a cooling unit for cooling a hydraulic fluid returning from hydraulic actuators, such as hydraulic cylinders and hydraulic motors. The fuel cooler 17 is a cooling unit for cooling fuel. These cooling units are cooled by the cooling air suctioned by the cooling fan 14.

A compressor 18 driven by the prime mover E1 is disposed in front of the right portion of the prime mover E1. The compressor 18 is a portion of an air-conditioning system (air conditioner) equipped in the working machine 1 and turns a cooling medium (air conditioner gas) into a semi-liquid state by compression.

A fuel tank (tank) 19 is disposed in front of the compressor 18, the radiator 15, and the oil cooler 16. The fuel tank 19 stores fuel for the prime mover E1. A swivel motor 20 is disposed below the left portion of the fuel tank 19 (see FIG. 5). The swivel motor 20 is a hydraulic motor (hydraulic actuator). The swivel motor 20 swivels (rotationally drives) the machine body 2 around a swivel axis X1. A swivel joint 21 is disposed at the position of the swivel axis X1. The swivel joint 21 is a rotary joint that enables supplying and discharging of a hydraulic fluid between the hydraulic actuator of the traveling device 3 and a control valve V1 of the machine body 2. The left portion of the fuel tank 19, the swivel motor 20, and the swivel joint 21 are disposed below the cabin 5.

A battery 22 is disposed in front of the fuel tank 19. The battery 22 is a storage battery that supplies electric power to electrical components equipped in the working machine 1. A condenser 23 and a receiver 24 as parts of the air-conditioning system are disposed in front of the battery 22. The condenser 23 dissipates the heat of the cooling medium from the compressor 18 to liquefy the cooling medium. Specifically, the condenser 23 is a cooling unit that cools the cooling medium turned into a semi-liquid state in the compressor 18 to liquefy the cooling medium. In this embodiment, the condenser 23 is an electric condenser cooled by an electric fan. The receiver 24 stores the cooling medium liquefied by the condenser 23. The receiver 24 separates a cooling medium not liquefiable by the condenser 23 and the liquefied cooling medium from each other and removes moisture and impurities.

A hydraulic pump 25 is attached to one side (left portion) of the prime mover E1. The hydraulic pump 25 is driven by power from the prime mover E1. The hydraulic pump 25 delivers a hydraulic fluid (pressure oil) that drives the hydraulic actuators, such as hydraulic motors and hydraulic cylinders, equipped in the working machine 1. The hydraulic pump 25 delivers a pilot pressure for actuating a hydraulic valve as well as a hydraulic pressure for signals.

An exhaust gas purifier 26, an air cleaner 27, and a hydraulic fluid tank 28 are disposed to the left of the prime mover E1. The exhaust gas purifier 26 purifies exhaust gas discharged from the prime mover E1 and is, for example, a DPF (diesel particulate filter). The air cleaner 27 cleans air to be supplied to the prime mover E1. The hydraulic fluid tank 28 stores a hydraulic fluid. The exhaust gas purifier 26 and the air cleaner 27 are disposed higher than the hydraulic pump 25, and the air cleaner 27 is disposed to the left of the exhaust gas purifier 26. The hydraulic fluid tank 28 is disposed lower than the operator's seat 6. The hydraulic fluid is delivered from the hydraulic fluid tank 28 to the hydraulic pump 25.

The control valve V1 is disposed in front of the hydraulic fluid tank 28. The control valve V1 controls the flow rate of hydraulic fluid to be supplied from the hydraulic pump 25 to the hydraulic actuators that are equipped in the working machine 1 and that are driven by the hydraulic fluid. Specifically, the control valve V1 is a valve unit having a group of control valves that control the flow rate of hydraulic fluid to be supplied to the individual hydraulic actuators equipped in the working machine 1. The control valve V1 is disposed below a step 84*a* to be described later.

The hydraulic fluid tank 28 and the control valve V1 are disposed at the same side as the hydraulic pump 25 in the machine body 2. The hydraulic pump 25, the hydraulic fluid tank 28, and the control valve V1 are disposed at one side (left side) of the machine body 2, so that, for example, a route of a hydraulic hose routed among the hydraulic pump 25, the hydraulic fluid tank 28, and the control valve V1 can be simplified.

An air conditioner body 29 for air-conditioning the inside of the cabin 5 is disposed above the prime mover E1, the hydraulic pump 25, and the exhaust gas purifier 26 (see FIG. 5). The air conditioner body 29 serves as a main unit of the air-conditioning system and has, for example, a casing, an expansion valve accommodated within the casing, an evaporator, and a blower fan. In the air conditioner body 29, the cooling medium from the receiver 24 is vaporized by being injected into the evaporator from the expansion valve. The vaporized cooling medium cools the evaporator, and air from the blower fan travels through the evaporator, whereby cool air is generated. The cooling medium output from the evaporator returns to the compressor 18. A heating system of the air-conditioning system utilizes the heat of the prime mover E1.

Figure 3:
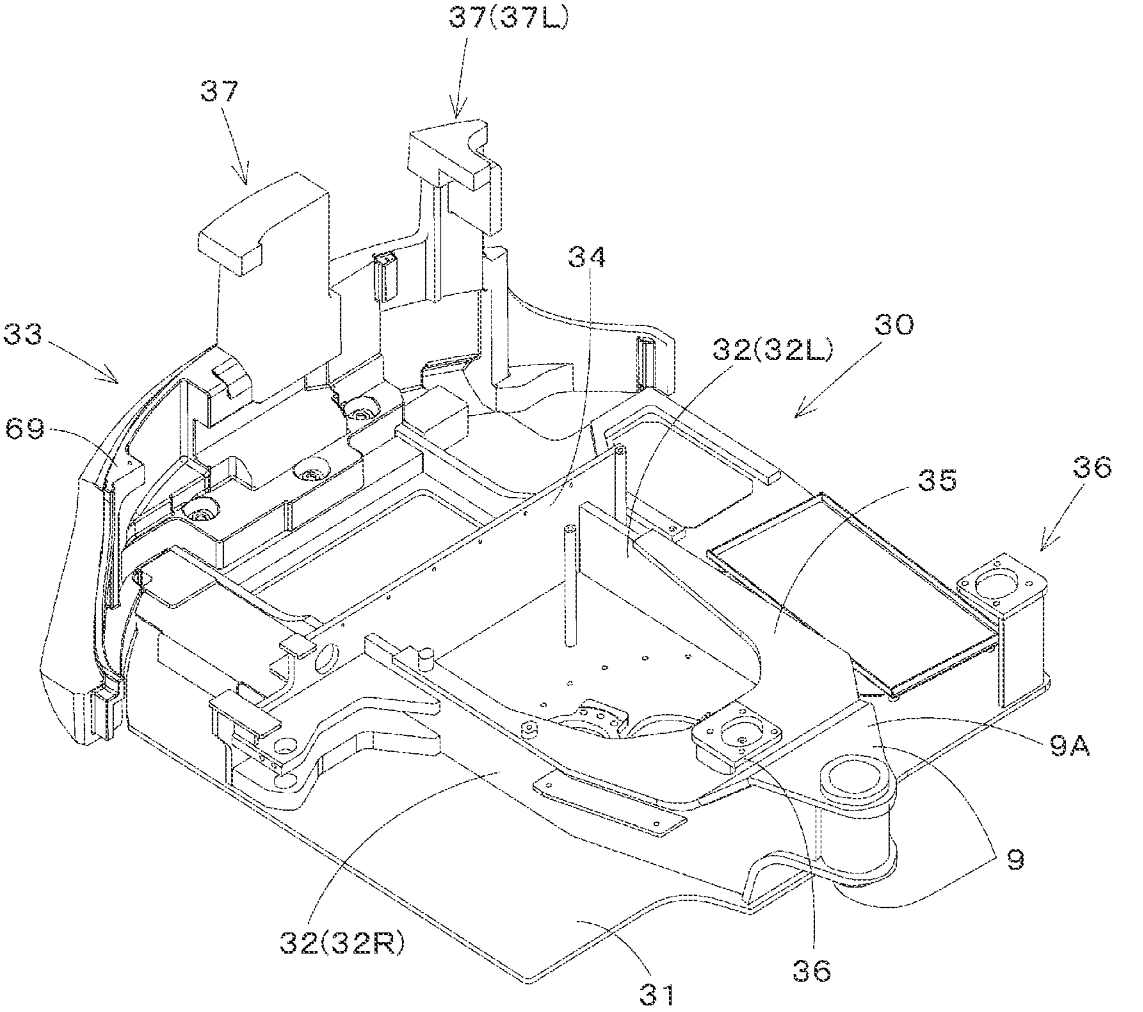
FIG. 3 is a perspective view of a swivel frame.

As illustrated in FIG. 3, the machine body 2 has a swivel frame 30 as a framework. The swivel frame 30 has a swivel substrate (substrate) 31 defining the bottom of the machine body 2, a reinforcement rib 32 that reinforces the swivel substrate 31, the aforementioned support bracket 9, and a weight 33. The swivel frame 30 also has, for example, brackets and stays for attaching devices, tanks, and other components equipped in the machine body 2. The swivel substrate 31 is formed of, for example, a thick steel sheet. The brackets and stays equipped in the swivel frame 30 are fixed on the swivel substrate 31 by welding. The swivel substrate 31 is supported on the traveling device 3 via the swivel bearing 8 in a rotatable manner around the swivel axis X1.

The reinforcement rib 32 is provided on the swivel substrate 31 to extend toward the rear portion from the front portion. The reinforcement rib 32 is formed of a plate material and is fixed to the swivel substrate 31 by welding such that the reinforcement rib 32 stands vertically upright on the swivel substrate 31 (in a state where the thickness direction is aligned with the horizontal direction). Specifically, the reinforcement rib 32 includes a first vertical rib 32R provided at one side (right side) of the swivel substrate 31 in the machine-body width direction K2 and extending toward the rear portion from the front portion of the swivel substrate 31, and also includes a second vertical rib 32L provided at the other side (left side) of the swivel substrate 31 in the machine-body width direction K2 and extending toward the rear portion from the front portion of the swivel substrate 31.

Figure 4A:
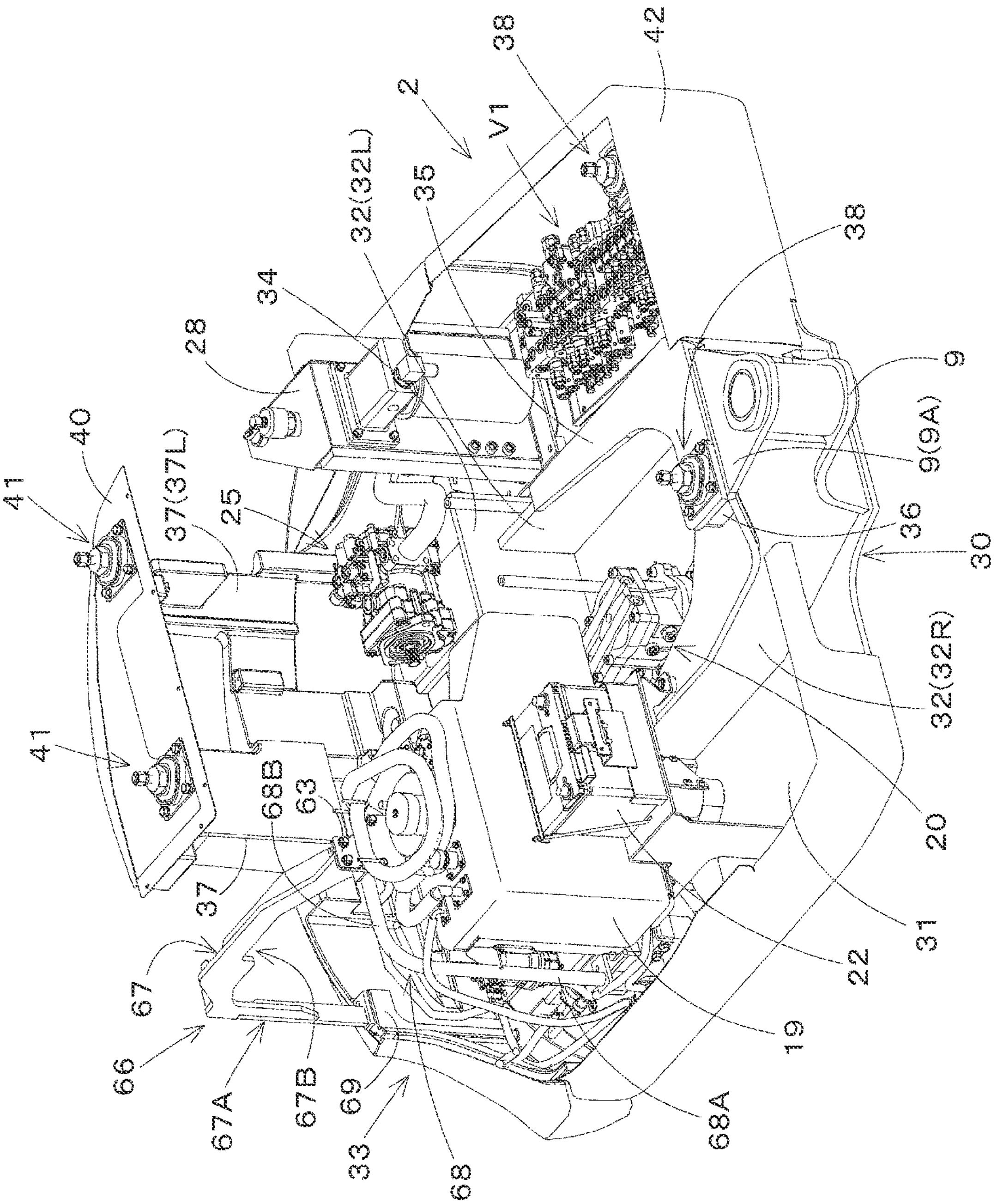
FIG. 4A is a perspective view of a machine body.
Figure 4B:
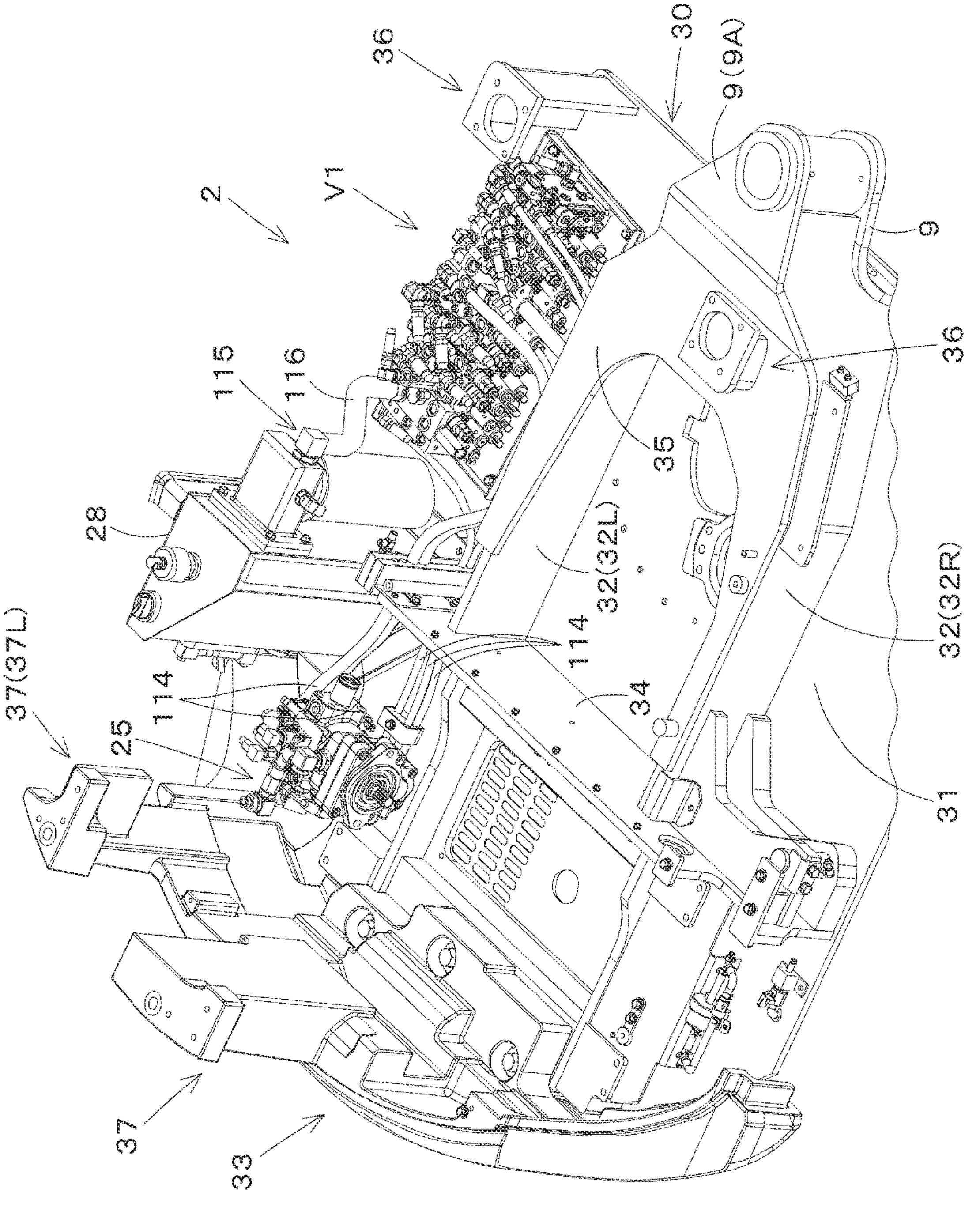
FIG. 4B is a perspective view of the machine body.
Figure 4C:
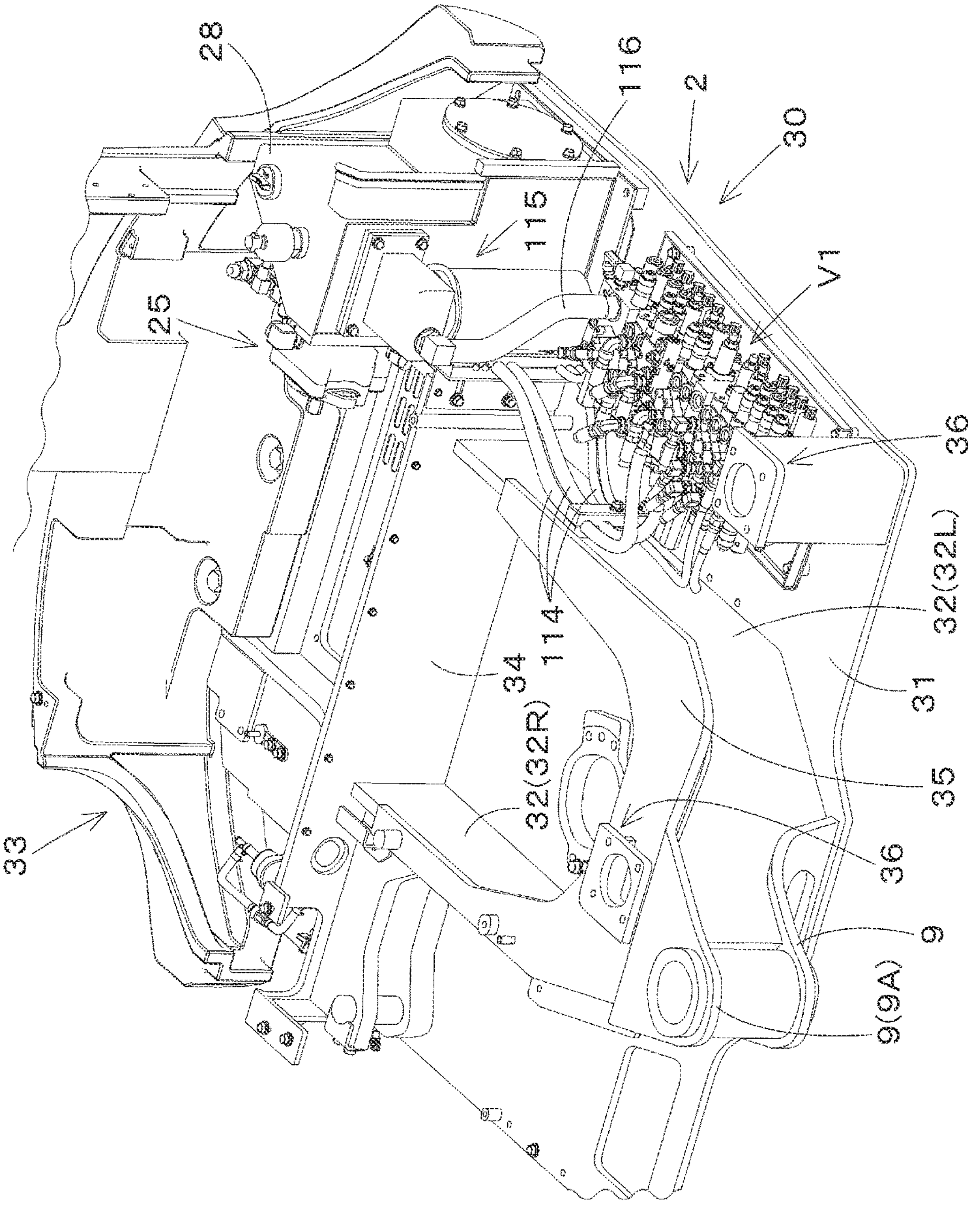
FIG. 4C is a perspective view of the machine body.

As illustrated in FIG. 4A, FIG. 4B, and FIG. 4C, the hydraulic fluid tank 28 is disposed at the other side (left side) in the machine-body width direction K2 relative to the second vertical rib 32L. The control valve V1 is disposed at the other side (left side) in the machine-body width direction K2 relative to the second vertical rib 32L and in front of the hydraulic fluid tank 28. The hydraulic pump 25 is disposed toward the rear side of the machine body relative to the front end of the hydraulic fluid tank 28. A delivery hose (hydraulic hose) 114 that connects the hydraulic pump 25 and the control valve V1 to each other is routed between the second vertical rib 32L and the hydraulic fluid tank 28.

Accordingly, the maintainability of a suction filter (not illustrated) and a return filter 115 provided in the hydraulic fluid tank 28 can be enhanced, and the occurrence of noise caused by interference between the delivery hose (hydraulic hose) 114 and the outer sheath can be avoided.

The front portion of the hydraulic fluid tank 28 is provided with the return filter 115, and the return filter 115 and the control valve V1 are connected to each other by a return hose (hydraulic hose) 116.

The support bracket 9 is formed of a pair of upper and lower plate members and is secured to the front portion of the reinforcement rib 32. The weight 33 is attached to the rear portion of the swivel substrate 31.

A partition plate 34 is fixed to an intermediation area of the swivel substrate 31 in the front-rear direction. The partition plate 34 extends in the machine-body width direction K2 in a vertically upright state, and extends across the first vertical rib 32R and the second vertical rib 32L. The prime mover E1 is installed between the partition plate 34 and the weight 33. The front end of the hydraulic fluid tank 28 is disposed to the left of the partition plate 34. The rear portion of the hydraulic fluid tank 28 and the hydraulic pump 25 are disposed behind the partition plate 34.

A reinforcement plate 35 extending rearward from an upper plate 9A defining the upper portion of the support bracket 9 is fixed in front of the partition plate 34 and on the first vertical rib 32R and the second vertical rib 32L.

As illustrated in FIG. 3, FIG. 4B, and FIG. 4C, mount attachment sections 36 are provided at the front left side of the swivel substrate 31 and at the front portion of the reinforcement plate 35. The left portion of the weight 33 is provided with a pair of left and right supports 37 that protrude upward.

As illustrated in FIG. 4A, mount members 38 to which the front portion of the cabin 5 is attached such as to support the front portion of the cabin 5 in a vibration-proof manner are attached to the mount attachment sections 36. A shield plate 40 is attached to the left and right supports 37 of the weight 33 via a thick plate member 39 (see FIG. 19). Mount members 41 to which the rear portion of the cabin 5 is attached such as to support the rear portion of the cabin 5 in a vibration-proof manner are attached on the shield plate 40.

As illustrated in FIG. 4A, the left and right side surfaces and the front surface of the swivel frame 30 are covered with a swivel cover 42. The control valve V1 is contained within the machine body 2 and can undergo inspection and maintenance by removing the swivel cover 42.

As illustrated in FIG. 2 and FIG. 5 to FIG. 7, the machine body 2 has a cover unit 43 that covers, for example, devices, components, and members equipped in the swivel frame 30.

Figure 7:
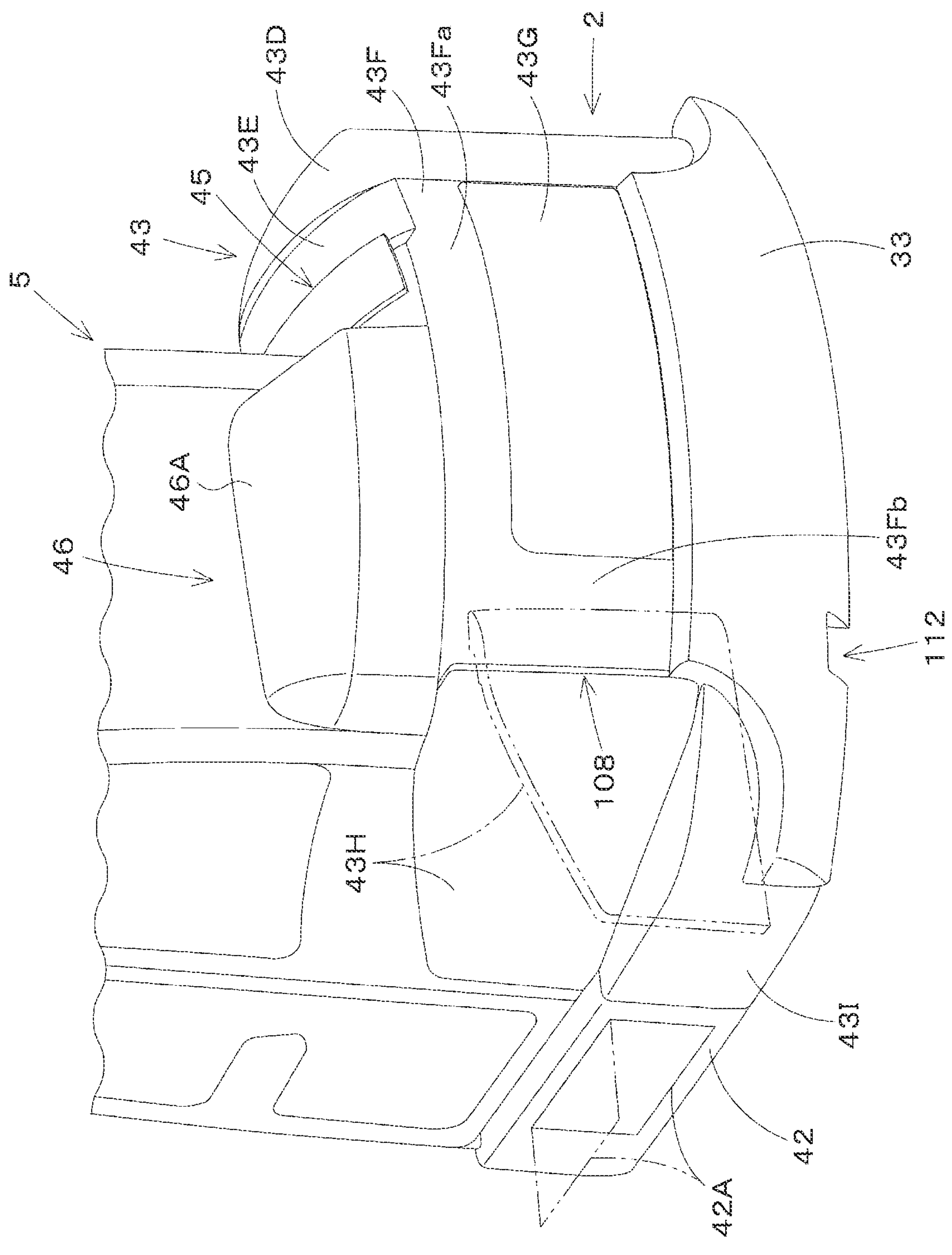
FIG. 7 is a perspective view of the machine body and the cabin, as viewed from the left rear side.
Figure 8:
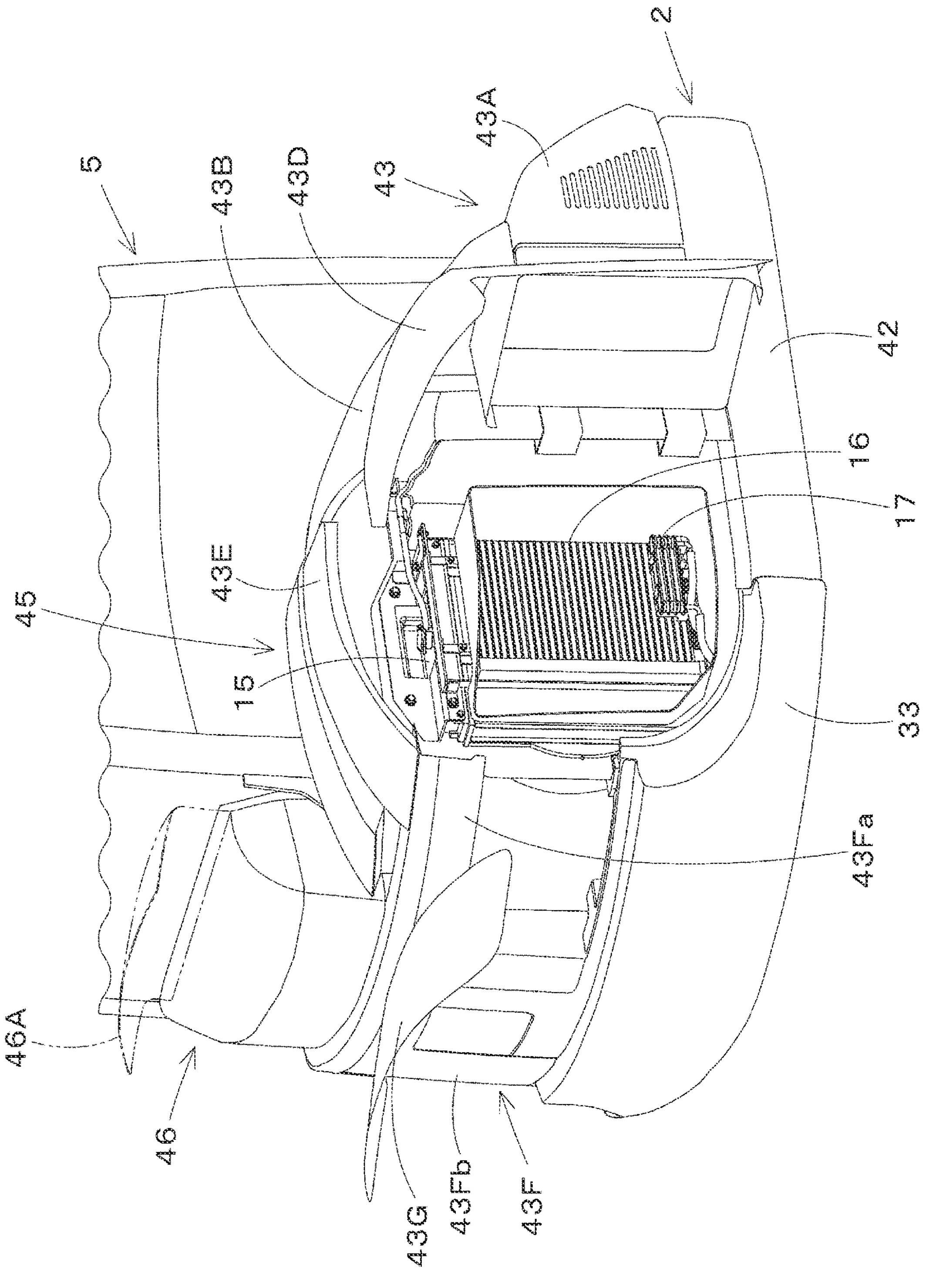
FIG. 8 is a perspective view of the machine body and the cabin, as viewed from the right rear side.

The cover unit 43 has a plurality of covers. The plurality of covers include a first cover 43A to a ninth cover 43I and a duct structure 45. The first cover 43A is disposed at the right front portion of the machine body 2 and covers the condenser 23 and the receiver 24. The first cover 43A is removable and enables inspection and maintenance of the condenser 23 and the receiver 24 by being removed. The second cover 43B is disposed behind the first cover 43A and covers the upper side of the fuel tank 19 and the battery 22. As illustrated in FIG. 5, the second cover 43B has the rear portion thereof pivotally supported by a hinge so as to be openable upward. By being opened, the second cover 43B enables refueling to the fuel tank 19 as well as inspection and maintenance of the fuel tank 19 and the battery 22. The third cover 43C covers the right side of the fuel tank 19 and the battery 22. As illustrated in FIG. 2, the third cover 43C has the rear portion thereof pivotally supported by a hinge so as to be openable rearward. By being opened, the third cover 43C enables inspection and maintenance of the fuel tank 19 and the battery 22. The third cover 43C is not limited to being pivotally supported by the hinge, and may be, for example, detachably attached by using a bolt. The fourth cover 43D covers the upper side of the radiator 15, the oil cooler 16, and the fuel cooler 17 as well as an area thereof from the right side to the rear side. The fourth cover 43D has an opening 44 for taking in outside air suctioned by the cooling fan 14. As illustrated in FIG. 8, the fourth cover 43D has the front portion thereof pivotally supported by a hinge so as to be openable forward. By being opened, the fourth cover 43D enables inspection and maintenance of the radiator 15, the oil cooler 16, and the fuel cooler 17. The fifth cover 43E covers the upper side of the cooling fan 14. The sixth cover 43F and the seventh cover 43G cover the rear side of the prime mover E1. The sixth cover 43F has a first upper section 43Fa located above the seventh cover 43G and a second section 43Fb located to the left of the seventh cover 43G. As illustrated in FIG. 8, the seventh cover 43G has the upper portion thereof pivotally supported by a hinge so as to be openable upward. Alternatively, the seventh cover 43G may have the left portion or right portion thereof pivotally supported by a hinge so as to be openable leftward or rightward. The eighth cover 43H covers the upper portion of the hydraulic fluid tank 28 and the left side of the air cleaner 27. As illustrated in FIG. 7, the eighth cover 43H has the rear portion thereof pivotally supported by a hinge so as to be openable rearward. By being opened, the eighth cover 43H enables inspection and maintenance of the hydraulic fluid tank 28, the air cleaner 27, and the hydraulic pump 25. The ninth cover 43I is disposed below the eighth cover 43H and covers the lower portion of the hydraulic fluid tank 28. The duct structure 45 is provided to the left of the fifth cover 43E, covers the upper side of the prime mover E1, and discharges hot air above the prime mover E1 outward from the cover unit 43.

As illustrated in FIG. 7, the left side surface of the swivel cover 42 is provided with an openable-closable cover 42A. The openable-closable cover 42A has the upper portion thereof pivotally supported by a hinge so as to be openable upward. By being opened, the openable-closable cover 42A allows access to the control valve V1.

Figure 9:
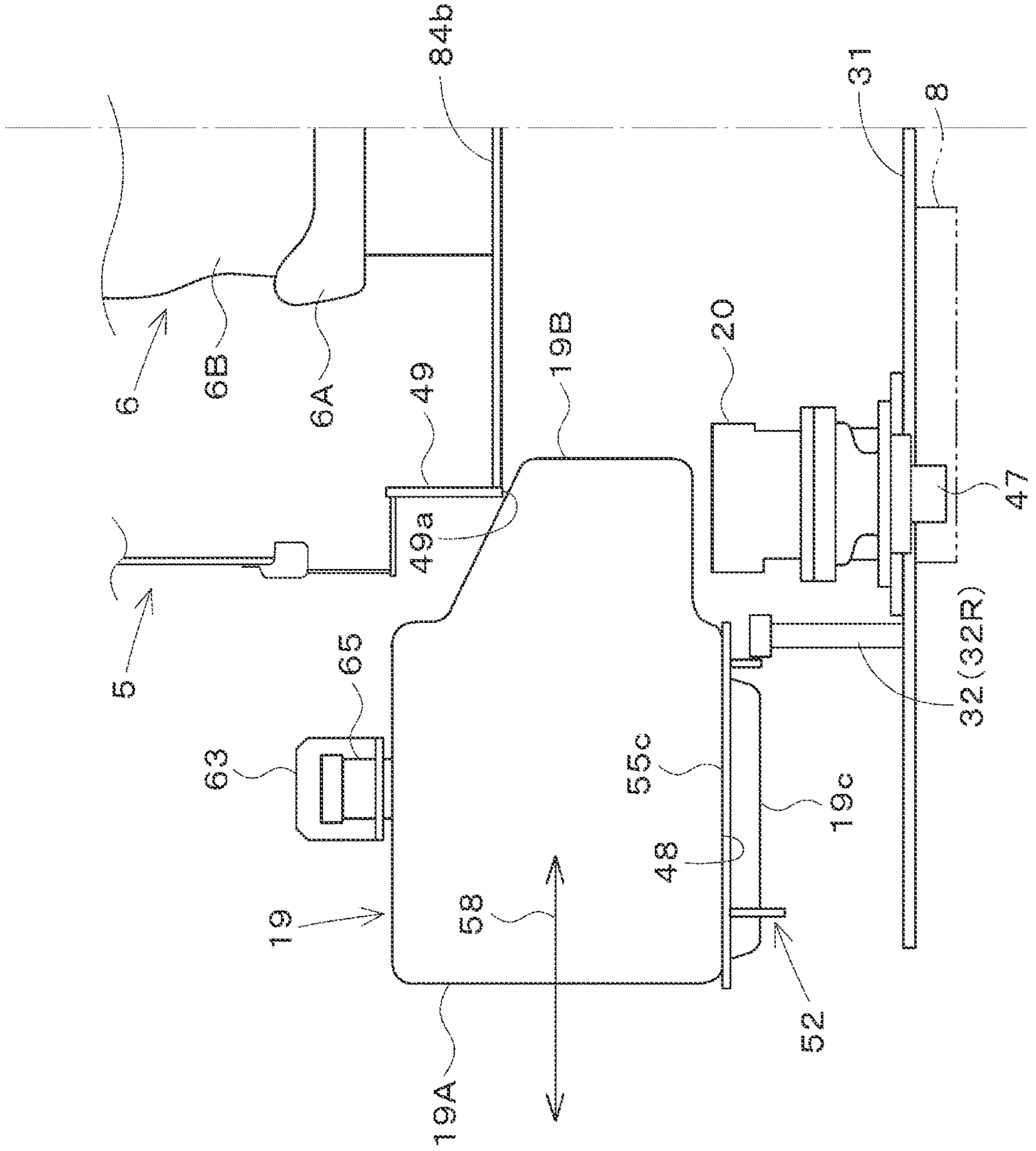
FIG. 9 is a cross-sectional front view illustrating the arrangement of a fuel tank and a swivel motor.

As illustrated in FIG. 4A and FIG. 9, the swivel motor 20 is disposed in front of the partition plate 34 and toward the first vertical rib 32R between the first vertical rib 32R and the second vertical rib 32L. The fuel tank 19 is disposed higher than the first vertical rib 32R (reinforcement rib 32), extends in the machine-body width direction K2 across the upper side of the first vertical rib 32R from the right end of the machine body 2 (the right side of the first vertical rib 32R), and extends above the swivel motor 20.

As illustrated in FIG. 9, the swivel motor 20 is attached on the swivel substrate 31. The swivel motor 20 is disposed below the cabin 5. A swivel pinion 47 driven around a vertical axis by power from the swivel motor 20 is attached to the lower portion of the swivel motor 20. The swivel pinion 47 is disposed below the swivel substrate 31 and meshes with the swivel bearing 8. Specifically, the swivel bearing 8 has an outer ring attached to the machine body 2 and an inner ring that is provided radially inward of the outer ring in a rotatable manner around the swivel axis X1 and that has an internally toothed gear radially inward of the inner ring. The swivel pinion 47 meshes with the internally toothed gear. The swivel pinion 47 is rotationally driven by the swivel motor 20 to move along the internally toothed gear, whereby the machine body 2 swivels around the swivel axis X1.

As illustrated in FIG. 9, the fuel tank 19 is disposed near the swivel motor 20. Specifically, the fuel tank 19 is disposed to the right of the swivel motor 20. The fuel tank 19 has a tank body 19A disposed to the right of the swivel motor 20, an overhanging portion 19B extending leftward from the tank body 19A and overhanging above the swivel motor 20, and a protrusion 19C protruding downward from the tank body 19A. The protrusion 19C extends in the machine-body width direction K2 at the center of the tank body 19A in the front-rear direction (see FIG. 15). The lower surface of the tank body 19A located in front of and behind the protrusion 19C defines placement lower surfaces 48 that are placed on placement sections 55*c* to be described later. The pair of placement lower surfaces 48 are flat surfaces extending in the machine-body width direction K2.

The fuel tank 19 according to this embodiment is provided with the overhanging portion 19B and the protrusion 19C, so that the capacity of the fuel tank 19 can be increased.

Figure 10:
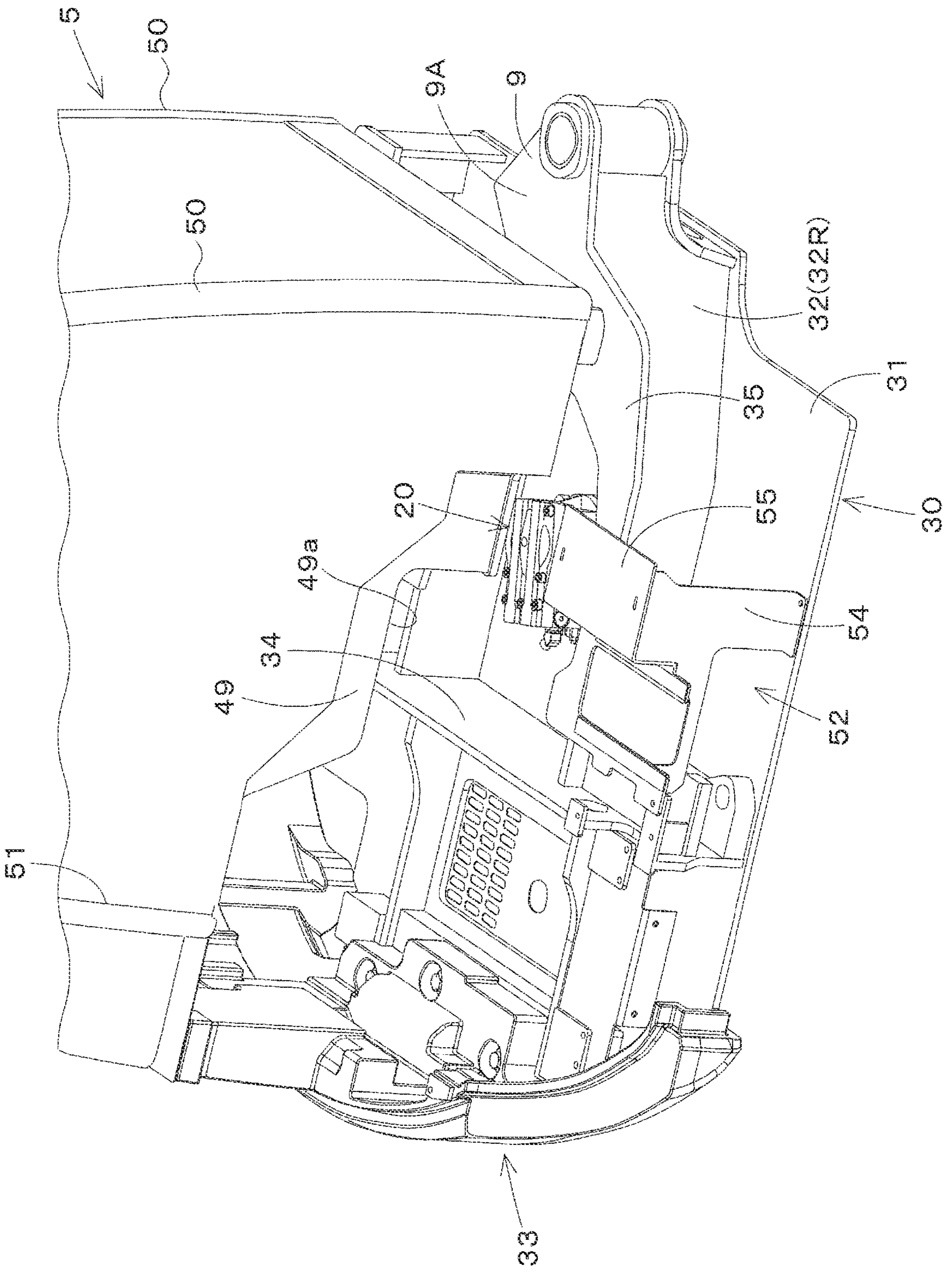
FIG. 10 is a perspective view of the cabin and the swivel frame.

As illustrated in FIG. 9 and FIG. 10, the cabin 5 has lower side plates 49 at the lower portion thereof. The lower side plates 49 are provided at the lower left portion and the lower right portion of the cabin 5. The left and right lower side plates 49 constitute a cabin frame defining the framework of the cabin 5 together with a front pillar 50 and a rear pillar 51. The lower portion of each lower side plate 49 is provided with a cutout 49*a* for avoiding interference with the overhanging portion 19B of the fuel tank 19.

Figure 11:
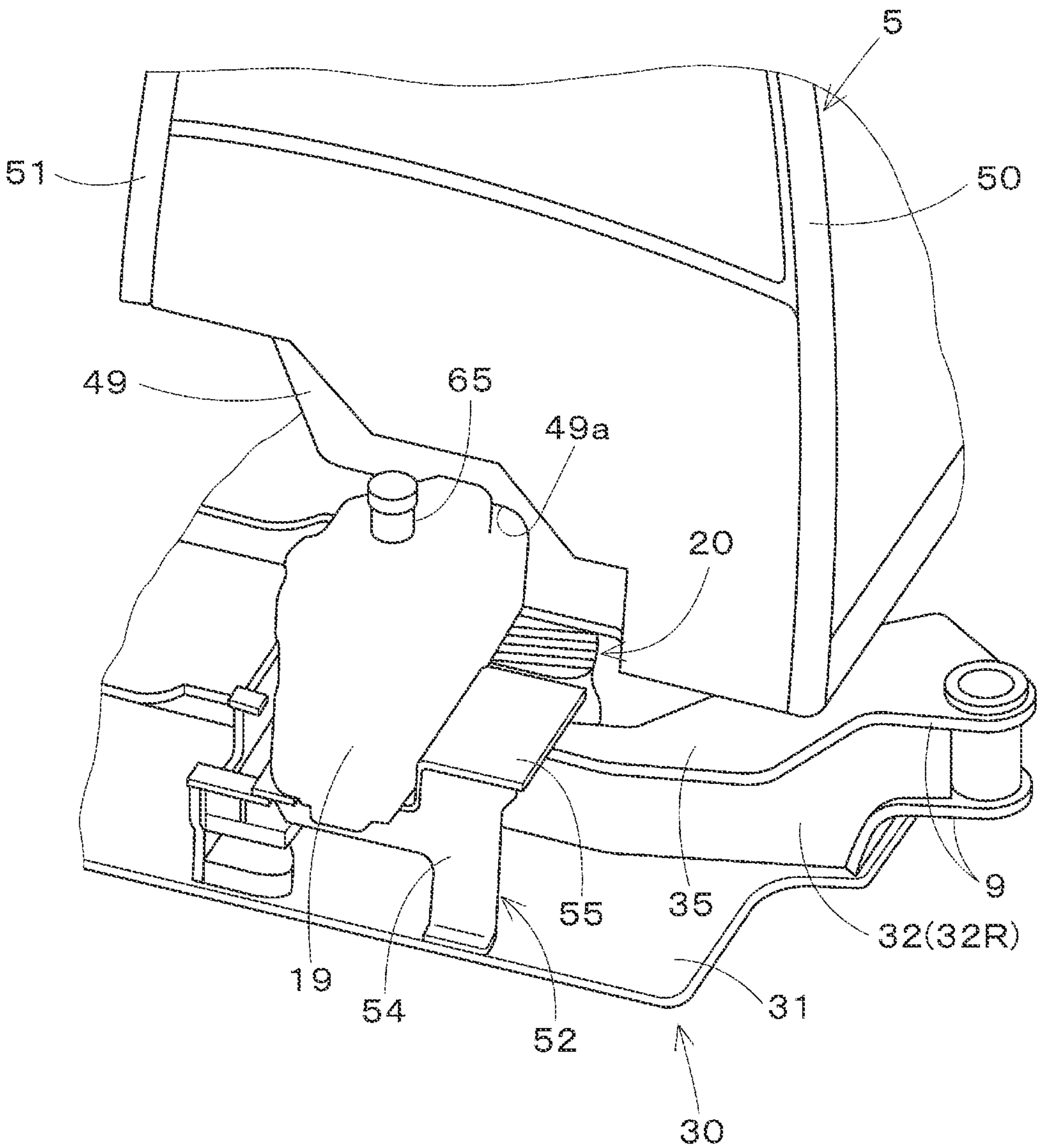
FIG. 11 is a perspective view illustrating the arrangement of the fuel tank and the swivel motor.

As illustrated in FIG. 11, the overhanging portion 19B is inserted below the cabin 5 via the cutouts 49*a*. The fuel tank 19 is supported by a support base 52 attached to the swivel frame 30. Furthermore, the fuel tank 19 is supported by the support base 52 in a movable manner to retract the overhanging portion 19B from above the swivel motor 20. In this embodiment, the fuel tank 19 is movable outward (rightward) in the machine-body width direction K2 from an installation position illustrated in FIG. 9.

Figure 12:
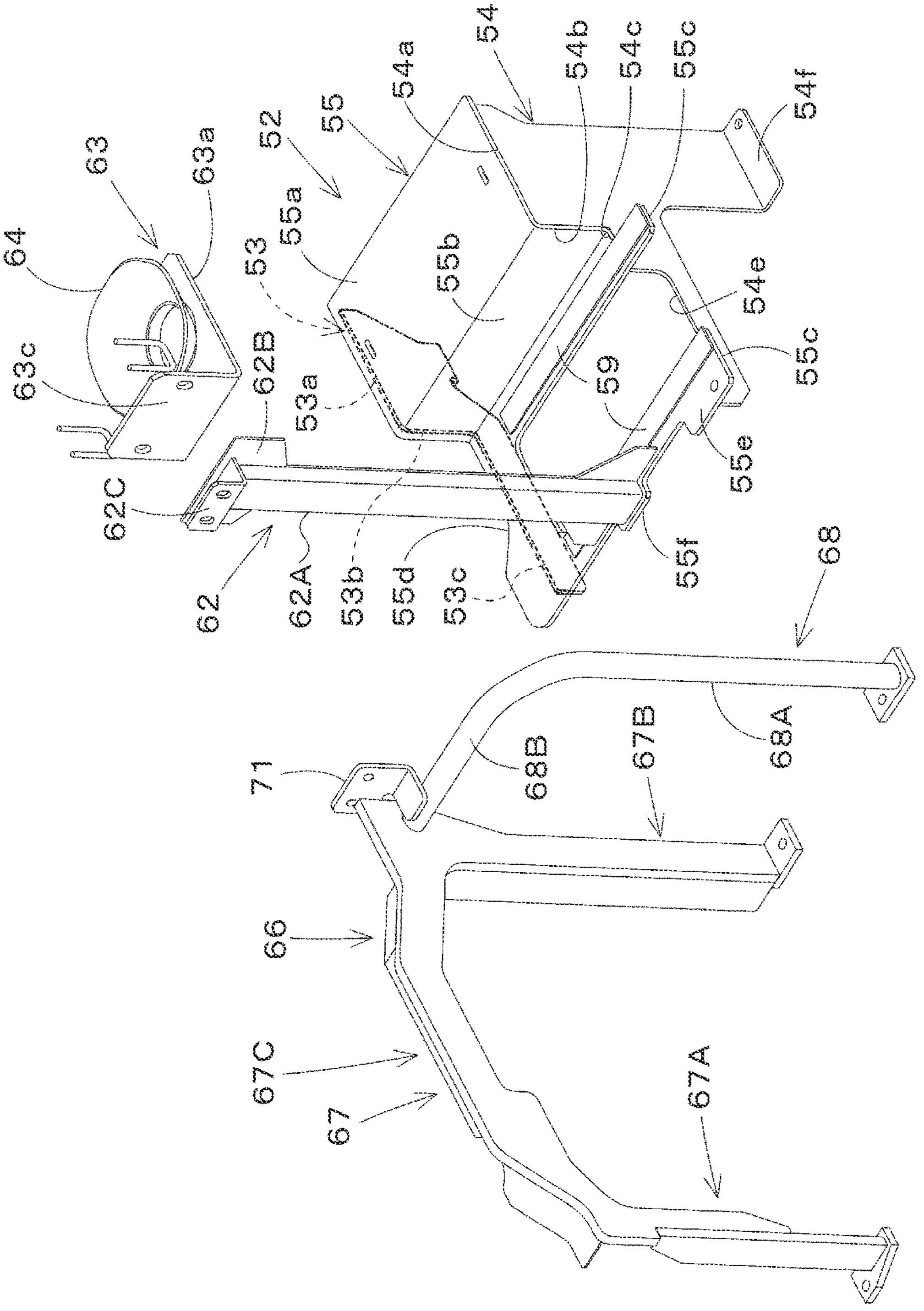
FIG. 12 is a perspective view of a support base, an attachment frame, and a support frame.

As illustrated in FIG. 12, the support base 52 has a first side plate 53, a second side plate 54, and an upper plate 55.

Figure 13:
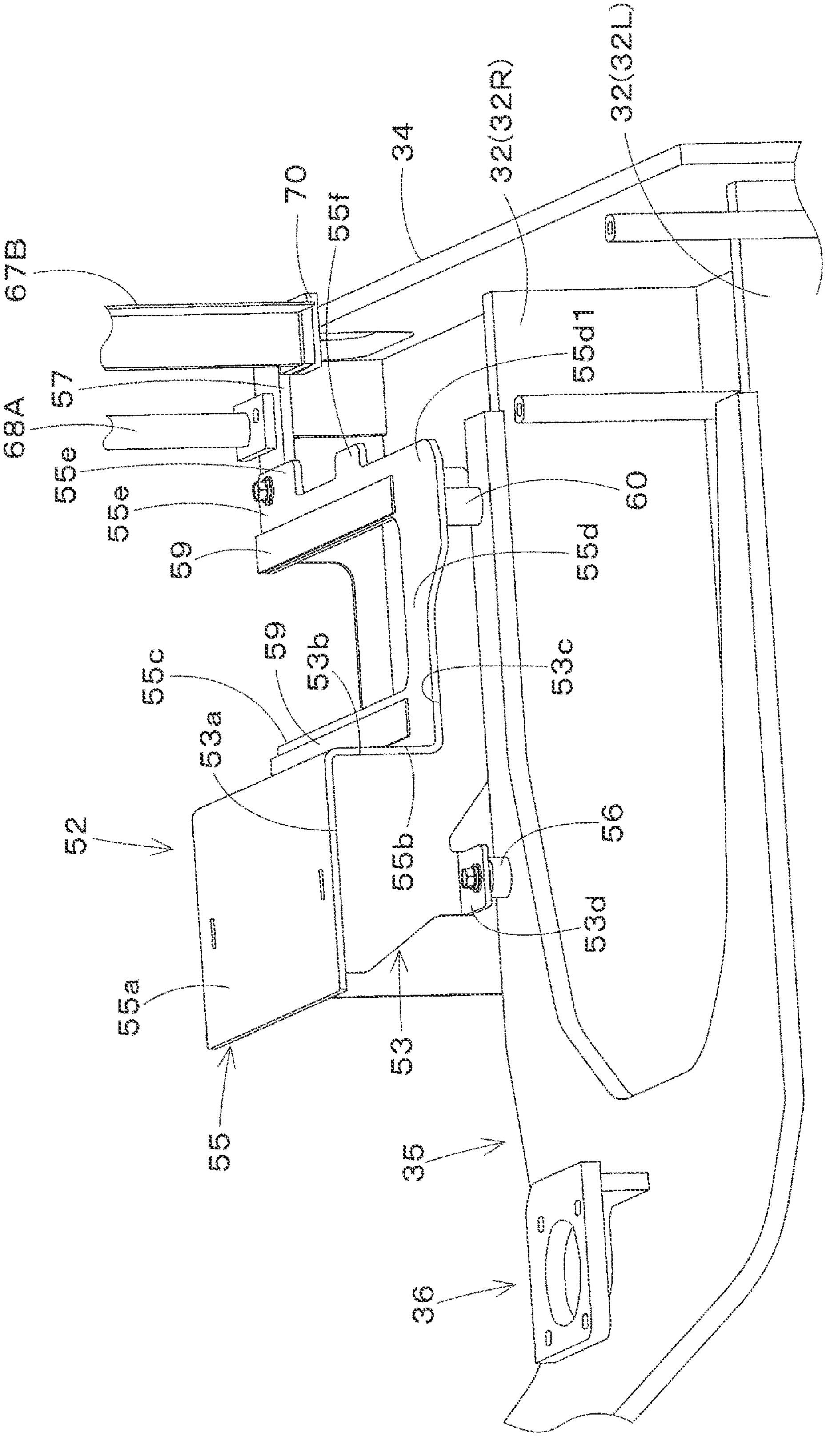
FIG. 13 is a perspective view illustrating the structure of the support base.

As illustrated in FIG. 12 and FIG. 13, the first side plate 53 has a front upper edge 53*a*, a vertical edge 53*b* extending downward from the front upper edge 53*a*, and a rear upper edge 53*c* extending rearward from the lower end of the vertical edge 53*b*. The first side plate 53 also has an attachment piece 53*d* at the front lower portion thereof. As illustrated in FIG. 13, the attachment piece 53*d* is attached, by using a bolt, to a nut member 56 fixed on the reinforcement plate 35.

Figure 14:
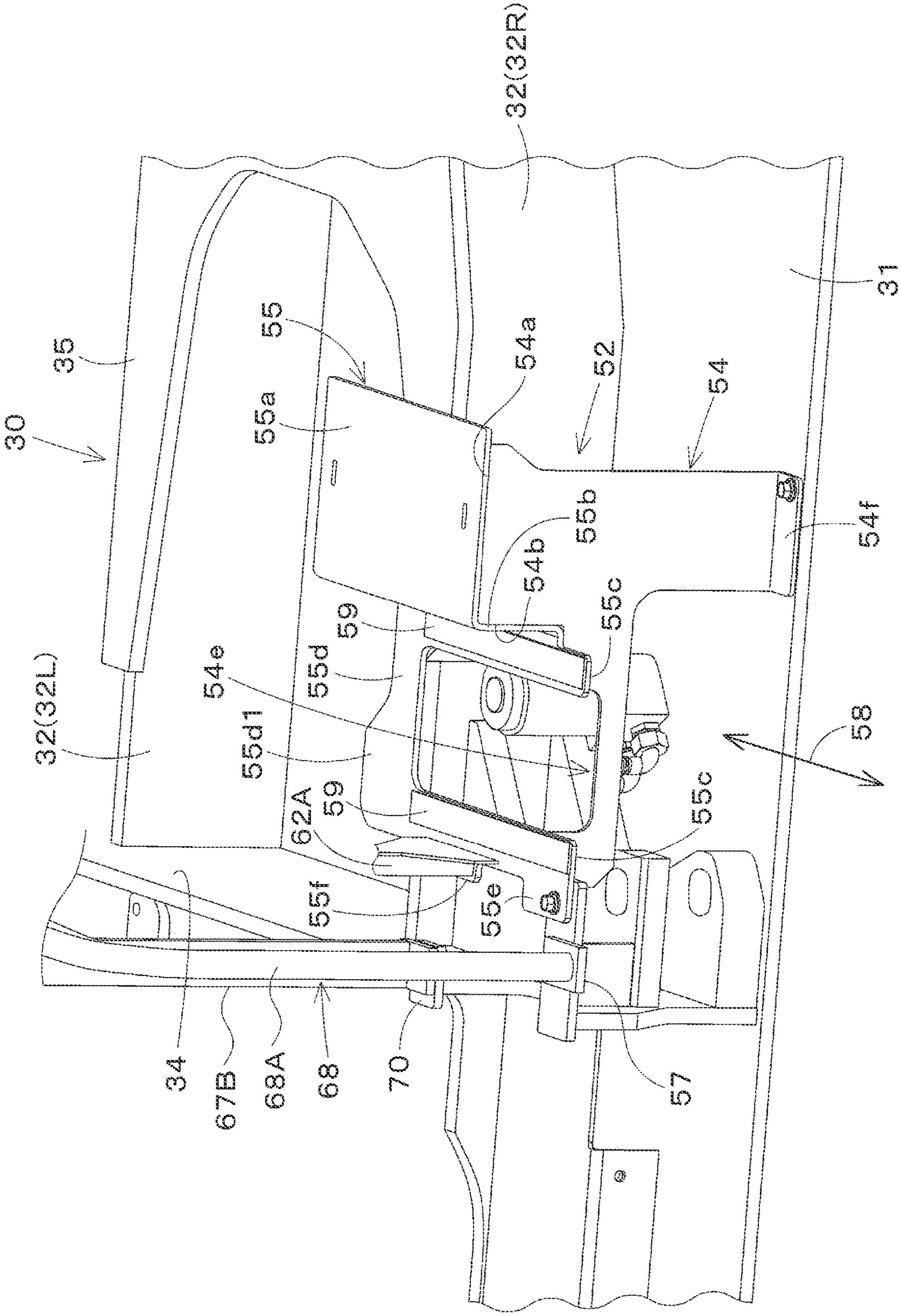
FIG. 14 is a perspective view illustrating the structure of the support base.
Figure 15:
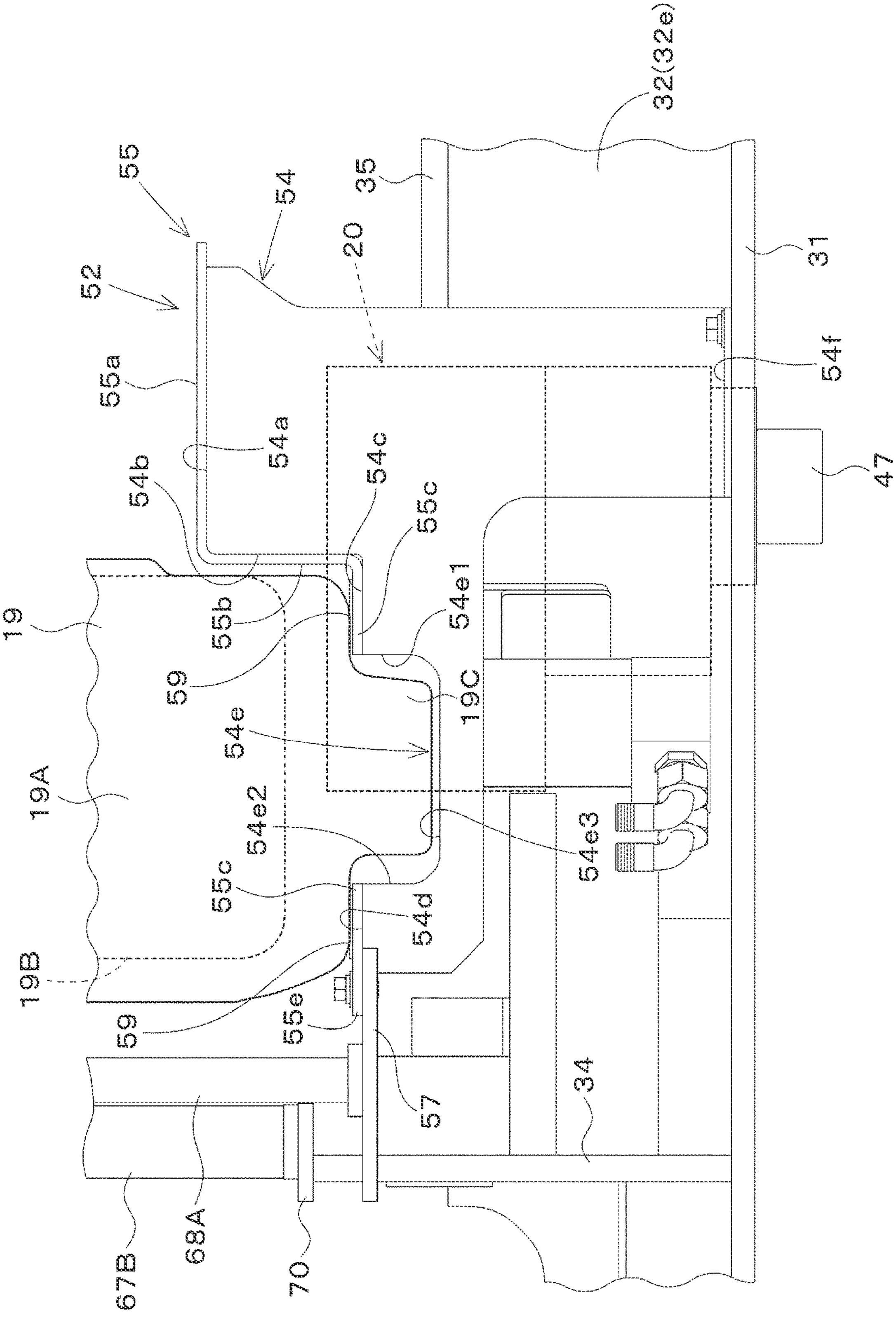
FIG. 15 is a right side view of the fuel tank and the support base.

As illustrated in FIG. 14 and FIG. 15, the second side plate 54 has a front upper edge 54*a*, a vertical edge 54*b* extending downward from the front upper edge 54*a*, a first rear upper edge 54*c* extending rearward from the vertical edge 54*b*, a second rear upper edge 54*d* located behind the first rear upper edge 54*c* with a distance therebetween, and a recessed edge 54*e* recessed downward and provided between the first rear upper edge 54*c* and the second rear upper edge 54*d*. The recessed edge 54*e* has a first edge 54*e*1 extending downward from the rear end of the first rear upper edge 54*c*, a second edge 54*e*2 extending downward from the front end of the second rear upper edge 54*d*, and a third edge 54*e*3 connecting the lower ends of the first edge 54*e*1 and the second edge 54*e*2 to each other. The second side plate 54 has an attachment piece 54*f* at the front lower portion thereof. The attachment piece 54*f* is attached to the swivel substrate 31 by using a bolt.

As illustrated in FIG. 12 to FIG. 15, the upper plate 55 is fixed to the first side plate 53 and the second side plate 54. The upper plate 55 has a battery attachment wall 55*a*, a downward-extending wall 55*b*, a pair of placement sections 55*c*, and a coupling wall 55*d*.

The battery attachment wall 55*a* is provided between the front upper edges 53*a* and 54*a* of the first side plate 53 and the second side plate 54. The battery 22 is placed on and attached to the battery attachment wall 55*a* (see FIG. 4A).

The downward-extending wall 55*b* extends downward from the rear edge of the battery attachment wall 55*a* and is provided between the vertical edges 53*b* and 54*b* of the first side plate 53 and the second side plate 54.

One (front) placement section 55*c* of the pair of placement sections 55*c* extends rearward from the lower edge of the downward-extending wall 55*b* and is provided between the rear upper edge 53*c* of the first side plate 53 and the first rear upper edge 54*c* of the second side plate 54. The other (rear) placement section 55*c* is disposed behind the one placement section 55*c* with a distance therebetween and is provided between the rear upper edge 53*c* of the first side plate 53 and the second rear upper edge 54*d* of the second side plate 54. The rear right side of the other placement section 55*c* is provided with an attachment piece 55*e*. The attachment piece 55*e* is fixed, by using a bolt, to a support plate 57 provided in the swivel frame 30. An extension piece 55*f* extending rearward is provided to the left of the attachment piece 55*e* of the other placement section 55*c*. The pair of placement sections 55*c* protrude rightward from the second side plate 54.

As illustrated in FIG. 15, the placement lower surfaces 48 of the fuel tank 19 are placed on the pair of placement sections 55*c* in a movable (slidable) manner in the machine-body width direction K2. In other words, the support base 52 has the pair of placement sections 55*c* that support the fuel tank 19 in a slidable manner in a tank movement direction 58 as a direction for moving the fuel tank 19. The pair of placement sections 55*c* are disposed side-by-side with a distance therebetween in the horizontal direction that is orthogonal to the tank movement direction 58. In this embodiment, the placement lower surfaces 48 are placed on the placement sections 55*c* via underlay members 59 provided on the upper surfaces of the placement sections 55*c*. The underlay members 59 may each be formed of, for example, a low-friction material or a cushioning material. Alternatively, the underlay members 59 may each be formed of a low friction cushioning material.

As illustrated in FIG. 15, the protrusion 19C protrudes between the pair of placement sections 55*c* and is located within the recessed edge 54*e*.

As illustrated in FIG. 13, the coupling wall 55*d* couples the left ends of the pair of placement sections 55*c* to each other. The protrusion 19C is disposed to the right of the coupling wall 55*d*. The rear portion of the coupling wall 55*d* is placed on and supported by a block member 60 fixed on the reinforcement plate 35.

Figure 16:
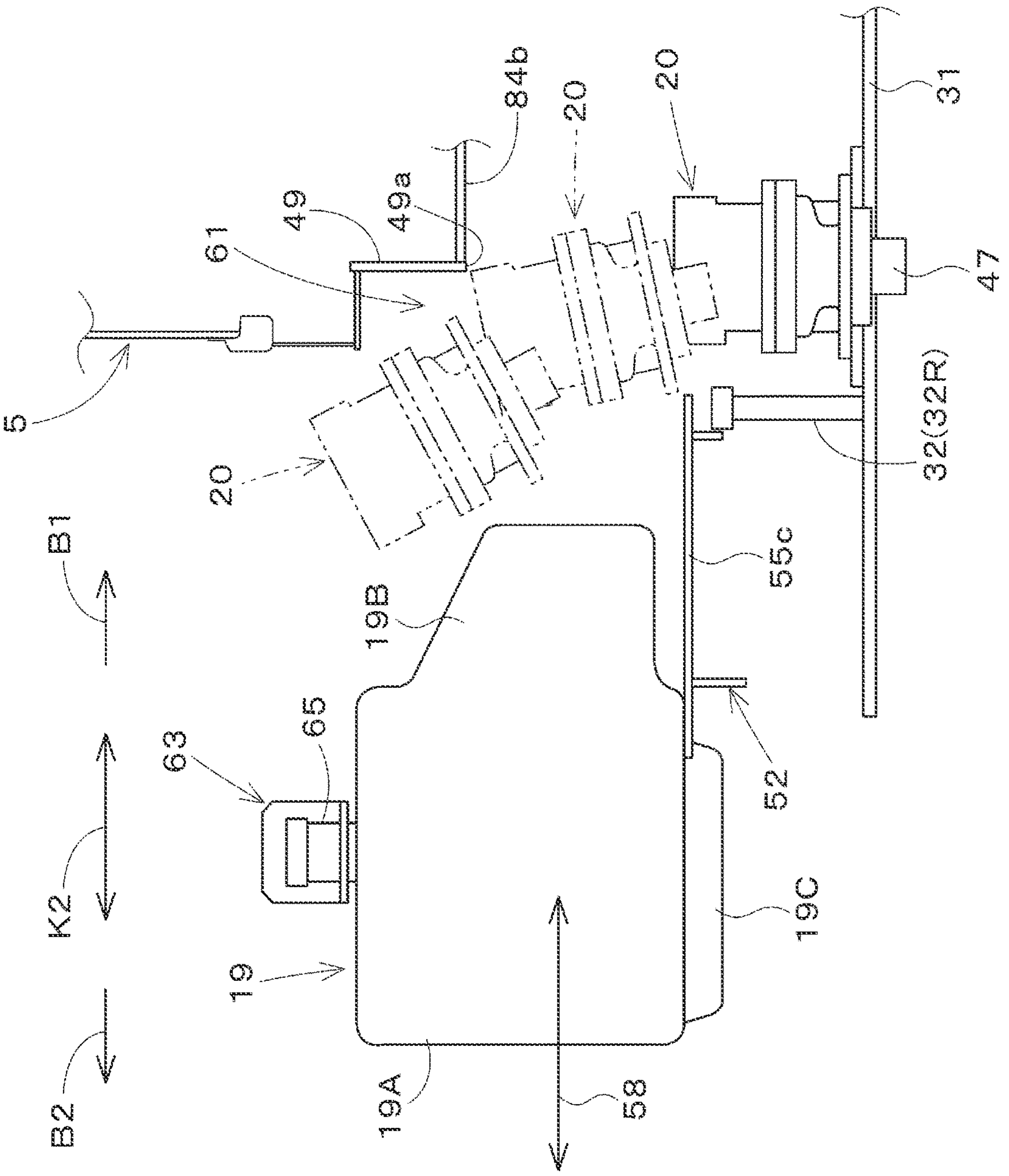
FIG. 16 is a front view illustrating a state where the swivel motor is being removed.

As illustrated in FIG. 16, the fuel tank 19 is movable in the tank movement direction 58 (machine-body width direction K2) on the support base 52. When the fuel tank 19 is moved rightward from the installation position illustrated in FIG. 9, the overhanging portion 19B retracts from above the swivel motor 20. Accordingly, the swivel motor 20 becomes accessible, thereby enabling maintenance of the swivel motor 20. Furthermore, a motor removal path 61 as a path used for removing the swivel motor 20 is provided between the cabin 5 and the support base 52. Therefore, by moving the fuel tank 19 and retracting the overhanging portion 19B from above the swivel motor 20, the overhanging portion 19B is retracted from the motor removal path 61. By retracting the overhanging portion 19B from the motor removal path 61, the swivel motor 20 becomes removable upward via the motor removal path 61. Specifically, the overhanging portion 19B overhangs above the swivel motor 20 to obstruct the motor removal path 61 defining a path along which the swivel motor 20 is removed upward from the machine body 2. In other words, the motor removal path 61 for removing the swivel motor 20 is used for the disposition of the fuel tank 19.

Accordingly, this embodiment can ensure, for example, maintenance and removal of the swivel motor 20 by moving the fuel tank 19 and retracting the overhanging portion 19B from above the swivel motor 20, so that the fuel tank 19 can be increased in capacity by being provided with the overhanging portion 19B overhanging above the swivel motor 20, and the space above the swivel motor 20 can be effectively utilized.

Because the motor removal path 61 used for removing the swivel motor 20 is provided between the cabin 5 and the support base 52, the swivel motor 20 can be removed without having to remove (unload) the cabin 5 from the machine body 2. Since the cabin 5 does not have to be unloaded from the machine body 2 to remove the swivel motor 20, the cabin 5 can be securely mounted to the machine body 2.

As an alternative to this embodiment in which the support base 52 is a combination of a tank support base that supports the fuel tank 19 and a battery support base that supports the battery 22, the tank support base and the battery support base may be separate members.

Figure 17:
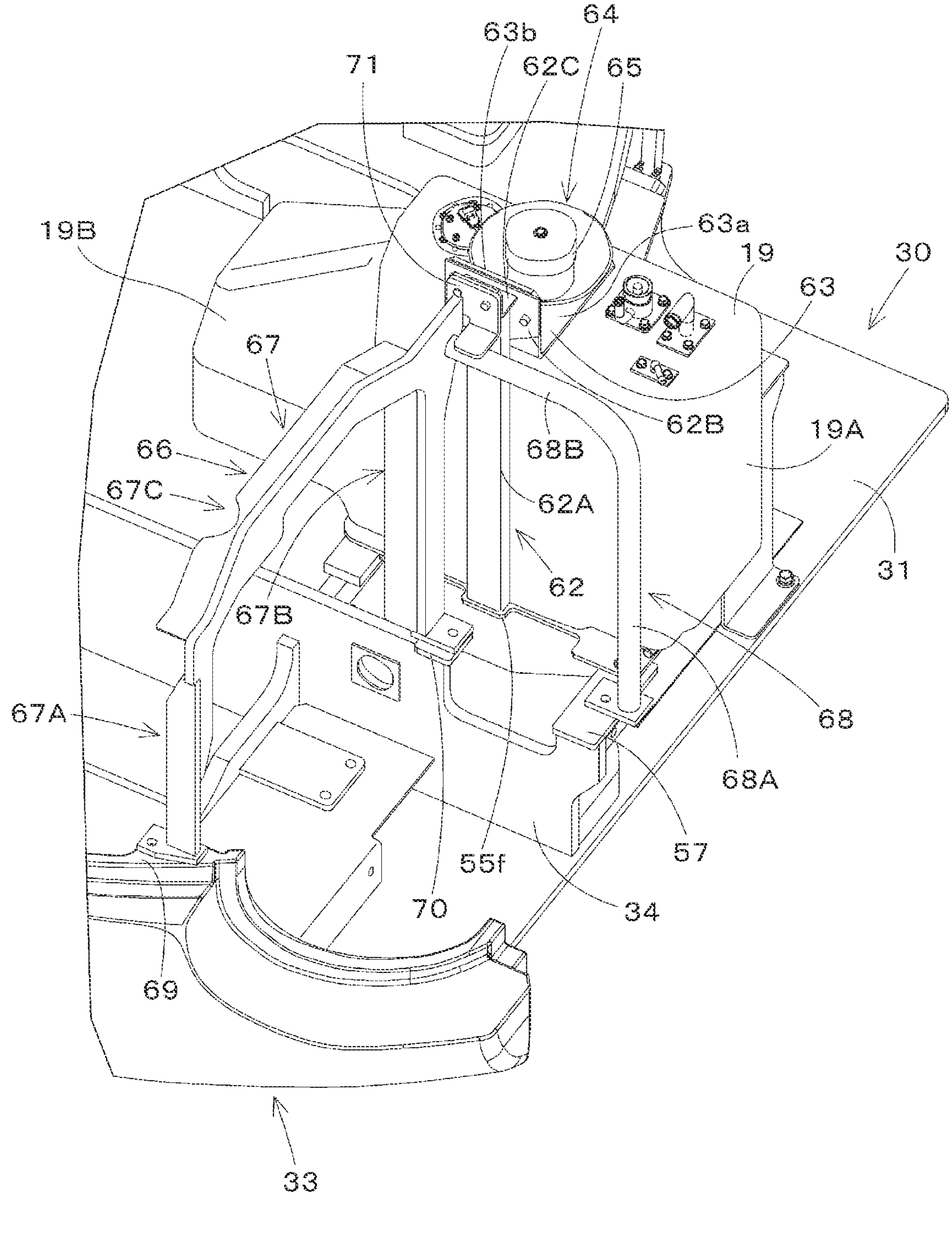
FIG. 17 is a perspective view of a support structure for the fuel tank.

As illustrated in FIG. 17, the fuel tank 19 has an attachment stay 63 attached to an attachment frame 62 standing upright on the support base 52. By attaching the attachment stay 63 to the attachment frame 62, the movement of the fuel tank 19 in the tank movement direction 58 can be restricted.

As illustrated in FIG. 12 and FIG. 17, the attachment stay 63 has a lower wall 63*a* and a vertical wall 63*b* extending upward from the rear portion of the lower wall 63*a*. The lower wall 63*a* is fixed to a mount member 64, and the mount member 64 is fitted to a mount area 65 provided at the upper portion of the fuel tank 19.

As illustrated in FIG. 12 and FIG. 17, the attachment frame 62 has a pillar member 62A standing upright on the extension piece 55*f* of one of the placement sections 55*c*, and also has a stay attachment section 62B and a frame attachment section 62C that are fixed to the upper portion of the pillar member 62A. The stay attachment section 62B is fixed to the front surface of the upper portion of the pillar member 62A. The attachment stay 63 is detachably attached to the stay attachment section 62B by using, for example, a bolt, so that the movement of the fuel tank 19 in the tank movement direction 58 can be restricted. By unfixing the attachment stay 63 from the stay attachment section 62B, the fuel tank 19 can be permitted to move in the tank movement direction 58. The frame attachment section 62C is fixed to the upper end of the pillar member 62A at the rear side of the stay attachment section 62B. By opening the second cover 43B, the attachment stay 63 can be unfixed from the stay attachment section 62B. By opening (or removing) the second cover 43B and the third cover 43C, the fuel tank 19 can be moved rightward.

As illustrated in FIG. 4A and FIG. 17, the attachment frame 62 is attached to a support frame 66 that supports devices equipped in the machine body 2. Accordingly, the attachment frame 62 can be sufficiently supported, and by extension, the movement of the fuel tank 19 can be sufficiently restricted and the fuel tank 19 can be sufficiently supported.

The support frame 66 has a gate-shaped main frame 67 and a sub frame 68 reinforcing the main frame 67. The main frame 67 has attached thereto and supports, for example, the radiator 15 and a fan shroud surrounding the cooling fan 14. The main frame 67 has a rear pillar section 67A whose lower portion is attached to an attachment section 69 provided on the weight 33 and that stands upright on the attachment section 69, a front pillar section 67B whose lower portion is attached to an attachment section 70 fixed to the partition plate 34 and that stands upright on the attachment section 70, and a coupling section 67C that couples the rear pillar section 67A and the front pillar section 67B to each other. An attachment piece 71 to which the frame attachment section 62C is attached is fixed to the upper portion of the front pillar section 67B.

The sub frame 68 is formed of a rod material or a plate material and has a pillar section 68A whose lower portion is attached to the support plate 57 fixed to the partition plate 34 and that stands upright on the support plate 57, and also has a horizontal section 68B that extends leftward from the upper end of the pillar section 68A and whose left end is fixed to the upper portion of the front pillar section 67B. The attachment piece 71 is also fixed to the horizontal section 68B.

Figure 18:
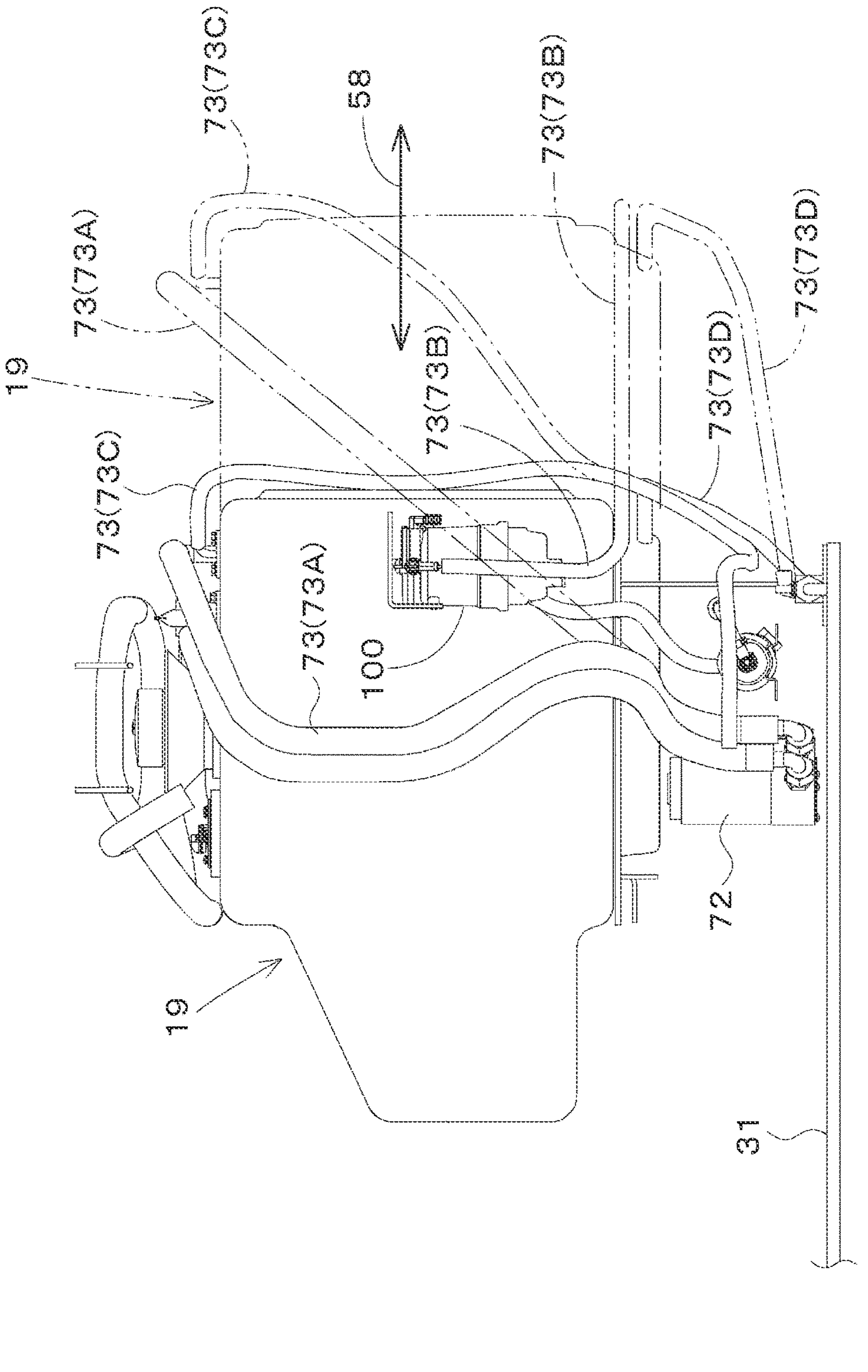
FIG. 18 is a rear view illustrating the relationship between the fuel tank and a hose.

As illustrated in FIG. 18, when the fuel tank 19 is moved in the tank movement direction 58, as indicated with an imaginary line, a hose 73 connected to the fuel tank 19 has a sufficient length to permit the movement. Examples of the hose 73 connected to the fuel tank 19 include a delivery hose 73A that delivers fuel from a refueling pump 72 to the fuel tank 19, a fuel tube 73B that connects a fuel filter 100 and the fuel tank 19 to each other, a return hose 73C through which fuel to be returned to the fuel tank 19 flows, and a drain tube 73D that drains the fuel from the fuel tank 19.

Figure 19:
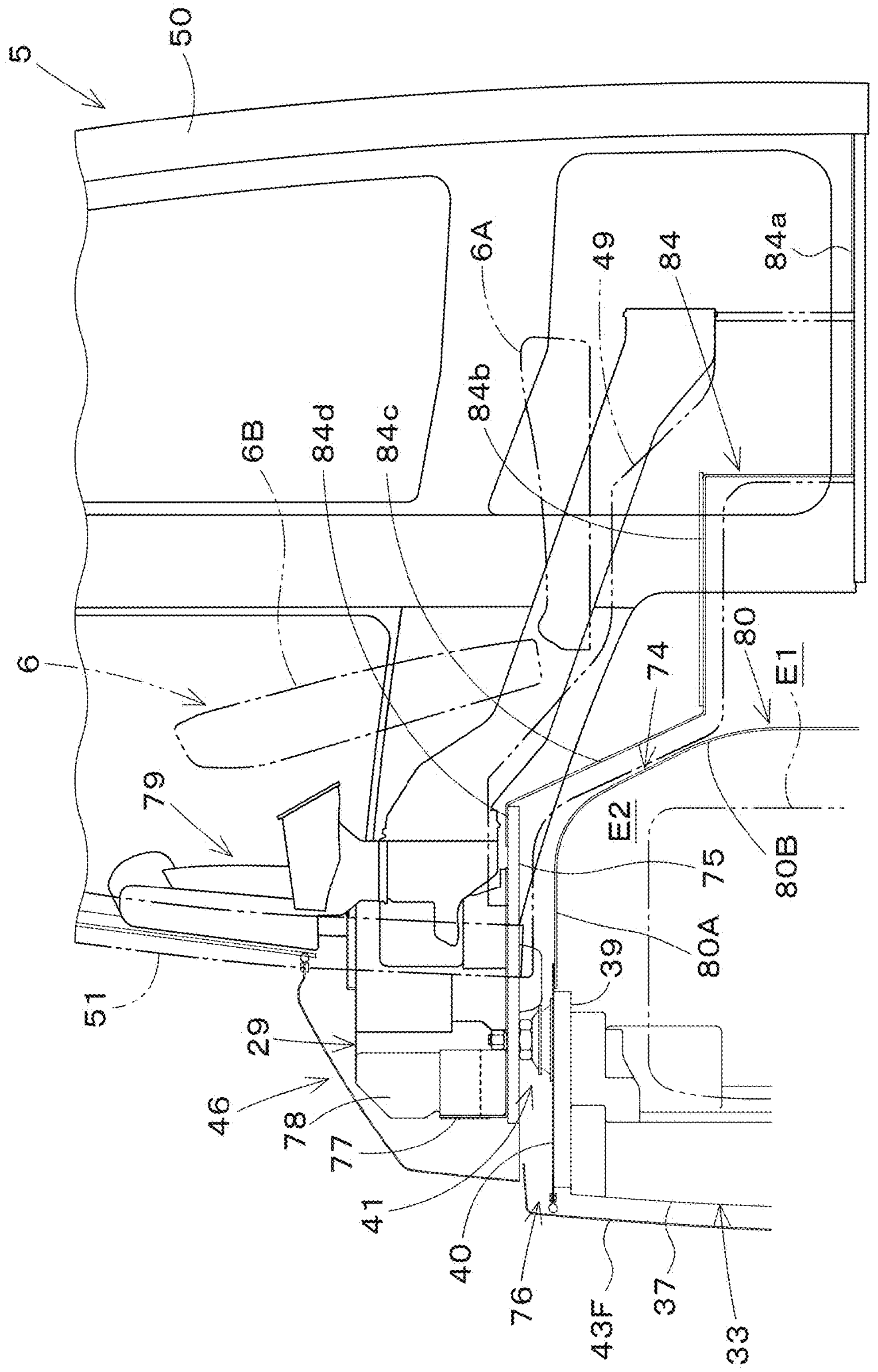
FIG. 19 is a cross-sectional side view of the cabin and a prime mover room.

As illustrated in FIG. 5 and FIG. 19, the air conditioner body 29 is installed at the rear portion of the cabin 5. The air conditioner body 29 is disposed behind the operator's seat 6, specifically, behind the backrest portion 6B of the operator's seat 6. The air conditioner body 29 has the front portion thereof located inside the cabin 5 and the rear portion thereof protruding rearward from the rear surface of the cabin 5. The portion of the air conditioner body 29 protruding from the cabin 5 is covered with an air-conditioner cover 46. With the air conditioner body 29 protruding from the cabin 5, a reduced internal space of the cabin 5 caused by the air conditioner body 29 can be suppressed.

As illustrated in FIG. 8, the air-conditioner cover 46 has an openable-closable cover 46A that is openable and closable. The openable-closable cover 46A has the upper front portion thereof pivotally supported by the cabin 5 via a hinge so as to be openable upward. By being opened, the openable-closable cover 46A enables maintenance of the air conditioner body 29.

As illustrated in FIG. 19, the air conditioner body 29 is disposed above a prime mover room (engine room) E2 that accommodates the prime mover E1. The air conditioner body 29 conventionally installed below the operator's seat 6 is disposed above the prime mover room E2 so that the foot space of the operator can be increased.

Figure 27:
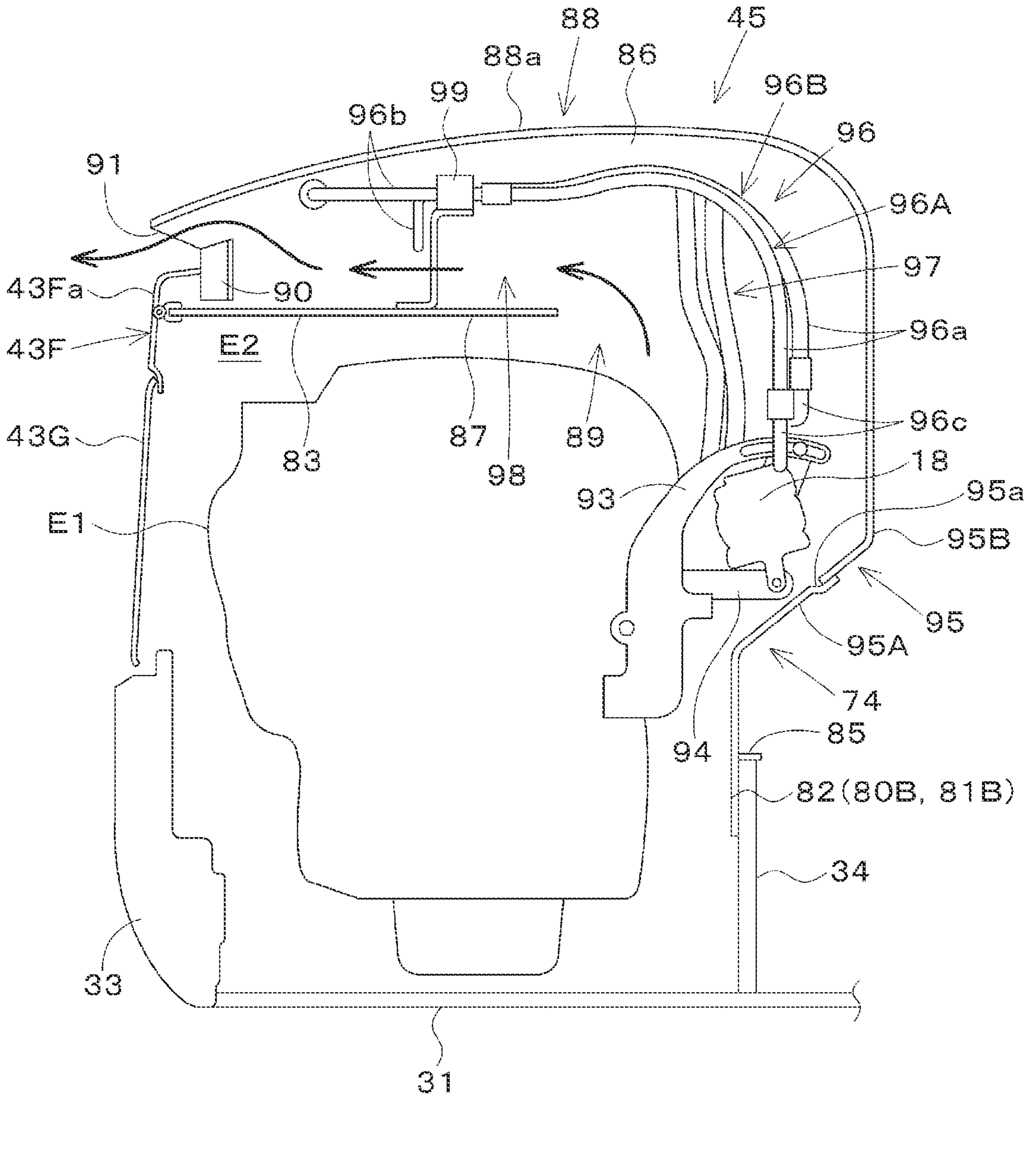
FIG. 27 is a cross-sectional view illustrating the structure of the duct structure.

As illustrated in, for example, FIG. 2, FIG. 19, and FIG. 27, the prime mover room E2 includes, for example, a partition 74 that separates the prime mover E1 and the operator's seat 6 from each other, the partition plate 34, the swivel substrate 31, the weight 33, the sixth cover 43F to the ninth cover 43I, and the shield plate 40.

As illustrated in FIG. 19, the cabin 5 has a plate member 75 provided behind the operator's seat 6. Specifically, the plate member 75 is provided behind the lower portion of the backrest portion 6B of the operator's seat 6. The plate member 75 has the front portion thereof disposed inside the cabin 5 and the rear portion thereof protruding rearward from the rear surface of the cabin 5. The plate member 75 is coupled to the rear portions of the left and right lower side plates 49. The plate member 75 is connected to the rear portion of a floor sheet 84 (outer wall of the cabin 5) defining the bottom of the inside of the cabin 5. The floor sheet 84 has the step 84*a* where the operator places his/her feet, a seat base 84*b* that is located behind the step 84*a* and to which the operator's seat 6 is attached, an inclined wall 84*c* that is inclined upward as the inclined wall 84*c* extends rearward from the seat base 84*b*, and a connection wall 84*d* extending rearward from the rear upper portion of the inclined wall 84*c* and connected to the plate member 75.

As illustrated in FIG. 19, the floor sheet 84 and the partition 74 are provided with a distance therebetween. Specifically, the prime mover room E2 and the inside of the cabin 5 are separated from each other by a double-walled structure including the partition 74, serving as a partition between the prime mover room E2 and the exterior of the prime mover room E2, and the outer wall (floor sheet 84) of the cabin 5. The plate member 75 is disposed above the prime mover room E2 with a distance 76 from the prime mover room E2 and is supported by the machine body 2 in a vibration-proof manner via the mount members 41. The air conditioner body 29 is installed on the plate member 75. The plate member 75 is formed of a thick plate material and has an air layer (heat insulation layer) intervening the plate member 75 and the prime mover room E2 by being disposed with a distance 76 from the prime mover room E2, thereby significantly suppressing transmission of heat from the prime mover room E2 (prime mover E1) to the air conditioner body 29.

With the air conditioner body 29 being installed on the plate member 75 to which the mount members 41 that support the rear portion of the cabin 5 in a vibration-proof manner are attached, multifunctional use of the members can be achieved, and the installation structure of the air conditioner body 29 can be made compact.

Figure 20:
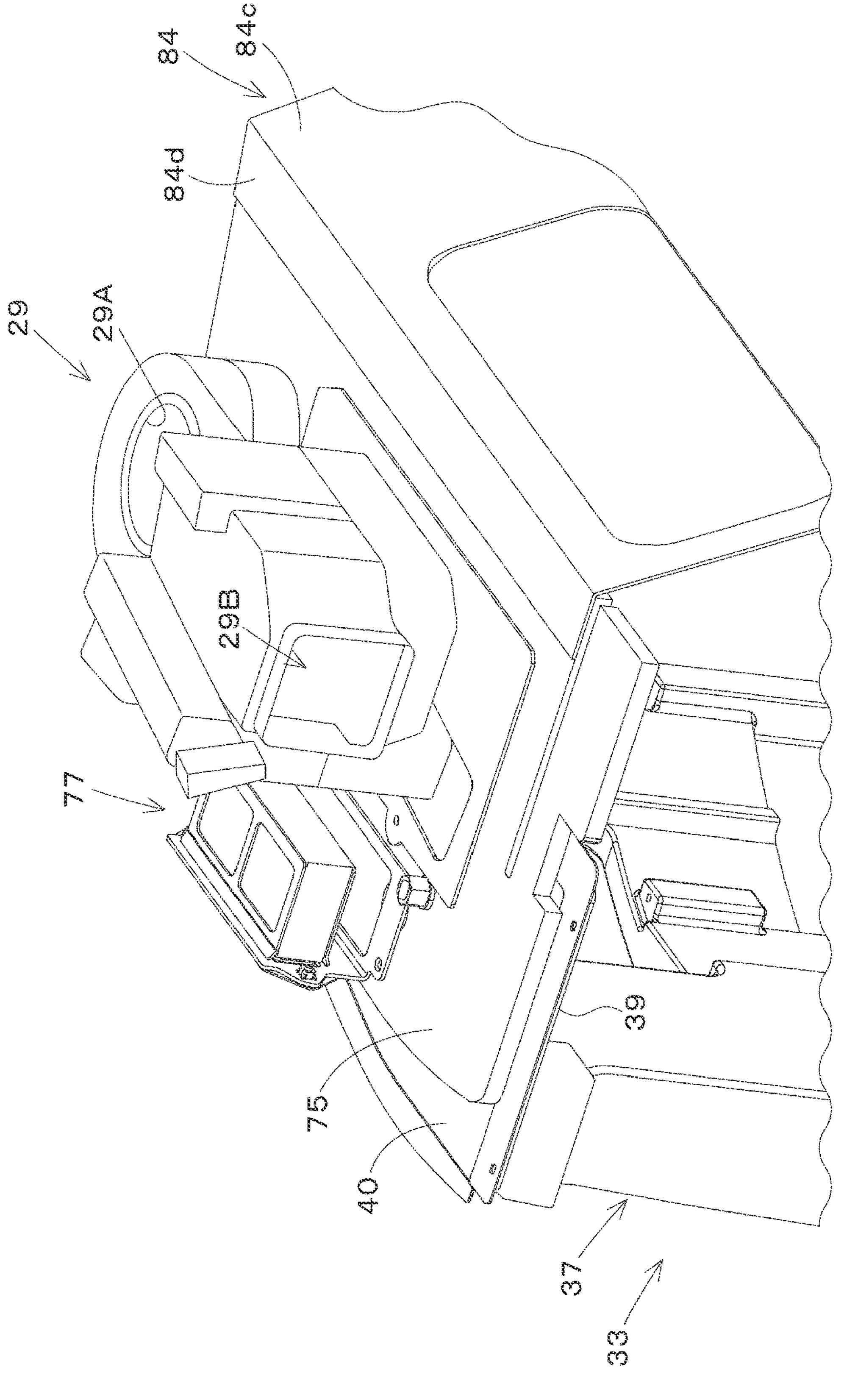
FIG. 20 is a perspective view of an installation area of an air conditioner body.

As illustrated in FIG. 20, a filter unit 77 is installed behind the air conditioner body 29. An intake section 29A that takes in air is provided at the left side of the air conditioner body 29, and a discharge portion 29B that discharges air-conditioned air is provided at the right side of the air conditioner body 29.

As illustrated in FIG. 19, the filter unit 77 and the intake section 29A are connected to each other by an intake duct 78, such that outside air is taken into the air conditioner body 29 via the filter unit 77. The discharge portion 29B is connected to a supply duct 79, such that the air-conditioned air is supplied into the cabin 5 through the supply duct 79.

As illustrated in FIG. 2, the duct structure 45 that discharges the hot air in the prime mover room E2 to the outside is provided at the right portion of the prime mover room E2 (right side of the prime mover E1).

Figure 23A:
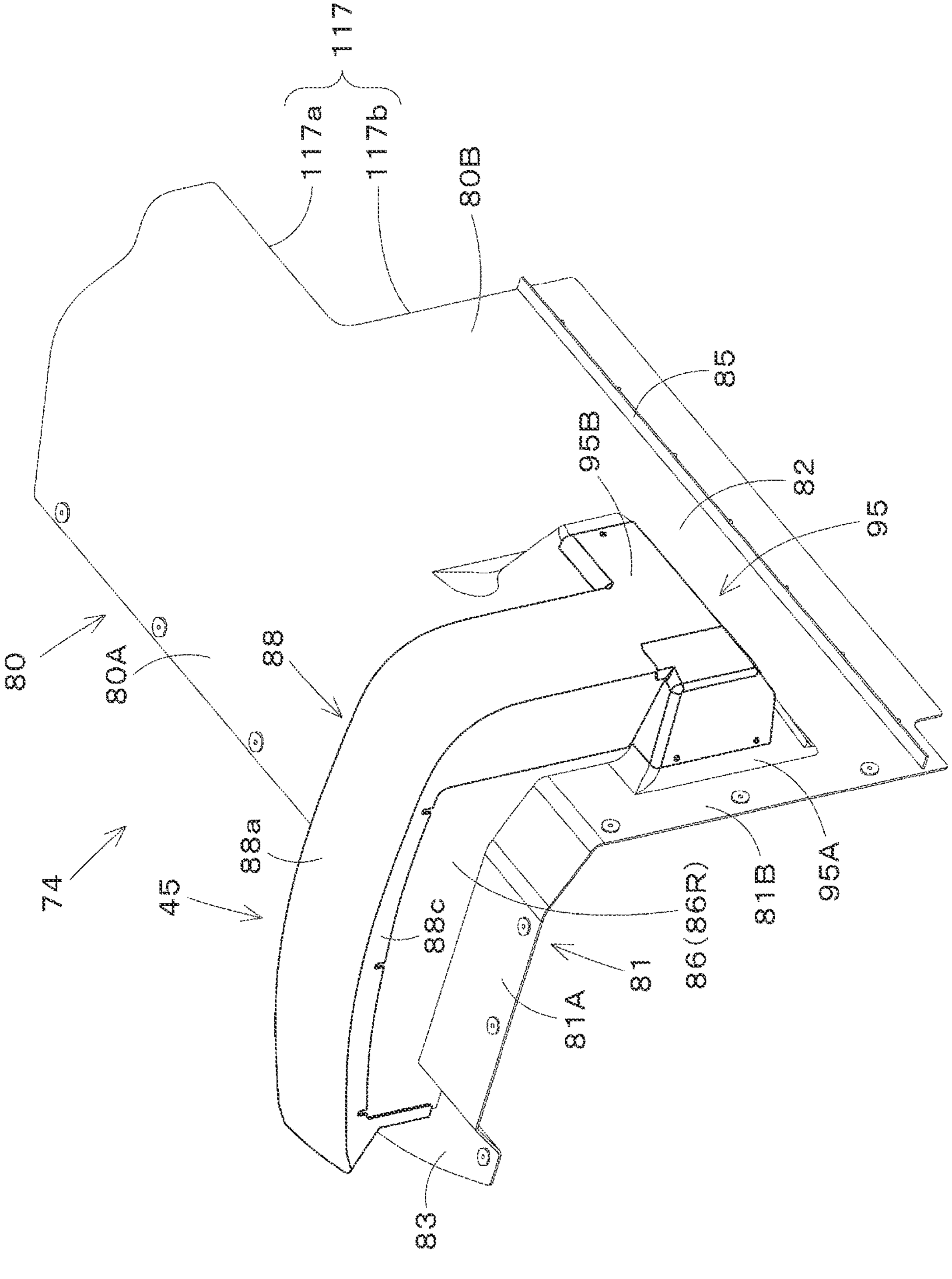
FIG. 23A is a perspective view of a partition.
Figure 24:
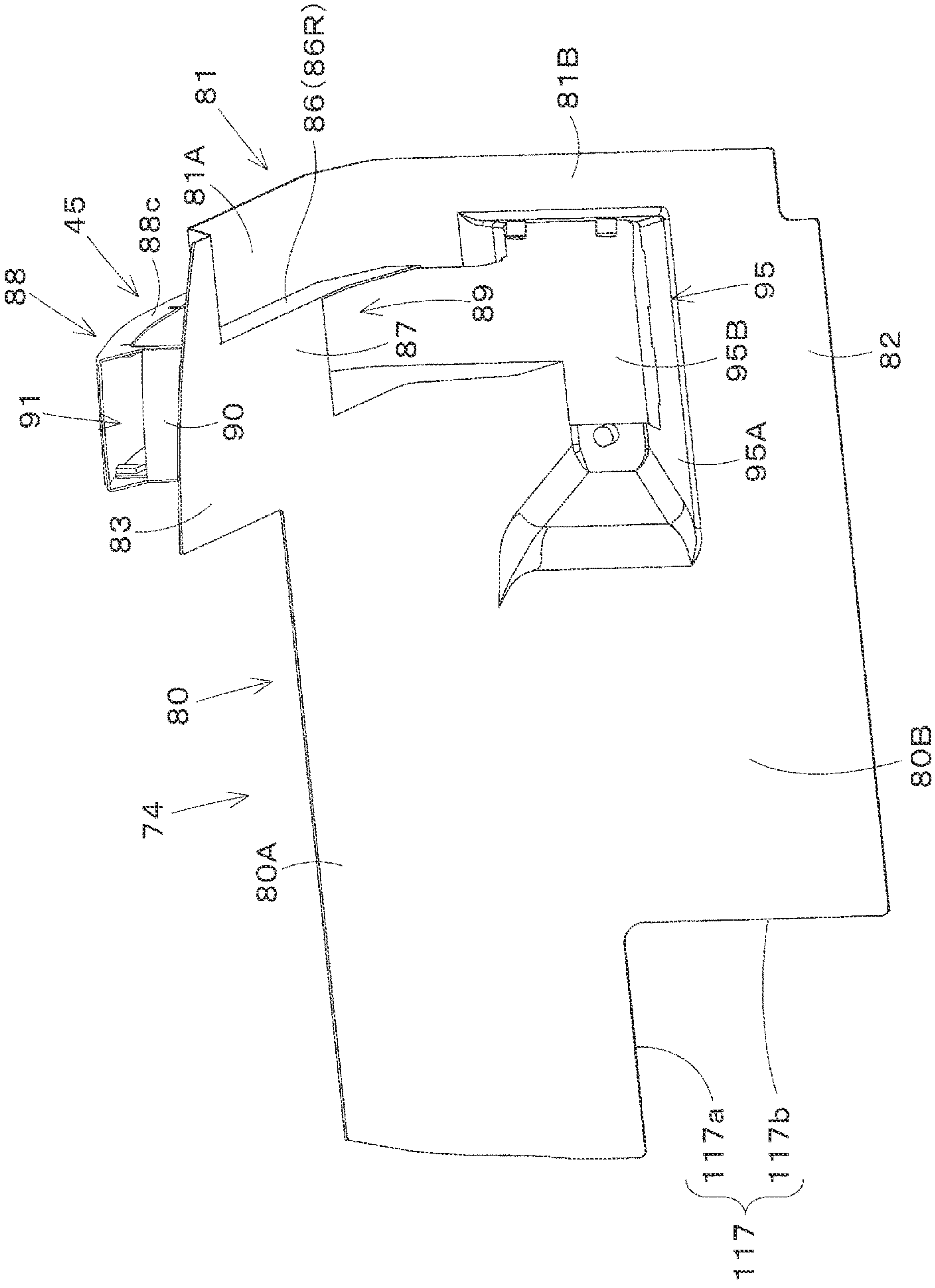
FIG. 24 is a perspective view of the partition.

As illustrated in FIG. 23A and FIG. 24, the duct structure 45 is a portion of the partition 74 constituting the prime mover room E2. Specifically, the partition 74 has a main wall 80 defining the left portion of the partition 74, a fan cover wall 81 defining the right portion of the partition 74, the duct structure 45 provided between the main wall 80 and the fan cover wall 81, a first coupling wall 82 that couples the lower portions of the main wall 80 and the fan cover wall 81 to each other, and a second coupling wall 83 that couples the rear portions of the main wall 80 and the fan cover wall 81 to each other.

As illustrated in FIG. 19, the main wall 80 has an upper wall 80A that covers the upper side of the prime mover E1 and a front wall 80B that covers the front side of the prime mover E1. As illustrated in FIG. 19, the upper wall 80A is connected to the shield plate 40.

Figure 23B:
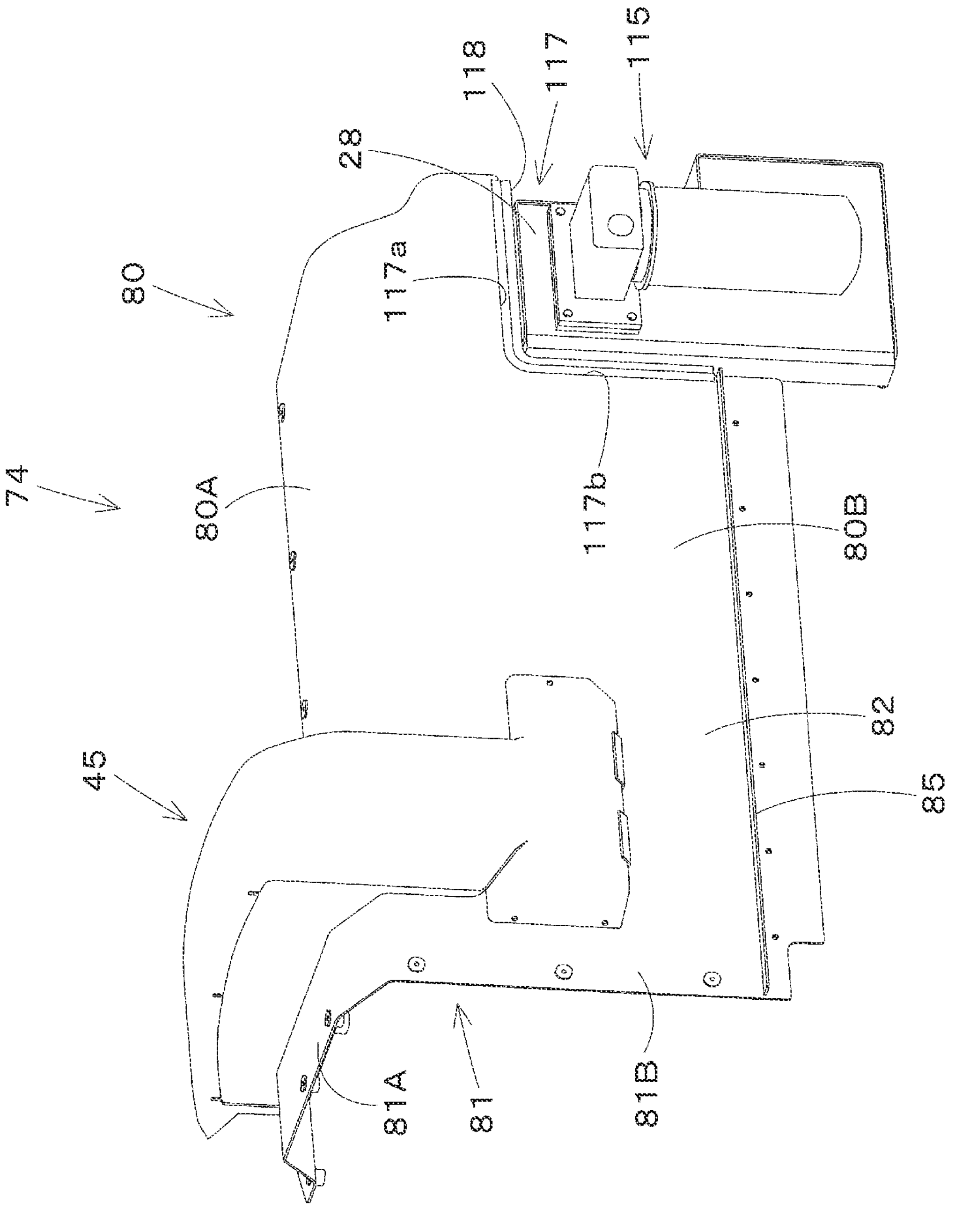
FIG. 23B is a perspective view of the partition.

As illustrated in FIG. 23A and FIG. 24, the left portion of the front wall 80B is provided with a cutout 117. The cutout 117 has a cutout shape that is open at the left and lower sides thereof and that is defined by an upper edge 117*a* extending in the machine-body width direction K2 and a vertical edge 117*b* extending downward from the right end of the upper edge 117*a*. As illustrated in FIG. 23B, the front portion of the hydraulic fluid tank 28 is disposed in the cutout 117 to block the cutout 117. A seal member 118 is attached to the upper edge 117*a* and the vertical edge 117*b* of the cutout 117. The seal member 118 abuts on the hydraulic fluid tank 28 to form a seal between the hydraulic fluid tank 28 and the cutout 117. Therefore, the hydraulic fluid tank 28 is a portion of the partition 74 separating the prime mover room E2 and the outside (operator's seat 6 side) of the prime mover room E2 from each other.

Figure 21:
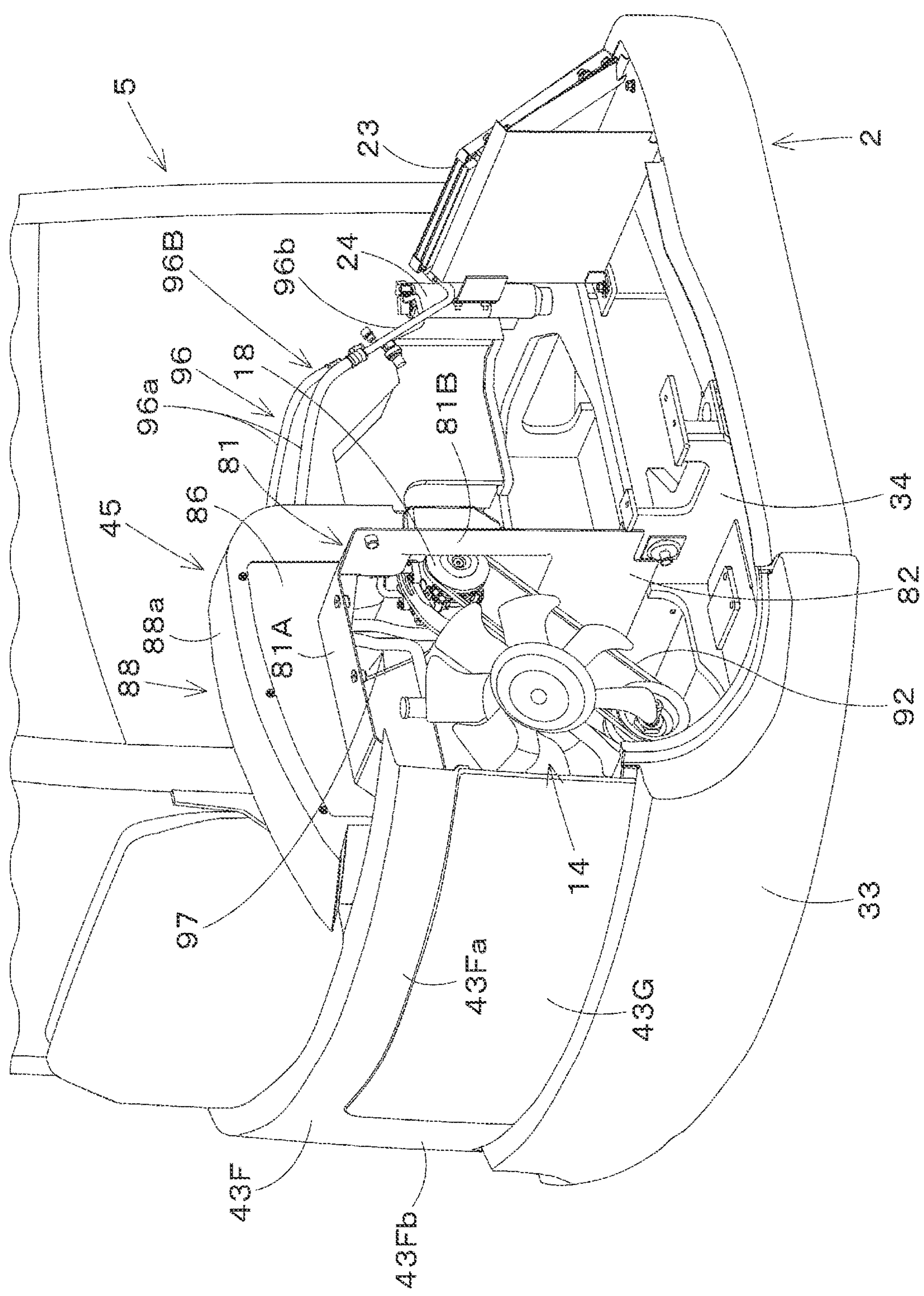
FIG. 21 is a perspective view of, for example, a duct structure, a compressor, and a condenser, as viewed from the rear.
Figure 22:
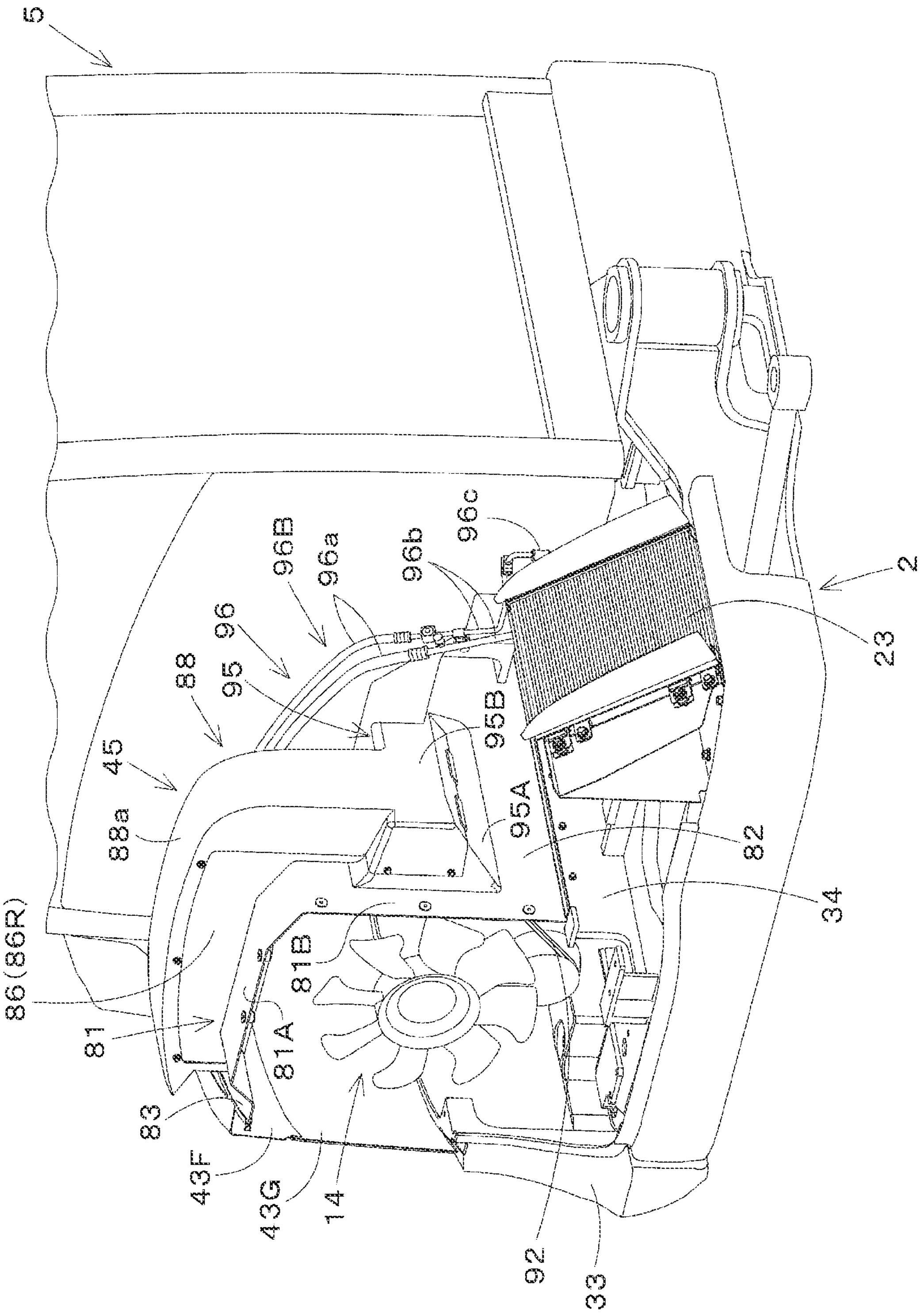
FIG. 22 is a perspective view of, for example, the duct structure and the condenser, as viewed from the rear.

As illustrated in FIG. 21 and FIG. 22, the fan cover wall 81 has an upper wall 81A covering the upper side of the cooling fan 14 and a front wall 81B covering the front side of the cooling fan 14. As illustrated in FIG. 23A and FIG. 24, the first coupling wall 82 couples the lower portion of the front wall 80B of the main wall 80 and the lower portion of the front wall 81B of the fan cover wall 81 to each other. As illustrated in FIG. 24, the second coupling wall 83 couples the rear portion of the upper wall 80A of the main wall 80 and the rear portion of the upper wall 81A of the fan cover wall 81 to each other. As illustrated in FIG. 27, the lower portion of the front wall 80B of the main wall 80, the lower portion of the front wall 81B of the fan cover wall 81, and the first coupling wall 82 are attached to the partition plate 34. As illustrated in FIG. 23A and FIG. 27, an abutment plate 85 that abuts on the upper end of the partition plate 34 to position the upper end of the partition plate 34 is provided across the lower portion of the front wall of the main wall 80, the first coupling wall 82, and the lower portion of the front wall 81B of the fan cover wall 81.

Figure 25:
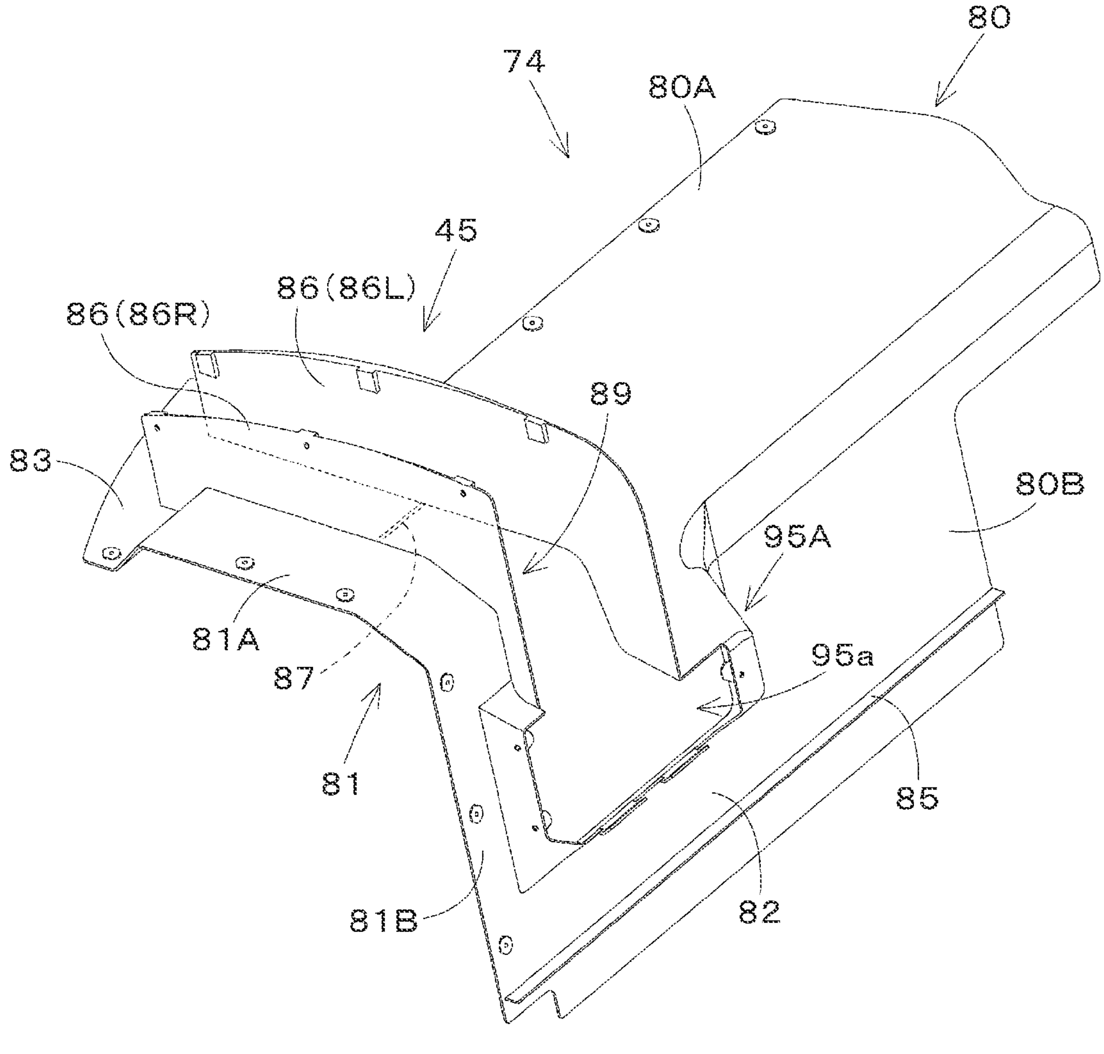
FIG. 25 is a perspective view of the partition in a state where a cover wall is removed.

As illustrated in FIG. 23A, FIG. 24, and FIG. 25, the duct structure 45 has a pair of side walls 86, a bottom wall 87, and a cover wall 88. The pair of side walls 86 are disposed facing each other with a distance therebetween in the machine-body width direction K2. One side wall 86L of the pair is connected to the right end of the main wall 80. The other side wall 86R is connected to the left end of the fan cover wall 81. The pair of side walls 86 are open at the rear, front, upper, and lower sides thereof. As illustrated in FIG. 27, the bottom wall 87 is located above the prime mover E1. The bottom wall 87 extends rearward from the second coupling wall 83 and is provided between the lower ends of the rear portions of the pair of side walls 86 so as to block the gap between the lower ends of the rear portions of the pair of side walls 86. Therefore, the gap between the lower ends of the rear portions of the pair of side walls 86 is open at the front side and is blocked at the rear side by the bottom wall 87. The front side of the gap between the lower ends of the pair of side walls 86, that is, the gap between the front end of the bottom wall 87 and the cover wall 88 located in front of the front end of the bottom wall 87, defines an entrance 89 that communicates with the upper portion of the prime mover room E2 and that takes in the hot air from the prime mover room E2.

Figure 26:
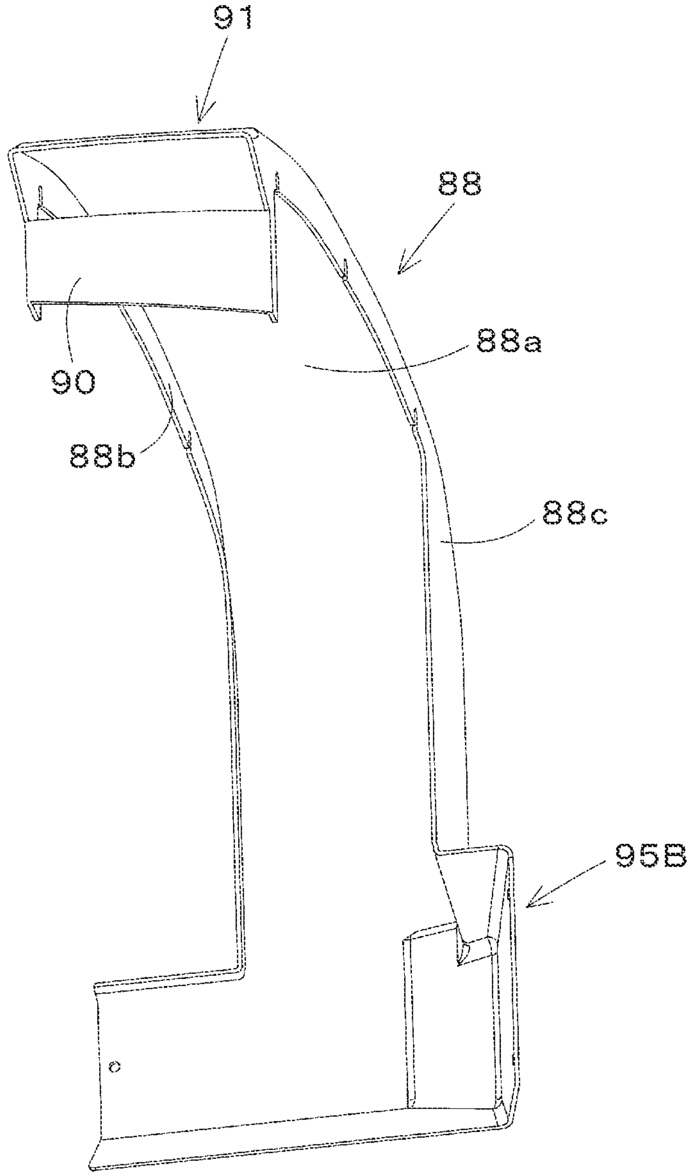
FIG. 26 is a perspective view of the cover wall.

As illustrated in FIG. 23A, the cover wall 88 blocks the gap between the upper ends of the pair of side walls 86 and the gap between the front ends of the pair of side walls 86. Specifically, the cover wall 88 has an upper wall 88*a* provided from the rear end to the front lower end of the gap between the pair of side walls 86, a first side wall 88*b* extending from the left end of the upper wall 88*a* and detachably attached to the one side wall 86L, and a second side wall 88*c* extending from the right end of the upper wall 88*a* and detachably attached to the other side wall 86R. As illustrated in FIG. 26 and FIG. 27, the rear end of the cover wall 88 is provided with a blocking wall 90 and an exit 91. The blocking wall 90 blocks the lower portion of an open rear end between the pair of side walls 86. The exit 91 communicates with the outside of the prime mover room E2 to discharge the hot air taken in through the entrance 89, and is provided above the blocking wall 90.

The air taken into the prime mover room E2 by the cooling fan 14 is introduced into the duct structure 45 through the entrance 89 together with the hot air in the upper portion of the prime mover room E2, as indicated by an arrow in FIG. 27. The introduced hot air flows rearward through the duct structure 45 so as to be discharged outside the prime mover room E2 through the exit 91.

As illustrated in FIG. 27, the compressor 18 is disposed in front of the right upper portion of the prime mover E1 and below the entrance 89. The compressor 18 is driven by power transmitted from the prime mover E1 via a transmission belt 92, as illustrated in FIG. 21, and is attached to a first stay 93 and a second stay 94, which are attached to the prime mover E1, in such a manner that the tension of the transmission belt 92 is adjustable, as illustrated in FIG. 27.

As illustrated in FIG. 27, a compressor placement portion 95 where the compressor 18 is disposed is provided below the front portion of the duct structure 45. The compressor placement portion 95 is disposed at the right side (one side) of the cabin 5 in the machine-body width direction K2. The compressor placement portion 95 is provided below the entrance 89 in communication with the entrance 89.

As illustrated in FIG. 23A and FIG. 25, the compressor placement portion 95 has a main portion 95A having an inspection opening 95*a*, and also has an openable-closable cover 95B that blocks the inspection opening 95*a*.

As illustrated in FIG. 25, the main portion 95A is formed by shaping a plate member defining the partition 74 into a recessed shape from the rear side toward the front side. The inspection opening 95*a* is oriented forward and communicates with the gap between the pair of side walls 86.

As illustrated in FIG. 23A, the openable-closable cover 95B is integrated with the front lower portion of the cover wall 88 of the duct structure 45. In other words, the openable-closable cover 95B is detachable together with the cover wall 88.

Figure 28:
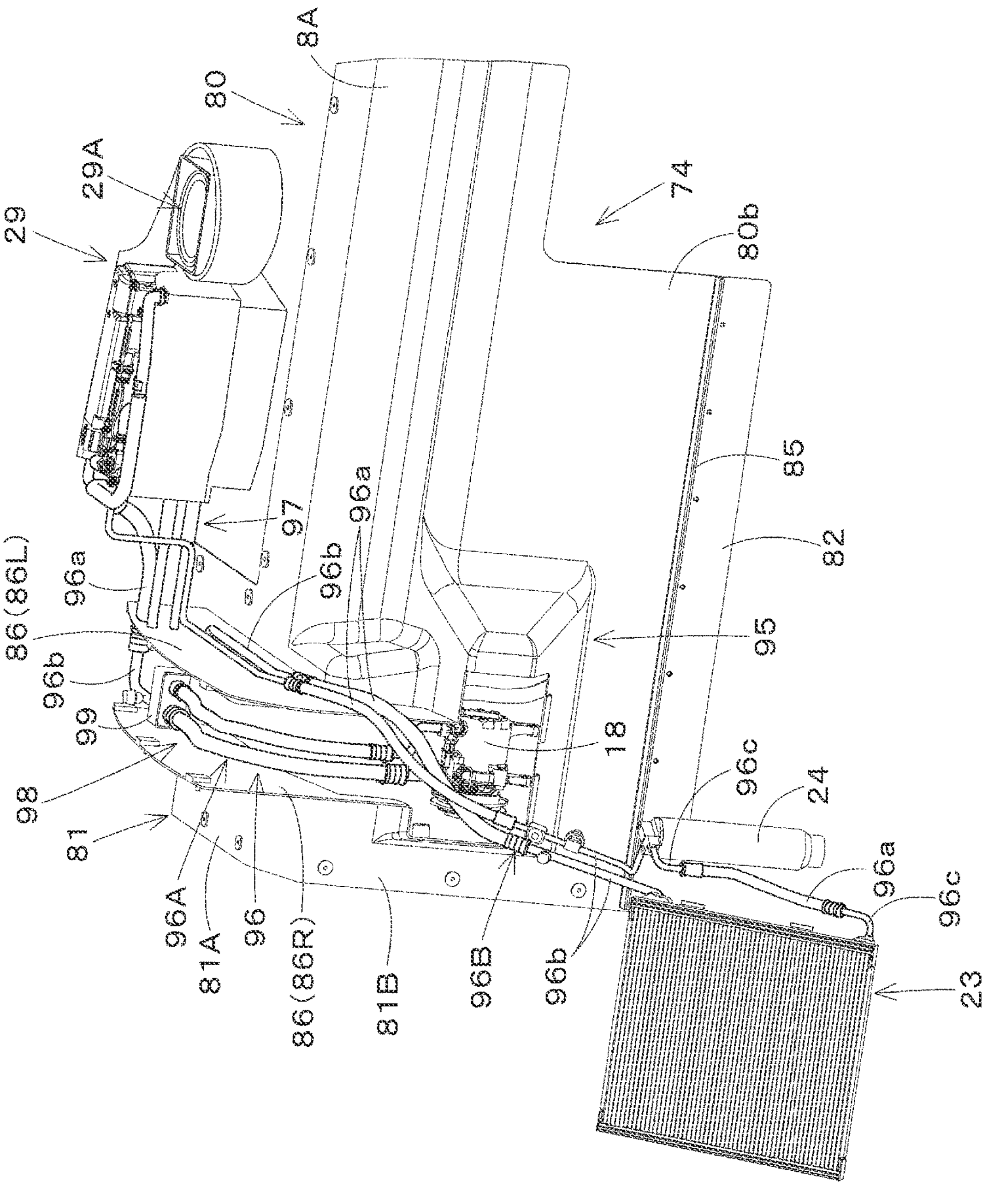
FIG. 28 is a perspective view illustrating how a cooling medium pipe is routed.
Figure 29:
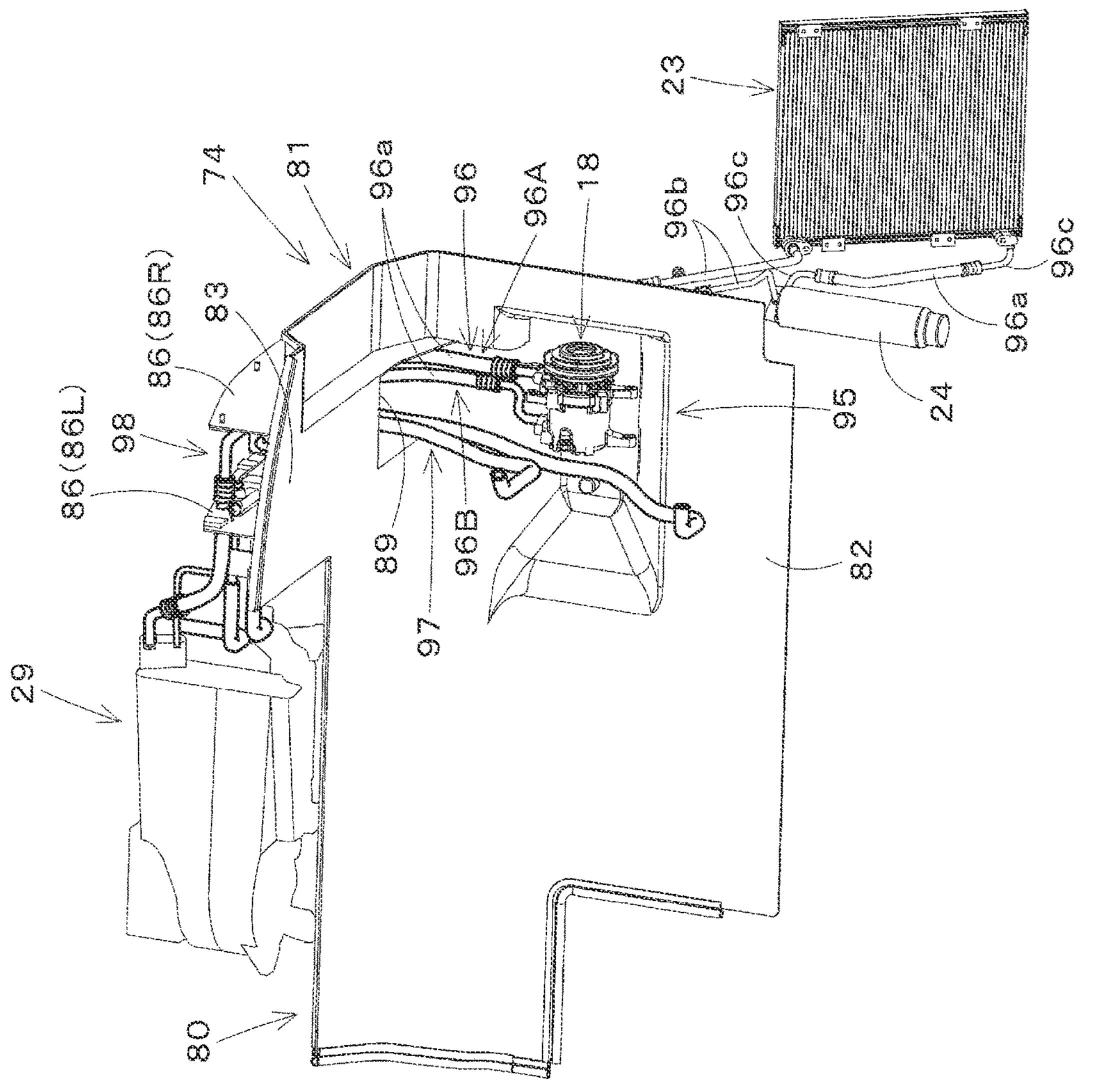
FIG. 29 is a perspective view illustrating how the cooling medium pipe is routed.
Figure 30:
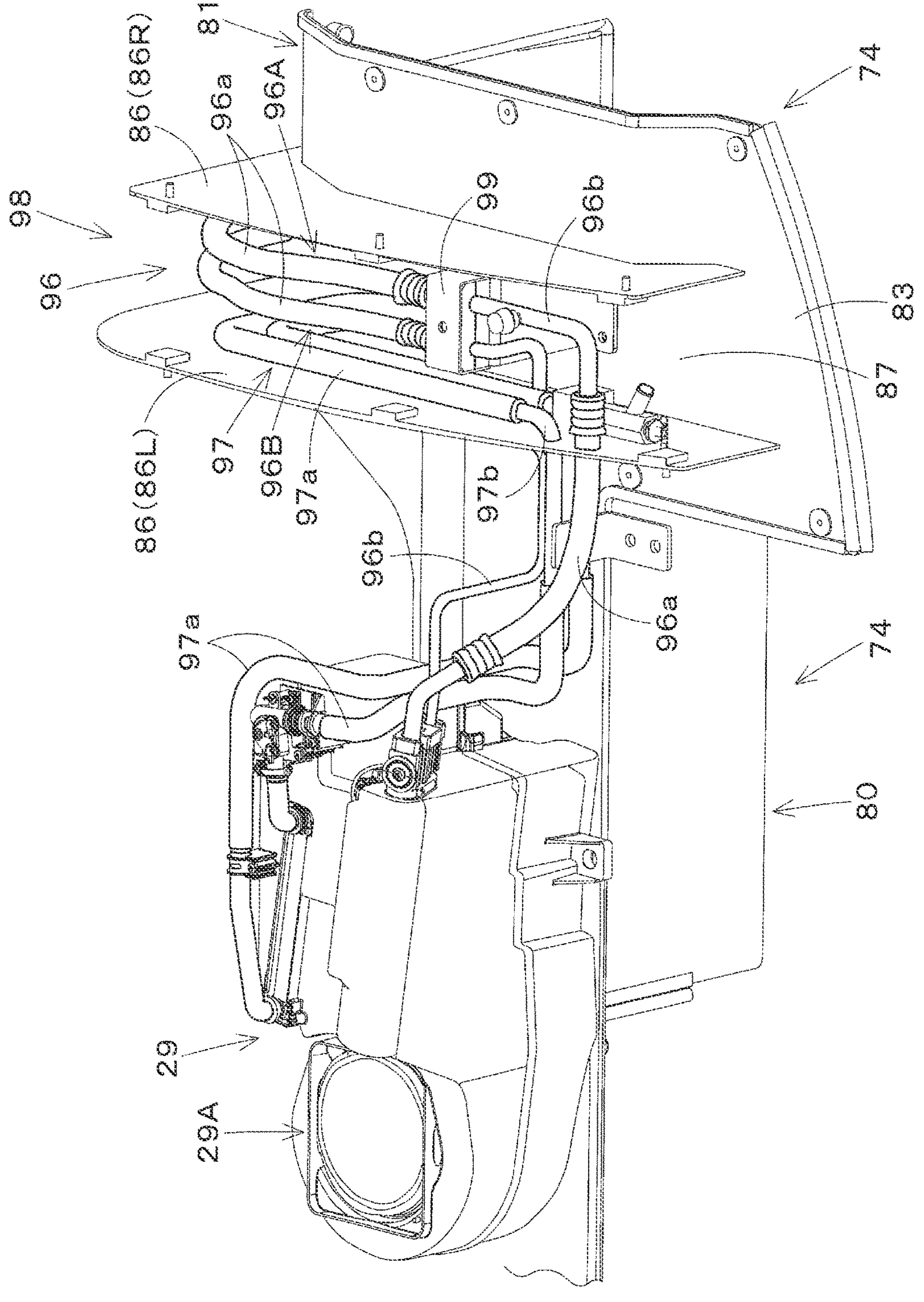
FIG. 30 is a perspective view illustrating how the cooling medium pipe and a heating medium pipe are routed.

As illustrated in FIG. 28, by removing the openable-closable cover 95B together with the cover wall 88, the compressor 18 is accessible via the inspection opening 95*a* and the gap between the pair of side walls 86. Therefore, by removing the openable-closable cover 95B together with the cover wall 88, the tension of the transmission belt 92 that transmits power to the compressor 18 can be adjusted. Furthermore, the compressor 18 is also removable. Moreover, the compressor 18 is accessible from inside the cabin 5. Specifically, as illustrated in FIG. 1, the right side surface (one side surface) of the cabin 5 is provided with an openable-closable window 5A, and the compressor placement portion 95 is disposed at the right side (one side) of the cabin 5. Therefore, by opening the second cover 43B, removing the openable-closable cover 95B and the cover wall 88, and opening the openable-closable window 5A, the compressor 18 becomes accessible from inside the cabin 5. This achieves enhanced maintainability, such as maintenance of the compressor 18 and adjustment of the transmission belt 92.

As illustrated in FIG. 27, a cooling medium pipe 96 connected to the compressor 18 and a heating medium pipe 97 routed from the prime mover E1 to the air conditioner body 29 and used for heating by the air-conditioning system are routed through the duct structure 45. Specifically, the interior of the duct structure 45 defines a route 98 for routing the cooling medium pipe 96 and the heating medium pipe 97. In other words, the route 98 is defined by the duct structure 45, and the hot air in the upper portion of the prime mover room E2 is discharged by using the route 98. Therefore, the route 98 has the entrance 89 that communicates with the upper portion of the prime mover room E2 and that takes in the hot air from the prime mover room E2, and also has the exit 91 that communicates with the outside of the prime mover room E2 and that discharges the hot air taken in through the entrance 89.

In this embodiment, the duct structure 45 defines the route 98 for the cooling medium pipe 96 and the heating medium pipe 97 and the discharge path for discharging the hot air from the prime mover room E2, thereby achieving simplification of the structure and multifunctional use of the members.

As illustrated in FIG. 27 to FIG. 30, the cooling medium pipe 96 includes, for example, a hose 96*a*, a pipe (steel pipe) 96*b*, and a joint 96*c*. The cooling medium pipe 96 is inserted into the route 98 from the compressor 18 via the entrance 89, and is clamped to a clamp section 99 at an intermediate location of the route 98. The cooling medium pipe 96 is provided as a pair. One cooling medium pipe 96A of the pair is routed from the clamp section 99 to the air conditioner body 29 via one (left) side wall 86L. The other cooling medium pipe 96B extends along the one side wall 86L and is then routed forward so as to be connected to the condenser 23. Moreover, the other cooling medium pipe 96B extends from the condenser 23 to the receiver 24 and is routed rearward from the receiver 24 so as to be connected to the air conditioner body 29. The one cooling medium pipe 96A and the other cooling medium pipe 96B are detachable from the one side wall 86L.

As illustrated in FIG. 27, the heating medium pipe 97 includes, for example, a hose 97*a*, a pipe (steel pipe) 97*b*, and a joint. The heating medium pipe 97 is provided as a pair. The pair of heating medium pipes 97 are inserted into the route 98 from the prime mover E1 via the entrance 89, extend along the one side wall 86L, and are then connected to the air conditioner body 29.

Figure 31:
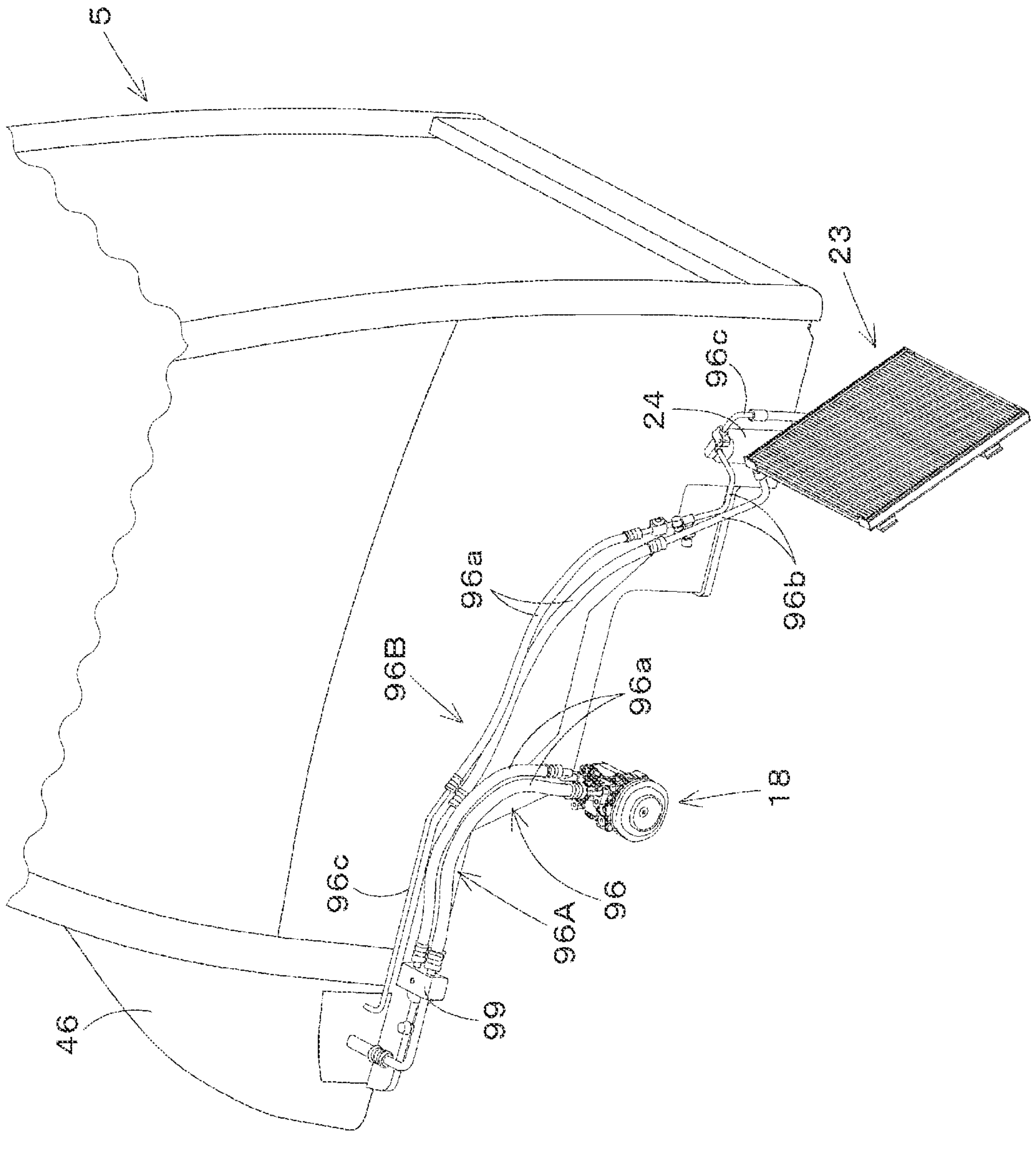
FIG. 31 is a perspective view of the cabin, the compressor, the condenser, and a receiver.

FIG. 31 illustrates a state where the compressor 18 is removed from the prime mover E1, the condenser 23 and the receiver 24 are removed from the machine body 2, and the cooling medium pipe 96 is removed from the one side wall 86L. When the cabin 5 is to be removed from the machine body 2, the compressor 18, the condenser 23, and the receiver 24 can remain in the cabin 5 while the cooling medium pipe 96 is connected to the compressor 18, the condenser 23, the receiver 24, and the air conditioner body 29. In other words, the cabin 5 can be unloaded from the machine body 2 without having to disconnect the cooling medium pipe 96 (without having to drain the cooling medium) from, for example, the compressor 18, the condenser 23, and the receiver 24.

Because the condenser 23 and the receiver 24 are disposed laterally to the front portion of the cabin 5, if the working machine 1 is not cabin-specific, the condenser 23 and the receiver 24 can be disposed at walk-through locations since the condenser 23 and the receiver 24 are not installed in the machine body 2.

Figure 32:
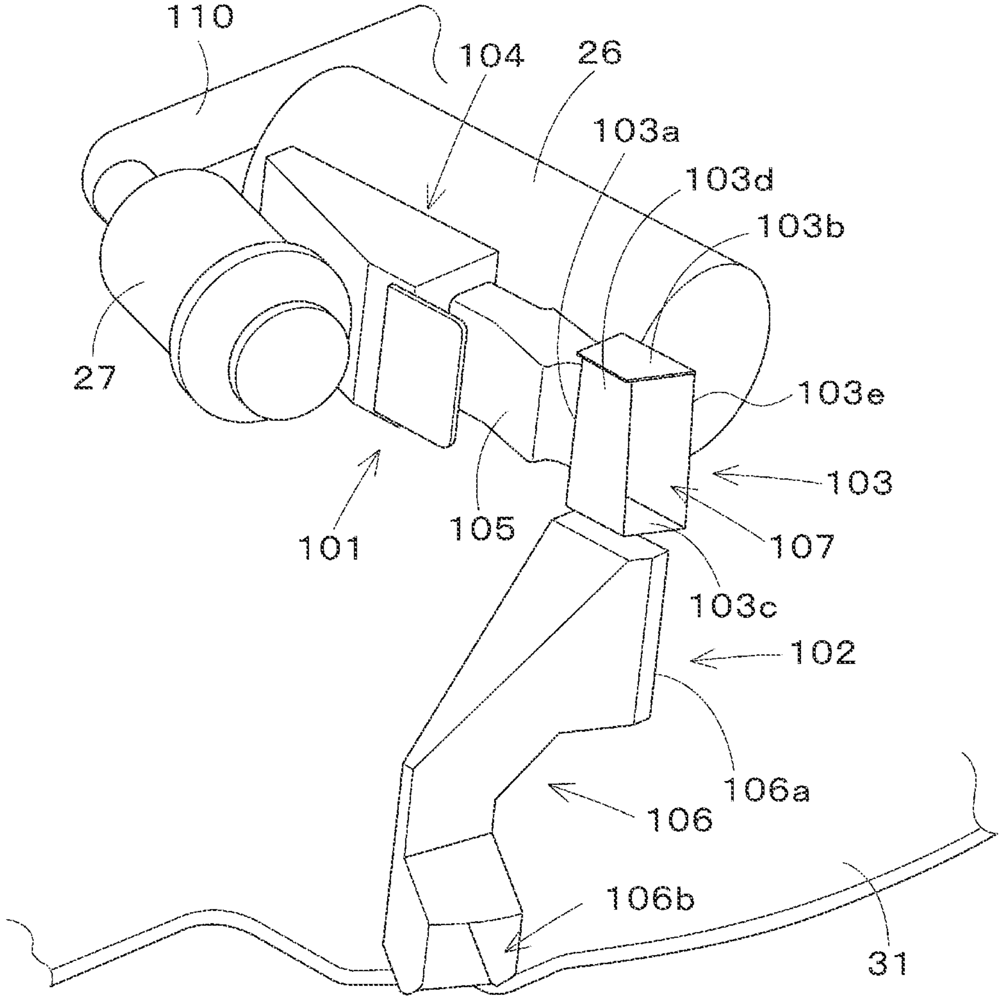
FIG. 32 is a perspective view illustrating an intake structure and an exhaust structure.
Figure 33:
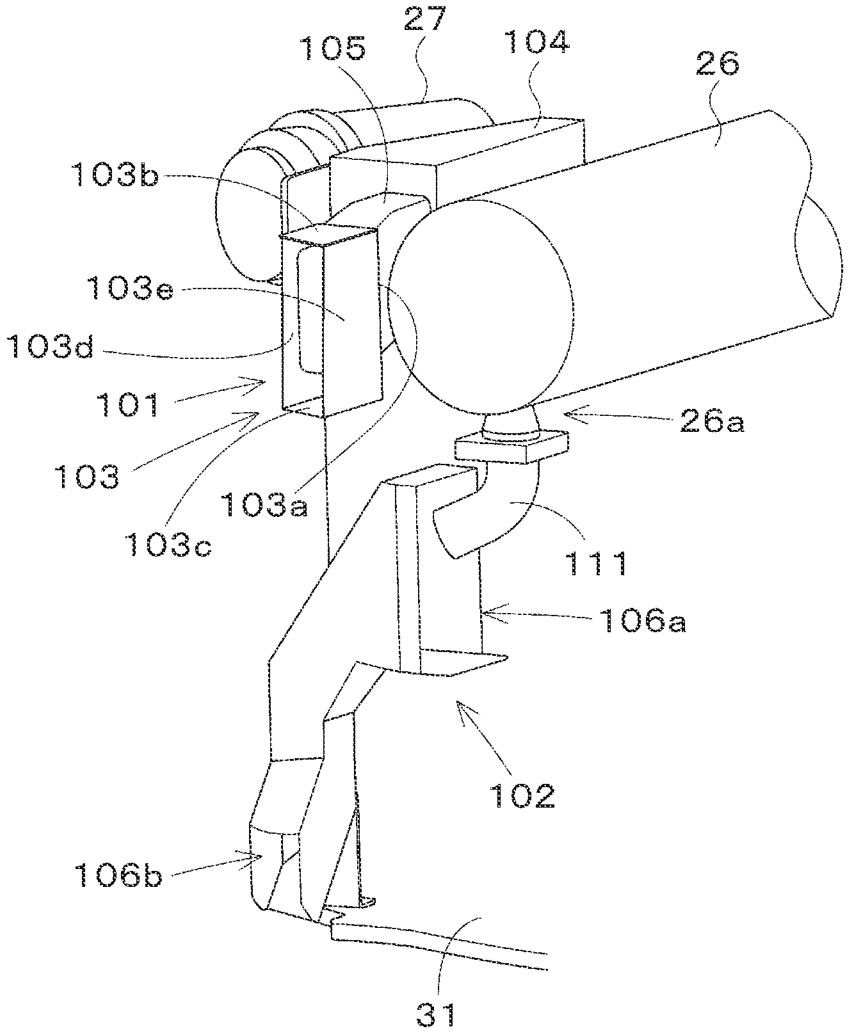
FIG. 33 illustrates the intake structure and the exhaust structure.

FIG. 32 and FIG. 33 illustrate an intake structure 101 that takes air into the prime mover E1 and an exhaust structure 102 that discharges exhaust gas, discharged from the prime mover E1, outside the prime mover room E2.

As illustrated in FIG. 32 and FIG. 33, the intake structure 101 includes an air intake box 103 that takes in air, a silencer box 104 that reduces intake sound, a connection box 105 that connects the air intake box 103 and the silencer box 104 to each other, and the air cleaner 27. The exhaust structure 102 includes the exhaust gas purifier 26 and an exhaust duct 106. The intake structure 101 is provided laterally to (to the left of) the exhaust gas purifier 26. The intake structure 101 is provided at the other side of (to the left of) the machine body 2 in the machine-body width direction K2.

Figure 34:
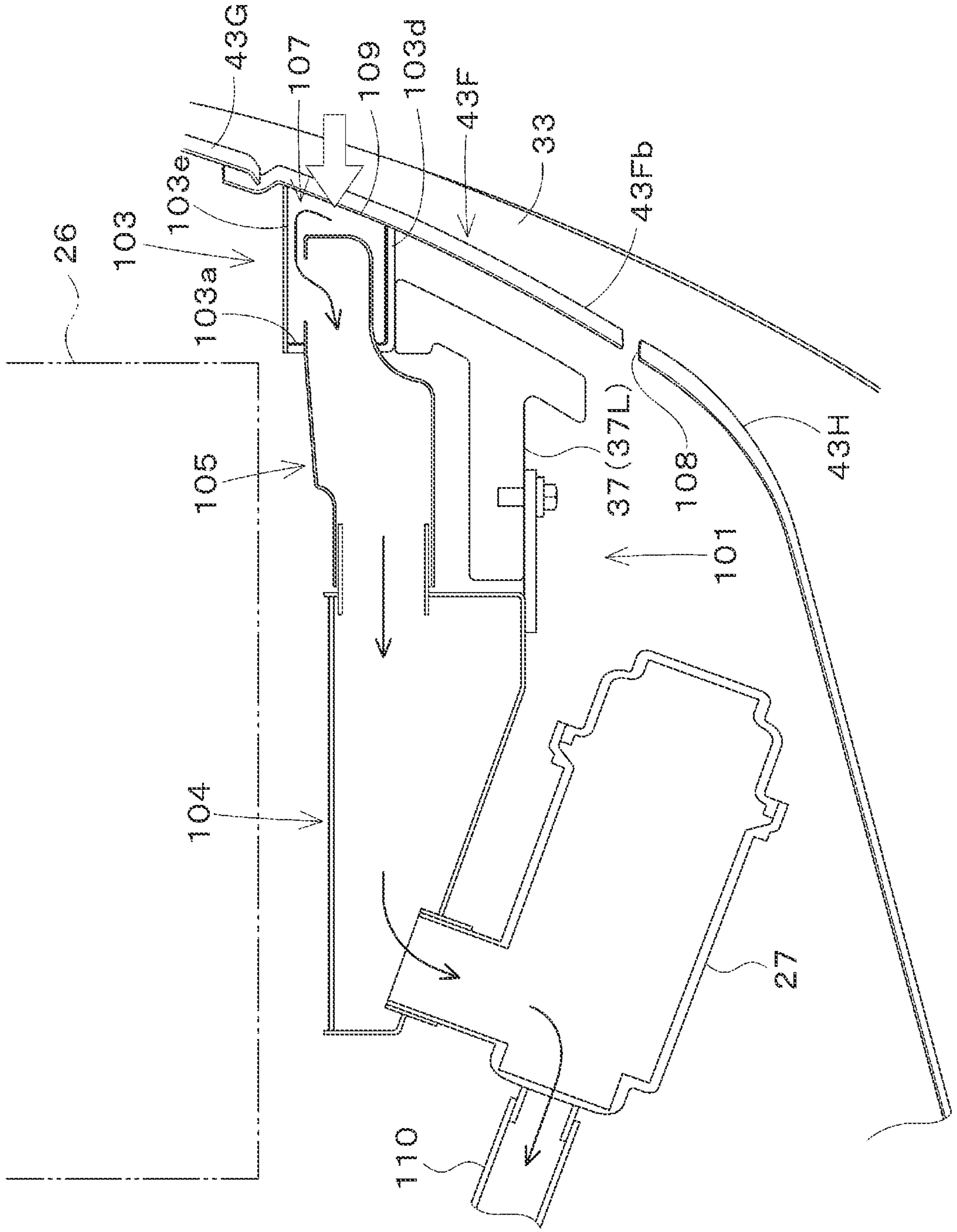
FIG. 34 is a cross-sectional plan view of the intake structure.

As illustrated in FIG. 32 and FIG. 33, the air intake box 103 has a front wall 103*a*, an upper wall 103*b*, a lower wall 103*c*, a first left side wall 103*d*, and a second right side wall 103*e*, and has a rear opening. Furthermore, as illustrated in FIG. 34, the second section 43Fb of the sixth cover 43F is provided with an outside-air inlet 109 for taking air (outside air) into an opening 107 at the rear portion of the air intake box 103. The outside-air inlet 109 is formed of, for example, a louver or multiple holes.

The air intake box 103 serves as a partition between the exhaust gas purifier 26 and a gap 108, and intake air of the prime mover E1 is taken in through the opening 107 provided at the rear portion of the air intake box 103, thereby preventing hot air from being taken in from the exhaust gas purifier 26 disposed to the right of the air intake box 103.

The exit 91 of the duct structure 45 is disposed at the right side (one side) in the machine-body width direction K2, and the intake structure 101 takes in outside air from the left side (the other side) in the machine-body width direction K2, so that the hot air discharged from the prime mover room E2 can be prevented from being taken into the prime mover E1 as intake air.

As illustrated in FIG. 34, the air taken into the air intake box 103 flows to the silencer box 104 via the connection box 105, and flows to the air cleaner 27 from the silencer box 104. The air flows from the air cleaner 27 to the prime mover E1 via, for example, an intake hose 110.

As illustrated in FIG. 32 and FIG. 33, the exhaust duct 106 is disposed vertically upright between the exhaust gas purifier 26 and the swivel substrate 31. The exhaust duct 106 has a rightward-oriented inlet opening 106*a* at the upper portion thereof and a rearward-oriented outlet opening 106*b* at the lower portion thereof. As illustrated in FIG. 33, an exhaust pipe 111 is connected to a discharge side 26*a* of the exhaust gas from the exhaust gas purifier 26. The exhaust pipe 111 is bent so as to be oriented toward the inlet opening 106*a* of the exhaust duct 106. The exhaust gas discharged from the prime mover E1 travels through the exhaust gas purifier 26, is blown out toward the inlet opening 106*a* from the exhaust pipe 111, and is discharged from the outlet opening 106*b*.

As illustrated in FIG. 7, a discharge portion 112 having a cutout shape is provided at the right lower end of the weight 33. The exhaust gas discharged from the outlet opening 106*b* of the exhaust duct 106 is discharged outward from the discharge portion 112.

The working machine 1 described above may include: a traveling device 3; the machine body 2 supported in a swivelable manner on the traveling device 3; a swivel motor 20 to swivel the machine body 2; a tank (fuel tank 19) disposed near the swivel motor 20; and a support base 52 to support the tank 19. The tank 19 may include a tank body 19A and an overhanging portion 19B extending from the tank body 19A and overhanging the swivel motor 20, and be supported by the support base 52 in a movable manner to retract the overhanging portion 19B from a space above the swivel motor 20.

This configuration can ensure, for example, maintenance of the swivel motor 20 by moving the tank 19 and retracting the overhanging portion 19B from the space above the swivel motor 20, so that the tank 19 can be increased in capacity by being provided with the overhanging portion 19B overhanging the swivel motor 20, and the space above the swivel motor 20 can be effectively utilized.

The overhanging portion 19B may overhang the swivel motor 20 to obstruct the motor removal path 61 defining a path along which the swivel motor 20 is removed upward from the machine body 2.

With this configuration, even though the overhanging portion 19B overhanging above the swivel motor 20 from the tank body 19A is provided, the overhanging portion 19B can be retracted from above the swivel motor 20, so that the swivel motor 20 can be removed through the motor removal path 61.

The cabin 5 may be equipped in the machine body 2, the swivel motor 20 is disposed below the cabin 5, and the motor removal path 61 is provided between the cabin 5 and the support base 52.

With this configuration, the swivel motor 20 can be removed without having to unload the cabin 5 from the machine body 2.

The support base 52 may have the pair of placement sections 55*c* that slidably support the tank 19 in the tank movement direction 58 as a direction for moving the tank 19. The pair of placement sections 55*c* may be disposed side-by-side with a distance therebetween in the horizontal direction that is orthogonal to the tank movement direction 58. The tank 19 may have the protrusion 19C protruding between the pair of placement sections 55*c* from the tank body 19A.

With this configuration, the tank 19 can be provided with the protrusion 19C without hindering the movement of the tank 19, and can be increased in capacity as a result of being provided with the protrusion 19C.

The attachment frame 62 standing upright on the support base 52 and the attachment stay 63 provided at the upper portion of the tank 19 may be provided. The attachment frame 62 may have the stay attachment section 62B detachably attached to the attachment stay 63.

With this configuration, the movement of the tank 19 can be restricted.

The support frame 66 supporting devices equipped in the machine body 2 may be provided. The attachment frame 62 may have the frame attachment section 62C attached to the support frame 66.

The movement of the tank 19 can be properly restricted.

The prime mover E1 equipped in the machine body 2 may be provided, and the tank 19 may be the fuel tank 19 that stores fuel for the prime mover E1.

A working machine 1 includes: a machine body 2; a cabin 5 on the machine body 2; an air conditioner body 29 for air conditioning in the cabin 5; and a prime mover room E2 to contain a prime mover E1 on the machine body 2, wherein the air conditioner body 29 is disposed above the prime mover room E2.

With this configuration, the air conditioner body 29 is disposed above the prime mover room E2, so that the foot space of the operator can be increased, as compared with a case where the air conditioner body 29 is disposed below the operator's seat 6.

The working machine 1 may further include: an operator's seat 6 disposed inside the cabin 5. The cabin 5 may include a plate member 75 disposed behind the operator's seat 6, the plate member 75 having the air conditioner body 29 disposed thereon. The plate member 75 may be disposed above the prime mover room E2 with a distance from the prime mover room E2 and be supported by the machine body 2 in a vibration-proof manner via at least one mount member 41.

With this configuration, transmission of heat from the prime mover room E2 to the air conditioner body 29 can be suppressed, and simplification of the structure and multifunctional use of the members can be achieved.

The plate member 75 may include a front portion disposed inside the cabin 5 and a rear portion protruding rearward from a rear surface of the cabin 5.

With this configuration, it is possible to eliminate or reduce the likelihood that the air conditioner body 29 will narrow the internal space of the cabin 5.

The working machine 1 may further include: a cooling fan 14 to introduce air outside the prime mover room E2 into the prime mover room E2; a compressor 18 to be driven by power from the prime mover E1 to compress a cooling medium; and a route 98 for a cooling medium pipe 96 connected to the compressor 18, the route 98 having an entrance 89 and an exit 91, the entrance 89 being in communication with an upper portion of the prime mover room E2 and configured to allow hot air from the prime mover room E2 to enter the route 98, the exit 91 being in communication with an outside of the prime mover room E2 and configured to allow the hot air having entered the route 98 through the entrance 89 to be discharged.

With this configuration, the route 98 for the cooling medium pipe 96 can be used as an exhaust path for discharging the hot air from the prime mover room E2, thus achieving simplification of the structure and multifunctional use of the members.

The working machine 1 may further include: a compressor placement portion 95 for placement of the compressor 18. The route 98 may include a pair of side walls 86 facing each other with a distance therebetween in a machine-body width direction K2, a bottom wall 87 closing a gap between lower ends of rear portions of the pair of side walls 86, and a cover wall 88 closing a gap between upper ends of the pair of side walls 86 and a gap between front ends of the pair of side walls 86. The entrance 89 may be defined by the bottom wall 87 and the cover wall 88. The exit 91 may be provided at a rear portion of the cover wall 88. The compressor placement portion 95 may be provided lower than the entrance 89 and in communication with the entrance 89.

With this configuration, the cooling medium pipe 96 can be readily guided.

The compressor placement portion 95 may include a main portion 95A and an openable-closable cover 95B, the main portion 95A having an inspection opening 95*a* facing forward and being in communication with a space between the pair of side walls 86, the openable-closable cover 95B being configured to close the inspection opening 95*a*. The openable-closable cover 95B may be attachable and detachable together with the cover wall 88.

With this configuration, the condenser 23 is accessible by merely removing the openable-closable cover 95B together with the cover wall 88.

A condenser 23 and a receiver 24 may be disposed laterally to a front portion of the cabin 5 and in front of the compressor 18, the condenser 23 being configured to dissipate heat of the cooling medium from the compressor 18 to liquefy the cooling medium, the receiver 24 being configured to store the cooling medium liquefied by the condenser 23. The compressor 18, the condenser 23, and the receiver 24 may be removable together with the cabin 5 from the machine body 2.

With this configuration, the cabin 5 can be unloaded from the machine body 2 without having to disconnect the cooling medium pipe 96 from the compressor 18, the condenser 23, and the receiver 24.

The working machine 1 may further include: a compressor placement portion 95 for placement of the compressor 18. The compressor placement portion 95 may be disposed closer to one of opposite sides of the machine body in a machine-body width direction K2 than the cabin 5 is such that the compressor 18 is accessible from an inside the cabin 5.

This configuration achieves enhanced maintainability, such as maintenance of the compressor 18 and adjustment of the transmission belt 92 that transmits power to the compressor 18.

The machine body 2 may include a substrate (swivel substrate 31), a first vertical rib 32R, and a second vertical rib 32L, the first vertical rib 32R being provided on a first portion of the substrate 31 that is closer to the one of the opposite sides of the machine body in the machine-body width direction K2 than a second portion of the substrate 31 is and extending from a front portion toward a rear portion of the substrate 31, the second vertical rib 32L being provided on the second portion of the substrate 31 that is closer to the other of the opposite sides of the machine body in the machine-body width direction K2 than the first portion is and extending from the front portion toward the rear portion of the substrate 31. The working machine 1 may further include: a hydraulic actuator to be driven by hydraulic fluid; a hydraulic fluid tank 28 to store hydraulic fluid; a hydraulic pump 25 to deliver hydraulic fluid from the hydraulic fluid tank 28; a control valve V1 to control a flow rate of hydraulic fluid supplied from the hydraulic pump 25 to the hydraulic actuator; and a hydraulic hose (delivery hose 114) connecting the hydraulic pump 25 and the control valve V1 to each other. The hydraulic fluid tank 28 may be disposed closer to the other of the opposite sides of the machine body in the machine-body width direction K2 than the second vertical rib 32L is. The control valve V1 may be disposed closer to the other of the opposite sides of the machine body in the machine-body width direction K2 than the second vertical rib 32L is and in front of the hydraulic fluid tank 28. The hydraulic pump 25 may be disposed closer to a rear of the machine body than a front end of the hydraulic fluid tank 28 is. The hydraulic hose 114 may be routed between the second vertical rib 32L and the hydraulic fluid tank 28.

With this configuration, the maintainability of the suction filter and return filter 115 provided in the hydraulic fluid tank 28 can be enhanced, and the occurrence of noise caused by interference between the hydraulic hose (delivery hose 114) and the outer sheath can be avoided.

The prime mover room E2 and the inside of the cabin 5 may be separated from each other by a double-walled structure including a partition 74 and an outer wall (floor sheet 84) of the cabin 5, the partition 74 separating the prime mover room E2 and the outside of the prime mover room E2 from each other. The hydraulic fluid tank 28 may define a portion of the partition 74.

With this configuration, transmission of heat from the prime mover room E2 into the cabin 5 can be suppressed, and multifunctional use of the members can be achieved.

The working machine 1 may further include a fuel tank 19 to store fuel for the prime mover E1. The fuel tank 19 may be disposed above the first vertical rib 32R and across the first vertical rib 32R in the machine-body width direction K2.

With this configuration, the cabin 5 can be disposed at the rear of the machine body as compared to a case where the fuel tank 19 is disposed at the rear of the cabin 5, thus achieving stability of the machine body.

The exit 91 may be provided on one of opposite sides of the machine body in a machine-body width direction K2. The working machine 1 may further include an intake structure 101 to introduce air into the prime mover E1. The intake structure 101 may be configured to allow outside air to enter the prime mover E1 from the other of the opposite sides of the machine body in the machine-body width direction K2.

With this configuration, the hot air discharged from the prime mover room E2 can be prevented from being taken into the prime mover E1 as intake air.

Figure 35:
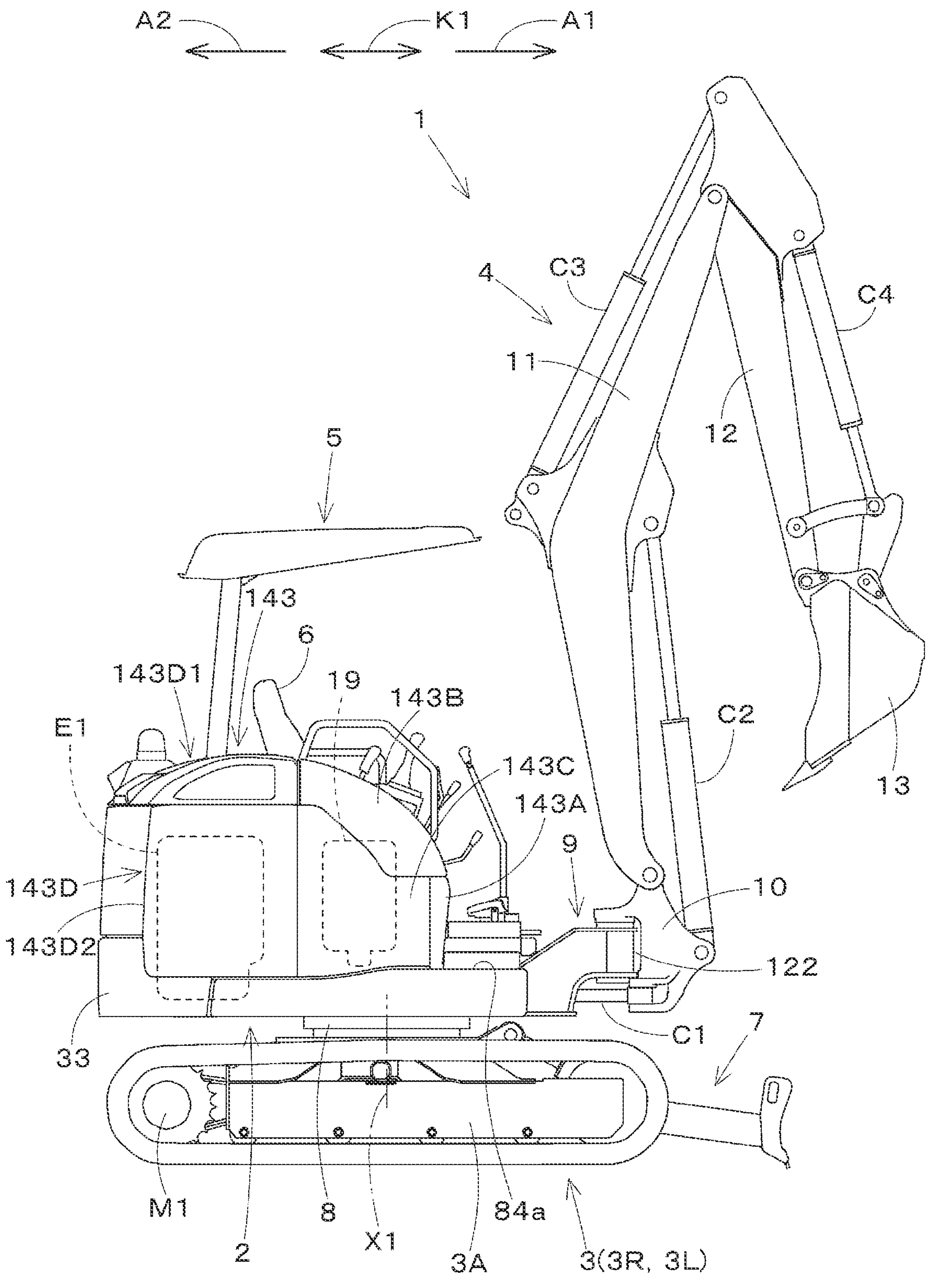
FIG. 35 is a schematic side view illustrating the overall configuration of a working machine according to another embodiment.
Figure 36:
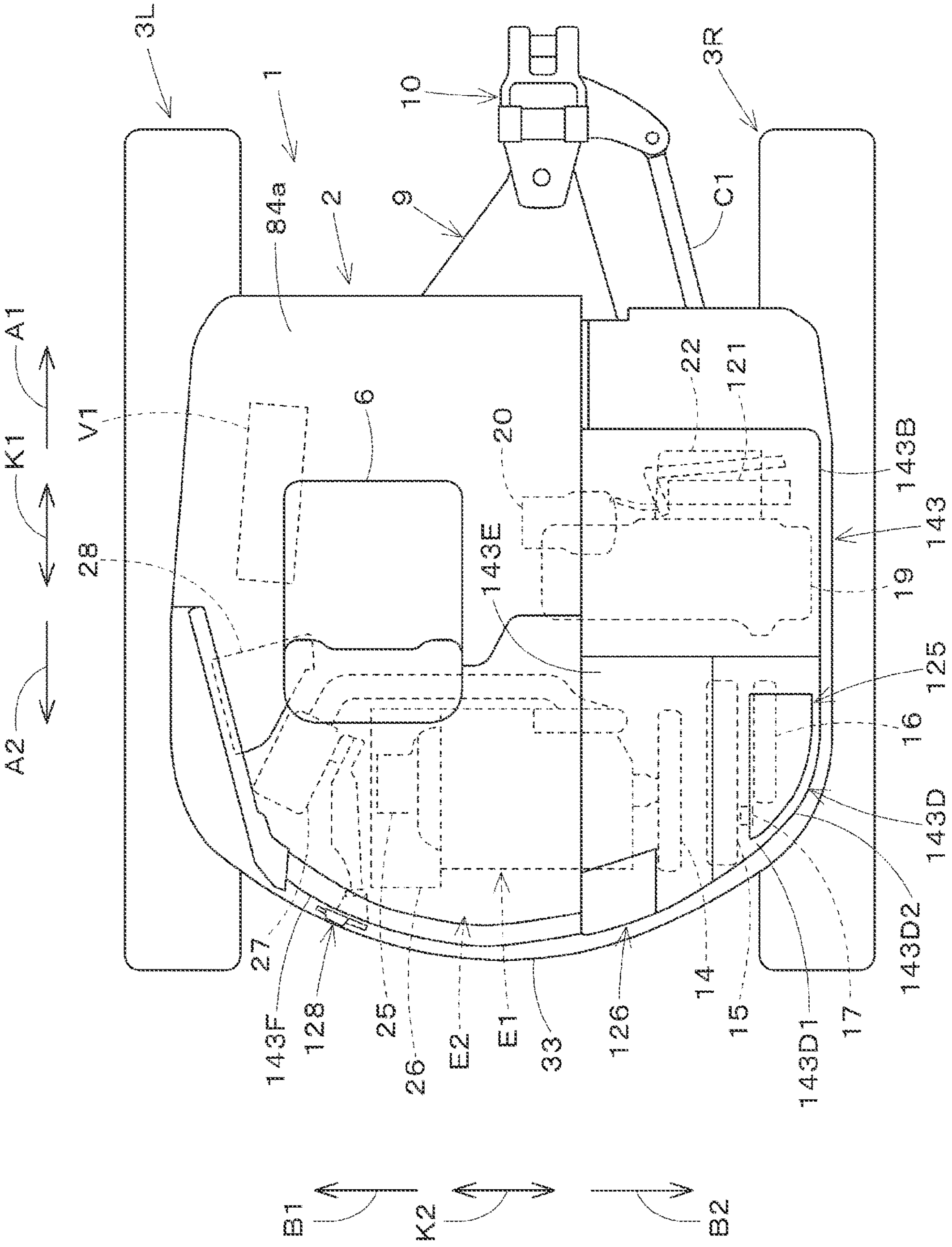
FIG. 36 is a schematic plan view of the working machine according to such another embodiment.
Figure 95:
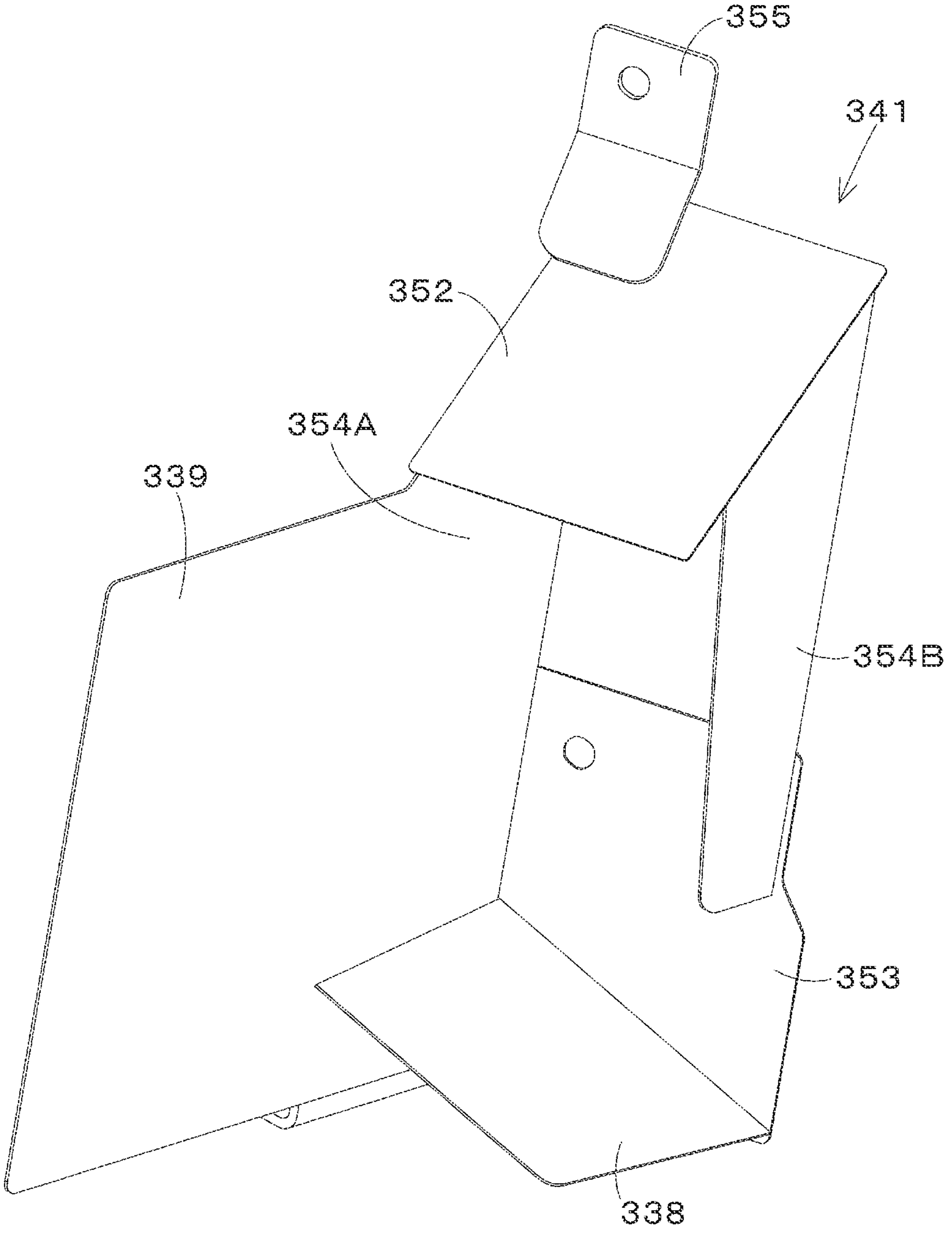
FIG. 95 is a perspective view of the second component body.

FIG. 35 to FIG. 95 illustrate another embodiment. FIG. 35 is a schematic side view illustrating the overall configuration of the working machine 1 according to such another embodiment. FIG. 36 is a schematic plan view of the working machine 1 according to such another embodiment. In this embodiment, a backhoe serving as a swivel working machine is similarly exemplified as the working machine 1.

As illustrated in FIG. 35, the working machine 1 includes the machine body (swivel base) 2, the traveling device 3, and the working device 4. The machine body 2 is equipped with the operator's seat 6 and a canopy 5 as a sun shade for the operator (driver) sitting in the operator's seat 6. The canopy 5 may also function as an operator protector that protects the operator. Although the working machine 1 is a canopy-specific working machine in this embodiment, the working machine 1 may be a cabin-specific working machine in which the machine body 2 is equipped with a cabin that surrounds the operator's seat 6 in place of the canopy 5.

In this embodiment, a direction (indicated by an arrow A1 in FIG. 35 and FIG. 36) extending forward from the operator sitting in the operator's seat 6 of the working machine 1 will be described as a forward direction (machine-body forward direction), and a direction (indicated by an arrow A2 in FIG. 35 and FIG. 36) extending rearward from the operator will be described as a rearward direction (machine-body rearward direction). A direction indicated by an arrow K1 in FIG. 35 and FIG. 36 will be described as a front-rear direction. A direction (toward the far side in FIG. 35 and indicated by an arrow B1 in FIG. 36) extending leftward from the operator will be described as a leftward direction, and a direction (toward the near side in FIG. 35 and indicated by an arrow B2 in FIG. 36) extending rightward from the operator will be described as a rightward direction. Furthermore, the horizontal direction extending orthogonally to the front-rear direction (machine-body front-rear direction) K1 will be described as a machine-body width direction K2 (see FIG. 36).

In this embodiment, components similar to those in the above-described embodiment illustrated in FIG. 1 to FIG. 34 will be given the same reference signs, and descriptions thereof will be omitted. There may sometimes be redundant descriptions.

Figure 37:
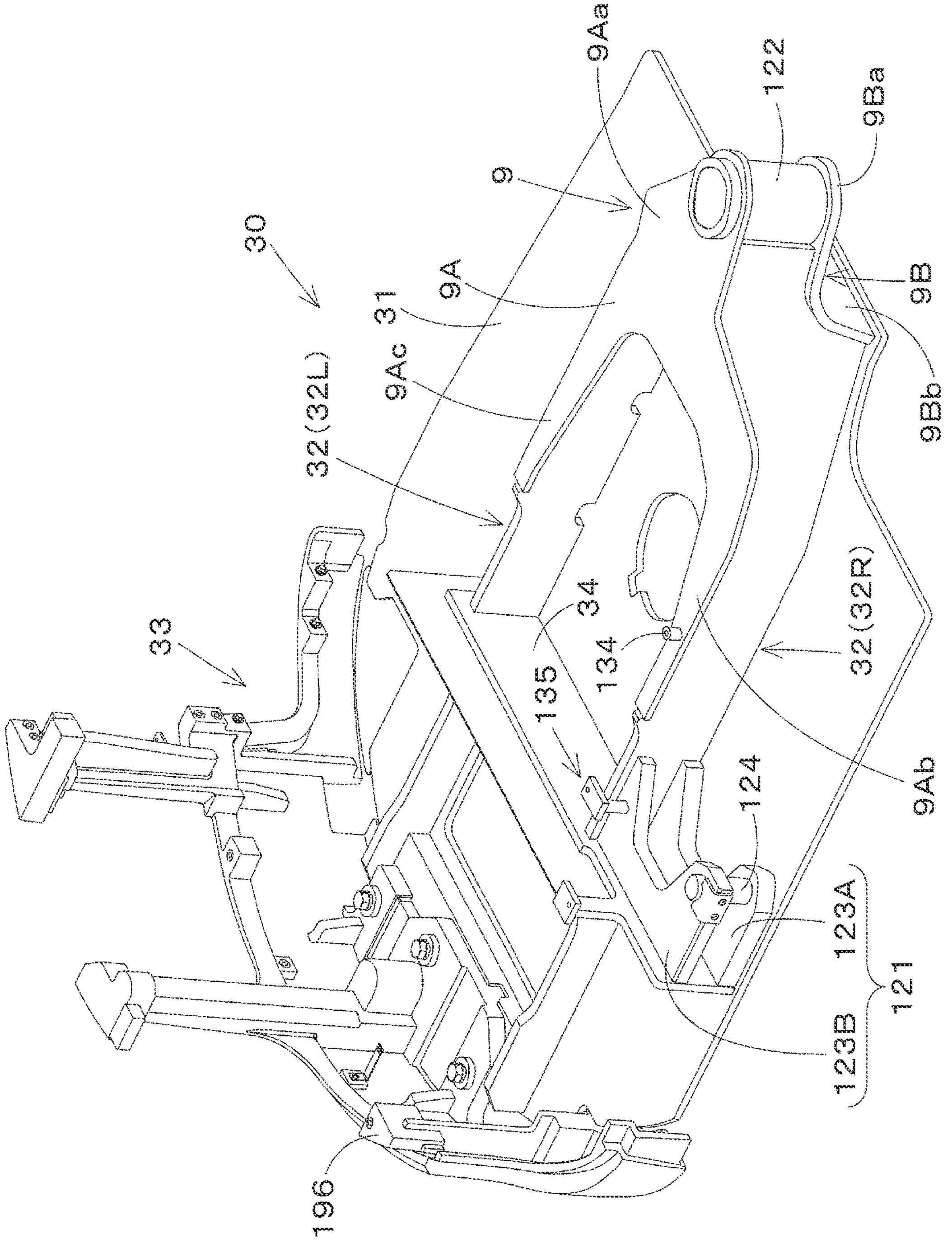
FIG. 37 is a perspective view of the swivel frame.

As illustrated in FIG. 37, the support bracket 9 includes a pair of upper and lower plate members and is fixed to the front portion of the reinforcement rib 32. Specifically, the support bracket 9 has an upper plate 9A fixed to the upper end of the reinforcement rib 32 and a lower plate 9B fixed to the front lower portion of the reinforcement rib 32. The upper plate 9A has a main portion 9Aa provided between the front portions of the upper ends of the first vertical rib 32R and the second vertical rib 32L, a first extension section 9Ab extending rearward above the upper end of the first vertical rib 32R from the main portion 9Aa, and a second extension section 9Ac extending rearward above the upper end of the second vertical rib 32L from the main portion 9Aa. The lower plate 9B has an upper wall 9Ba disposed below the front portion of the main portion 9Aa and a vertical wall 9Bb extending downward from the rear end of the upper wall 9Ba. A cylindrical boss 122 is fixed between the front portion of the main portion 9Aa and the front portion of the upper wall 9Ba. The swing bracket 10 is supported by the cylindrical boss 122 in a swivelable manner via a vertical shaft.

The weight 33 is attached to the rear portion of the swivel substrate 31. The weight 33 defines the rear portion of the machine body 2.

The partition plate 34 is fixed to an intermediate portion of the swivel substrate 31 in the front-rear direction K1. The partition plate 34 extends in the machine-body width direction K2 in a vertically upright state, and extends across the first vertical rib 32R and the second vertical rib 32L. The prime mover E1 is installed between the partition plate 34 of the swivel substrate 31 and the weight 33.

As illustrated in FIG. 37, a bracket member 123 that supports the rear end of the swing cylinder C1 is disposed in front of the right portion of the partition plate 34 and to the right of the first vertical rib 32R. The bracket member 123 includes a lower bracket 123A and an upper bracket 123B. The lower bracket 123A is placed on and fixed to the swivel substrate 31, has the rear end thereof fixed to the front surface of the partition plate 34, and has the left end thereof fixed to the right surface of the first vertical rib 32R. The upper bracket 123B is disposed above the lower bracket 123A, has the rear end thereof fixed to the front surface of the partition plate 34, and has the left end thereof fixed to the right surface of the first vertical rib 32R. The right portion of the bracket member 123 is provided with a pin 124 that pivotally supports the rear end of the swing cylinder C1 and that extends between the upper bracket 123B and the lower bracket 123A.

Figure 38:
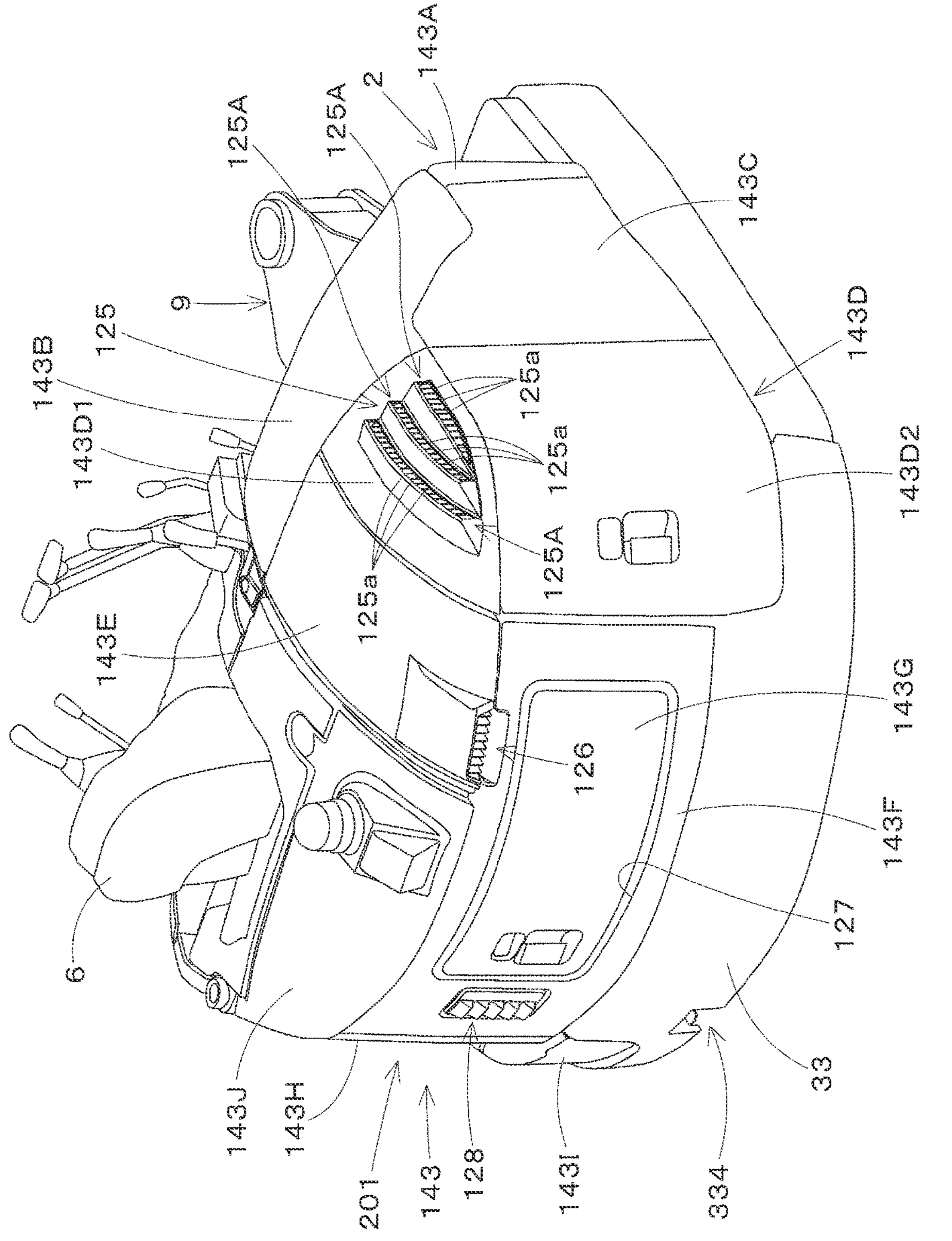
FIG. 38 is a perspective view of the machine body.

As illustrated in FIG. 38, the machine body 2 has a cover unit 143 that covers, for example, devices, components, and members equipped in the swivel frame 30. The cover unit 143 has a plurality of covers. The plurality of covers include a first cover 143A to a tenth cover 143J.

The first cover 143A is disposed at the right front portion of the machine body 2 and covers, for example, the battery 22. The first cover 143A is removable and enables inspection and maintenance of, for example, the battery 22 by being removed.

The second cover 143B extends rearward and upward from the upper portion of the first cover 143A and covers the upper side of the fuel tank 19 and the battery 22. The second cover 143B has the rear portion thereof pivotally supported by a hinge in a rotatable manner around an axis extending in the machine-body width direction K2 so as to be openable upward. By being opened, the second cover 143B enables refueling to the fuel tank 19 as well as inspection and maintenance of the fuel tank 19 and the battery 22.

The third cover 143C covers the right side of, for example, the fuel tank 19 and the battery 22. The third cover 143C has the rear portion thereof pivotally supported by a hinge in a rotatable manner around an axis extending in the up-down direction so as to be openable rearward. By being opened, the third cover 143C enables inspection and maintenance of the fuel tank 19 and the battery 22. When the second cover 143B and the third cover 143C are opened, the upper and lateral sides of the fuel tank 19 become exposed. The third cover 143C is not limited to being pivotally supported by the hinge, and may be, for example, detachably attached by using a bolt.

The fourth cover 143D covers, for example, the radiator 15, the oil cooler 16, and the fuel cooler 17. Specifically, the fourth cover 143D includes an upper wall 143D1 that covers the upper side of, for example, the radiator 15, the oil cooler 16, and the fuel cooler 17, and also includes an outer wall (side wall) 143D2 that covers an area from the right side to the rear side of, for example, the radiator 15, the oil cooler 16, and the fuel cooler 17. The fourth cover 143D has the front portion thereof pivotally supported by a hinge in a rotatable manner around an axis extending in the up-down direction so as to be openable forward. By being opened, the fourth cover 143D enables inspection and maintenance of, for example, the radiator 15, the oil cooler 16, and the fuel cooler 17. The upper wall 143D1 has an outside-air intake portion 125 that takes outside air into the fourth cover 143D by suction of the cooling fan 14.

The fifth cover 143E covers the right portion of the prime mover E1 and the upper side of, for example, the cooling fan 14. The fifth cover 143E has a discharge portion 126 that discharges hot air above the prime mover E1 outside the cover unit 143.

The sixth cover 143F and the seventh cover 143G cover the rear side of the prime mover E1. The sixth cover 143F has an opening 127 that is opened and closed by the seventh cover 143G. The seventh cover 143G has the right portion thereof pivotally supported by a hinge in a rotatable manner around an axis extending in the up-down direction so as to be openable rightward. The seventh cover 143G has an air inlet 128 located to the left of the sixth cover 143F and provided for taking in air to be suctioned into the air cleaner 27.

The eighth cover 143H covers the upper portion of the hydraulic fluid tank 28 and the left side of the air cleaner 27. The eighth cover 143H has the rear portion thereof pivotally supported by a hinge in a rotatable manner around an axis extending in the up-down direction so as to be openable rearward. By being opened, the eighth cover 143H enables inspection and maintenance of the hydraulic fluid tank 28, the air cleaner 27, and the hydraulic pump 25.

The ninth cover 143I is disposed below the eighth cover 143H and covers the lower portion of the hydraulic fluid tank 28.

The tenth cover 143J covers the upper side of the prime mover E1.

Figure 39:
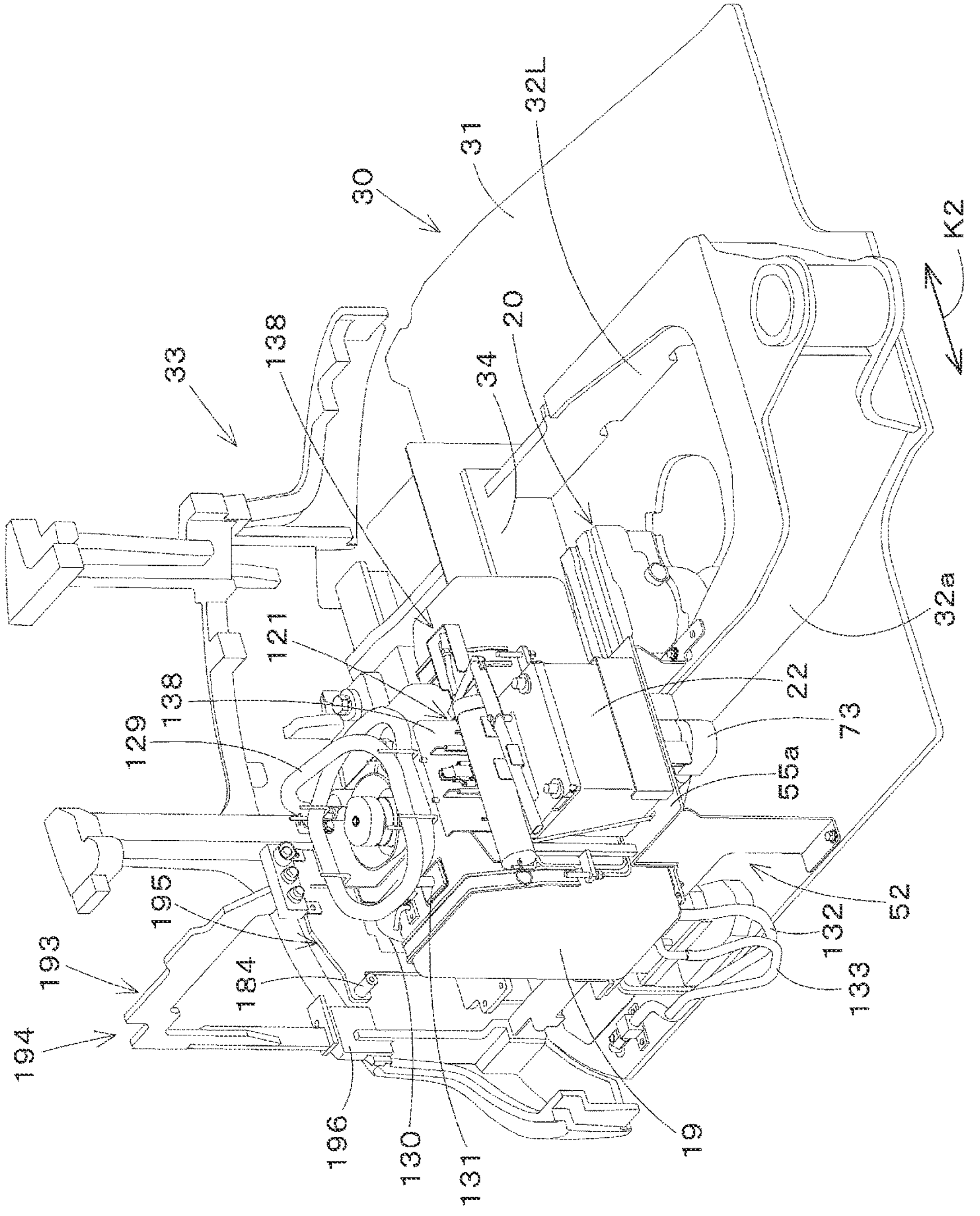
FIG. 39 is a perspective view illustrating an area where the fuel tank is disposed in the swivel frame.

As illustrated in FIG. 39, the swivel motor 20 is disposed in front of the partition plate 34 and toward the first vertical rib 32R between the first vertical rib 32R and the second vertical rib 32L. The swivel motor 20 is attached on the swivel substrate 31. A swivel pinion (not illustrated) driven around a vertical axis by power from the swivel motor 20 is attached to the lower portion of the swivel motor 20. The swivel pinion meshes with an internally toothed gear provided in the swivel bearing 8. The swivel bearing 8 has an outer ring attached to the machine body 2 and an inner ring that is provided radially inward of the outer ring in a rotatable manner around the swivel axis X1. The internally toothed gear is provided radially inward of the inner ring. Thus, the swivel pinion is rotationally driven by the swivel motor 20 so as to move along the internally toothed gear, whereby the machine body 2 swivels around the swivel axis X1.

The fuel tank 19 is disposed higher than the first vertical rib 32R (reinforcement rib 32), extends in the machine-body width direction K2 across the upper side of the first vertical rib 32R from the right end of the machine body 2 (the right side of the first vertical rib 32R), and extends above the swivel motor 20. The fuel tank 19 is disposed near the swivel motor 20. Specifically, the fuel tank 19 is disposed to the right of the swivel motor 20.

Figure 40:
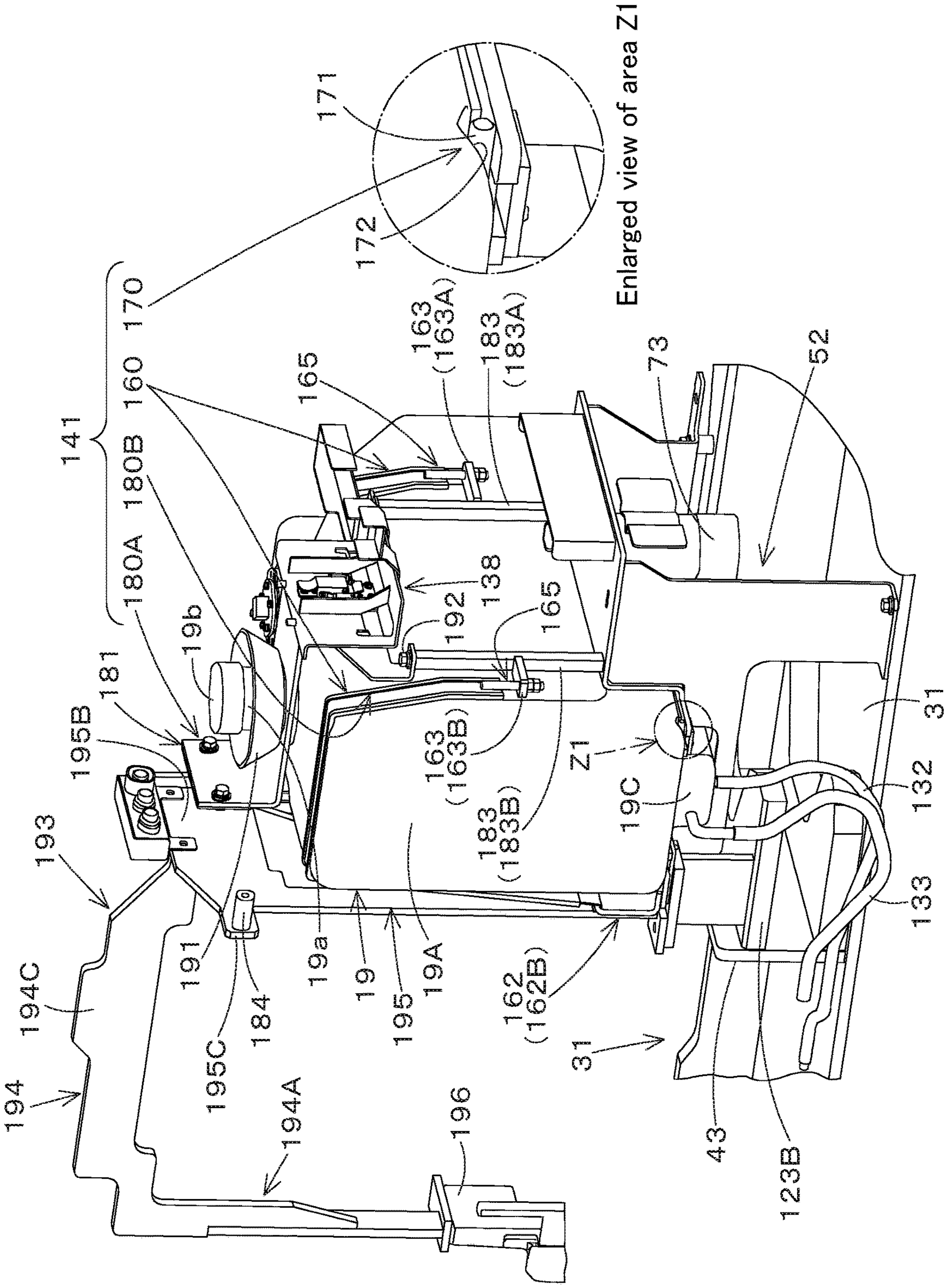
FIG. 40 is a perspective view of the area where the fuel tank is disposed.

As illustrated in FIG. 39 and FIG. 40, the fuel tank 19 is supported by the support base 52 mounted on the swivel frame 30 (machine body 2). A refueling pump 72 is disposed below the support base 52. The refueling pump 72 is attached to the support base 52.

As illustrated in FIG. 39, a suction hose 129 for delivering fuel from a fuel container, which stores the fuel, to the refueling pump 72 is wound around and retained at the upper portion of the fuel tank 19. The upper portion of the fuel tank 19 is provided with a refueling pipe 131 connected to a delivery hose 130 that delivers the fuel discharged from the refueling pump 72 to the fuel tank 19.

Figure 41:
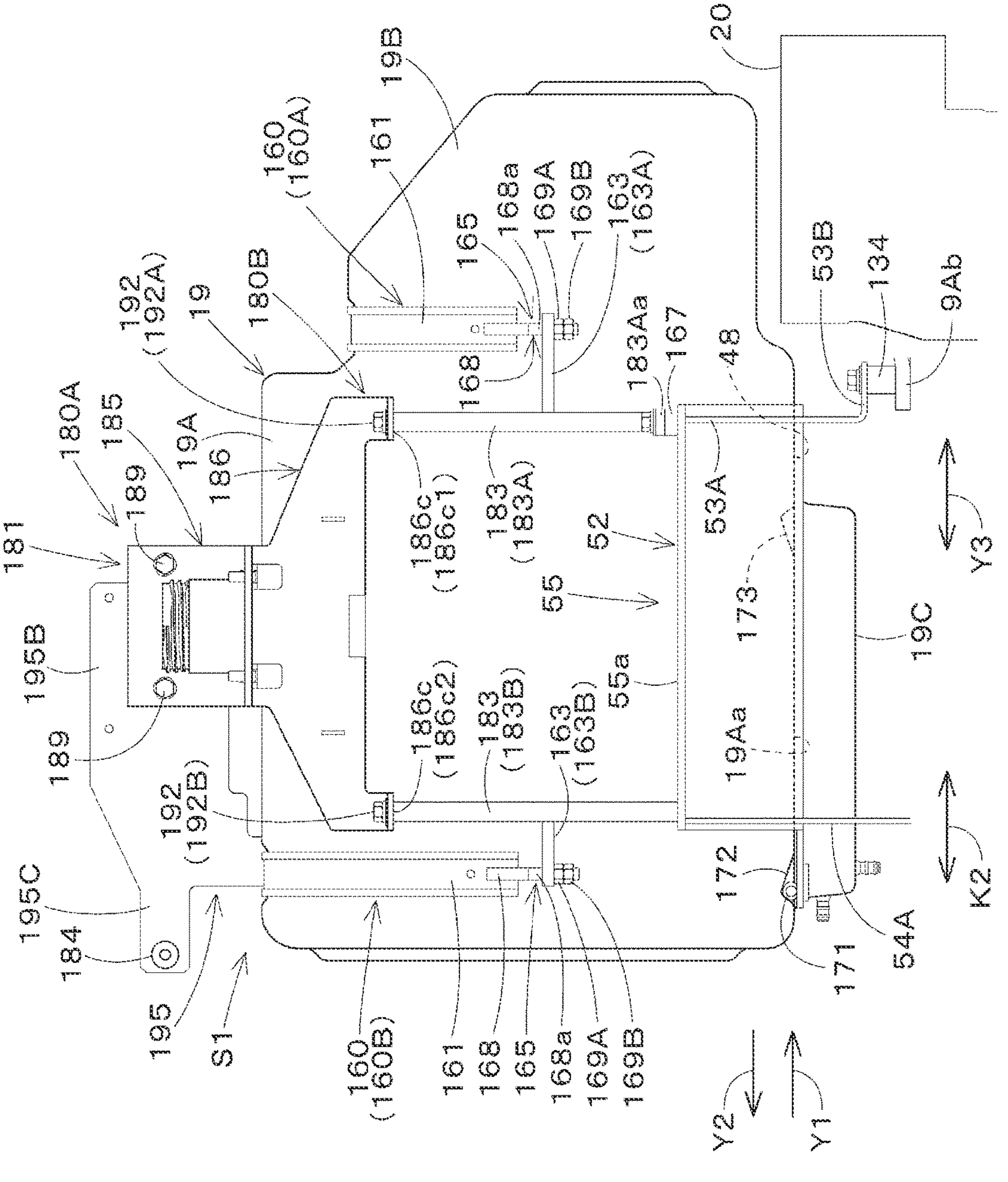
FIG. 41 is a front view of a state where the fuel tank is in an installation position.
Figure 42:
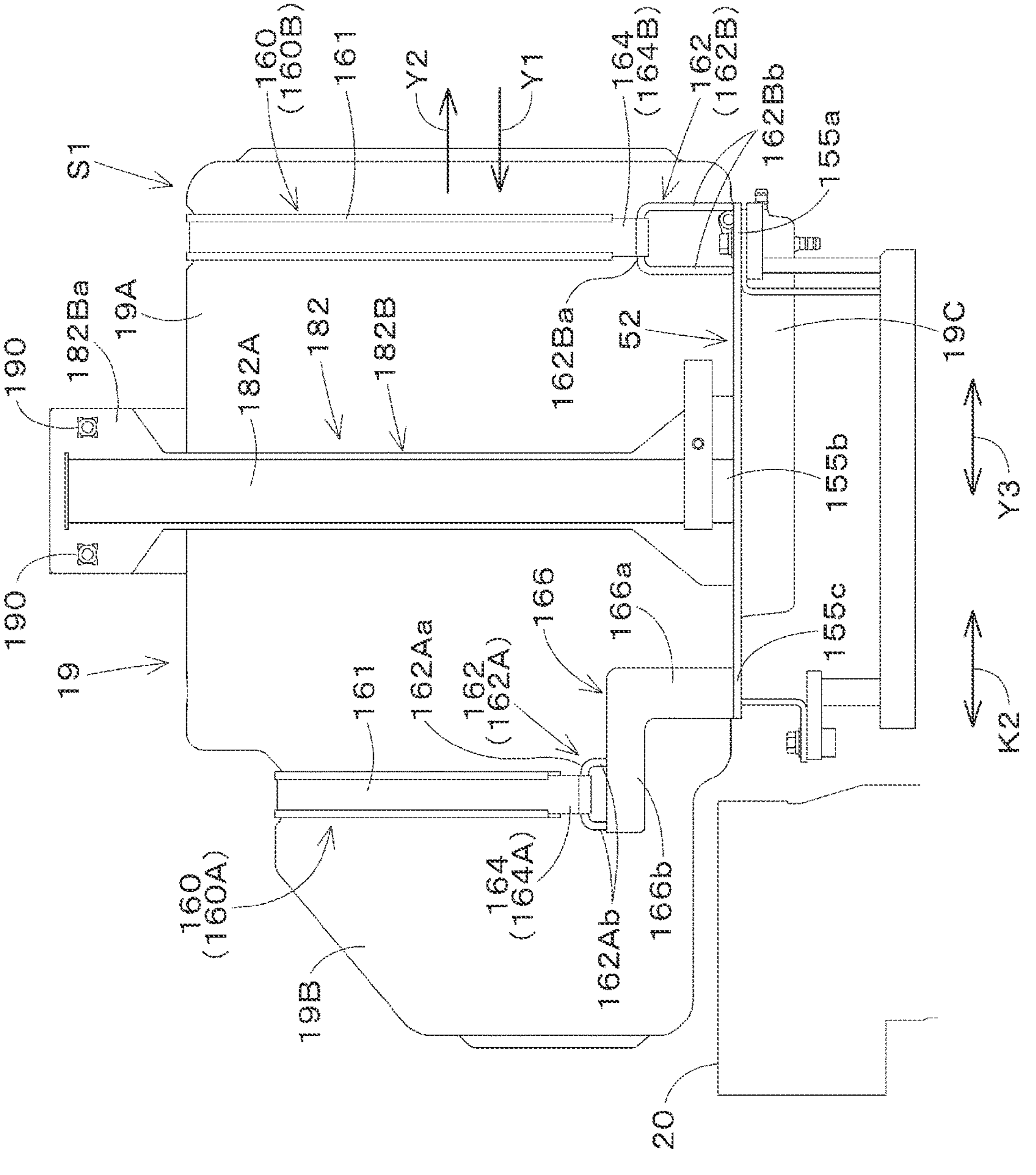
FIG. 42 is a rear view of the state where the fuel tank is in the installation position.
Figure 43:
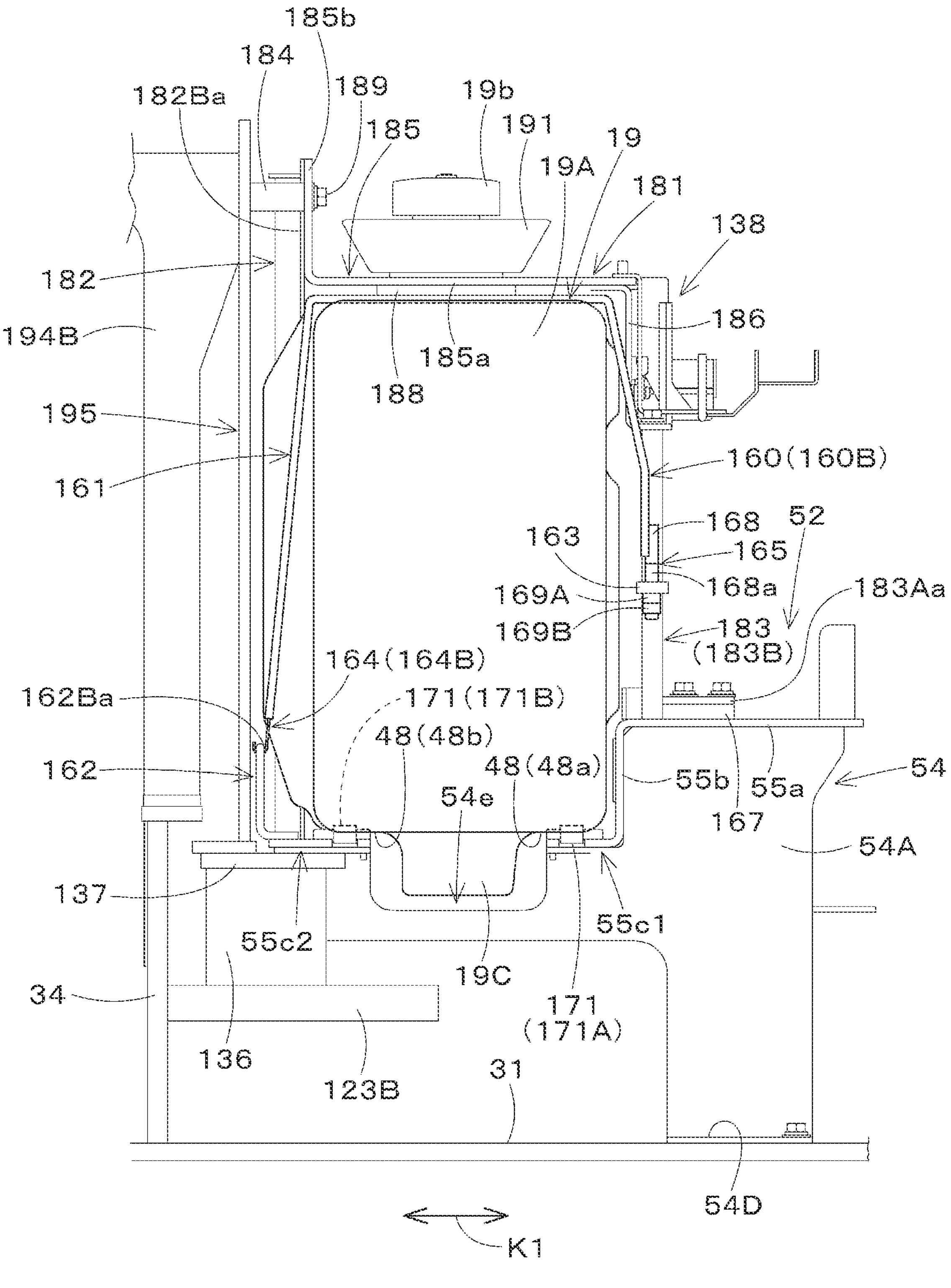
FIG. 43 is a right side view of the state where the fuel tank is in the installation position.

As illustrated in FIG. 41, FIG. 42, and FIG. 43, the fuel tank 19 has the tank body 19A disposed to the right of the swivel motor 20, the overhanging portion 19B extending leftward from the tank body 19A and overhanging above the swivel motor 20, and the protrusion 19C protruding downward from a bottom 19Aa of the tank body 19A. The protrusion 19C extends in the machine-body width direction K2 at substantially the center of the tank body 19A in the front-rear direction K1. The swivel motor 20 is disposed below the overhanging portion 19B.

The fuel tank 19 according to this embodiment is provided with the overhanging portion 19B and the protrusion 19C, so that the fuel tank 19 can be increased in capacity. Moreover, with the protrusion 19C provided, water in the fuel can be separated therefrom. As illustrated in FIG. 40, the bottom of the protrusion 19C is connected to a drain tube 132 for draining water from inside the fuel tank 19. The right side surface of the protrusion 19C is connected to a supply tube 133 that delivers the fuel in the fuel tank 19 to the prime mover E1. With the right side surface of the protrusion 19C being provided with a fuel delivery section connected to the supply tube 133, cleaning can be performed readily even when the fuel delivery section is jammed.

The lower surface of the tank body 19A located in front of and behind the protrusion 19C defines the placement lower surfaces 48 that are placed on placement sections 55*c*1 and 55*c*2 to be described later.

As illustrated in FIG. 41, FIG. 42, and FIG. 43, the fuel tank 19 is supported by the support base 52 in a movable manner in the horizontal direction (movement direction Y3) between an installation position S1 and a withdrawn position S2 withdrawn from the installation position S1. The installation position S1 is the position illustrated in FIG. 41 and FIG. 42 and is where the fuel tank 19 is accommodated within the cover unit 143. The withdrawn position S2 is the position illustrated in FIG. 44 and is where the fuel tank 19 (overhanging portion 19B) can be retracted from above the swivel motor 20. In this embodiment, the fuel tank 19 is withdrawable outward (rightward) in the machine-body width direction K2 from the installation position S1.

By withdrawing the fuel tank 19 from the installation position S1 to the withdrawn position S2 to retract the overhanging portion 19B from above the swivel motor 20, the swivel motor 20 becomes accessible, thereby enabling maintenance of the swivel motor 20. Furthermore, by retracting the overhanging portion 19B from above the swivel motor 20, the swivel motor 20 becomes removable upward. For example, maintenance and removal of the swivel motor 20 can be ensured by moving the fuel tank 19 and retracting the overhanging portion 19B from above the swivel motor 20, so that the fuel tank 19 can be increased in capacity by being provided with the overhanging portion 19B overhanging above the swivel motor 20, and the space above the swivel motor 20 can be effectively utilized. Moreover, withdrawing the fuel tank 19 from the installation position S1 to the withdrawn position S2 can facilitate the maintenance of the fuel tank 19 and can achieve enhanced maintainability.

Next, the structure of the support base 52 will be described.

Figure 45:
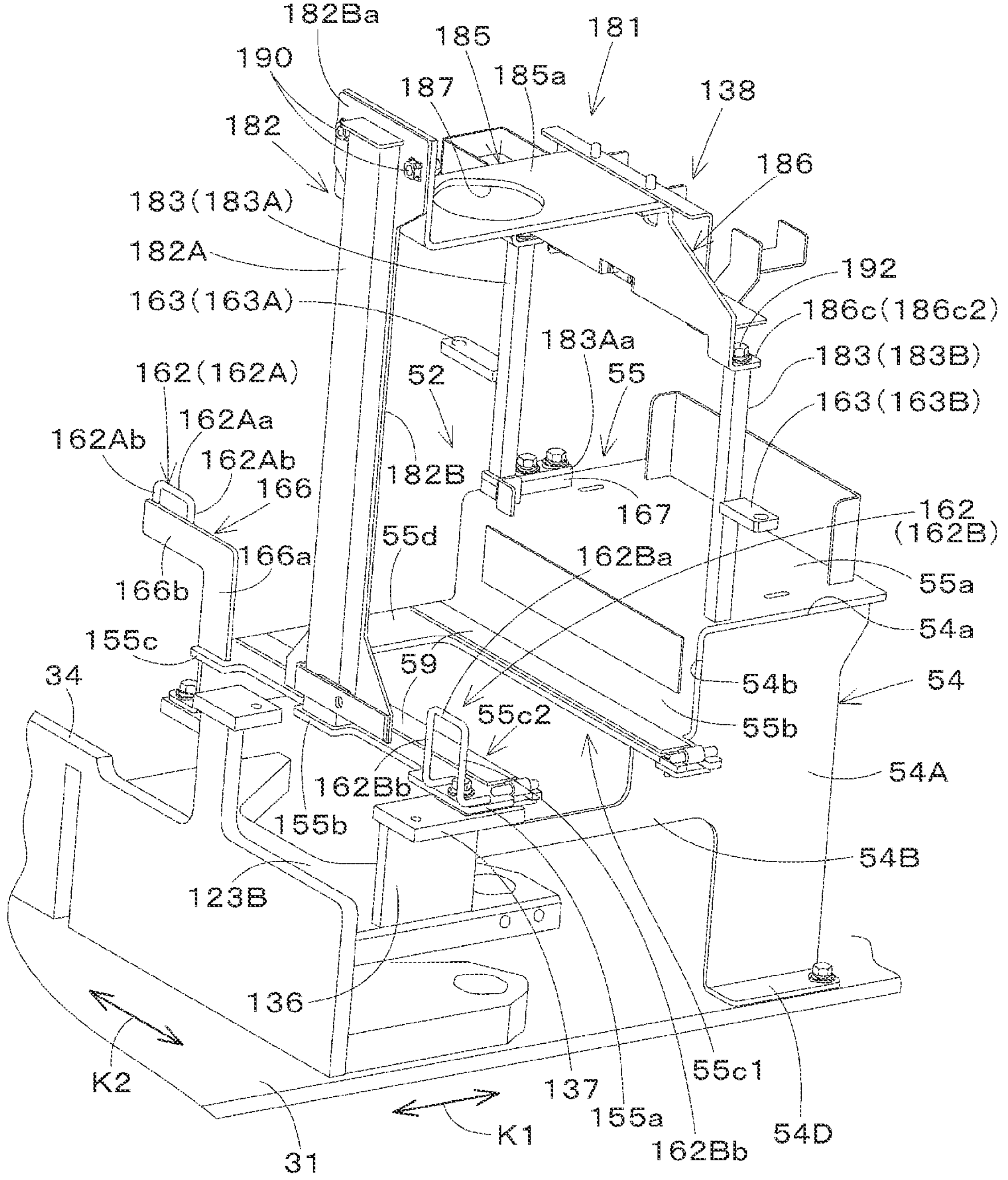
FIG. 45 is a perspective view of the support base and members that support the fuel tank.
Figure 46:
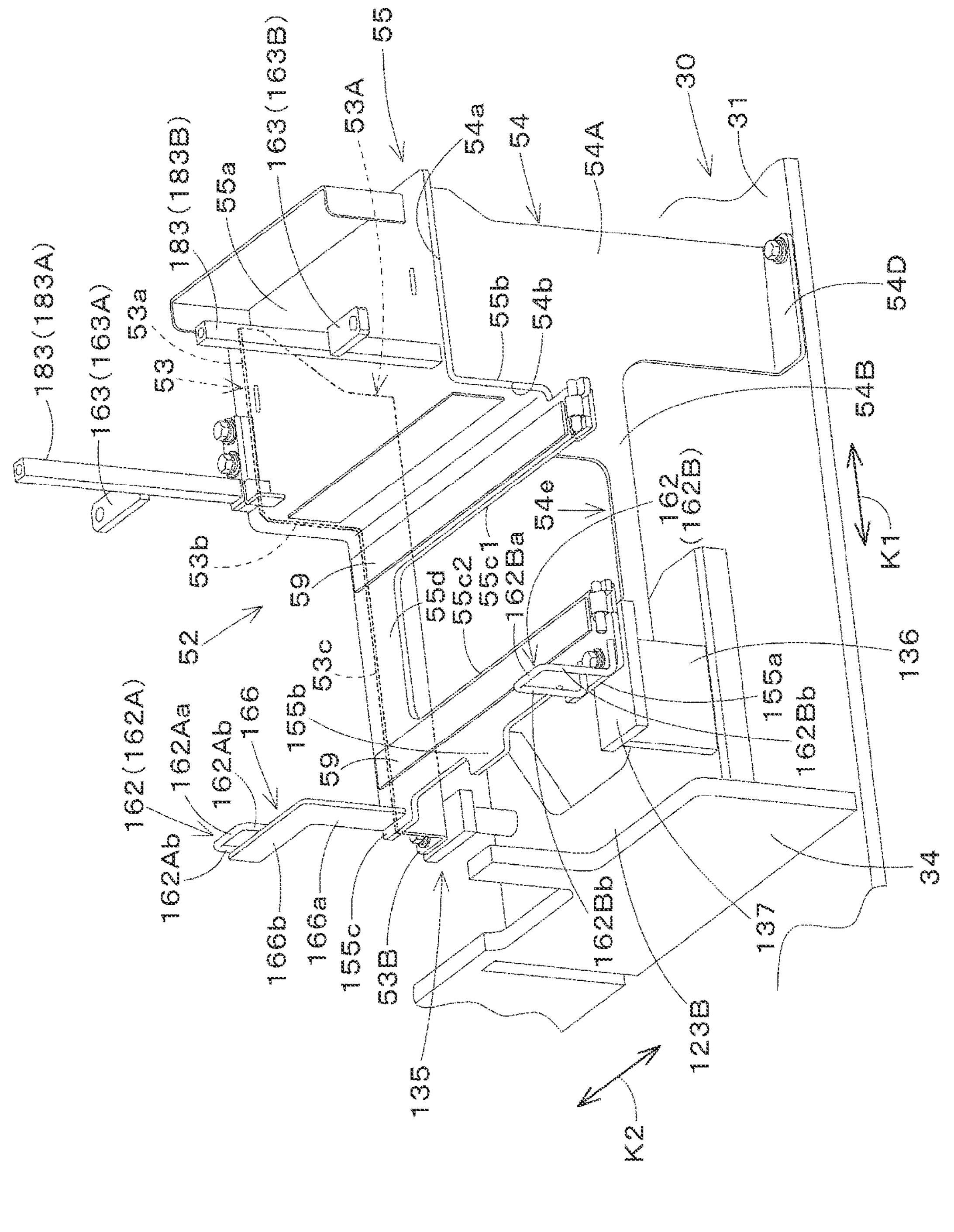
FIG. 46 is a perspective view of, for example, the support base.
Figure 47:
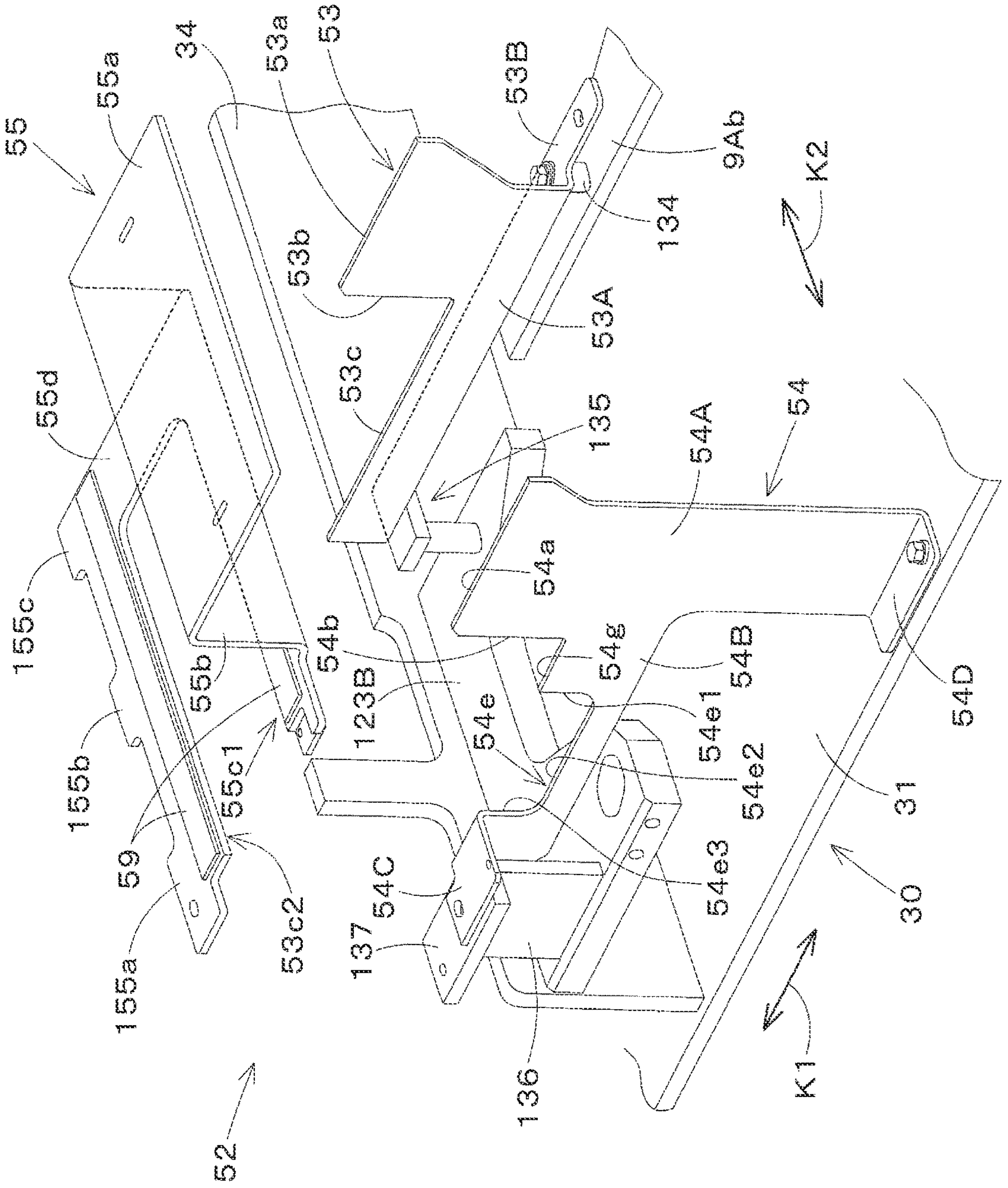
FIG. 47 is an exploded perspective view of the support base.

As illustrated in FIG. 45, FIG. 46, and FIG. 47, the support base 52 has the first side plate 53, the second side plate 54, and the upper plate 55. The first side plate 53, the second side plate 54, and the upper plate 55 are each formed of a plate material and are fixed to one another by, for example, welding appropriate locations to one another.

As illustrated in FIG. 46 and FIG. 47, the first side plate 53 has a vertical wall 53A whose plate surface is oriented in the machine-body width direction K2 and that is long in the front-rear direction K1, and also has an attachment wall 53B extending leftward from the lower end of the vertical wall 53A. The first side plate 53 has the front upper edge 53*a* defining the front upper end of the vertical wall 53A, the vertical edge 53*b* extending downward from the rear end of the front upper edge 53*a*, and the rear upper edge 53*c* extending rearward from the lower end of the vertical edge 53*b*. The front portion of the attachment wall 53B is fixed, by using a bolt, to a boss member 134 fixed to the first extension section 9Ab. The rear portion of the attachment wall 53B is fixed, by using a bolt, to an attachment member 135 fixed to the left portion of the upper bracket 123B.

Figure 48:
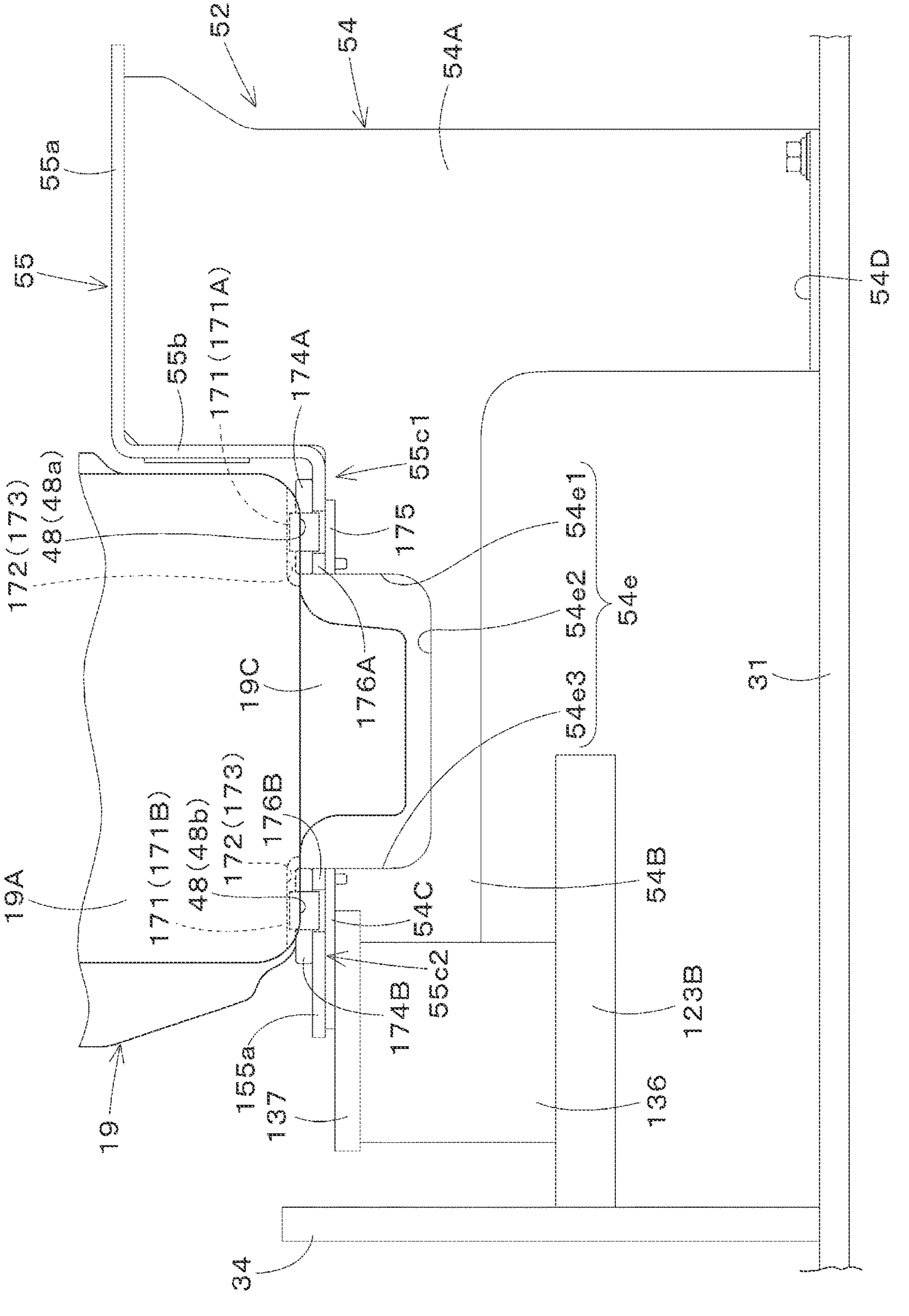
FIG. 48 is a right side view of the fuel tank and the support base.

As illustrated in FIG. 46, FIG. 47, and FIG. 48, the second side plate 54 has a vertical wall 54A whose plate surface is oriented in the machine-body width direction K2 and that is long in the up-down direction, an extension wall 54B extending rearward from the upper portion of the vertical wall 54A, a first attachment wall 54C extending rightward from the upper end of the rear portion of the extension wall 54B, and a second attachment wall 54D extending rightward from the lower end of the vertical wall 54A. The second side plate 54 has the front upper edge 54*a* defining the upper end of the vertical wall 54A, the vertical edge 54*b* extending downward from the rear end of the front upper edge 54*a*, a rear upper edge 54*g* extending rearward from the lower end of the vertical edge 54*b*, and the recessed edge 54*e* recessed downward and provided between the rear upper edge 54*g* and the first attachment wall 54C.

As illustrated in FIG. 47 and FIG. 48, the recessed edge 54*e* has the first edge 54*e*1 extending downward from the rear end of the rear upper edge 54*g*, the second edge 54*e*2 extending downward from the front end and the left end of the first attachment wall 54C, and the third edge 54*e*3 that connects the lower ends of the first edge 54*e*1 and the second edge 54*e*2 to each other. The first attachment wall 54C is placed on the front portion of the upper surface of a support plate 137 and is attached thereto by using a bolt. The support plate 137 is fixed to the upper end of a vertical plate 136 standing upright on the right portion of the upper bracket 123B.

As illustrated in FIG. 46, the upper plate 55 is fixed between the first side plate 53 and the second side plate 54.

As illustrated in FIG. 46 and FIG. 47, the upper plate 55 has the battery attachment wall 55*a*, the downward-extending wall 55*b*, the pair of front and rear placement sections 55*c*1 and 55*c*2, and the coupling wall 55*d*.

The battery attachment wall 55*a* is provided between the front upper edges 53*a* and 54*a* of the first side plate 53 and the second side plate 54. The battery 22 is placed on and attached to the battery attachment wall 55*a* (see FIG. 39).

The downward-extending wall 55*b* extends downward from the rear edge of the battery attachment wall 55*a* and is provided between the vertical edges 53*b* and 54*b* of the first side plate 53 and the second side plate 54.

One (front) placement section 55*cl* of the pair of placement sections 55*cl* and 55*c*2 extends rearward from the lower edge of the downward-extending wall 55*b* and extends between the front portion of the rear upper edge 53*c* of the first side plate 53 and the rear upper edge 54*g* of the second side plate 54. The one placement section 55*c*1 protrudes rightward from the rear upper edge 53*c* of the first side plate 53. The other (rear) placement section 55*c*2 is disposed behind the one placement section 55*c*1 with a distance therebetween and extends between the rear portion of the rear upper edge 53*c* of the first side plate 53 and the upper surface of the first attachment wall 54C of the second side plate 54. As illustrated in FIG. 47, the rear portion of the other placement section 55*c*2 is provided with a first support piece 155*a*, a second support piece 155*b*, and a third support piece 155*c* with a distance therebetween in that order from the right side. The first support piece 155*a* overlies the upper surface of the first attachment wall 54C and is fixed, by using a bolt, to the support plate 137 together with the first attachment wall 54C.

As illustrated in FIG. 43 and FIG. 48, the fuel tank 19 is placed on the pair of placement sections 55*c*1 and 55*c*2 in a movable (slidable) manner in the machine-body width direction K2. Specifically, a front placement lower surface 48*a* is placed on the placement section 55*c*1, and a rear placement lower surface 48*b* is placed on the placement section 55*c*1. In other words, the support base 52 has the pair of placement sections 55*c*1 and 55*c*2 that support the fuel tank 19 in a slidable manner in the movement direction Y3 as a direction for moving the fuel tank 19. The pair of placement sections 55*cl* and 55*c*2 are disposed side-by-side with a distance therebetween in the horizontal direction that is orthogonal to the movement direction Y3. In this embodiment, the placement lower surfaces 48 are placed on the placement sections 55*cl* and 55*c*2 via the underlay members 59 provided on the upper surfaces of the placement sections 55*c*1 and 55*c*2. The underlay members 59 may each be formed of, for example, a low-friction material or a cushioning material. Alternatively, the underlay members 59 may each be formed of a low friction cushioning material.

As illustrated in FIG. 43 and FIG. 48, the protrusion 19C protrudes between the pair of placement sections 55*c*1 and 55*c*2 and is located within the recessed edge 54*e*.

As illustrated in FIG. 46 and FIG. 47, the coupling wall 55*d* couples the left ends of the pair of placement sections 55*c* to each other. The protrusion 19C is disposed to the right of the coupling wall 55*d*. The coupling wall 55*d* is placed on and supported by the rear upper edge 53*c*.

As an alternative to this embodiment in which the support base 52 is a combination of a tank support base that supports the fuel tank 19 and a battery support base that supports the battery 22, the tank support base and the battery support base may be separate members.

As illustrated in FIG. 40, the working machine 1 includes a securing device 141 capable of securing the fuel tank 19 in the installation position S1 and the withdrawn position S2. The securing device 141 includes a first securing device 160, a second securing device 170, a third securing device 180A, and a fourth securing device 180B.

First, the first securing device 160 will be described.

The first securing device 160 is a device (securing band unit) that secures the fuel tank 19 in the installation position S1 by pressing the fuel tank 19 against the support base 52 with a band 161.

As illustrated in FIG. 41, FIG. 42, and FIG. 43, the first securing device 160 includes a first securing band unit 160A and a second securing band unit 160B. The first securing band unit 160A secures the side (left side) of the fuel tank 19 in a pressing direction Y1 (direction from the withdrawn position S2 toward the installation position S1) when the fuel tank 19 is in the installation position S1. In this embodiment, the first securing band unit 160A secures the base of the overhanging portion 19B. The second securing band unit 160B secures the side (right side) of the fuel tank 19 in a pulling direction Y2 (direction from the installation position S1 toward the withdrawn position S2) when the fuel tank 19 is in the installation position S1.

The first securing band unit 160A and the second securing band unit 160B each have a hook member 162, a securing piece 163, the band 161, a band hooking member 164, and a band securing member 165.

As illustrated in FIG. 41, FIG. 42, and FIG. 43, the hook member 162 is formed of a rod material. The hook member 162 is disposed near the lower portion of the fuel tank 19. As illustrated in FIG. 42, a hook member 162A of the first securing band unit 160A is secured to an attachment plate 166 standing upright on the third support piece 155*c* of the other placement section 55*c*2, and a hook member 162B of the second securing band unit 160B is secured to the first support piece 155*a* of the other placement section 55*c*2.

As illustrated in FIG. 45 and FIG. 46, the attachment plate 166 has a vertical plate section 166*a* standing upright from the third support piece 155*c* and a horizontal plate section 166*b* extending leftward from the upper portion of the vertical plate section 166*a*. The hook member 162A has a hook 162Aa disposed above the horizontal plate section 166*b* with a distance therebetween and extending in the machine-body width direction K2, and also has a pair of legs 162Ab extending downward from the left and right ends of the hook 162Aa and fixed to the horizontal plate section 166*b*. The hook member 162B has a hook 162Ba disposed above the first support piece 155*a* with a distance therebetween and extending in the machine-body width direction K2, and also has a pair of legs 162Bb extending downward from the left and right ends of the hook 162Ba and then extending forward so as to be fixed to the first support piece 155*a*.

As illustrated in FIG. 43, the securing piece 163 is disposed opposite the hook member 162 such that the securing piece 163 and the hook member 162 sandwich the fuel tank 19. The securing piece 163 is secured to a pillar member 183 standing upright on the battery attachment wall 55*a*.

As illustrated in FIG. 45 and FIG. 46, the pillar member 183 includes a first pillar member 183A disposed at the left and rear portions of the battery attachment wall 55*a*, and also includes a second pillar member 183B disposed at the right and rear portions of the battery attachment wall 55*a*. An attachment plate 183Aa is secured to the lower end of the first pillar member 183A. The attachment plate 183Aa is secured, by using a bolt, to an attachment block 167 secured to the battery attachment wall 55*a*. The second pillar member 183B has the lower end thereof secured to the battery attachment wall 55*a*. A securing piece 163A of the first securing band unit 160A is secured in a leftward protruding manner to an intermediate location, in the up-down direction, of the left surface of the first pillar member 183A. A securing piece 163B of the second securing band unit 160B is secured in a rightward protruding manner to an intermediate location, in the up-down direction, of the right surface of the second pillar member 183B.

As illustrated in FIG. 43, the band 161 extends from the hook member 162 to the securing piece 163 via the upper surface of the fuel tank 19. The upper surface of the fuel tank 19 is provided with a band groove to which the band 161 is fitted.

As illustrated in FIG. 41, FIG. 42, and FIG. 43, the band hooking member 164 is provided at one longitudinal end of the band 161 and is hooked onto the hook member 162. Specifically, the band hooking member 164 is hook-shaped. A band hooking member 164A of the first securing band unit 160A is hooked onto the hook 162Aa of the hook member 162A, and a band hooking member 164B of the second securing band unit 160B is hooked onto the hook 162Ba of the hook member 162B.

The band securing member 165 is provided at the other longitudinal end of the band 161 and is secured to the securing piece 163 by tensioning the band 161. Specifically, the band securing members 165 of the first securing band unit 160A and the second securing band unit 160B each have a bolt member 168, a fastening nut 169A, and a lock nut 169B. The bolt member 168 has the upper portion thereof secured to the band by, for example, welding, and has a threaded section 168*a* (male-threaded section) at the lower portion thereof. By inserting the threaded section 168*a* into the securing piece 163 from above, disposing the fastening nut 169A below the securing piece 163, and screwing and tightly fastening the fastening nut 169A to the threaded section 168*a*, the band securing member 165 can tension the band 161. After the band 161 is tensioned, the lock nut 169B is screwed onto the threaded section 168*a* so that the fastening nut 169A is prevented from loosening.

In the first securing device 160 described above, the band 161 can be removed by unfastening the lock nut 169B and the fastening nut 169A from the bolt member 168. When the fuel tank 19 is to be moved from the installation position S1 to the withdrawn position S2, the band 161 of the first securing device 160 (first securing band unit 160A, second securing band unit 160B) is removed.

Next, the second securing device 170 will be described.

The second securing device 170 positions and secures the fuel tank 19 in the installation position S1 and the withdrawn position S2 by using engaging sections 171 provided at the support base 52 and a first engagement section 172 and a second engagement section 173 provided in the fuel tank 19.

Figure 49:
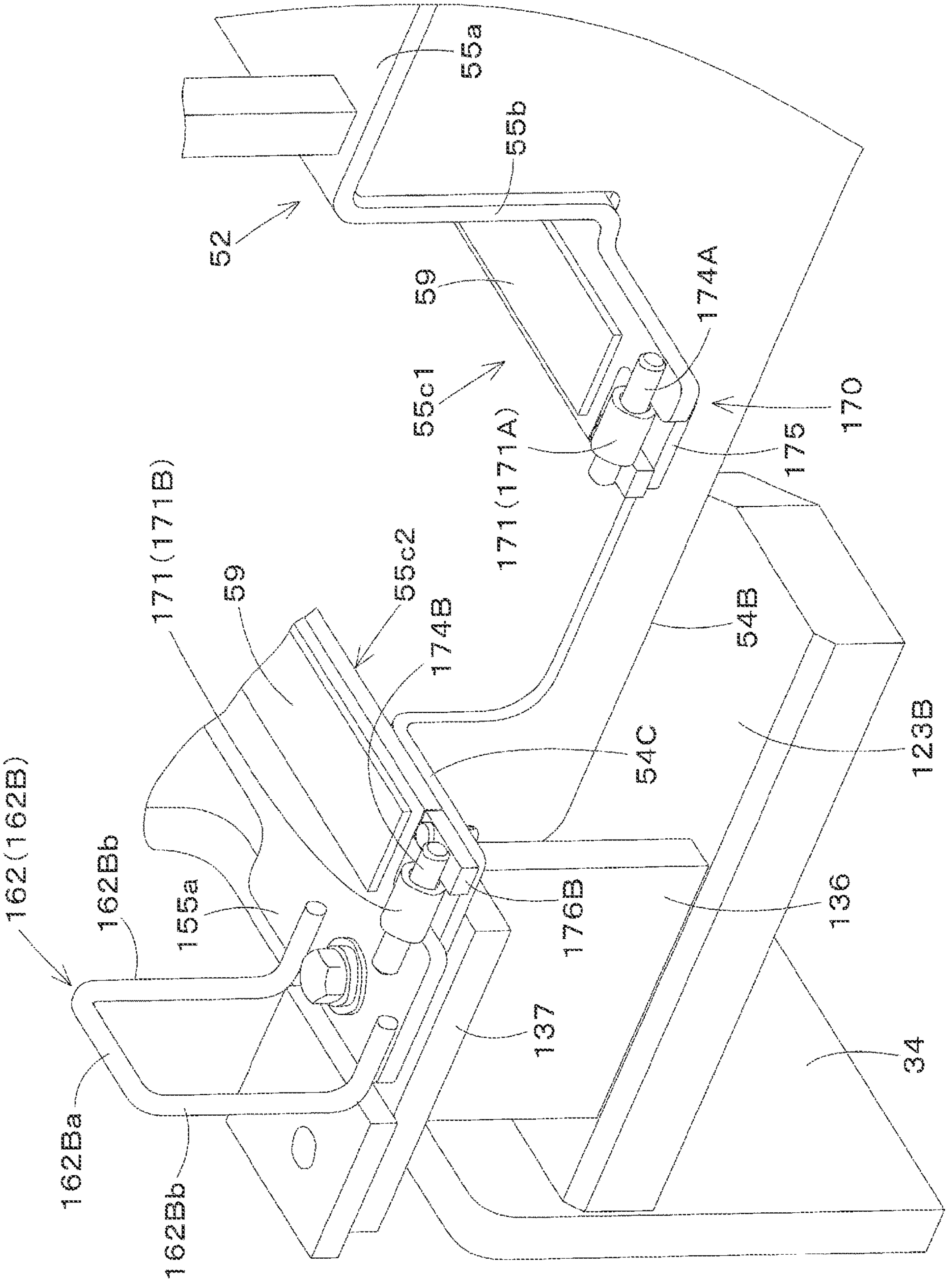
FIG. 49 is a perspective view of a right portion of the support base.
Figure 50:
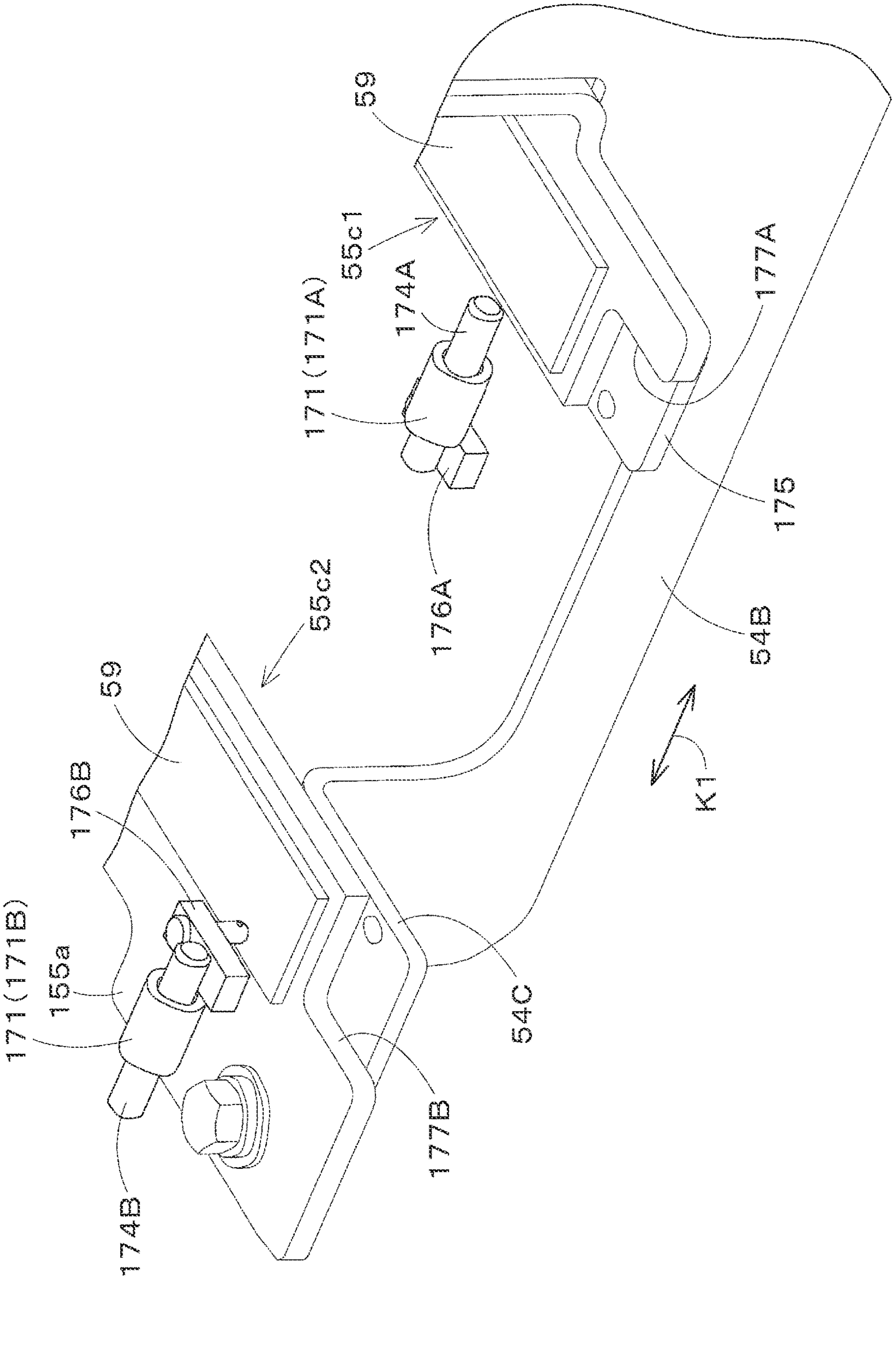
FIG. 50 is an exploded perspective view of the right portion of the support base.
Figure 51:
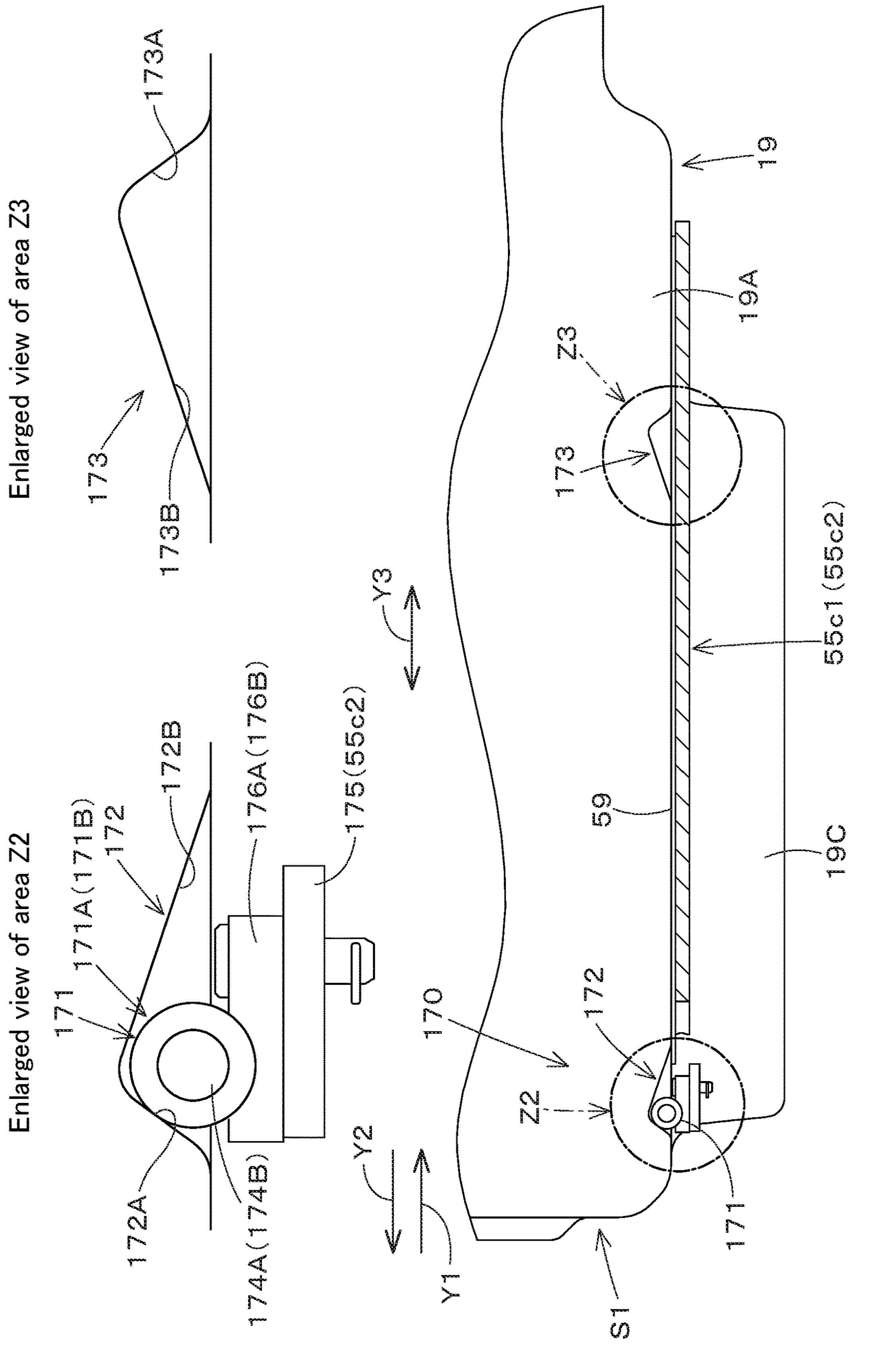
FIG. 51 is a front view illustrating a second securing device.

As illustrated in FIG. 49, FIG. 50, and FIG. 51, in the second securing device according to this embodiment, the engaging sections 171 provided at the support base 52 are rollers. The pair of placement sections 55*c*1 and 55*c*2 are individually provided with the engaging sections171. Specifically, the engaging sections 171 are provided at the front end of the placement section 55*c*1 and at the front end of the placement section 55*c*2. In other words, the engaging sections 171 include a front engaging section 171A provided at the placement section 55*c*1 and a rear engaging section 171B provided at the placement section 55*c*2.

As illustrated in FIG. 50, the front end of the placement section 55*c*1 is provided with an L-shaped cutout 177A that is open at the rear and right sides thereof. A plate member 175 is secured to the front end and the lower surface of the placement section 55*c*1 so as to cover the cutout from below. The front engaging section 171A is fitted in a rotatable manner around an axis to a support shaft 174A extending in the front-rear direction K1. A rectangular-block-shaped shaft attachment member 176A is secured to the rear portion of the support shaft 174A and at the rear side of the front engaging section 171A. The shaft attachment member 176A is secured to the rear portion of the plate member 175 by pinning, so that the support shaft 174A is disposed over the upper surfaces of the shaft attachment member 176A and the placement section 55*c*1, and the front engaging section 171A is disposed in a rotatable manner while protruding upward between the shaft attachment member 176A and the placement section 55*c*1 from the upper surface of the placement section 55*c*1, as illustrated in FIG. 48.

As illustrated in FIG. 50, the front end of the placement section 55*c*2 is provided with an L-shaped cutout 177B that is open at the front and right sides thereof. The cutout 177B is covered with the first attachment wall 54C from below. The rear engaging section 171B is fitted in a rotatable manner around an axis to a support shaft 174B extending in the front-rear direction K1. A rectangular-block-shaped shaft attachment member 176B is secured to the front portion of the support shaft 174B and at the front side of the rear engaging section 171B. The shaft attachment member 176B is secured to the front portion of the first attachment wall 54C by pinning, so that the support shaft 174B is disposed over the upper surfaces of the shaft attachment member 176B and the placement section 55*c*2, and the rear engaging section 171B is disposed in a rotatable manner while protruding upward between the shaft attachment member 176B and the placement section 55*c*2 from the upper surface of the placement section 55*c*2, as illustrated in FIG. 48.

As illustrated in FIG. 51, the first engagement section 172 and the second engagement section 173 provided in the fuel tank 19 are recesses to which the engaging sections (rollers) 171 are fitted. Furthermore, the first engagement section 172 and the second engagement section 173 are provided away from each other in the fuel tank 19 in the movement direction Y3 of the fuel tank 19. Specifically, the first engagement section 172 is provided in the right portion of the tank body 19A (fuel tank 19), and the second engagement section 173 is provided in the left portion of the tank body 19A (fuel tank 19).

As illustrated in FIG. 41, when the fuel tank 19 is in the installation position S1, the first engagement section 172 is engaged with (fitted to) the corresponding engaging section

Figure 44:
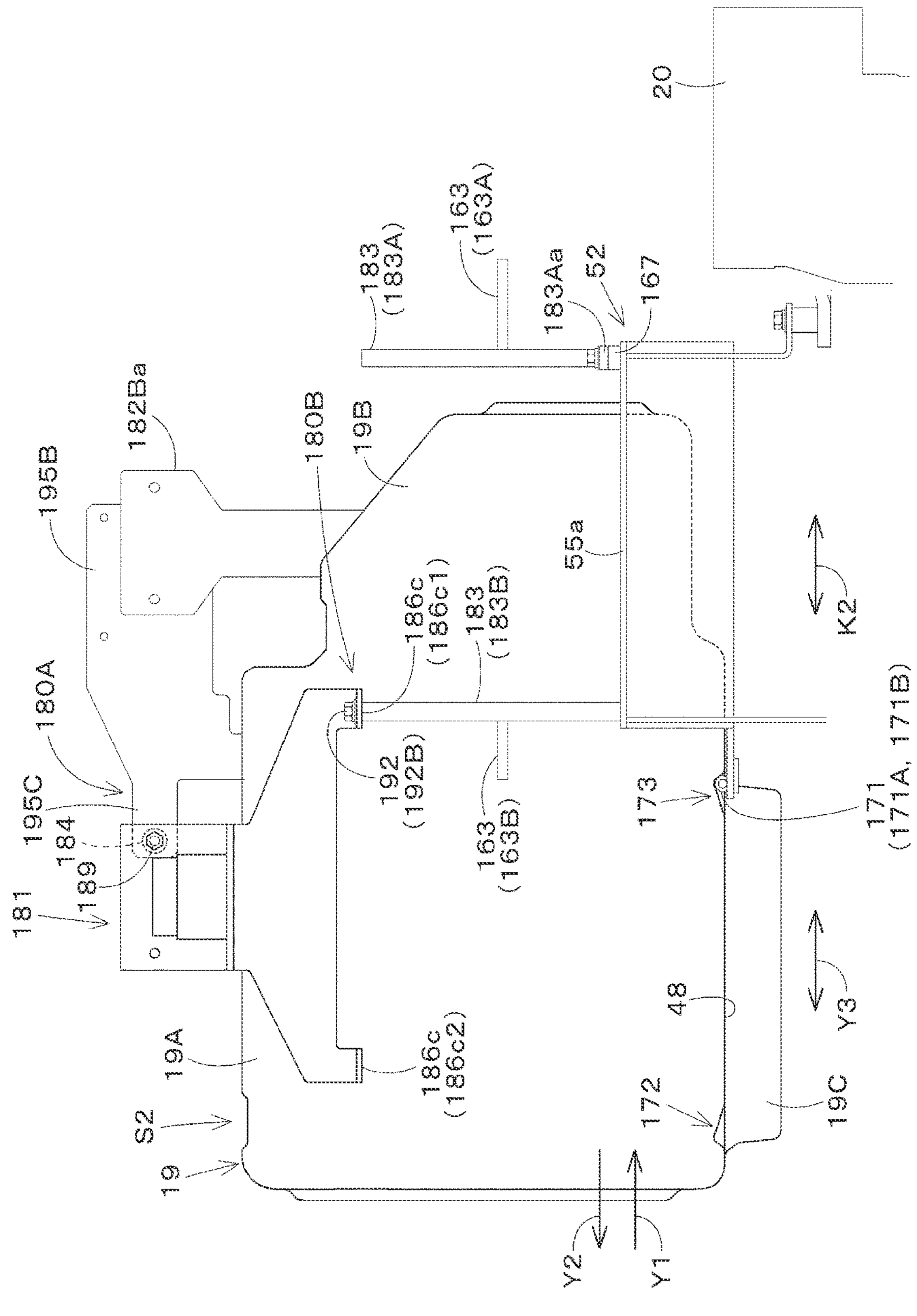
FIG. 44 is a front view of a state where the fuel tank is in a withdrawn position.

171 so as to restrict the movement of the fuel tank 19 in the pulling direction Y2 and the pressing direction Y1. Furthermore, as illustrated in FIG. 44, when the fuel tank 19 is in the withdrawn position S2, the second engagement section 173 is engaged with (fitted to) the corresponding engaging section 171 so as to restrict the movement of the fuel tank 19 in the pulling direction Y2 and the pressing direction YT.

As illustrated in FIG. 48, the first engagement section 172 and the second engagement section 173 are provided in the front portion and the rear portion, respectively, of the fuel tank 19 in correspondence with the pair of front and rear engaging sections 171.

As illustrated in FIG. 51, the recesses defining the first engagement section 172 and the second engagement section 173 are upward-oriented recesses and each have a triangular shape with an apex at the upper portion in side view.

The first engagement section 172 has a first restriction surface 172A and a first guide surface 172B. When the fuel tank 19 is in the installation position S1, the first restriction surface 172A abuts on the front side of the corresponding engaging section 171 in the pulling direction Y2 so as to restrict the movement of the fuel tank 19 in the pressing direction Y1. The first restriction surface 172A is inclined toward the pulling direction Y2 as the first restriction surface 172A extends downward. When the fuel tank 19 is in the installation position S1, the first guide surface 172B abuts on the rear side of the corresponding engaging section 171 in the pulling direction Y2 so as to restrict the movement of the fuel tank 19 in the pulling direction Y2. The first guide surface 172B is inclined toward the pressing direction Y1 as the first guide surface 172B extends downward from an apex 172C of the recess. The first guide surface 172B has an inclination angle that is more moderate than the inclination angle of the first restriction surface 172A.

The second engagement section 173 has a second restriction surface 173A and a second guide surface 173B. When the fuel tank 19 is in the withdrawn position S2, the second restriction surface 173A abuts on the front side of the corresponding engaging section 171 in the pressing direction Y1 so as to restrict the movement of the fuel tank 19 in the pulling direction Y2. The second restriction surface 173A is inclined toward the pressing direction Y1 as the second restriction surface 173A extends downward. When the fuel tank 19 is in the withdrawn position S2, the second guide surface 173B abuts on the rear side of the corresponding engaging section 171 in the pressing direction Y1 so as to restrict the movement of the fuel tank 19 in the pressing direction Y1. The second guide surface 173B is inclined toward the pulling direction Y2 as the second guide surface 173B extends downward from an apex 173C of the recess. The second guide surface 173B has an inclination angle that is more moderate than the inclination angle of the second restriction surface 173A.

Alternatively, the first restriction surface 172A and the second restriction surface 173A may extend in the vertical direction.

When the fuel tank 19 is to be moved from the installation position S1 to the withdrawn position S2, the engaging sections 171 smoothly disengage from the first engagement section 172 by being guided by the first guide surface 172B and smoothly engage with the second engagement section 173 by being guided by the second guide surface 173B, and the corresponding engaging section 171 comes into abutment with the second restriction surface 173A so that the fuel tank 19 is positioned and secured in the withdrawn position S2.

When the fuel tank 19 is to be moved from the withdrawn position S2 to the installation position S1, the engaging sections 171 smoothly disengage from the second engagement section 173 by being guided by the second guide surface 173B and smoothly engage with the first engagement section 172 by being guided by the first guide surface 172B, and the corresponding engaging section 171 comes into abutment with the first restriction surface 172A so that the fuel tank 19 is positioned and secured in the installation position S1.

The engaging sections 171 may each be formed of a rod material (round rod). Furthermore, the engaging sections 171 may be recesses, and the first engagement section 172 and the second engagement section 173 may be protrusions engageable with the engaging sections 171.

Next, the third securing device 180A and the fourth securing device 180B will be collectively described.

As illustrated in FIG. 41 and FIG. 44, the third securing device 180A secures the fuel tank 19 in the installation position S1 and the withdrawn position S2 at the rear side of the fuel tank 19 and includes a stay member 181 provided at the fuel tank 19 in a movable manner together with the fuel tank 19, a stay attachment section (first securing section) 182Ba and a boss member (second securing section) 184 that are provided at the machine body 2 and away from each other in the movement direction Y3 of the fuel tank 19, and securing members 189 (first securing member) that secure the stay member 181 to the stay attachment section 182Ba (first securing section) when the fuel tank 19 is in the installation position S1 and that secures the stay member 181 to the boss member (second securing section) 184 when the fuel tank 19 is in the withdrawn position S2.

The fourth securing device 180B secures the fuel tank 19 in the installation position S1 and the withdrawn position S2 at the front side of the fuel tank 19 and includes the stay member 181 provided at the fuel tank 19 in a movable manner together with the fuel tank 19, the first pillar member (third securing section) 183A and the second pillar member (fourth securing section) 183B that are provided at the machine body 2 and away from each other in the movement direction Y3 of the fuel tank 19, and a securing member 192 (second securing member 192A, third securing member 192B) that secures the stay member 181 to the first pillar member (third securing section) 183A and the second pillar member (fourth securing section) 183B when the fuel tank 19 is in the installation position S1.

The second pillar member (fourth securing section) 183B is disposed toward the pulling direction Y2, extending from the installation position S1 toward the withdrawn position S2, relative to the first pillar member (third securing section) 183A.

As illustrated in FIG. 41, the securing member 192 includes a second securing member 192A that secures the stay member 181 to the third securing section 183A when the fuel tank 19 is in the installation position S1, and also includes a third securing member 192B that secures the stay member 181 to the fourth securing section 183B when the fuel tank 19 is in the installation position S1.

As illustrated in FIG. 44, the third securing member 192B secures the stay member 181 to the fourth securing section 183B when the fuel tank 19 is in the withdrawn position S2.

Figure 52:
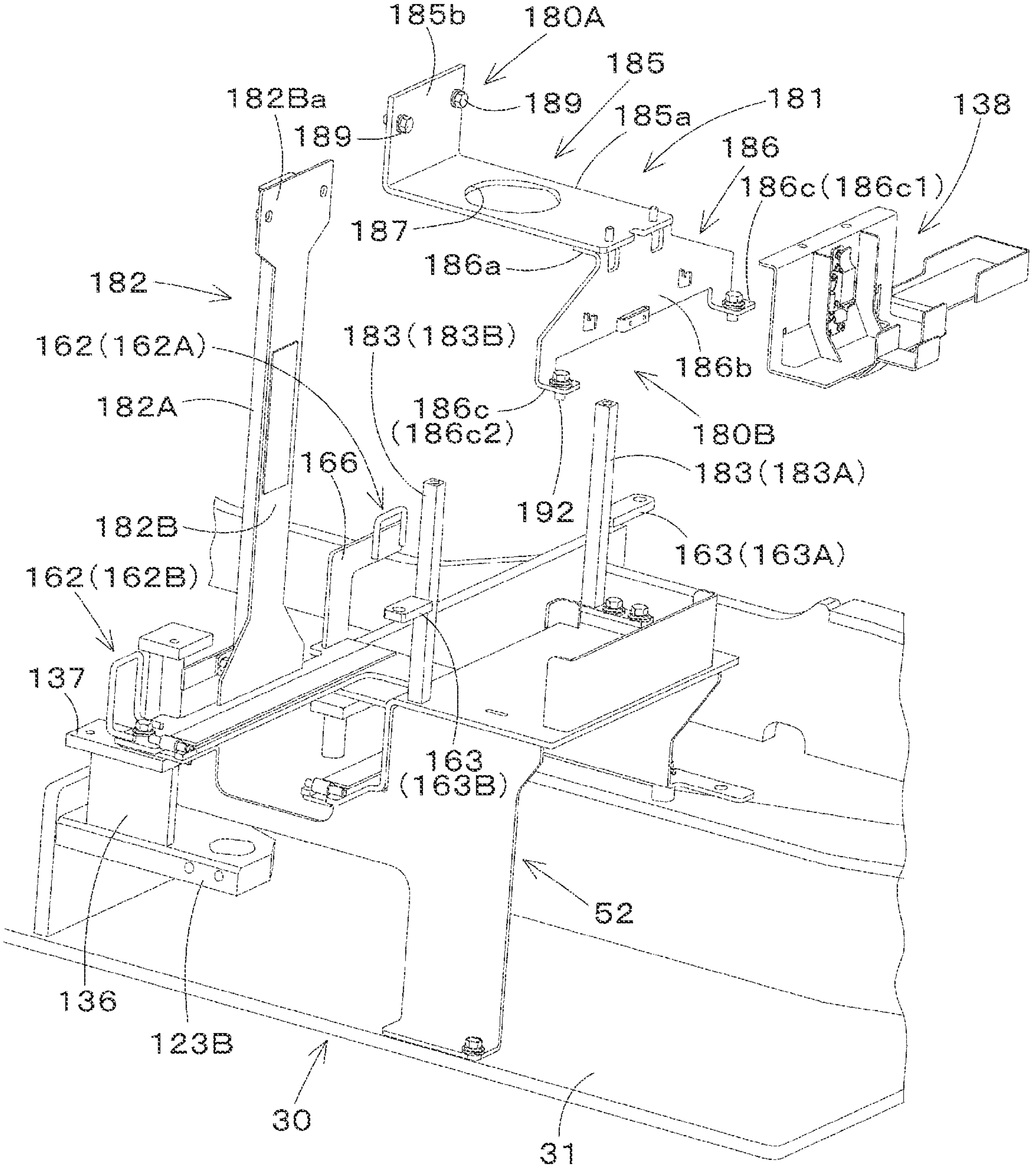
FIG. 52 is an exploded perspective view illustrating a third securing device and a fourth securing device.

As illustrated in FIG. 45 and FIG. 52, the stay member 181 has a first stay 185 and a second stay 186 that are each formed of a plate material. The first stay 185 has a horizontal plate section 185*a* whose plate surface is oriented in the up-down direction and a vertical plate section 185*b* extending upward from the rear end of the horizontal plate section

185*a*. The second stay 186 has a securing plate section 186*a* secured to the lower surface of the front portion of the horizontal plate section 185*a*, a vertical plate section 186*b* that widens in the machine-body width direction K2 as the vertical plate section 186*b* extends downward from the front end of the securing plate section 186*a*, and a pair of attachment pieces 186*c* extending forward the left and right areas of the lower end of the vertical plate section 186*b*.

As illustrated in FIG. 45 and FIG. 52, an insertion hole 187 extends through the horizontal plate section 185*a* of the first stay 185.

Figure 53:
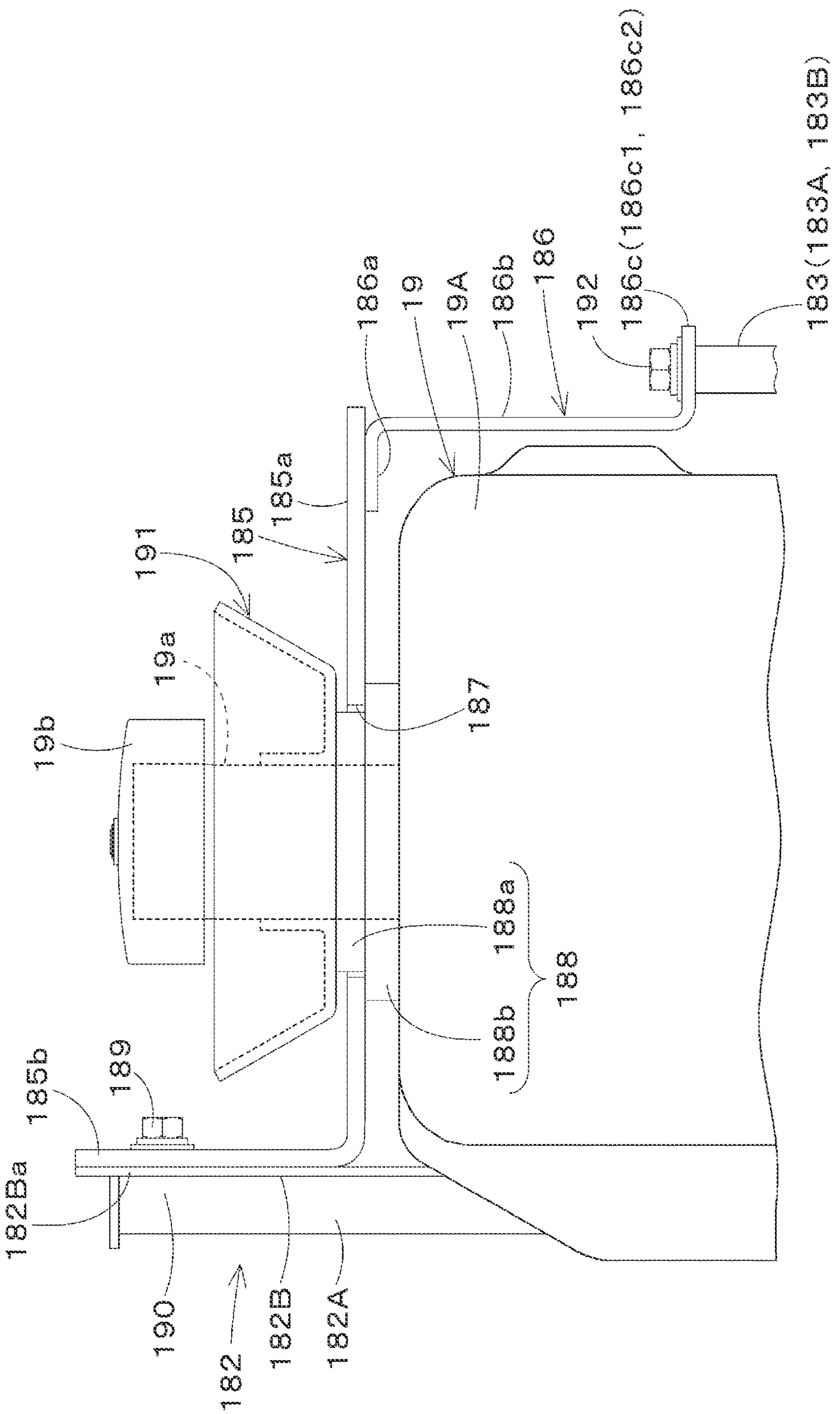
FIG. 53 is a right side view illustrating a support structure for an upper portion of the fuel tank.

As illustrated in FIG. 53, the area where the insertion hole 187 is provided is provided with an elastic member 188 formed of an elastic material, such as rubber. The elastic member 188 has a cylindrical section 188*a* and a flanged section 188*b* extending from the cylindrical section 188*a*. The cylindrical section 188*a* is fitted in the insertion hole 187. The flanged section 188*b* extends radially outward from the entire periphery of the lower portion of the cylindrical section 188*a* and is interposed between the horizontal plate section 185*a* and the fuel tank 19. In other words, the first stay 185 (horizontal plate section 185*a*) abuts on the upper surface of the fuel tank 19 via the elastic member 188 (flanged section 188*b*). A refuel opening 19*a* protruding upward from the upper surface of the fuel tank 19 extends through the cylindrical section 188*a*. Therefore, the stay member 181 is movable together with the fuel tank 19 via the refuel opening 19*a*.

The fuel tank 19 can be refueled also through the refuel opening 19*a*. The upper portion of the refuel opening 19*a* is blocked with a cap 19*b*. The first stay 185 is provided with a receiver member 191 that surrounds the refuel opening 19*a*.

As illustrated in FIG. 45, the stay attachment section 182Ba is provided at the upper portion of a frame member 182 standing upright on the second support piece 155*b* of the other placement section 55*c*2. As illustrated in FIG. 45 and FIG. 52, the frame member 182 has a pillar member 182A and a plate member 182B secured to the front surface of the pillar member 182A. The plate member 182B has the stay attachment section 182Ba at the upper portion thereof. The vertical plate section 185*b* of the first stay 185 overlies the front surface of the stay attachment section 182Ba and is secured thereto by the pair of left and right securing members 189. The securing members 189 are bolts. Nuts 190 are secured to the rear surface of the stay attachment section 182Ba. By inserting the securing members 189 through the vertical plate section 185*b* and the stay attachment section 182Ba and screwing the securing members 189 to the nuts 190, the vertical plate section 185*b* is attached and secured to the stay attachment section 182Ba.

As illustrated in FIG. 41, the second stay 186 is attached to the pillar member 183. Specifically, a left attachment piece 186*c*1 is secured to the upper portion of the first pillar member 183A by using the second securing member 192A, and a right attachment piece 186*c*2 is secured to the upper portion of the second pillar member 183B by using the third securing member 192B. Each securing member 192 is a bolt.

By attaching the first stay 185 to the stay attachment section 182Ba and attaching the second stay 186 to the pillar member 183, the stay member 181 is attached to the frame member 182 and the pillar member 183. By attaching the stay member 181 to the frame member 182 and the pillar member 183, the stay member 181 (the flanged section of the elastic member 188) can be pressed against the fuel tank 19.

As illustrated in FIG. 40, the boss member 184 is attached to a support frame 193 that supports devices (e.g., the radiator 15 and the fan shroud surrounding the cooling fan 14) equipped in the machine body 2.

Figure 54:
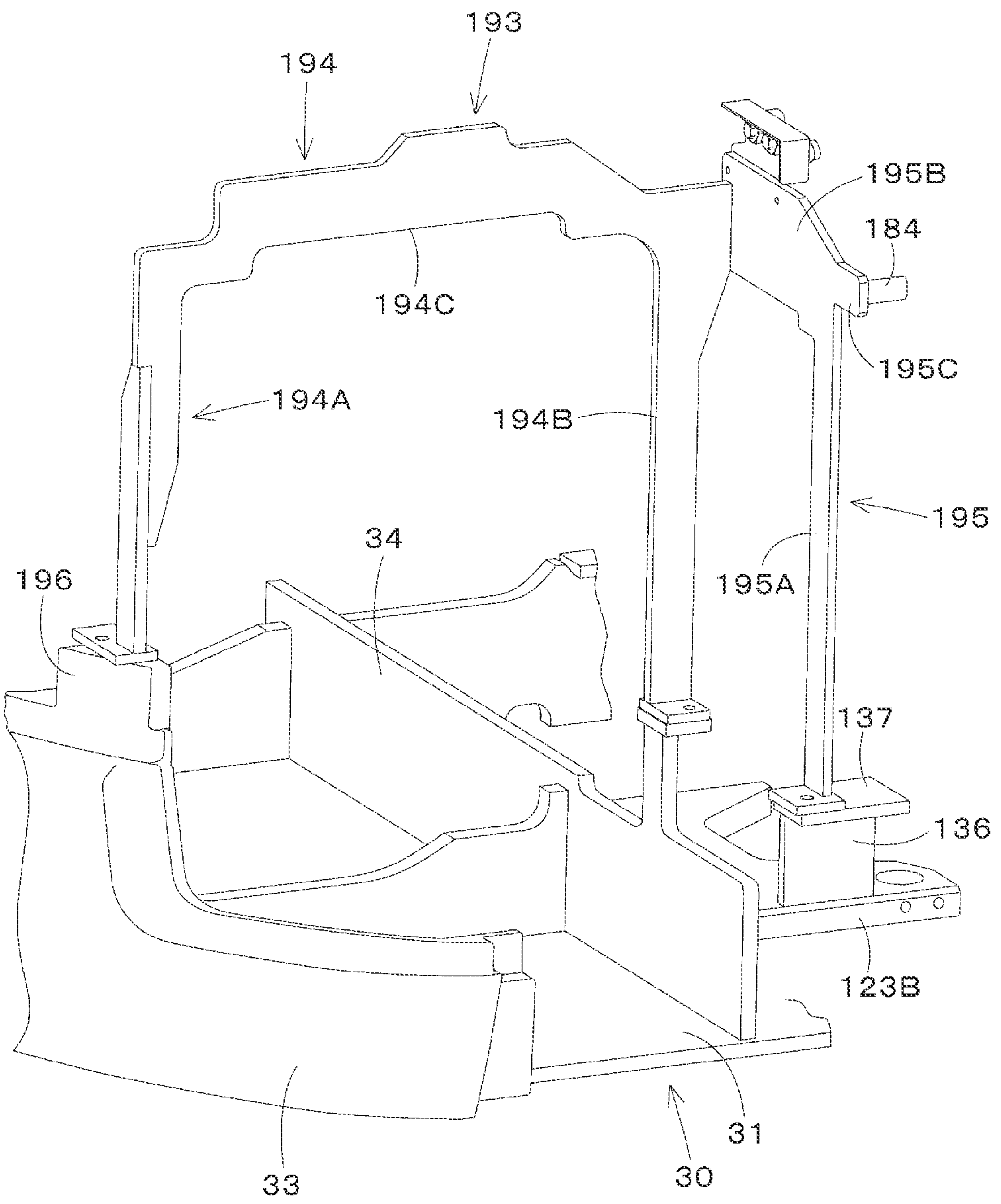
FIG. 54 is a rear perspective view of the support frame.

As illustrated in FIG. 40 and FIG. 54, the support frame 193 is attached to the machine body 2. Specifically, the support frame 193 has a first frame 194 and a second frame 195.

The first frame 194 has a rear pillar section 194A whose lower portion is attached to an attachment section 196 provided at the weight 33 and that stands upright on the attachment section 196, a front pillar section 194B whose lower portion is attached to an attachment section 197 secured to the partition plate 34 and that stands upright on the attachment section 197, and a coupling section 194C that couples the rear pillar section 194A and the front pillar section 194B to each other.

The second frame 195 has a pillar section 195A whose lower portion is attached to the support plate 137 and that stands upright on the support plate 137, a front wall section 195B extending leftward from the upper portion of the pillar section 195A, and an attachment piece 195C extending rightward from the upper portion of the pillar section 195A. The upper portion of the front pillar section 194B is secured to the rear surface of the front wall section 195B.

The boss member 184 is a cylindrical body with a female-threaded inner peripheral surface. As illustrated in FIG. 41, the boss member 184 is disposed such that the axis thereof is aligned with the front-rear direction K1 and is secured to the front surface and the right side of the attachment piece 195C. Furthermore, the boss member 184 is secured to the attachment piece 195C such that the axis of the boss member 184 is located at the same height as the axes of the nuts 190 to which the securing members 189 are screwed. The boss member 184 is disposed away from the stay attachment section 182Ba in the movement direction Y3 of the fuel tank 19.

The third securing device 180A and the fourth securing device 180B can secure the fuel tank 19 in the installation position S1 by using the securing members 189 and the securing member 192. When the fuel tank 19 is to be withdrawn from the installation position S1 to the withdrawn position S2, the fuel tank 19 is moved in the pulling direction Y2 by detaching the securing members 189 and the securing member 192. As illustrated in FIG. 44, when the fuel tank 19 is moved to the withdrawn position S2, one of the securing members 189 becomes screwable to the boss member 184, and the securing member 192 becomes screwable to the upper portion of the second pillar member 183B. By screwing the securing member 189 to the boss member 184 and screwing the securing member 192 to the upper portion of the second pillar member 183B, the fuel tank 19 can be secured in the withdrawn position S2, and the fuel tank 19 can be prevented from falling.

As an alternative to this embodiment in which the fuel tank 19 is secured in the withdrawn position S2 by using both the third securing device 180A and the fourth securing device 180B, the fuel tank 19 may be secured in the withdrawn position S2 by using either the third securing device 180A or the fourth securing device 180B.

As illustrated in FIG. 39, FIG. 40, and FIG. 52, a grease gun holder 138 that holds a grease gun 121 as a tool for filling, for example, a bearing of a device with grease is attached to the vertical plate section 186*b* of the second stay 186. As illustrated in FIG. 39, the grease gun 121 and the grease gun holder 138 are disposed above the battery 22.

The hoses connected to the fuel tank 19, such as the delivery hose 130, the drain tube 132, and the supply tube 133, each have a sufficient length to permit movement of the fuel tank 19 when the fuel tank 19 moves in the pulling direction Y2.

The following description relates to a cooling-air introduction structure that introduces cooling air into the prime mover room E2 accommodating the prime mover E1 via a cooler unit including the radiator 15, the oil cooler 16, and the fuel cooler 17.

First, the overview of the cooling-air introduction structure will be described.

Figure 55:
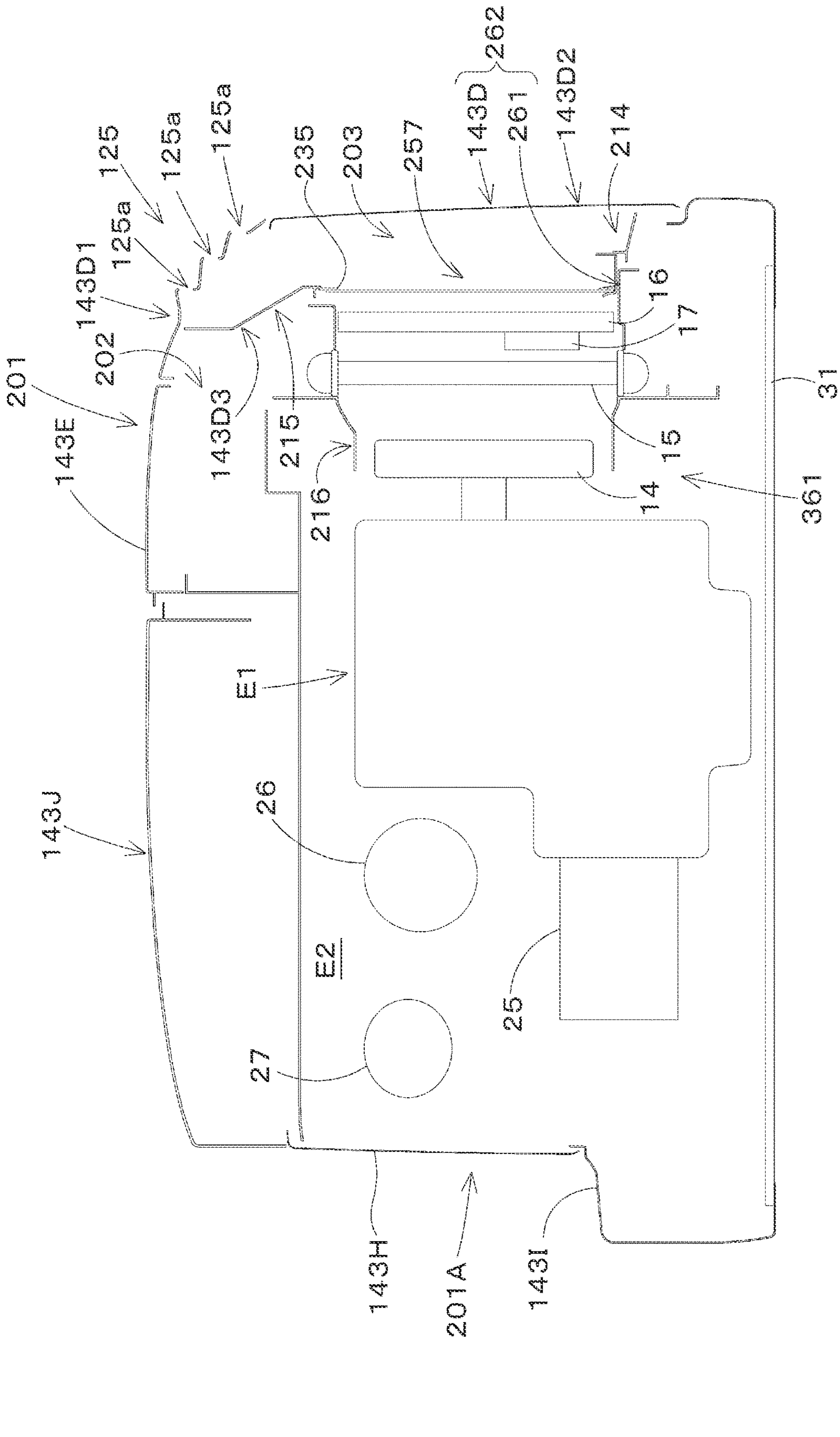
FIG. 55 is a schematic cross-sectional rear view illustrating a cooling-air intake structure.

As illustrated in FIG. 55, in addition to the prime mover E1, for example, the cooling fan 14, a fan shroud 216, the hydraulic pump 25, the exhaust gas purifier 26, and the air cleaner 27 are accommodated within the prime mover room E2. The fan shroud 216 covers the cooling fan 14 and guides cooling air occurring at the cooling fan 14 from the radiator 15 to the cooling fan 14.

The prime mover room E2 includes, for example, the partition 74 that separates the prime mover E1 and the operator's seat 6 from each other, the partition plate 34, the swivel substrate 31, the weight 33, and the fifth cover 143E to the tenth cover 143J. The fifth cover 143E to the tenth cover 143J constitute a main body 201A (hood body) of a hood 201 defining the prime mover room E2.

As illustrated in FIG. 55, the radiator 15 is disposed with a distance from the prime mover E1 in the machine-body width direction K2. In this embodiment, the radiator 15 is disposed to the right of the prime mover E1 with a distance therebetween. The cooling fan 14 is disposed between the radiator 15 and the prime mover E1 and delivers cooling air toward the prime mover E1. The radiator (cooling unit) 15 and the cooling fan 14 constitute a cooler 361. The cooler 361 is disposed between the prime mover E1 and the hood 201 (openable-closable duct 143D).

As an alternative to this embodiment in which the cooling fan 14 is disposed between the radiator (cooling unit) 15 and the prime mover E1, the radiator 15 may be disposed between the cooling fan 14 and the prime mover E1. In other words, the prime mover E1, the cooling fan 14, the cooling unit (radiator 15), and the hood 201 (openable-closable duct 143D) may be disposed in the following order: hood 201 (openable-closable duct 143D)→cooling unit (radiator 15)→cooling fan 14→prime mover E1, or may be disposed in the following order: hood 201 (openable-closable duct 143D)→cooling fan 14→cooling unit (radiator 15)→prime mover E1.

Figure 56:
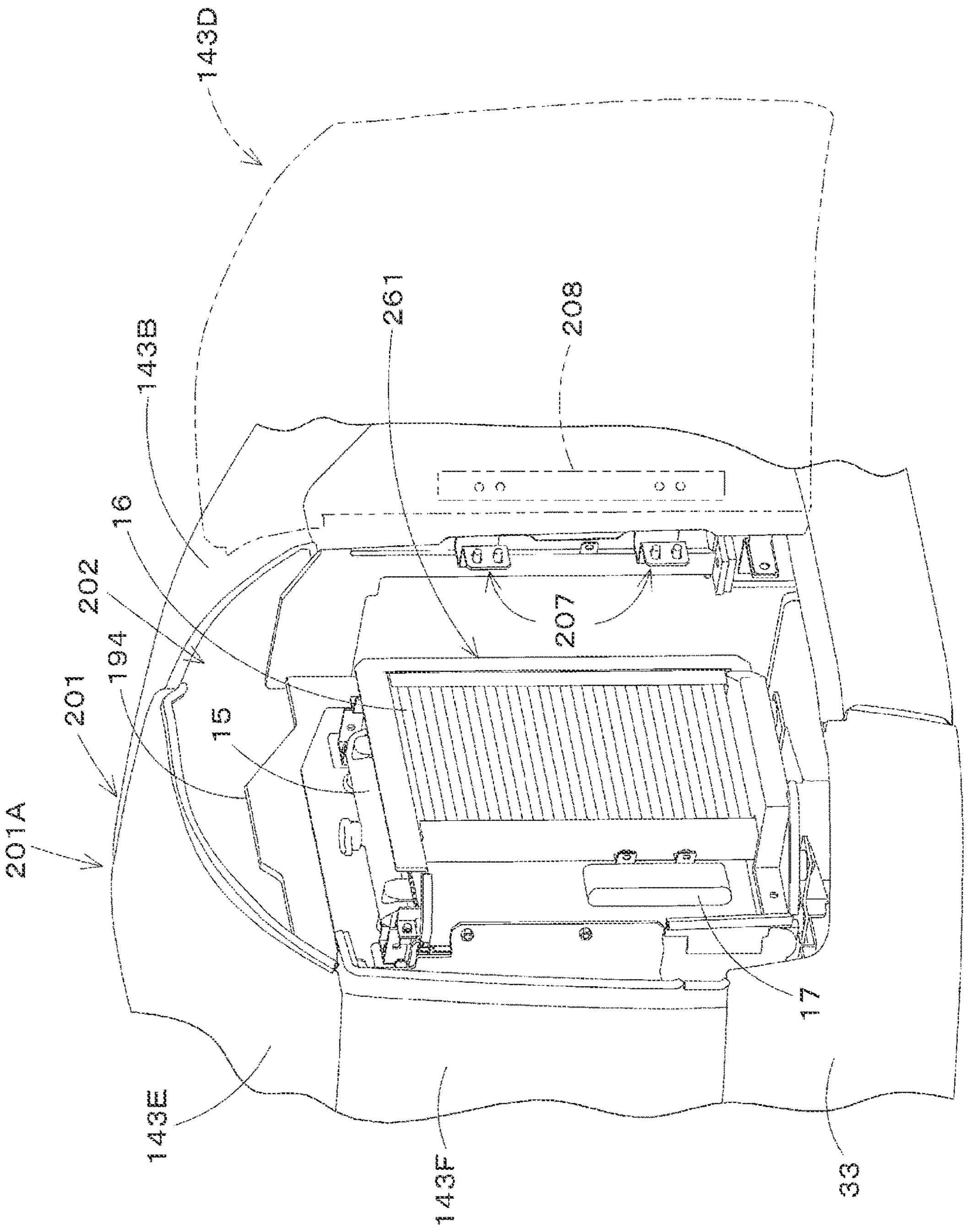
FIG. 56 is a perspective view illustrating a state where an openable-closable duct is open.

In this embodiment, as illustrated in FIG. 55 and FIG. 56, the side (right side) of the hood body 201A where the radiator 15 is disposed is an open section 202 that is exposed rightward. The radiator 15, the oil cooler 16, and the fuel cooler 17 are disposed to the right of the open section 202 and are covered with the fourth cover (referred to as openable-closable duct) 143D. The openable-closable duct 143D constitutes the hood 201. In other words, the hood 201 includes the openable-closable duct 143D.

The openable-closable duct 143D blocks the open section 202 (exposed side of the hood body 201A) in an openable-closable manner. In other words, the hood 201 is openable and closable at the cooler 361 side.

The openable-closable duct 143D guides outside air taken in through the outside-air intake portion 125 to, for example, the radiator 15 and the oil cooler 16. In other words, the openable-closable duct 143D blocks the open section 202 at the radiator 15 side of the hood 201 and covers, for example, the radiator 15 and the oil cooler 16, and defines a guide path 203 that guides outside air taken in by the cooling fan 14 to, for example, the oil cooler 16 and the radiator 15.

As illustrated in FIG. 21, the opposite side (right side) of the radiator 15 from the prime mover E1 is provided with a stationary duct 261 that guides cooling air suctioned by the cooling fan 14 to the radiator 15. The outside-air intake portion 125 is provided at a position of the upper wall 143D1 located higher than the stationary duct 261.

The stationary duct 261 is provided at the hood 201 (openable-closable duct 143D) side of the cooler 361. The openable-closable duct 143D is provided at the cooler 361 side of the hood 201. By closing the hood 201 (openable-closable duct 143D), the openable-closable duct 143D and the stationary duct 261 are connected to each other. Specifically, by closing the open section 202 of the hood 201, the openable-closable duct 143D guides the outside air taken in by the cooling fan 14 to the stationary duct 261. In other words, by closing the openable-closable duct 143D, an intake duct 262 is formed. The intake duct 262 allows the outside air (cooling air) taken into the openable-closable duct 143D from the outside-air intake portion 125 by suction of the cooling fan 14 to flow to the oil cooler 16 and the radiator 15 via the openable-closable duct 143D and the stationary duct 261. More specifically, by closing the hood 201, the openable-closable duct 143D and the stationary duct 261 are connected to each other, and the outside air taken in from outside the machine body 2 is introduced to the cooler 361 via the openable-closable duct 143D and the stationary duct 261.

Next, the openable-closable duct 143D will be described in detail.

Figure 57:
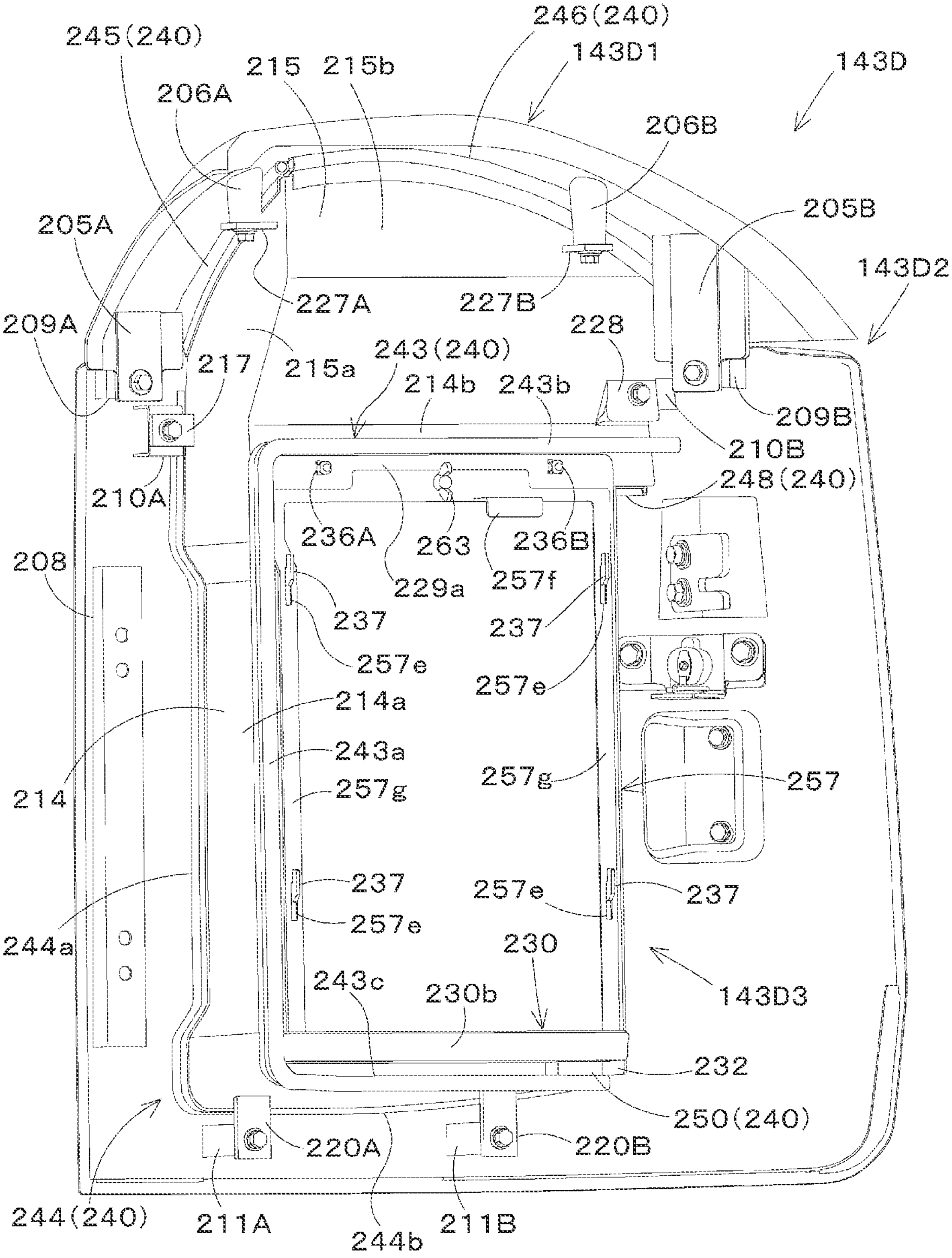
FIG. 57 is a perspective view illustrating the inner side of the openable-closable duct.
Figure 58A:
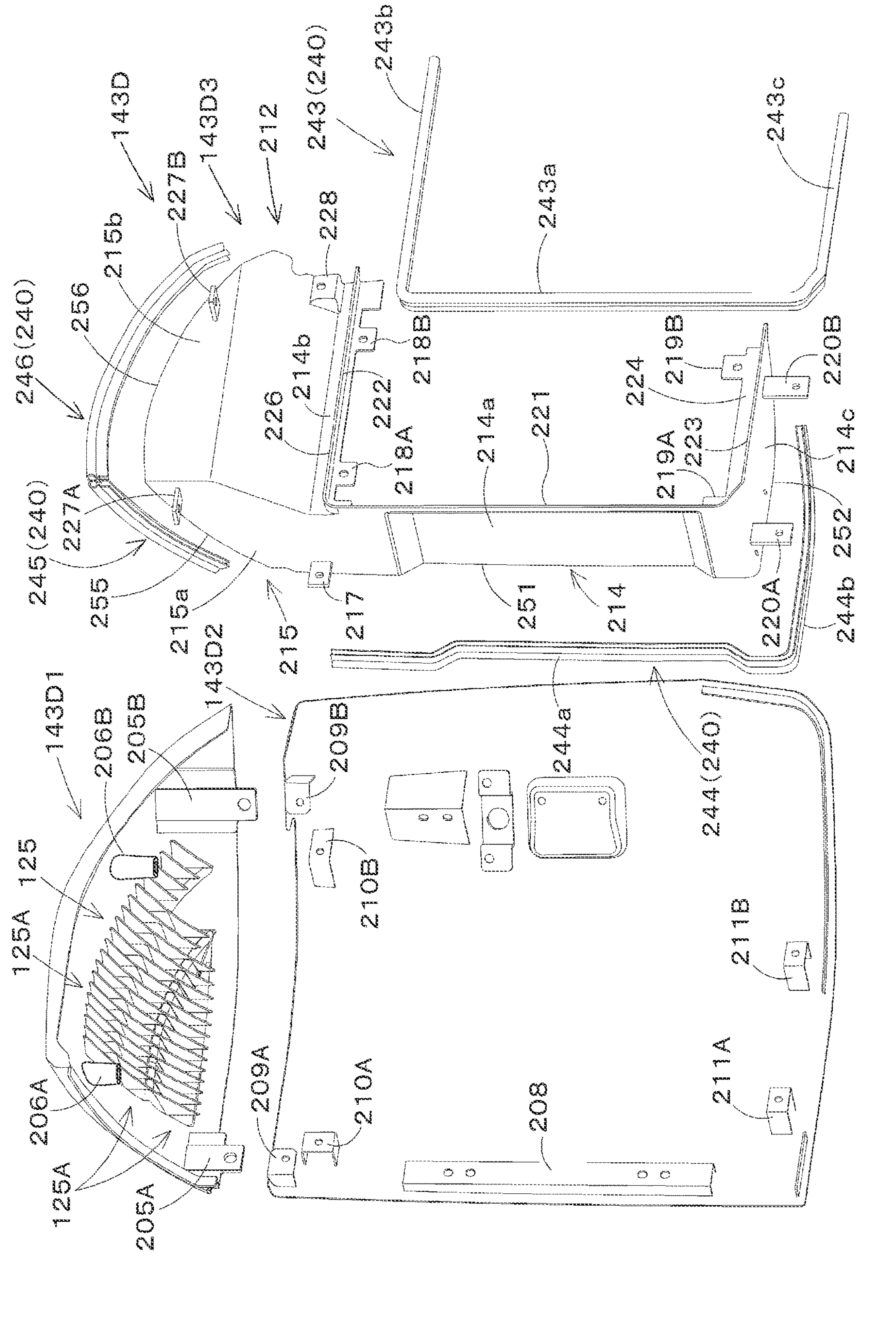
FIG. 58A is an exploded perspective view of the openable-closable duct.

As illustrated in FIG. 57 and FIG. 58A, the openable-closable duct 143D has a partition member 143D3 and a seal member 204 in addition to the upper wall 143D1 and the outer wall (side wall) 143D2 described above. Specifically, the hood 201 has the outer wall (side wall) 143D2 disposed laterally to the cooler 361, and also has the upper wall 143D1 connected to the upper portion of the outer wall 143D2. The openable-closable duct 143D is provided over the outer wall (side wall) 143D2 and the upper wall 143D1, guides the outside air taken in from the outside-air intake portion 125 downward along the outer wall (side wall) 143D2, and then causes the outside air to flow through the stationary duct 261 connected to the inner side of the openable-closable duct 143D in the machine-body width direction K2.

As illustrated in FIG. 55, the upper wall 143D1 is inclined downward as the upper wall 143D1 extends rightward, and is bent to protrude upward in rear view. The outside-air intake portion 125 is disposed to the right of the radiator 15 and the oil cooler 16.

As illustrated in FIG. 38 and FIG. 58A, in this embodiment, the outside-air intake portion 125 includes three opening rows 125A provided in the up-down direction. Each opening row 125A has multiple small openings 125*a* oriented rightward and arranged in the front-rear direction K1. The outside-air intake portion 125 is also louvered.

As illustrated in FIG. 57 and FIG. 48A, the lower surface of the upper wall 143D1 is provided with a pair of front and rear attachment stays 205A and 205B and a pair of front and rear cylindrical bosses 206A and 206B. The pair of attachment stays 205A and 205B are provided at the right portion of the upper wall 143D1, and the pair of cylindrical bosses 206A and 206B are provided at the left portion of the upper wall 143D1.

Figure 70:
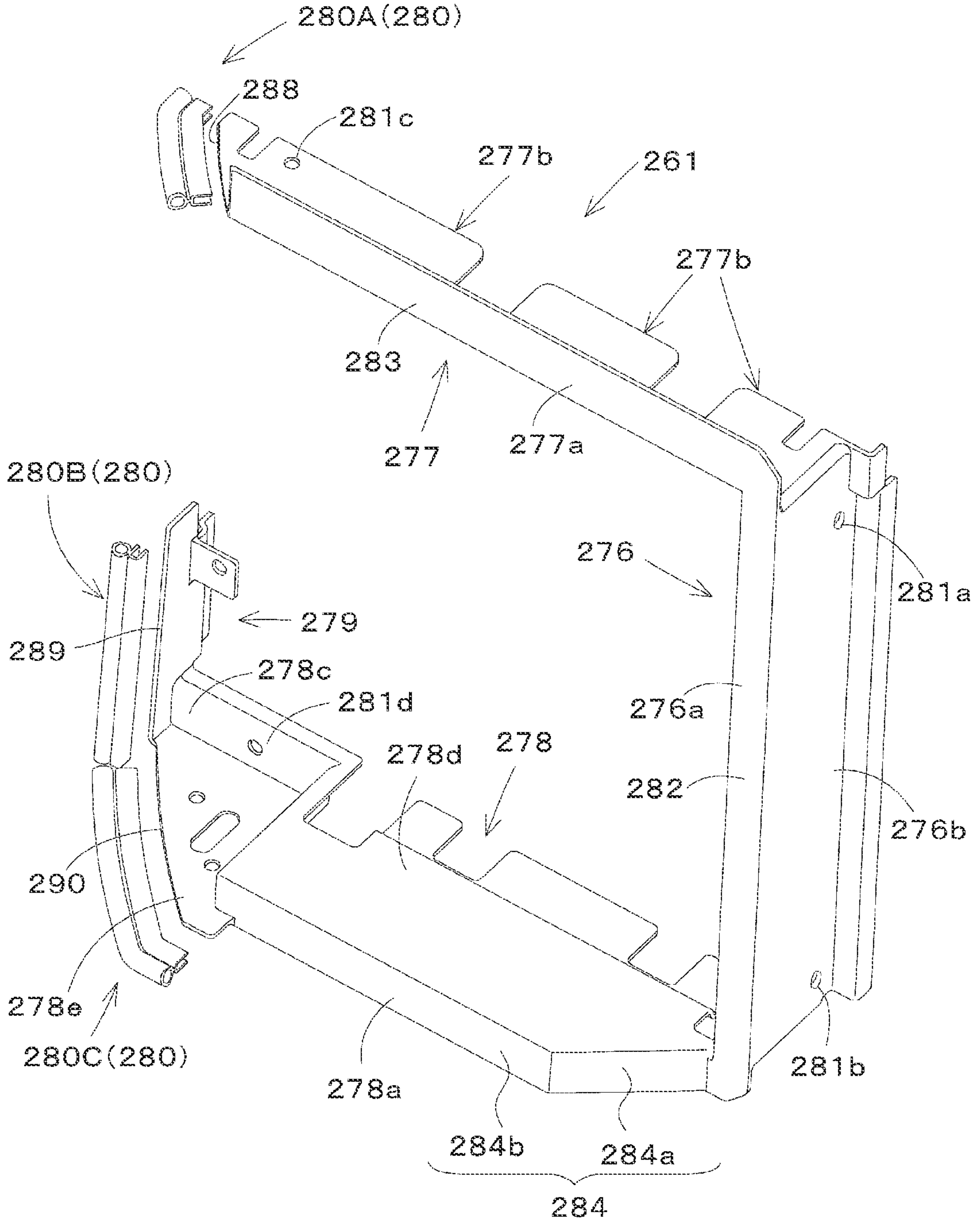
FIG. 70 is a perspective view of the stationary duct.

As illustrated in FIG. 55, the outer wall 143D2 is located at the opposite side (right side) of the radiator 15 from the prime mover E1. In other words, the outer wall 143D2 is located at the opposite side of the stationary duct 261 from the radiator 15. Furthermore, as illustrated in FIG. 70, the outer wall 143D2 is bent to protrude outward in plan view so as to cover the radiator 15, the oil cooler 16, and the fuel cooler 17 from the right side to the rear side. As illustrated in FIG. 57 and FIG. 58A, the front portion of the inner surface of the outer wall 143D2 is provided with a hinge attachment section 208. As illustrated in FIG. 56, a hinge 207 is disposed at the rear portion of the third cover 143C, and the hinge attachment section 208 is attached to the hinge 207. Accordingly, the openable-closable duct 143D opens by rotating forward around an axis extending in the up-down direction.

As illustrated in FIG. 58A, the inner surface of the outer wall 143D2 is provided with a pair of front and rear first attachment brackets 209A and 209B, a pair of front and rear second attachment brackets 210A and 210B, and a pair of front and rear third attachment brackets 211A and 211B. The pair of first attachment brackets 209A and 209B and the pair of second attachment brackets 210A and 210B are provided at the upper portion of the outer wall 143D2. The first attachment brackets 209A and 209B are provided higher than the second attachment brackets 210A and 210B. The pair of third attachment brackets 211A and 211B are provided at the lower portion of the outer wall 143D2.

As illustrated in FIG. 57, the front attachment stay 205A is attached to the front first attachment bracket 209A by using a bolt, and the rear attachment stay 205B is attached to the rear first attachment bracket 209B by using a bolt.

As illustrated in FIG. 55, the partition member 143D3 is disposed to the right of the radiator 15 and the oil cooler 16 and separates the outer wall 143D2 and the stationary duct 261 (radiator 15) from each other at the radiator 15 side relative to the outside-air intake portion 125.

Figure 59:
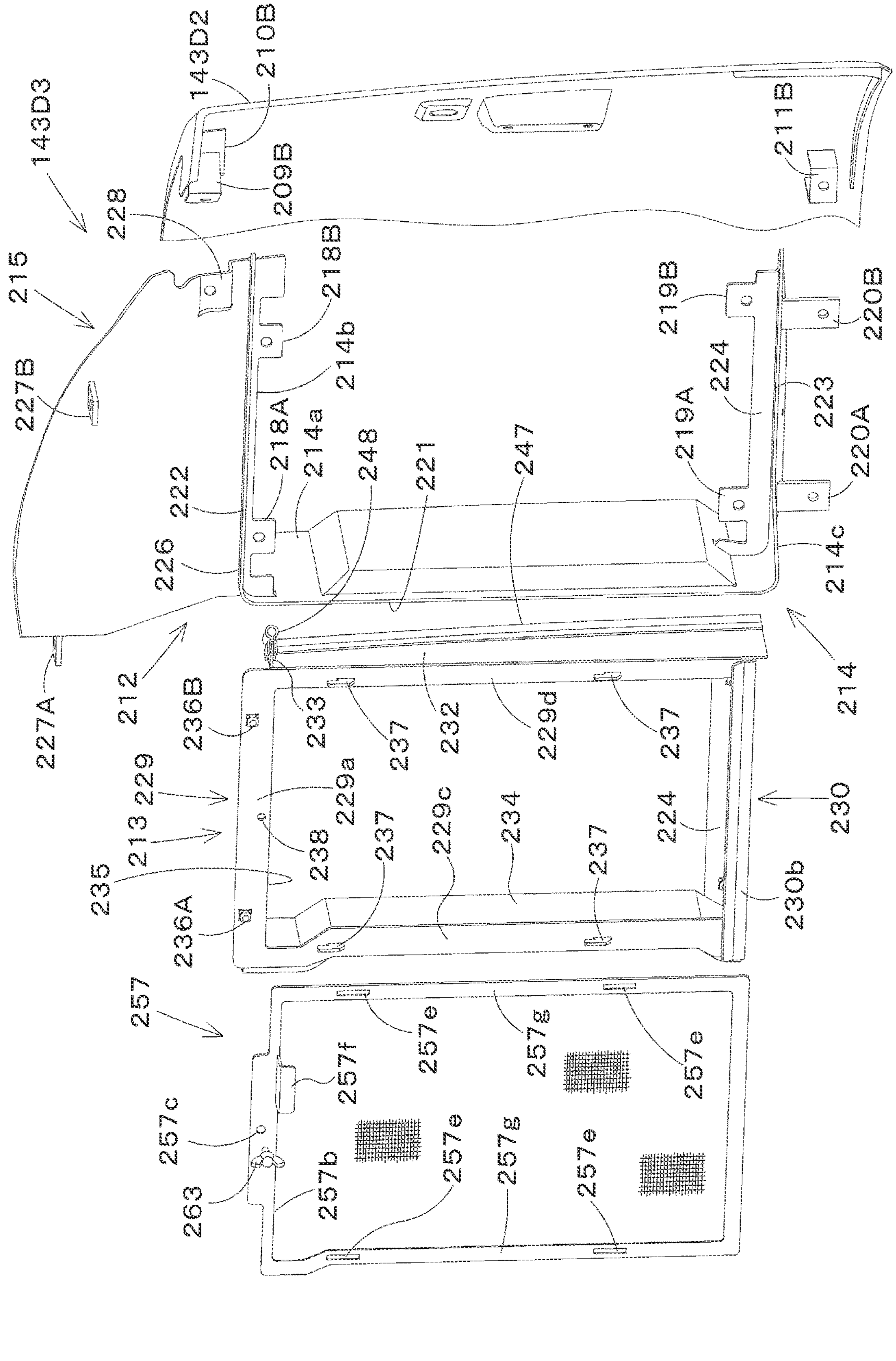
FIG. 59 is an exploded perspective view of a frame body.

As illustrated in FIG. 59, the partition member 143D3 has a main body 212 and a frame body 213. As illustrated in FIG. 58A and FIG. 59, the main body 212 has a lower body section 214 and an upper body section 215.

As illustrated in FIG. 55, the lower body section 214 is disposed at a position corresponding to the radiator 15. The upper body section 215 extends upward from the upper portion of the lower body section 214 and to near the upper wall 143D1.

As illustrated in FIG. 58A and FIG. 59, the lower body section 214 has a front wall 214*a*, an upper wall 214*b*, and a lower wall 214*c*, and is C-shaped with a rear opening in side view. The front wall 214*a* extends in the up-down direction such that the wall surface thereof is oriented in the front-rear direction K1. The upper wall 214*b* extends rearward from the upper left portion of the front wall 214*a* such that the wall surface of the upper wall 214*b* is oriented in the machine-body width direction K2. The lower wall 214*c* extends rearward from the lower end of the front wall 214*a* such that the wall surface of the lower wall 214*c* is oriented in the up-down direction.

As illustrated in FIG. 58A, the upper and right portions of the front surface of the front wall 214*a* are provided with a first attachment piece 217. As illustrated in FIG. 57, the first attachment piece 217 is attached to the second attachment bracket 210A of the outer wall 143D2 by using a bolt. As illustrated in FIG. 28, the right edge of the front wall 214*a* is located near the inner surface of the outer wall 143D2.

As illustrated in FIG. 58A and FIG. 59, the lower end of the upper wall 214*b* is provided with a pair of front and rear second attachment pieces 218A and 218B that protrude downward. The left side surface of the upper wall 214*b* is provided with a protruding wall (first protruding wall) 226 that protrudes leftward and that extends in the front-rear direction K1. The first protruding wall 226 is provided higher than the second attachment pieces 218A and 218B.

Figure 63:
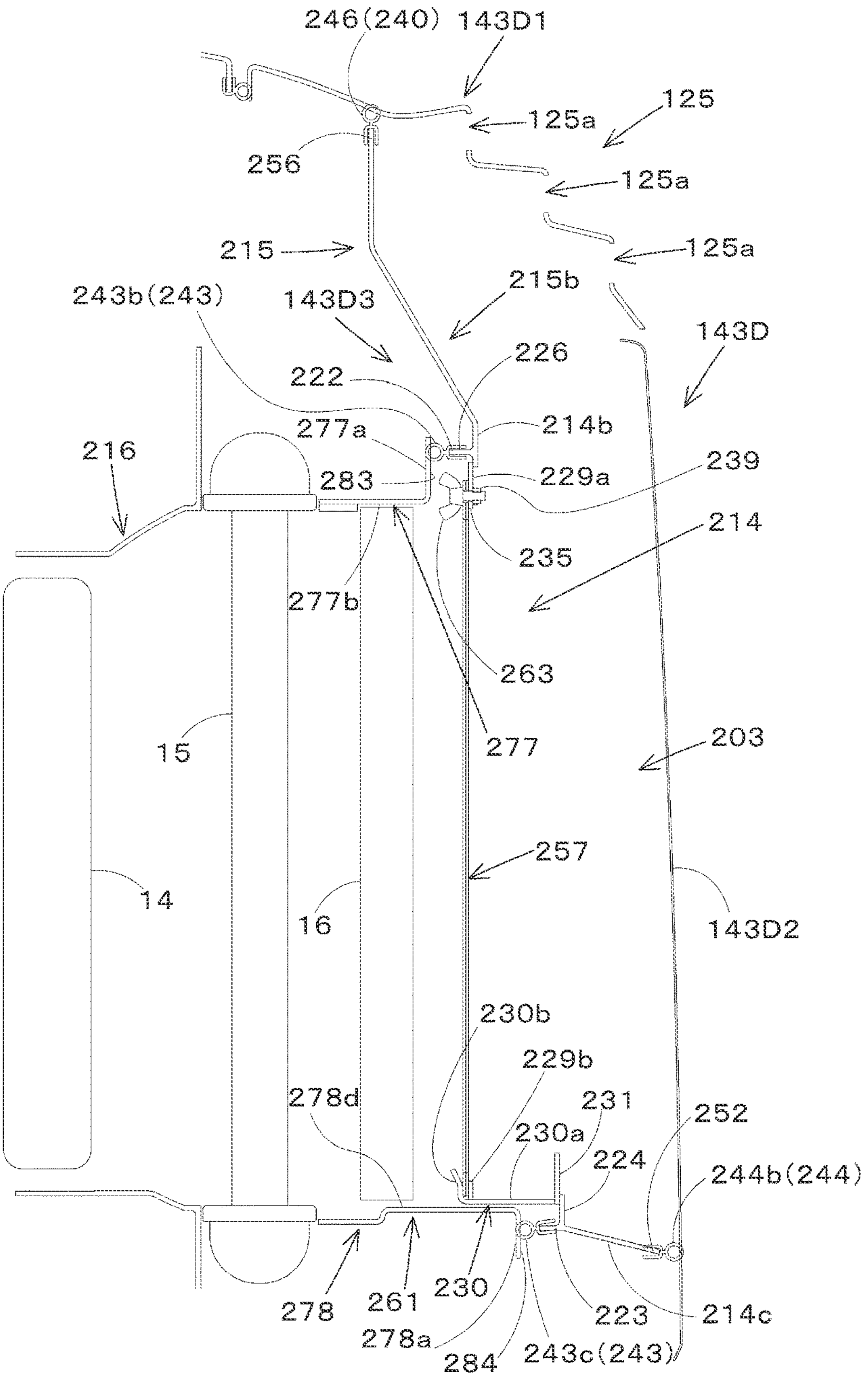
FIG. 63 is cross-sectional rear view of the openable-closable duct and the area where, for example, the radiator is disposed.

As illustrated in FIG. 58A and FIG. 59, the upper surface of the lower wall 214*c* is provided with a protruding wall (second protruding wall) 224 that protrudes upward and that extends in the front-rear direction K1. The protruding wall 224 is provided with a pair of front and rear third attachment pieces 219A and 219B that protrude upward. The lower surface of the lower wall 214*c* is provided with a pair of front and rear fourth attachment pieces 220A and 220B that protrude downward. As illustrated in FIG. 57, the front fourth attachment piece 220A is secured to the front third attachment bracket 211A by using a bolt, and the rear fourth attachment piece 220B is secured to the rear third attachment bracket 211B by using a bolt. As illustrated in FIG. 63, the right edge of the lower wall 214*c* is located near the outer wall 143D2.

As illustrated in FIG. 58A, the upper body section 215 has a front wall 215*a* and a side wall 215*b*.

As illustrated in FIG. 57, the front wall 215*a* extends upward from the upper end of the front wall 214*a* of the lower body section 214 and to near the lower surface of the upper wall 143D1.

As illustrated in FIG. 63, the side wall 215*b* has the lower portion thereof inclined leftward as the lower portion extends upward from the upper end of the upper wall 214*b* of the lower body section 214, and has the upper portion thereof extending upward from the lower end of the lower portion to near the lower surface of the upper wall 143D1.

As illustrated in FIG. 58A, the upper body section 215 is provided with a pair of front and rear fifth attachment pieces 227A and 227B and an attachment section 228. The front fifth attachment piece 227A is provided at the upper portion of the front surface of the front wall 215*a*. The rear fifth attachment piece 227B is provided at the upper and rear portions of the left surface of the side wall 215*b*. The attachment section 228 is provided at the lower and rear portions of the left surface of the side wall 215*b*.

As illustrated in FIG. 57, the front fifth attachment piece 227A is secured to the front cylindrical boss 206A of the upper wall 143D1 by using a bolt, and the rear fifth attachment piece 227B is secured to the rear cylindrical boss 206B by using a bolt. The attachment section 228 is secured to the second attachment bracket 210B of the outer wall 143D2 by using a bolt.

Figure 64:
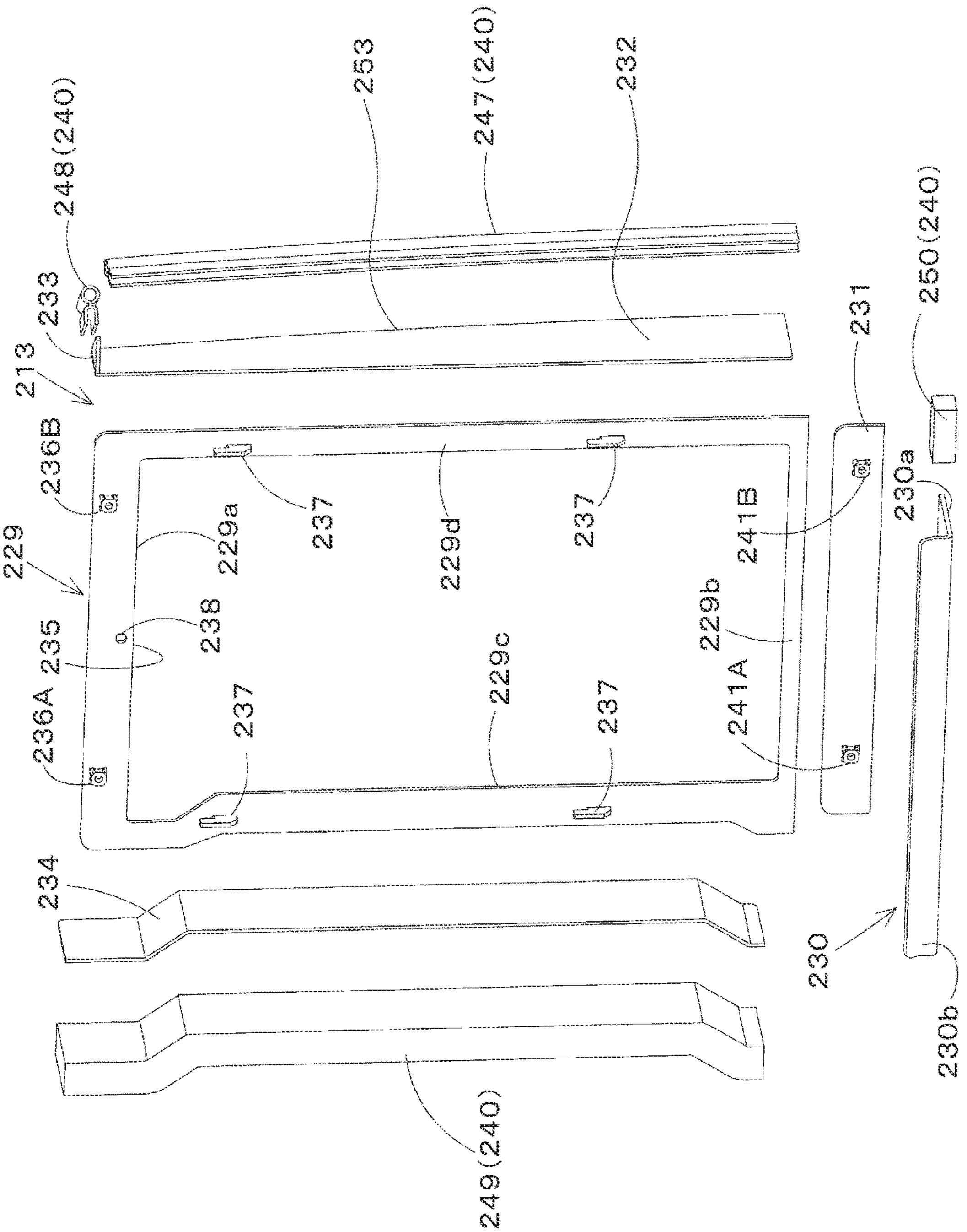
FIG. 64 is an exploded perspective view of the frame body.

As illustrated in FIG. 59, and FIG. 64, the frame body 213 has a main frame body 229, an engaging plate 230, an attachment plate 231, a first attachment member 232, a second attachment member 233, and a third attachment member 234.

Figure 62:
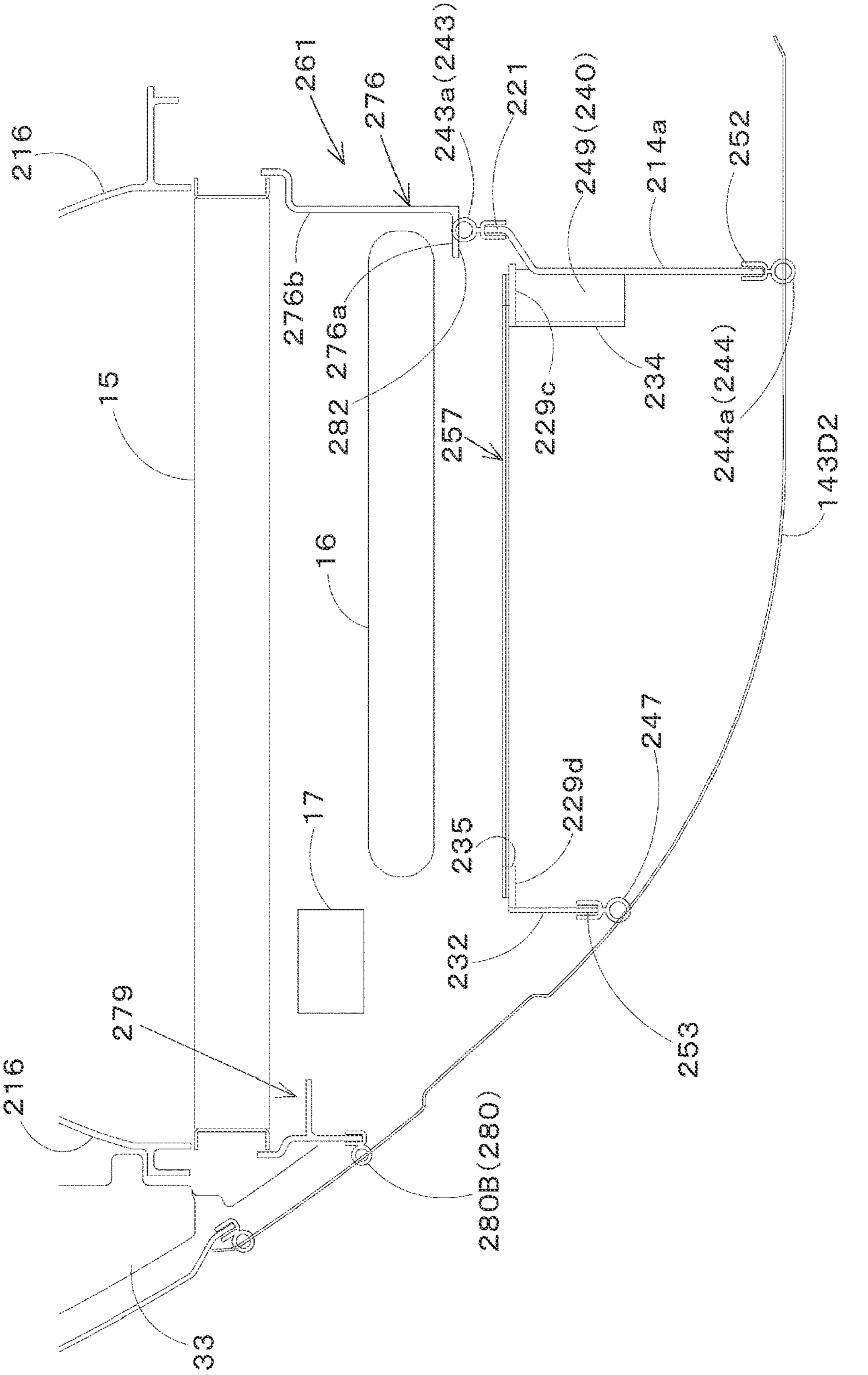
FIG. 62 is a cross-sectional plan view of the openable-closable duct and an area where, for example, a radiator is disposed.

The main frame body 229 is rectangular in side view and has a first frame section 229*a* at the upper portion, a second frame section 229*b* located below the first frame section 229*a* with a distance therebetween, a third frame section 229*c* that couples the front portions of the first frame section 229*a* and the second frame section 229*b* to each other, and a fourth frame section 229*d* that couples the rear portions of the first frame section 229*a* and the second frame section 229*b* to each other. Therefore, the inner side of the main frame body 229 is a rectangular opening 235 As illustrated in FIG. 62 and FIG. 63, the opening 235 is provided at a position corresponding to the radiator 15 (cooler 361). The opening 235 communicates with the stationary duct 261 and allows outside air (cooling air) taken into the openable-closable duct 143D from the outside-air intake portion 125 to travel through the opening 235. In other words, the partition member 143D3 has the opening 235 that is provided at the position corresponding to the radiator 15 and that allows the outside air to flow toward the radiator 15.

As illustrated in FIG. 64, a pair of front and rear nuts 236A and 236B are secured to the left surface of the first frame section 229*a*. The first frame section 229*a* is secured to the main body 212 by using a bolt 240A and a bolt 240B. The bolt 240A extends through the second attachment piece 218A of the main body 212 and the first frame section 229*a* and is screwed to the nut 236A. The bolt 240B extends through the second attachment piece 218B of the main body 212 and the first frame section 229*a* and is screwed to the nut 236B (see FIG. 57, FIG. 59, and FIG. 61).

Figure 61:
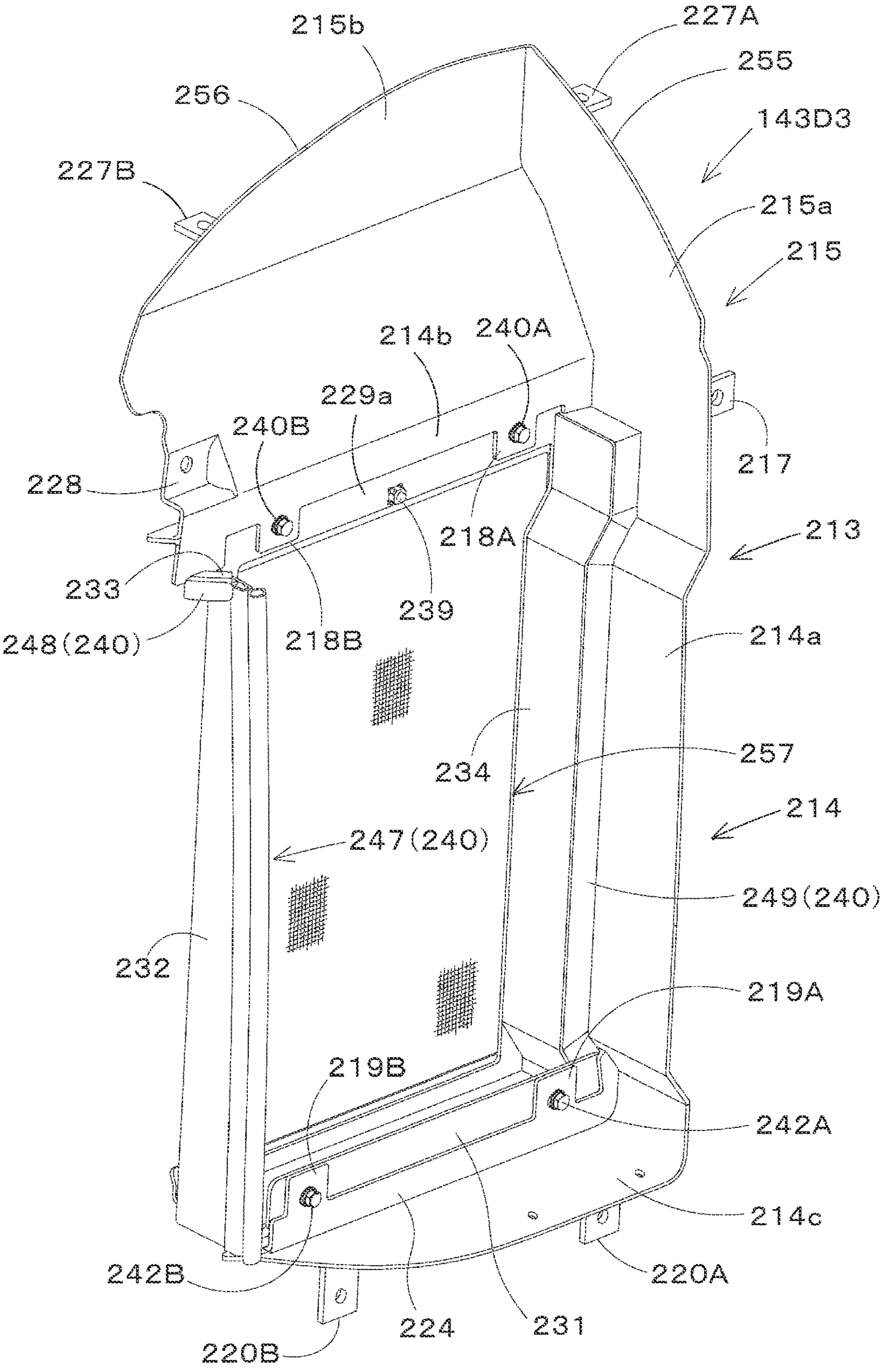
FIG. 61 is a perspective view illustrating the outer side of the partition member.

As illustrated in FIG. 64, an insertion hole 238 is provided substantially at the center of the first frame section 229*a* in the front-rear direction K1. As illustrated in FIG. 61, a nut 239 is secured to a position on the right surface of the first frame section 229*a* that corresponds to the insertion hole 238.

As illustrated in FIG. 64, a plurality of upward-oriented hooks 237 are secured to the left surface of each of the third frame section 229*c* and the fourth frame section 229*d*. The plurality of hooks 237 include a pair of upper and lower hooks provided on the third frame section 229*c* and a pair of upper and lower hooks provided on the fourth frame section 229*d*.

Figure 65:
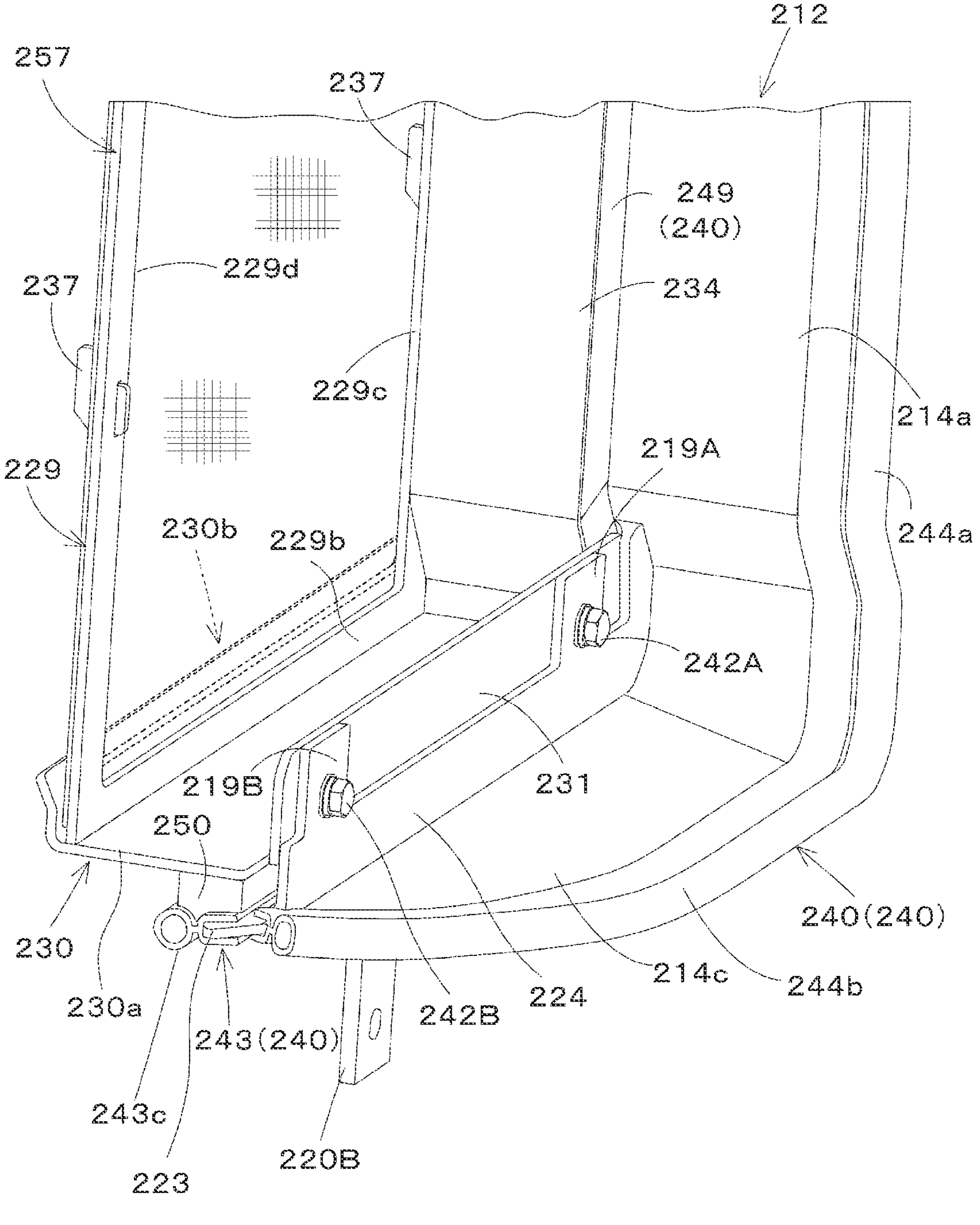
FIG. 65 is a perspective view of an outer lower portion of the frame body.

As illustrated in FIG. 65, the engaging plate 230 has a lower wall 230*a* whose plate surface is oriented in the up-down direction and an engaging wall 230*b* extending upward from the left end of the lower wall 230*a*. The lower wall 230*a* has the left end thereof secured to the lower end of the main frame body 229 and protrudes rightward from the lower end of the main frame body 229. The left end of the lower wall 230*a* protrudes slightly leftward from the lower end of the main frame body 229. The engaging wall 230*b* has the lower portion thereof extending in the up-down direction and the upper portion thereof being inclined leftward as the upper portion extends upward. The distance between the lower portion of the engaging wall 230*b* and the second frame section 229*b* defines a gap that allows the lower end of an insect-proof net 257, to be described later, to be inserted and retained therein. The upper portion of the engaging wall 230*b* functions as a guide when the lower end of the insect-proof net 257 is inserted between the lower portion of the engaging wall 230*b* and the second frame section 229*b*.

As illustrated in FIG. 65, the attachment plate 231 has the plate surface thereof oriented in the machine-body width direction K2 and has the lower end thereof secured to the right end of the lower wall 230*a* of the engaging plate 230. As illustrated in FIG. 64, a pair of front and rear nuts 241A and 241B are secured to the left surface of the attachment plate 231. The attachment plate 231 is secured to the main body 212 by using a bolt 242A and a bolt 242B. The bolt 242A extends through the third attachment piece 219A of the main body 212 and the attachment plate 231 and is screwed to the nut 241A. The bolt 242B extends through the third attachment piece 219B of the main body 212 and the attachment plate 231 and is screwed to the nut 241B.

Figure 60:
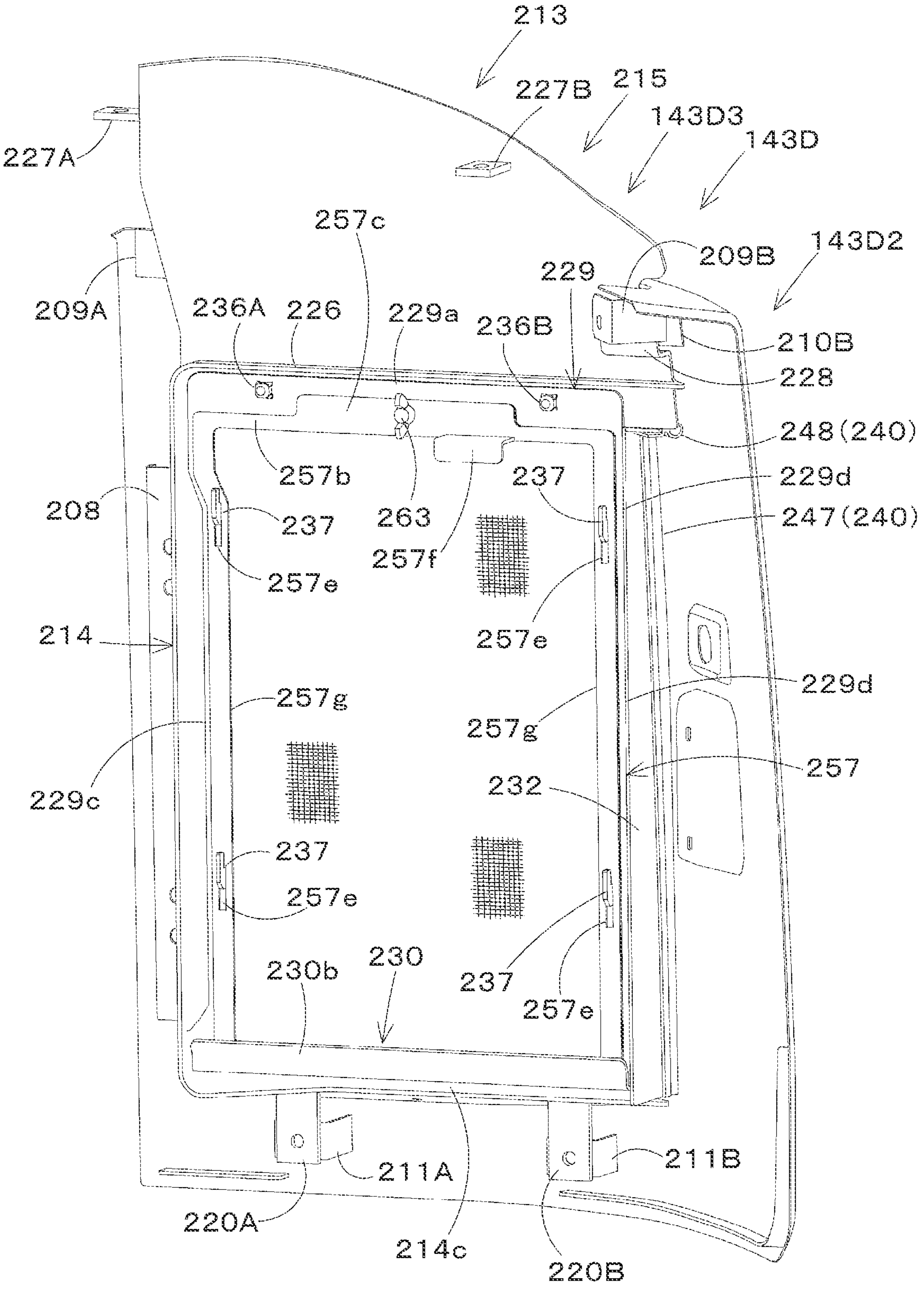
FIG. 60 is a perspective view illustrating the inner side of the partition member.

As illustrated in FIG. 60 and FIG. 62, the first attachment member 232, the second attachment member 233, and the third attachment member 234 are each formed of a plate material. The first attachment member 232 has the plate surface thereof oriented in the machine-body width direction K2, has the left end thereof secured to the rear end of the fourth frame section 229*d* by, for example, welding, and protrudes rightward from the fourth frame section 229*d*. As illustrated in FIG. 62, the right end of the first attachment member 232 is located near the outer wall 143D2.

As illustrated in FIG. 64, the second attachment member 233 has the plate surface thereof oriented in the up-down direction and is secured to the upper end of the first attachment member 232 by, for example, welding.

As illustrated in FIG. 59 and FIG. 61, the third attachment member 234 has the plate surface thereof oriented in the front-rear direction K1 and is secured to the rear end of the right surface of the third frame section 229*c* by, for example, welding.

As illustrated in FIG. 58A and FIG. 64, the seal member 204 includes a first seal 243, a second seal 244, a third seal 245, a fourth seal 246, a fifth seal 247, a sixth seal 248, a seventh seal 249, and an eighth seal 250.

Figure 58B:
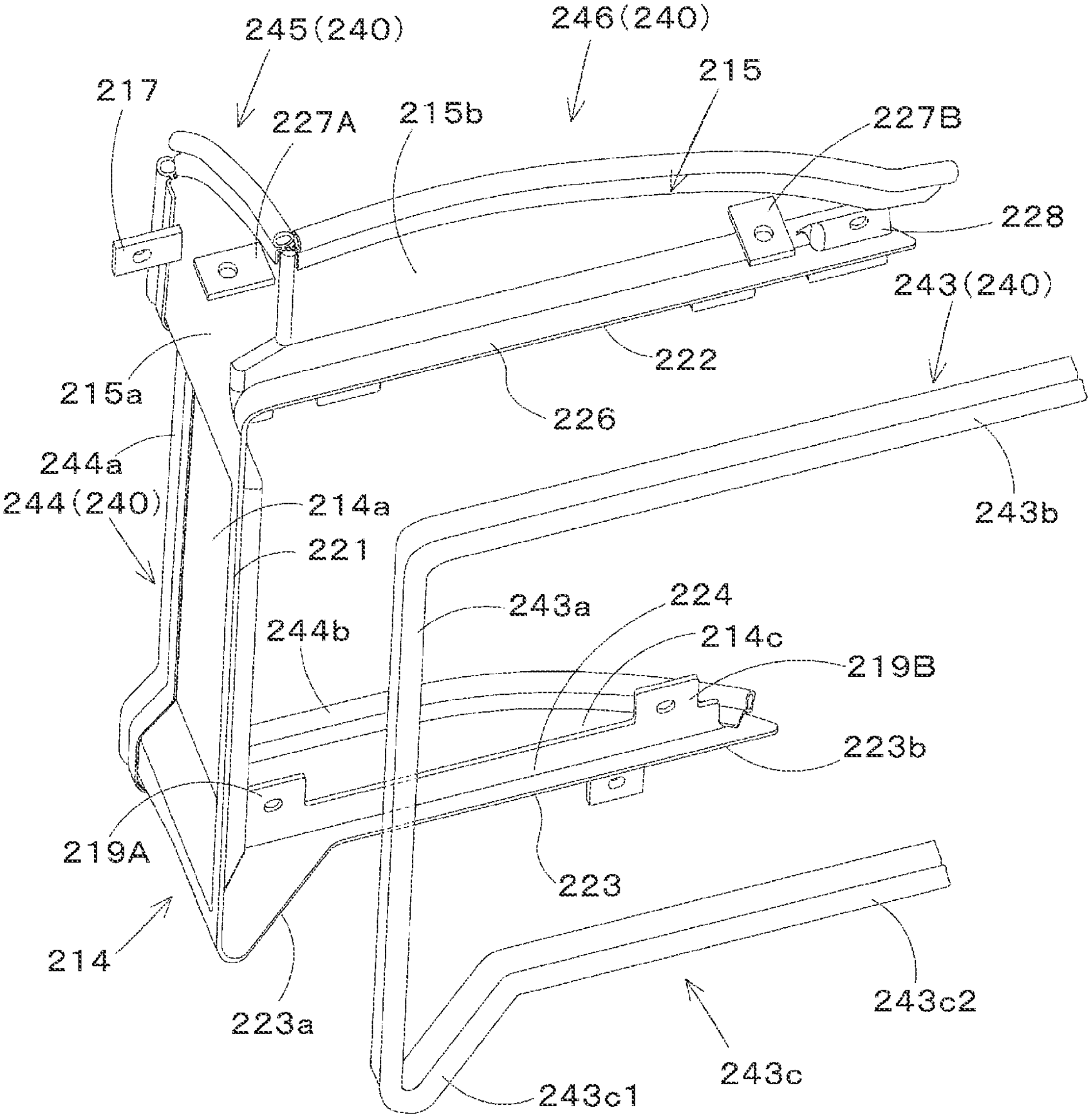
FIG. 58B is a perspective view illustrating the relationship between a main body of a partition member and a seal member.

As illustrated in FIG. 58A and FIG. 58B, the first seal 243 has a first section 243*a* extending in the up-down direction, a second section 243*b* extending rearward from the upper end of the first section 243*a*, and a third section 243*c* extending rearward from the lower end of the first section 243*a*, and is C-shaped with a rear opening in side view. The first seal 243 is attached to the left side of the lower body section 214 of the partition member 143D3. Specifically, the left edge of the front wall 214*a* serves as a first-seal attachment section 221, the left edge of the protruding wall 226 serves as a second-seal attachment section 222, and the left edge of the lower wall 214*c* serves as a third-seal attachment section 223. The first section 243*a* is attached to the first-seal attachment section 221, the second section 243*b* is attached to the second-seal attachment section 222, and the third section 243*c* is attached to the third-seal attachment section 223. Therefore, the first seal 243 surrounds the opening 235 from three sides.

As illustrated in FIG. 58B, the third-seal attachment section 223 has a first section 223*a* that is inclined rightward as the first section 223*a* extends rearward from the lower end of the first-seal attachment section 221, and a second section 223*b* extending rearward from the rear end of the first section 223*a*. The second section 223*b* is located to the right of the second-seal attachment section 222 (see FIG. 63). The third section 243*c* of the first seal 243 has a shape corresponding to the shape of the third-seal attachment section 223. Specifically, the third section 243*c* has a front portion 243*c*1 attached to the first section 223*a* of the first-seal attachment section 221 and a rear portion 243*c*2 attached to the second section 223*b* of the first-seal attachment section 221.

As illustrated in FIG. 58A, the second seal 244 has a first section 244*a* extending in the up-down direction and a second section 244*b* extending rearward from the lower end of the first section 244*a*. The second seal 244 is attached to the right side of the lower body section 214 of the partition member 143D3. Specifically, the right edge of the front wall 214*a* of the lower body section 214 serves as a fourth-seal attachment section 251, and the right edge of the lower wall 214*c* of the lower body section 214 serves as a fifth-seal attachment section 252. As illustrated in FIG. 62, the first section 244*a* of the second seal 244 is attached to the fourth-seal attachment section 251, and the first section 244*a* is in abutment with the outer wall 143D2. As illustrated in FIG. 63, the second section 244*b* of the second seal 244 is attached to the fifth-seal attachment section 252, and the second section 244*b* is in abutment with the outer wall 143D2.

As illustrated in FIG. 58A, the third seal 245 and the fourth seal 246 are attached to the upper body section 215 of the partition member 143D3. Specifically, the upper edge of the front wall 215*a* of the upper body section 215 serves as a sixth-seal attachment section 255, and the upper edge of the side wall 215*b* of the upper body section 215 serves as a seventh-seal attachment section 256. As illustrated in FIG. 57, the third seal 245 is attached to the sixth-seal attachment section 255, and the third seal 245 is in abutment with the lower surface of the upper wall 143D1. As illustrated in FIG. 57 and FIG. 63, the fourth seal 246 is attached to the seventh-seal attachment section 256, and the fourth seal 246 is in abutment with the lower surface of the upper wall 143D1.

As illustrated in FIG. 64, the right edge of the first attachment member 232 of the frame body 213 serves as an eighth-seal attachment section 253. As illustrated in FIG. 62, the fifth seal 247 is attached to the eighth-seal attachment section 253, and the fifth seal 247 is in abutment with the outer wall 143D2.

As illustrated in FIG. 61 and FIG. 64, the sixth seal 248 is attached to the second attachment member 233. As illustrated in FIG. 57 and FIG. 60, the sixth seal 248 is in abutment with the outer wall 143D2.

As illustrated in FIG. 61, the seventh seal 249 is interposed between the third attachment member 234 and the front wall 214*a* of the lower body section 214 of the partition member 143D3, is attached to the third attachment member 234, and is in abutment with the rear surface of the front wall 214*a*.

As illustrated in FIG. 57 and FIG. 65, the eighth seal 250 is interposed between the rear portion of the lower wall 230*a* of the engaging plate 230 and the third section 243*c* of the first seal 243, and seals the gap between the rear end of the second protruding wall 224 and the lower portion of the first attachment member 232.

Accordingly, the upper wall 143D1, the outer wall 143D2, and the partition member 143D3 define the guide path 203 that guides the outside air taken in from the outside-air intake portion 125 to the opening 235.

As illustrated in FIG. 57 and FIG. 60, the insect-proof net (dust-proof net) 257 that covers the opening 235 is attached to the frame body 213. The insect-proof net 257 is disposed near the connection area between the stationary duct 261 and the openable-closable duct 143D and serves as a dust-proof net that collects refuse contained in the outside air flowing from the openable-closable duct 143D toward the stationary duct 261.

Figure 66:
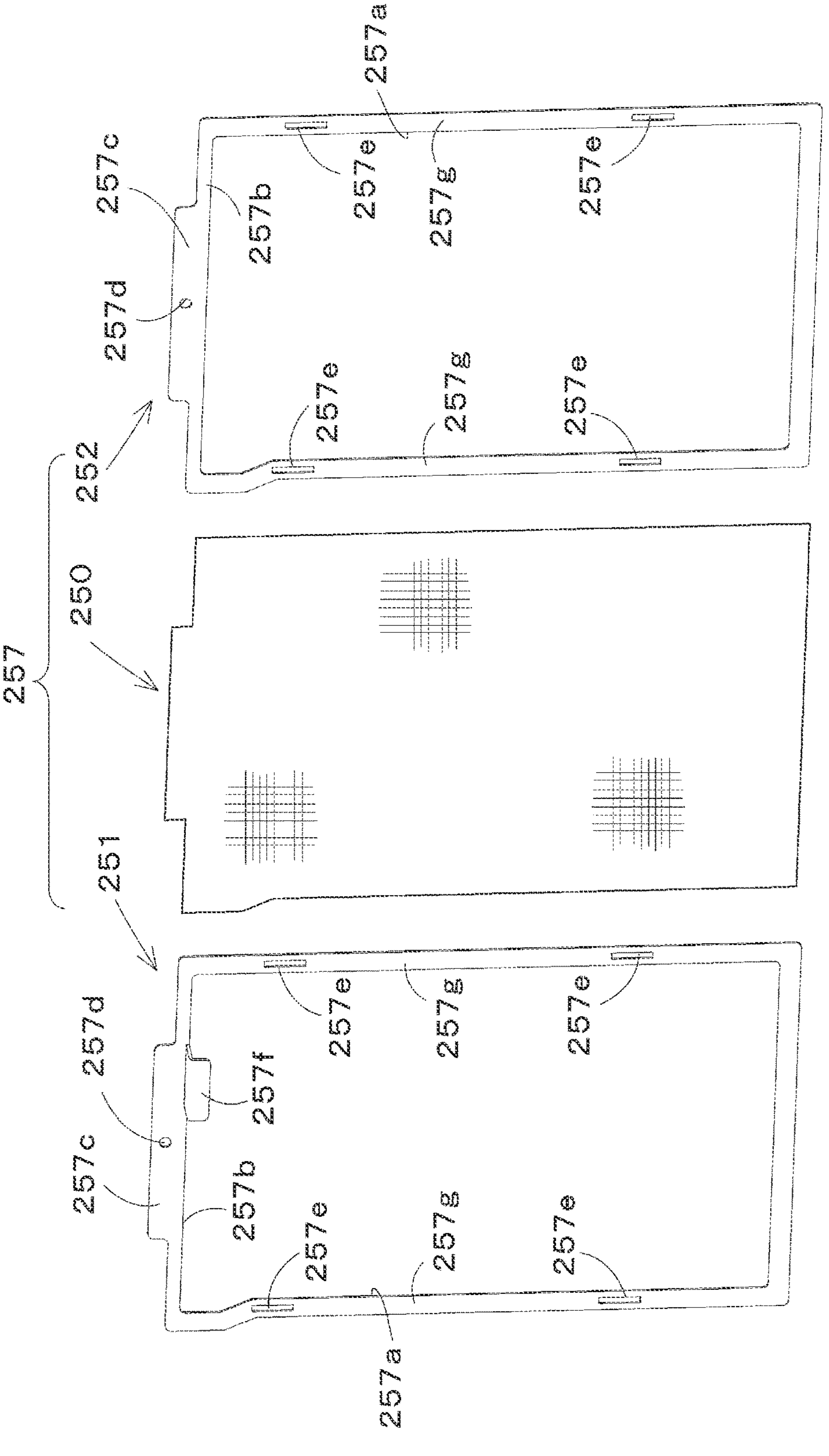
FIG. 66 is an exploded perspective view of an insect-proof net.

As illustrated in FIG. 59 and FIG. 66, the insect-proof net 257 has a net 258, a first net frame 259, and a second net frame 260. The net 258 is a mesh sheet that has air permeability and that prevents, for example, insects from passing through, and has a shape that corresponds to (covers) the opening 235. The insect-proof net 257 is formed by sandwiching the net 258 between the first net frame 259 and the second net frame 260 and connecting the first net frame 259 and the second net frame 260 to each other. The first net frame 259 and the second net frame 260 have substantially the same shape and each have an opening 257*a* corresponding to the opening 235. An upper frame section 257*b* of the insect-proof net 257 (first net frame 259, second net frame 260) is provided with a protrusion 257*c* protruding upward. The protrusion 257*c* is provided with a through-hole 257*d* extending through the first net frame 259 and the second net frame 260. Vertical frame sections 257*g* of the insect-proof net 257 (first net frame 259, second net frame 260) are provided with insertion holes 257*e* that are long in the up-down direction and through which the hooks 237 of the main frame body 229 are insertable in the machine-body width direction K2. The upper frame section 257*b* of the first net frame 259 is provided with a grab handle 257*f*.

The insect-proof net 257 is attached to the frame body 213 in the following manner.

First, the insect-proof net 257 is disposed to the left (in front of) the frame body 213. Then, the insect-proof net 257 is moved rightward (toward the frame body 213) so as to insert the hooks 237 into the insertion holes 257*e*. Subsequently, the insect-proof net 257 is slid downward so as to insert the lower end of the insect-proof net 257 between the lower portion of the engaging wall 230*b* and the second frame section 229*b*. In this case, the upper edges of the insertion holes 257*e* are engaged with the hooks 237 so that downward movement of the insect-proof net 257 is restricted, and leftward movement of the insect-proof net 257 (movement thereof away from the frame body 213) is restricted.

Accordingly, the insect-proof net 257 is retained by the plurality of hooks 237, and the lower end of the insect-proof net 257 is retained between the lower portion of the engaging wall 230*b* and the second frame section 229*b*. In other words, the insect-proof net 257 is retained by the frame body 213. Then, a securing member (wing bolt) 263 is inserted through the through-hole 257*d* and the insertion hole 238 in the first frame section 229*a*, and is screwed to the nut 239. Accordingly, the insect-proof net 257 is secured in a detachable manner.

When the insect-proof net 257 is to be removed, the securing member 263 is unfastened and the insect-proof net 257 is moved toward the operator by being slightly lifted upward, whereby the insect-proof net 257 can be removed readily.

Alternatively, the insect-proof net 257 may be attached to the stationary duct 261. In other words, the insect-proof net (dust-proof net) 257 is attachable to and detachable from the stationary duct 261 or the openable-closable duct 143D by opening the hood 201.

With regard to the aforementioned openable-closable duct 143D, since the outer wall 143D2 is not provided with an opening and the outside-air intake portion 125 is provided at a position higher than the prime mover E1 and the radiator 15, noise inside the hood 201 (noise from, for example, the prime mover E1 and the cooling fan 14) does not leak directly outward from the outer wall 143D2, so that outward leakage of the noise inside the hood 201 can be suppressed (reduced).

Furthermore, since the insect-proof net 257 is attached to the frame body 213 from the mating surface (outer side) of the openable-closable duct 143D with the hood 201, the insect-proof net 257 can be removed readily by opening the openable-closable duct 143D. Moreover, the insect-proof net 257 can also be attached readily. The insect-proof net 257 can readily serve as a partition.

When the insect-proof net 257 is to be, for example, removed and cleaned, the cleaning process is performed in a state where the openable-closable duct 143D is open. Thus, when the insect-proof net 257 is to be removed, insects and dust collected by the insect-proof net 257 fall outside the machine body 2, thereby facilitating the cleaning process.

Next, the stationary duct 261 will be described.

Figure 67:
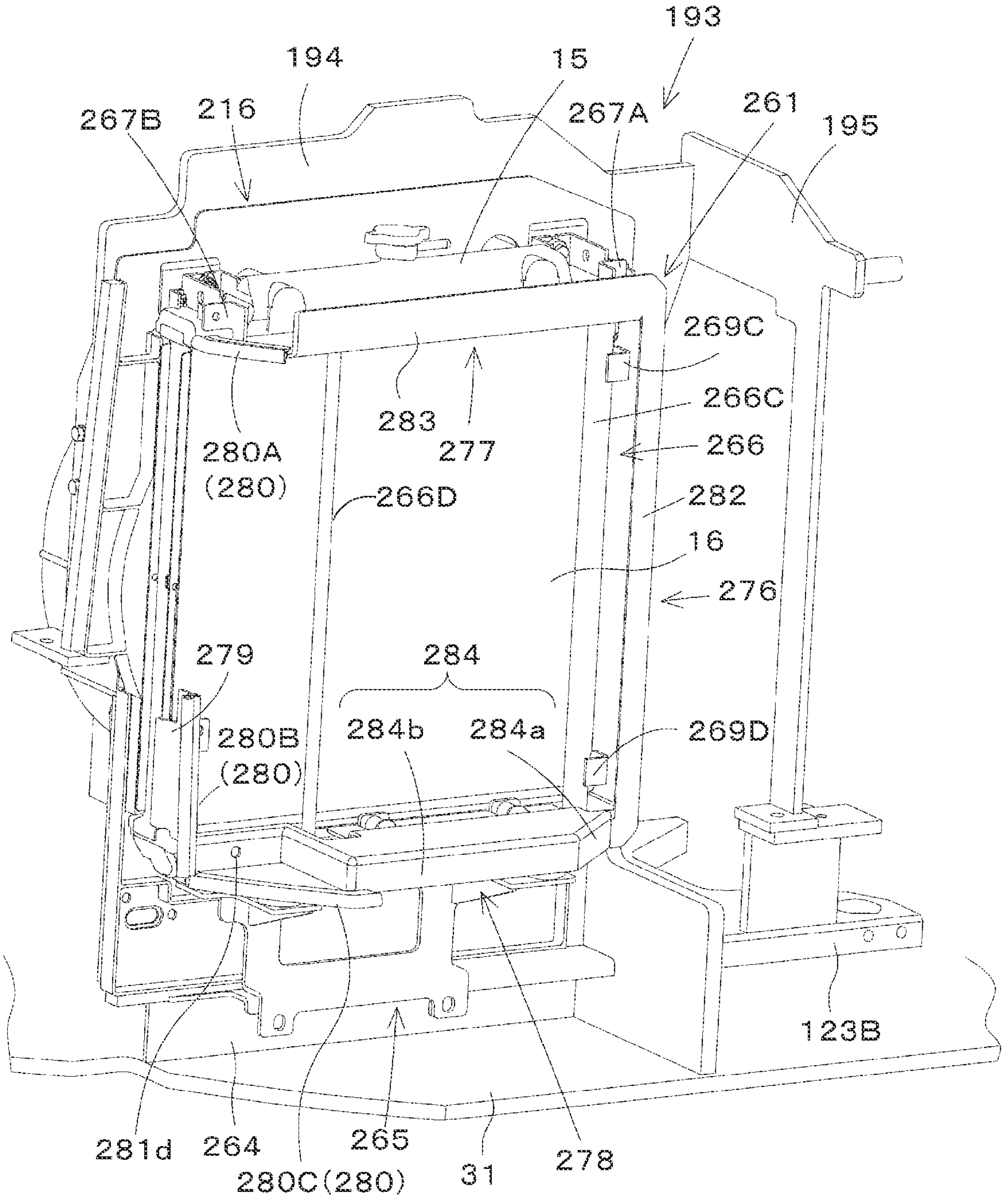
FIG. 67 is a perspective view of where a stationary duct is disposed.

As illustrated in FIG. 67, the fan shroud 216 has the lower portion thereof supported via a seal member by a support base 254 secured to the swivel substrate 31 and is secured to the first frame 194 of the support frame 193 by using, for example, a bolt. The radiator 15 is supported in a vibration-proof manner by a placement base 265 secured to the support base 254 by using, for example, a bolt, and is secured to the fan shroud 216 by using, for example, a bolt. An attachment frame 266 to which the oil cooler 16 is attached is attached to the radiator 15, and the stationary duct 261 is attached to the attachment frame 266.

Figure 69:
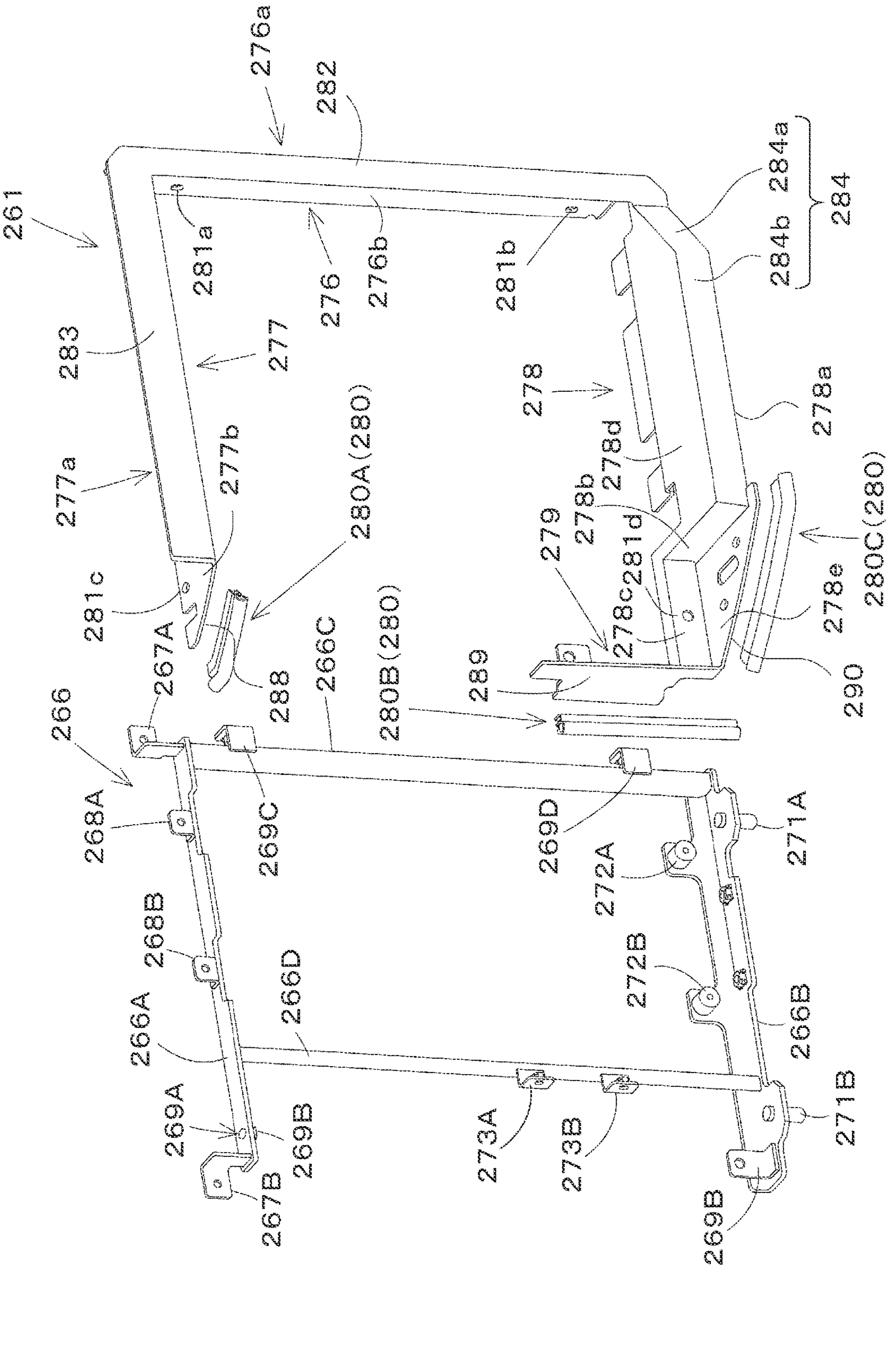
FIG. 69 is a perspective view of the attachment frame and the stationary duct.

As illustrated in FIG. 69, the attachment frame 266 has an upper frame member 266A, a lower frame member 266B disposed below the upper frame member 266A with a distance therebetween, a front frame member 266C that connects the front portions of the upper frame member 266A and the lower frame member 266B to each other, and a rear frame member 266D that couples the rear portions of the upper frame member 266A and the lower frame member 266B to each other.

The upper frame member 266A is provided with a pair of front and rear radiator attachment sections 267A and 267B, a pair of front and rear oil-cooler attachment sections 268A and 268B, and a first duct attachment section 269A.

Figure 68:
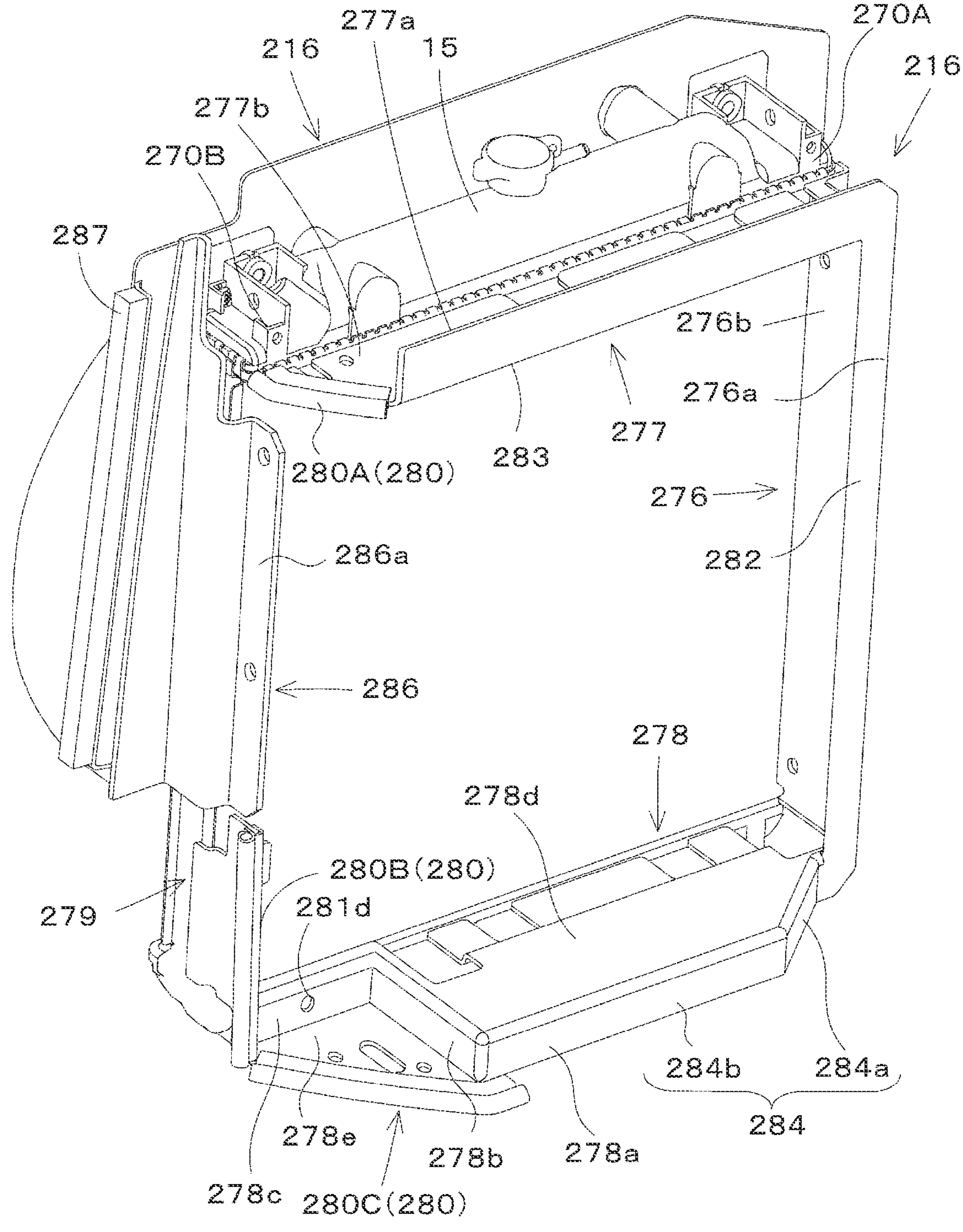
FIG. 68 is a perspective view of a fan shroud, the radiator, and the stationary duct.

As illustrated in FIG. 68, the upper portion of the radiator 15 is provided with a pair of front and rear frame attachment sections 270A and 270B. The front radiator attachment section 267A is attached to the front frame attachment section 270A, and the rear radiator attachment section 267B is attached to the rear frame attachment section 270B. The upper portion of the oil cooler 16 is secured to the pair of oil-cooler attachment sections 268A and 268B by using, for example, a bolt. The first duct attachment section 269A has a bolt insertion hole 269*a* and a nut member 269*b* secured to a position corresponding to the bolt insertion hole 269*a* in the lower surface of the upper frame member 266A.

A pair of front and rear insertion pins 271A and 271B, a pair of front and rear oil-cooler attachment sections 272A and 272B, and a second duct attachment section 269B are secured to the lower frame member 266B. The pair of front and rear insertion pins 271A and 271B are inserted through a vibration-proof member (not illustrated) provided at the placement base 265. In other words, the lower frame member 266B is supported by the placement base 265 in a vibration-proof manner. The lower portion of the oil cooler 16 is secured to the pair of oil-cooler attachment sections 272A and 272B by using, for example, a bolt.

A third duct attachment section 269C is secured to the upper portion of the front frame member 266C, and a fourth duct attachment section 269D is secured to the lower portion of the front frame member 266C.

A pair of upper and lower fuel-cooler attachment sections 273A and 273B to which the fuel cooler 17 is attached is secured to the lower portion of the rear frame member 266D.

As illustrated in FIG. 67 to FIG. 70, the stationary duct 261 is formed of a plate material. The stationary duct 261 has a first duct component 276 defining a front portion extending in the up-down direction, a second duct component 277 extending rearward from the upper portion of the first duct component 276, a third duct component 278 extending rearward from the lower portion of the first duct component 276, a fourth duct component 279 extending upward from the rear end of the third duct component 278, and a seal member 280.

The first duct component 276 has a vertical plate section 276*a* whose plate surface is oriented in the machine-body width direction K2 and that is long in the up-down direction, and also has an extension plate section 276*b* extending leftward from the front end of the vertical plate section 276*a*. The right surface of the vertical plate section 276*a* defines a first-seal abutment surface 282 on which the first section 243*a* of the first seal 243 abuts. The extension plate section 276*b* has a first securing section 281*a* at the upper portion thereof and a second securing section 281*b* at the lower portion thereof. The first securing section 281*a* is secured to the third duct attachment section 269C by using, for example, a bolt, and the second securing section 281*b* is secured to the fourth duct attachment section 269D by using, for example, a bolt.

The second duct component 277 has a vertical plate section 277*a* whose plate surface is oriented in the machine-body width direction K2 and that is long in the front-rear direction K1, and also has a horizontal plate section 277*b* extending leftward from the lower end of the vertical plate section 277*a*. The right surface of the vertical plate section 277*a* defines a second-seal abutment surface 283 on which the second section 243*b* of the first seal 243 abuts. The horizontal plate section 277*b* has a third securing section 281*c* at the rear portion thereof. The third securing section 281*c* is secured to the first duct attachment section 269A by using, for example, a bolt.

The third duct component 278 has a first vertical plate section 278*a* whose plate surface is oriented in the machine-body width direction K2 and that is long in the front-rear direction K1, a second vertical plate section 278*b* that extends leftward from the rear end of the first vertical plate section 278*a* and whose plate surface is oriented in the front-rear direction K1, a third vertical plate section 278*c* that extends rearward from the left end of the second vertical plate section 278*b* and whose plate surface is oriented in the machine-body width direction K2, an upper plate section 278*d* extending leftward from the upper ends of the first vertical plate section 278*a* and the third vertical plate section 278*c*, and an extension plate section 278*e* extending rightward from the lower end of the third vertical plate section 278*c* and coupled to the lower end of the second vertical plate section 278*b*. The right surface of the first vertical plate section 278*a* defines a third-seal abutment surface 284 on which the third section 243*c* of the first seal 243 abuts. The third-seal abutment surface 284 has a first section 284*a* and a second section 284*b*. The front portion 243*c*1 of the third section 243*c* abuts on the first section 284*a*, and the rear portion 243*c*2 of the third section 243*c* abuts on the second section 284*b*. The third vertical plate section 278*c* has a fourth securing section 281*d* secured to the second duct attachment section 269B by using, for example, a bolt.

The fourth duct component 279 extends upward from the rear portion of the third duct component 278 such that the plate surface is oriented in the front-rear direction K1.

As illustrated in FIG. 68, the stationary duct 261(first duct component 276, second duct component 277, third duct component 278, fourth duct component 279) extends rightward (toward the openable-closable duct 143D) from the radiator 15.

As illustrated in FIG. 69 and FIG. 70, the seal member 280 includes a tenth seal 280A, an eleventh seal 280B, and a twelfth seal 280C. The rear edge of the horizontal plate section 277*b* of the second duct component 277 serves as a tenth-seal attachment section 288, and the tenth seal 280A is attached to the tenth-seal attachment section 288. The right edge of the fourth duct component 279 serves as an eleventh-seal attachment section 289, and the eleventh seal 280B is attached to the eleventh-seal attachment section 289. The right edge of the extension plate section 278*e* of the third duct component 278 serves as a twelfth-seal attachment section 290, and the twelfth seal 280C is attached to the twelfth-seal attachment section 290.

Figure 72:
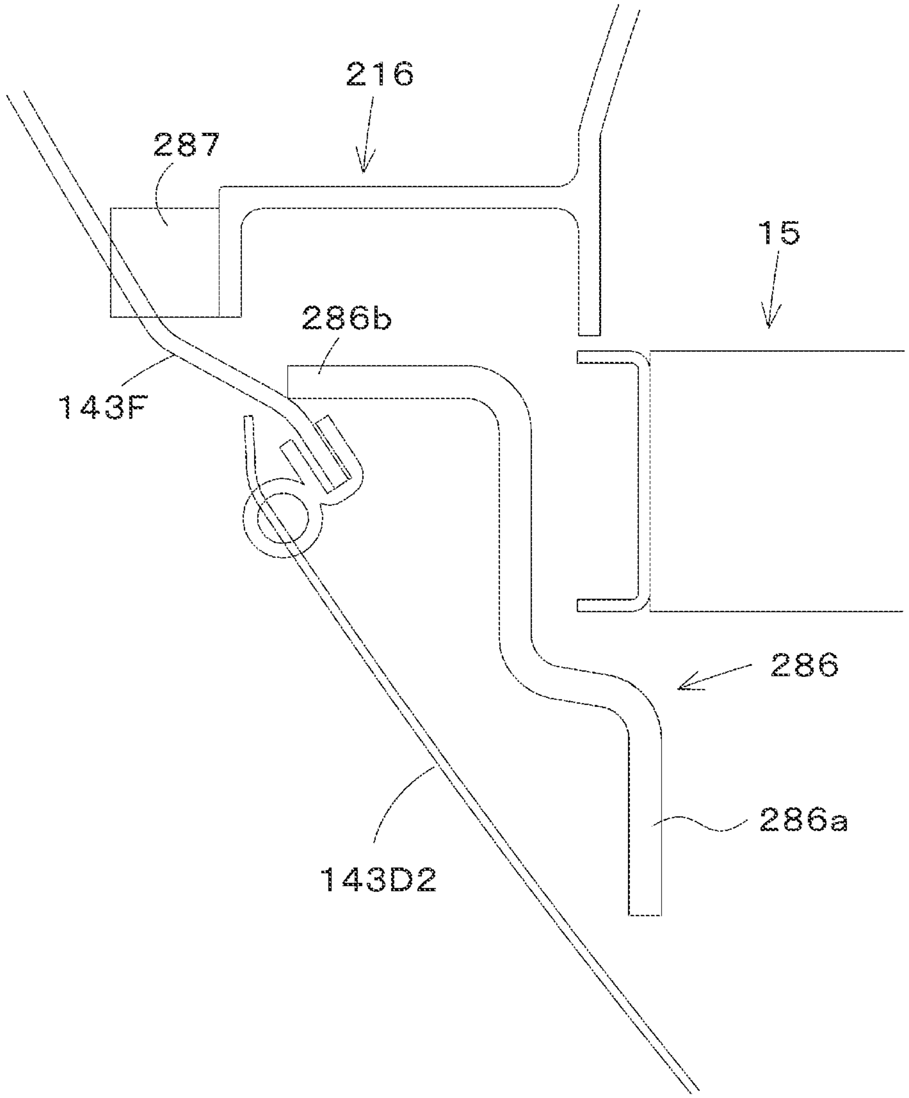
FIG. 72 is a cross-sectional plan view of an area where a bracket member is positioned.

As illustrated in FIG. 68, a right section 286*a* of a bracket member 286 is interposed between the tenth seal 280A and the eleventh seal 280B. A striker engaging with a latch provided at the outer wall 143D2 is attached to the right section 286*a* of the bracket member 286. As illustrated in FIG. 72, a base 286*b* of the bracket member 286 is secured to the inner surface of the sixth cover 143F by, for example, welding.

As illustrated in FIG. 68, the rear end of the fan shroud 216 is provided with a seal attachment wall 291 located to the left of the base 286*b* of the bracket member 286 and extending in the up-down direction. As illustrated in FIG. 68 and FIG. 72, the rear end of the seal attachment wall 291 is provided with a seal member 287 that abuts on the sixth cover 143F and that extends in the up-down direction.

Figure 71:
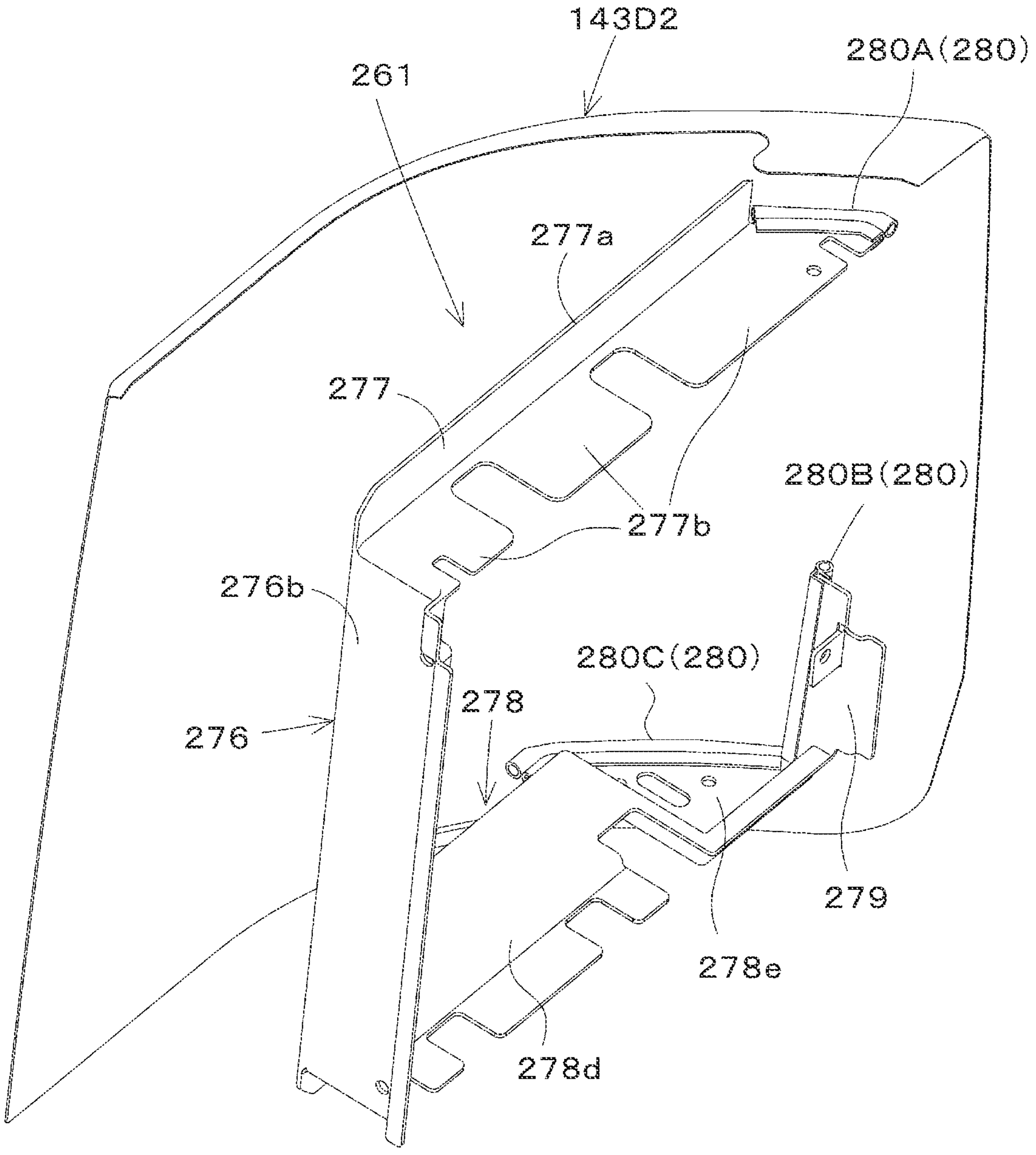
FIG. 71 is a perspective view illustrating a sealed area between the stationary duct and an outer wall.
Figure 73:
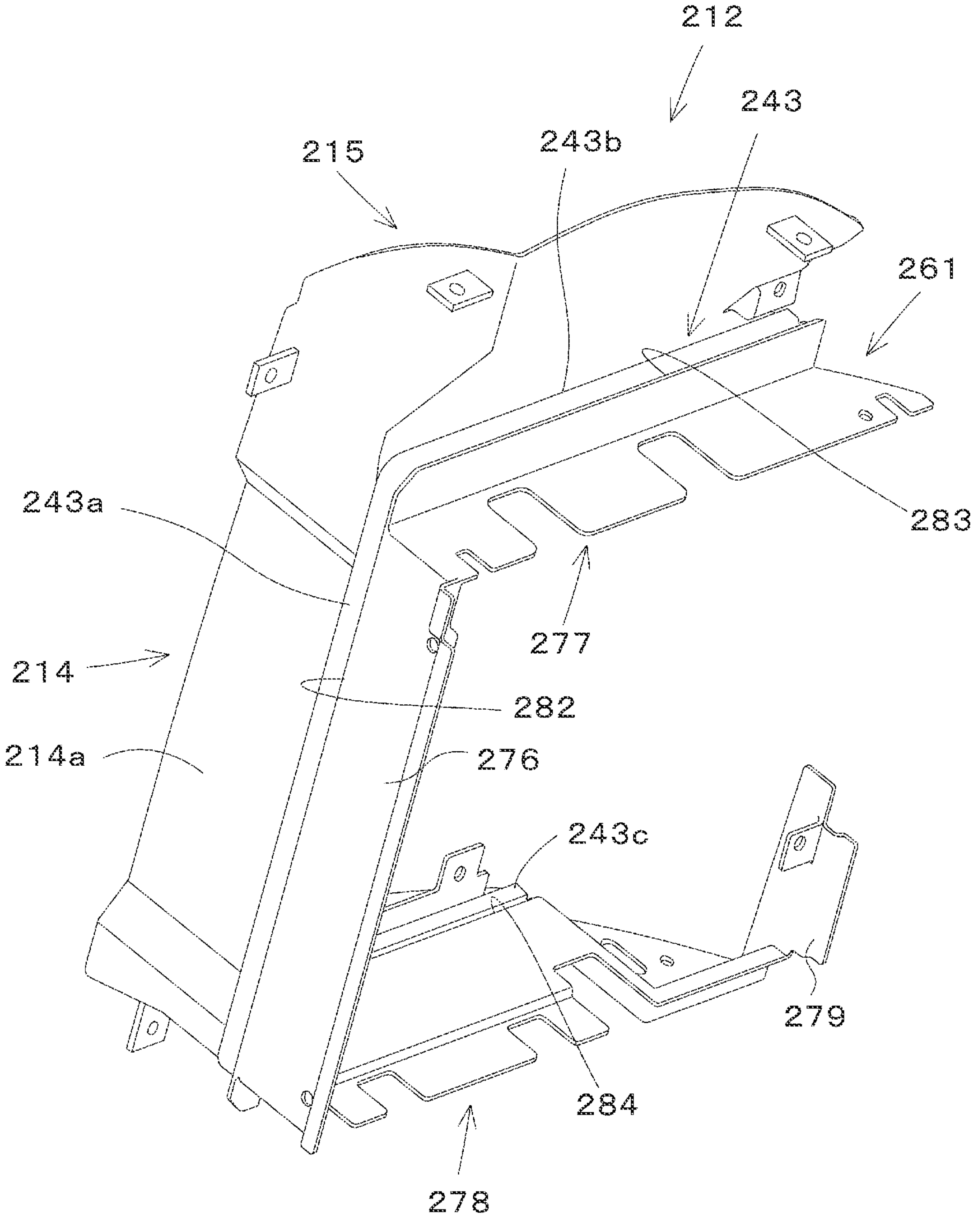
FIG. 73 is a perspective view illustrating a seal structure between the openable-closable duct and the stationary duct.
Figure 74:
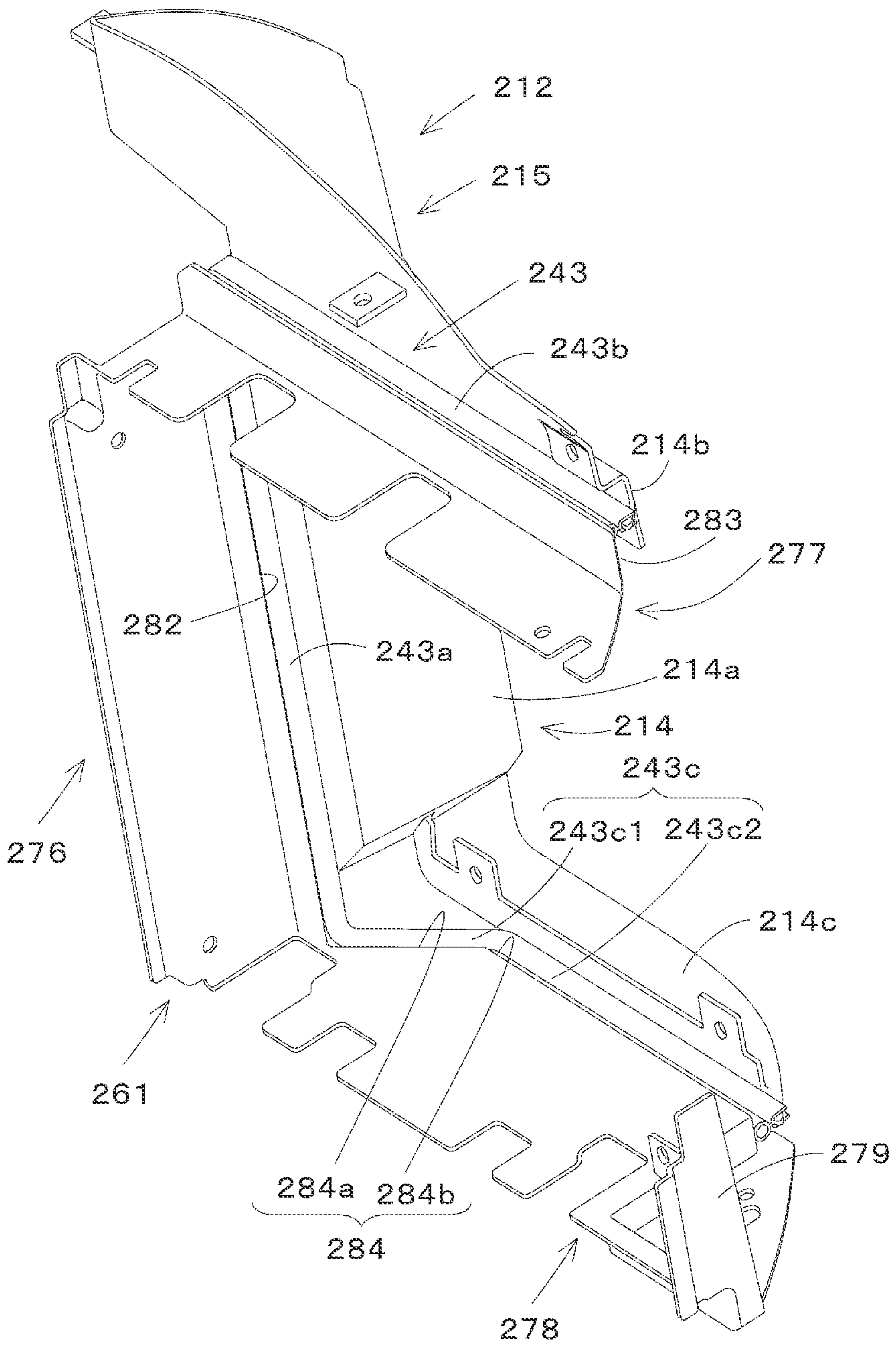
FIG. 74 is a perspective view illustrating the seal structure between the openable-closable duct and the stationary duct.

In the above-described structure, when the openable-closable duct 143D is closed, the first seal 243 abuts on the stationary duct 261 around the opening 235. Specifically, the first section 243*a* of the first seal 243 abuts on the first-seal abutment surface 282 of the stationary duct 261, as illustrated in FIG. 62 and FIG. 73, the second section 243*b* of the first seal 243 abuts on the second-seal abutment surface 283 of the stationary duct 261, as illustrated in FIG. 63 and FIG. 73, and the third section 243*c* of the first seal 243 abuts on the third-seal abutment surface 284 of the stationary duct 261, as illustrated in FIG. 63 and FIG. 74. Furthermore, when the openable-closable duct 143D is closed, the tenth seal 280A, the eleventh seal 280B, and the twelfth seal 280C abut on the inner surface of the outer wall 143D2 of the openable-closable duct 143D, as illustrated in FIG. 71. Moreover, the seal member 287 forms a seal between the rear end of the fan shroud 216 and the sixth cover 143F.

The above seal structure prevents hot air in the prime mover room E2 from being suctioned toward the cooling-air intake side of the radiator 15, so that the radiator 15, the oil cooler 16, and the fuel cooler 17 can be cooled efficiently, thereby achieving improved heat balance.

Next, an intake structure 296 that takes air into the prime mover E1 will be described.

First, the overview of the intake structure 296 will be described.

Figure 75:
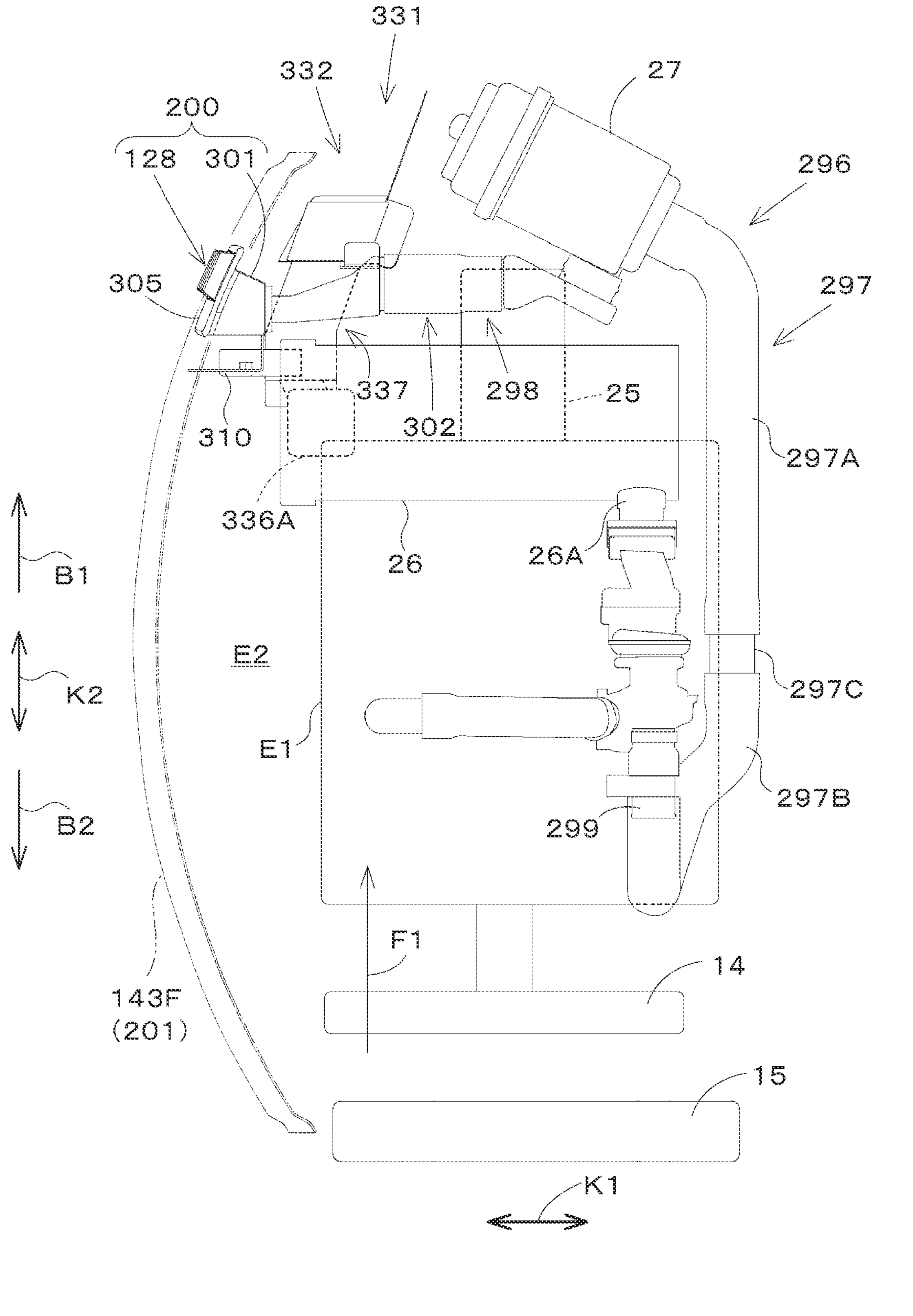
FIG. 75 is a plan view illustrating the arrangement of devices in the prime mover room.

As illustrated in FIG. 75, the intake structure 296 has the air cleaner 27, the air inlet 128 that takes in air (outside air) to be suctioned into the air cleaner 27, an inlet path 298 that guides the air taken in from the air inlet 128 to the air cleaner 27, and an outlet path 297 that guides the air from the air cleaner 27 to the prime mover E1. The air inlet 128 is provided in the sixth cover 143F constituting the hood 201. Specifically, the air inlet 128 is provided in the left portion of the sixth cover 143F.

The air cleaner 27 and the inlet path 298 are disposed within the hood 201 (prime mover room E2) and at the downstream side of cooling air F1 for the prime mover E1. Furthermore, the air cleaner 27 and the inlet path 298 are disposed above the hydraulic pump 25. Moreover, the air cleaner 27 and the inlet path 298 are disposed to the left of the exhaust gas purifier 26 (at the downstream side of the cooling air F1). Specifically, the exhaust gas purifier 26 extends in the front-rear direction K1, and the air cleaner 27 is disposed to the left of the front portion of the exhaust gas purifier 26. The inlet path 298 extends rearward from between the air cleaner 27 and the exhaust gas purifier 26 and extends to the sixth cover 143F.

Figure 76:
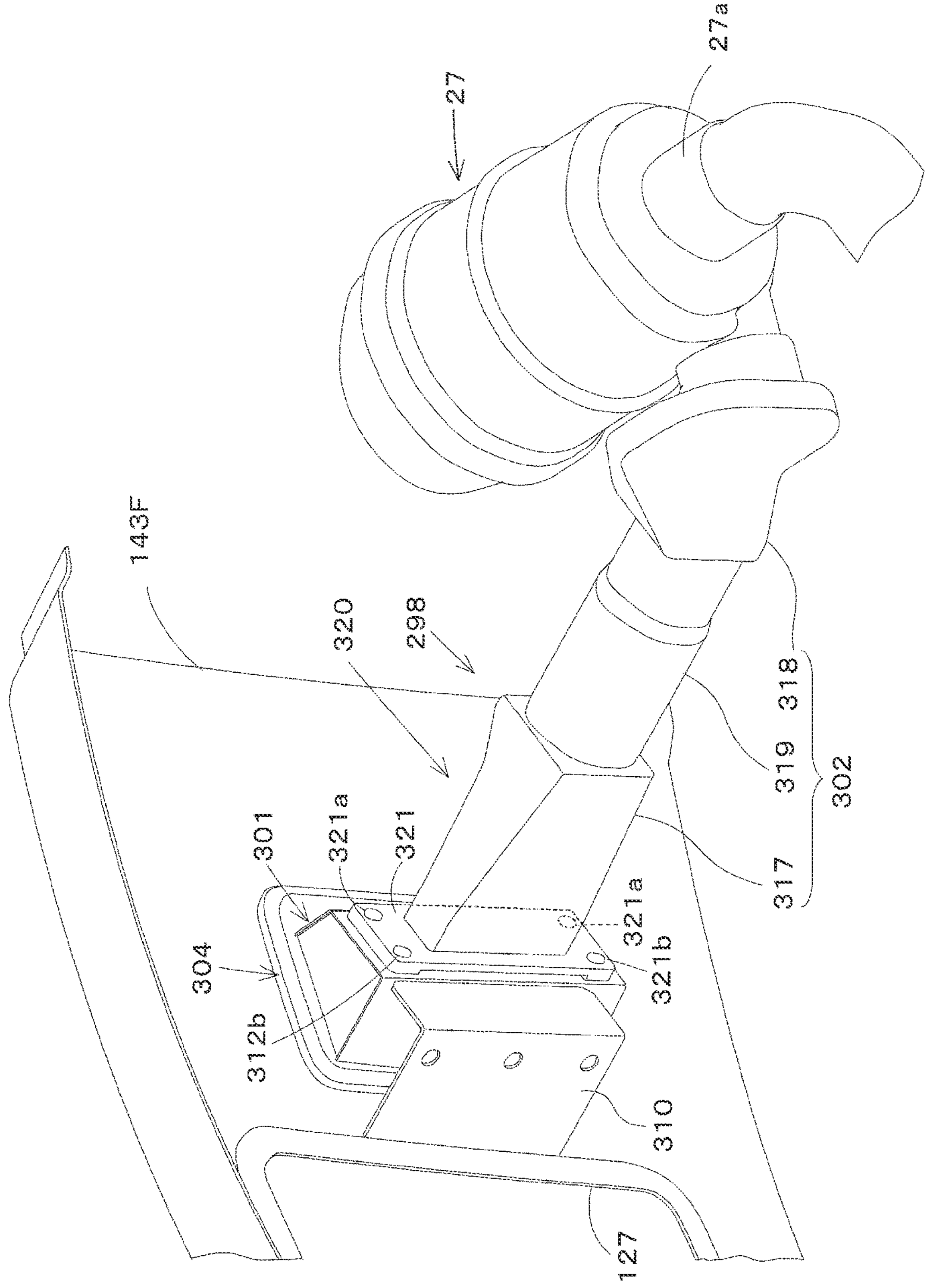
FIG. 76 is a perspective view illustrating an air cleaner and an inlet path.

The outlet path 297 has a first outlet hose 297A connected to the air cleaner 27, a second outlet hose 297B connected to an intake connection section 299 of the prime mover E1, and a connection pipe 297C that connects the first outlet hose 297A and the second outlet hose 297B to each other. Air taken into the air cleaner 27 via the inlet path 298 is guided to the intake connection section 299 via the outlet path 297 and is supplied to an intake manifold of the prime mover E1 from the intake connection section 299. As illustrated in FIG. 76, the first outlet hose 297A is connected to an outlet pipe 27*a* provided at a front end plate of the air cleaner 27.

Next, the air inlet 128 and the inlet path 298 will be described in detail.

Figure 77:
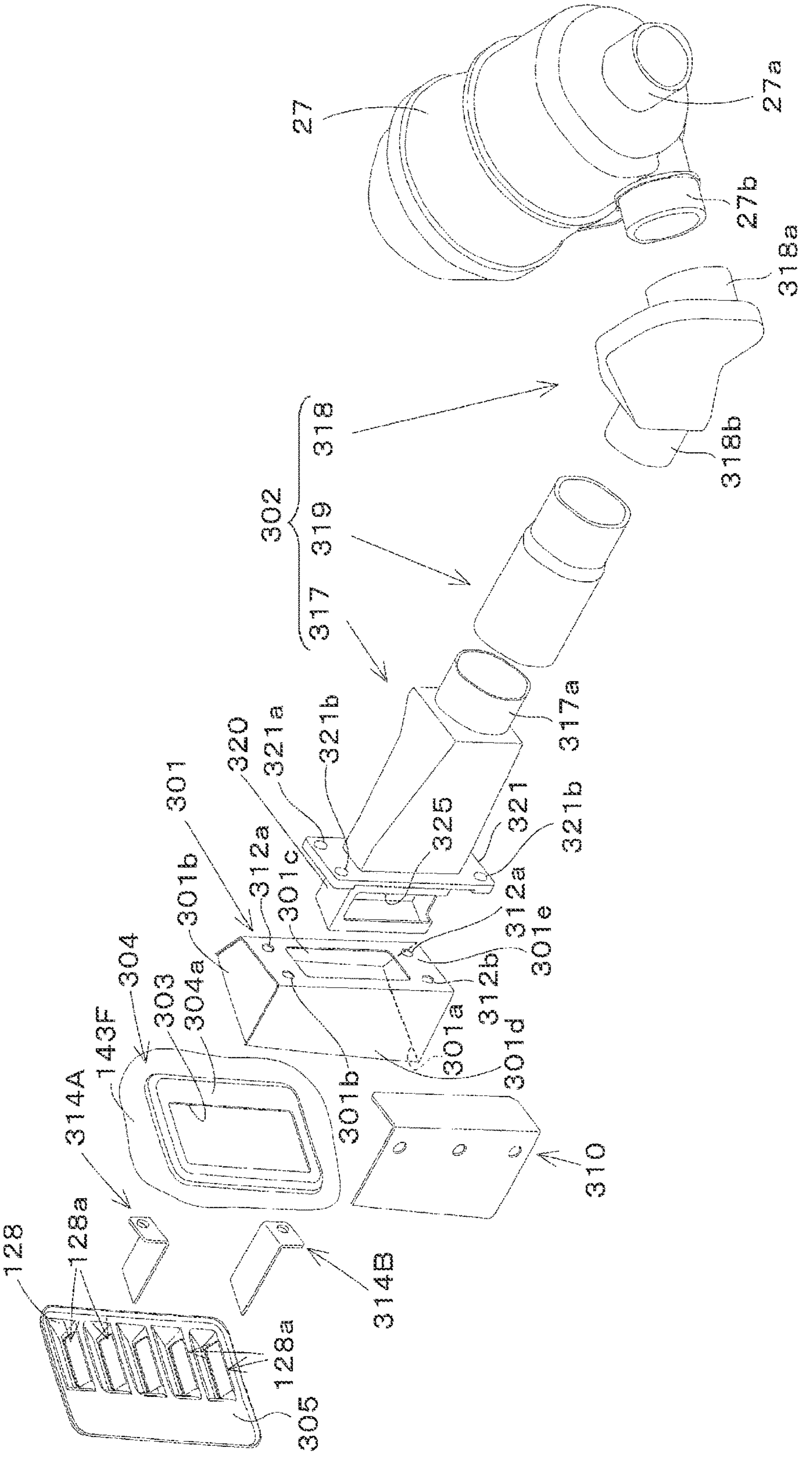
FIG. 77 is an exploded perspective view of the air cleaner and the inlet path.

As illustrated in FIG. 77, the sixth cover 143F is provided with a rectangular hole 303 that is long in the up-down direction. The hole 303 is provided in an area corresponding to the air inlet 128. In other words, the hole 303 is provided in the left portion of the sixth cover 143F and to the left of the opening 127 provided in the sixth cover 143F.

Figure 79:
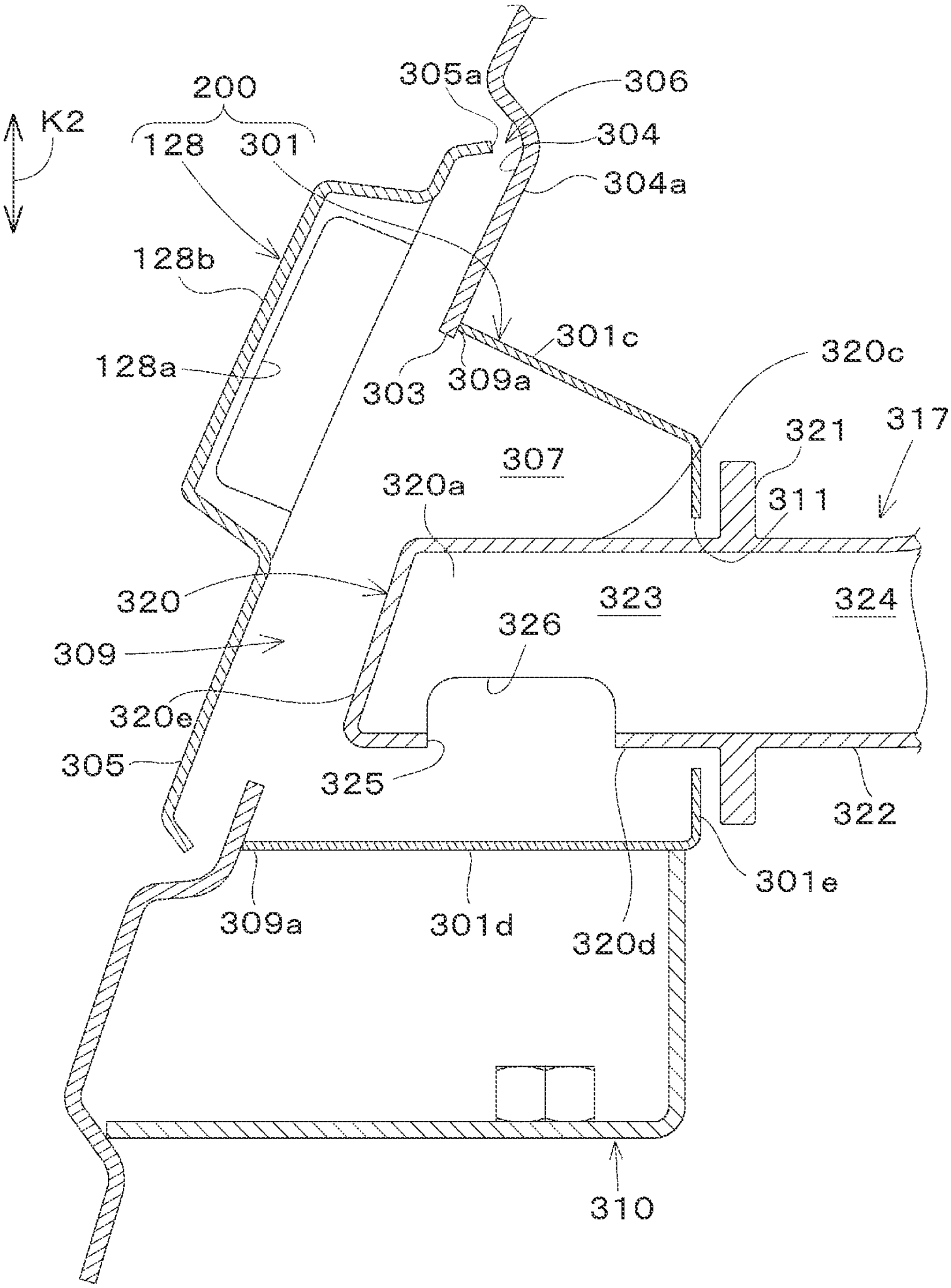
FIG. 79 is a cross-sectional plan view of an air intake area of the inlet path.
Figure 81:
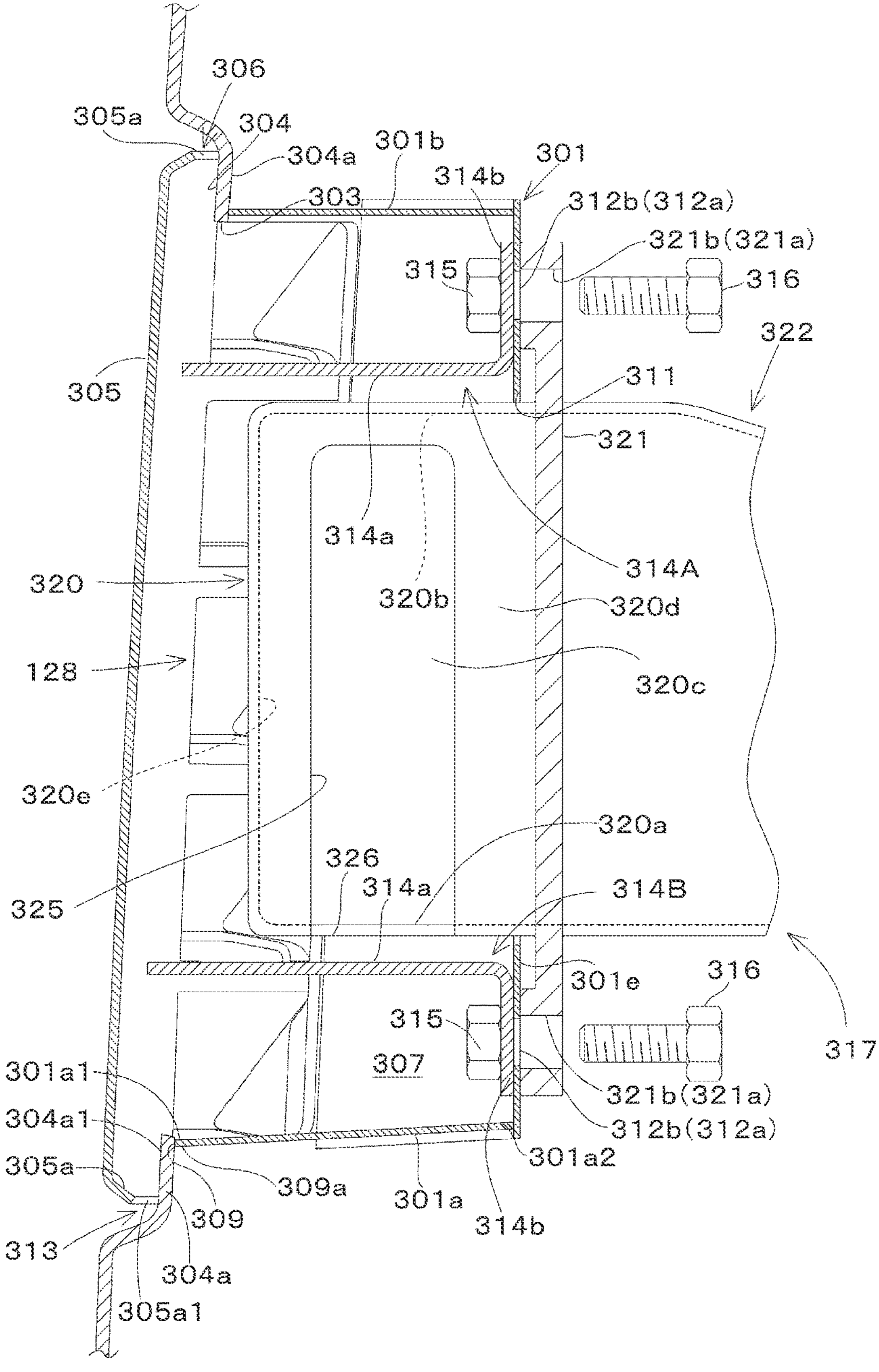
FIG. 81 is a cross-sectional side view of the air intake area of the inlet path.

As illustrated in FIG. 79 and FIG. 81, the hole 303 is provided in a front wall 304*a* of a recess 304 in the sixth cover 143F. The recess 304 is formed by recessing a wall section constituting the sixth cover 143F forward from the rear side. The hole 303 is provided in the front wall 304*a* toward the right side (toward the right side relative to the center of the front wall 304*a* in the machine-body width direction K2).

As illustrated in FIG. 79 and FIG. 81, a plate member 305 covering the hole 303 is disposed behind the recess 304. The plate member 305 has a shape corresponding to the recess 304. The plate member 305 is disposed away from the recess 304 (sixth cover 143F). In other words, the plate member 305 is disposed such that a gap 306 is provided between an outer peripheral edge 305*a* of the plate member 305 and the recess 304.

As illustrated in FIG. 81, a pair of upper and lower attachment stays 314A and 314B are secured to the plate member 305. The attachment stays 314A and 314B each have a support wall section 314*a* secured to the plate member 305 and extending forward, and an attachment wall section 314*b* extending in the up-down direction from the support wall section 314*a*. A nut 315 is secured to the rear surface of the attachment wall section 314*b*. Each of the attachment stays 314A and 314B is attached to an air intake box 301, to be described later, by using a bolt 316 screwed to the nut 315.

Figure 82:
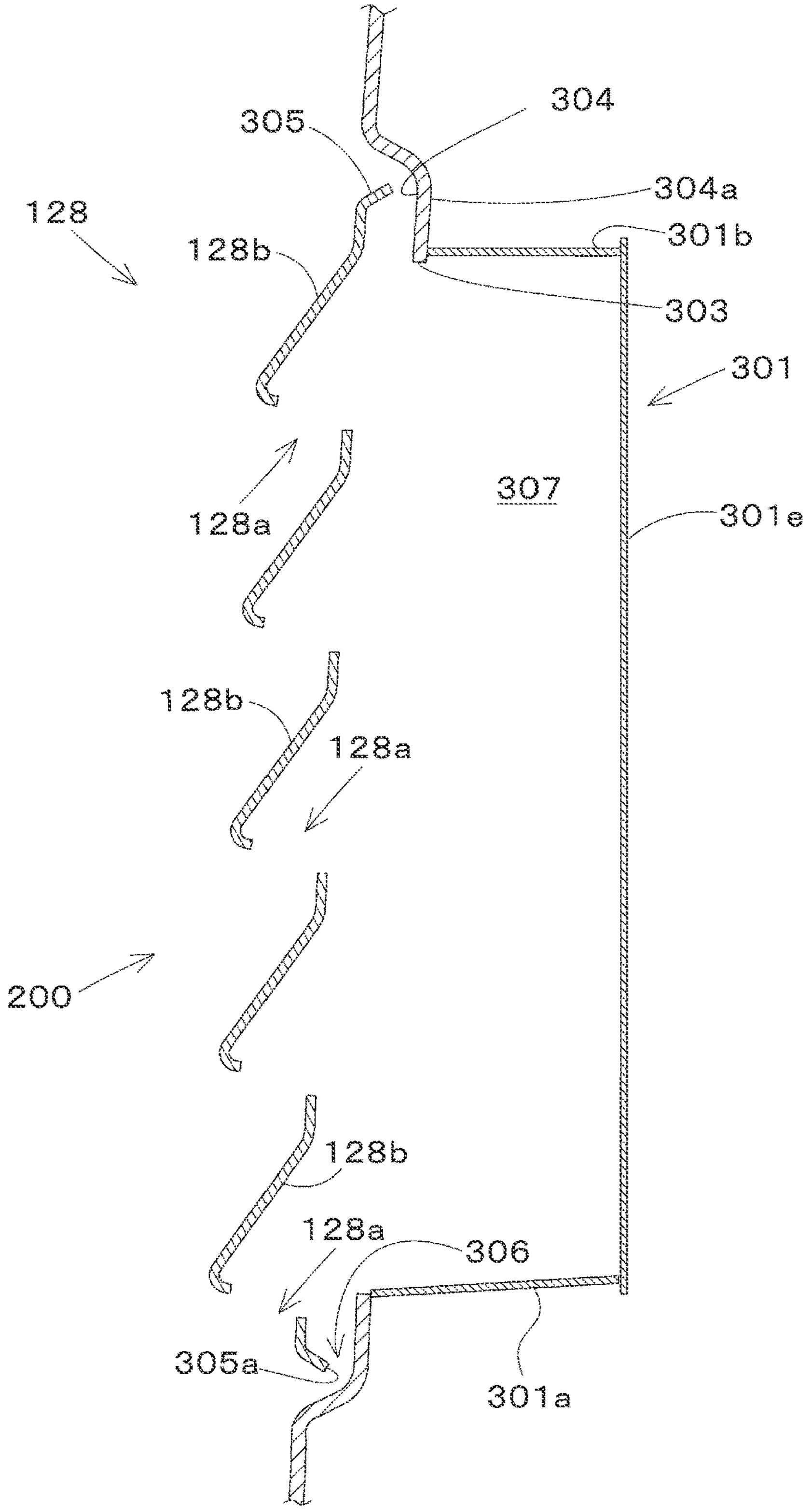
FIG. 82 is a cross-sectional side view of an air intake portion.

As illustrated in FIG. 77 and FIG. 82, the air inlet 128 is provided in the plate member 305. The air inlet 128 is provided in the plate member 305 toward the left side relative to the center of the plate member 305 in the machine-body width direction K2. As illustrated in FIG. 82, the air inlet 128 is louvered. Specifically, the air inlet 128 has through-holes 128*a* that allow air to travel therethrough and inclined walls 128*b* covering the upper side of the through-holes 128*a*. The plurality of through-holes 128*a* and the plurality of inclined walls 128*b* are arranged in the up-down direction. Air outside the sixth cover 143F (hood 201) is taken in via the through-holes 128*a*.

The air inlet 128 may be integrated with the sixth cover 143F (hood 201).

As illustrated in FIG. 76 and FIG. 77, the inlet path 298 has an air intake box 301 and a connection duct 302 that connects the air intake box 301 and the air cleaner 27 to each other.

As illustrated in FIG. 74, the air intake box 301 is provided at the sixth cover 143F (hood 201) at the opposite side of the prime mover E1 from the cooling fan 14.

As illustrated in FIG. 44 and FIG. 45, air taken in from the air inlet 128 is introduced to the air intake box 301. In other words, the air intake box 301 defines an air intake chamber 307 that takes in air outside the sixth cover 143F (hood 201).

As illustrated in FIG. 75, the air inlet 128 and the air intake box 301 constitute an outside-air intake portion 200 provided in the hood 201. The outside-air intake portion 200 and the air cleaner 27 are connected to each other by the connection duct 302, so that outside air suctioned by the air cleaner 27 is introduced to the outside-air intake portion 200, and the outside air introduced to the outside-air intake portion 200 is suctioned into the air cleaner 27 via the connection duct 302. Therefore, the intake structure 296 may be regarded in another way that the intake structure 296 has the air cleaner 27, the outside-air intake portion 200 that takes in air (outside air) suctioned by the air cleaner 27, the connection duct 302 that guides the air taken in from the outside-air intake portion 200 to the air cleaner 27, and the outlet path 297 that guides the air from the air cleaner 27 to the prime mover E1.

As illustrated in FIG. 79 and FIG. 81, the air intake box 301 has a bottom wall 301*a* defining the lower surface of the air intake chamber 307, an upper wall 301*b* defining the upper surface of the air intake chamber 307, a first side wall 301*c* defining the left surface of the air intake chamber 307, a second side wall 301*d* defining the right surface of the air intake chamber 307, and a front wall 301*e* defining the front surface of the air intake chamber 307, and has a rear opening. Therefore, the air intake box 301 has an opening 309 oriented toward the sixth cover 143F (hood 201) and communicating with the air inlet 128.

As illustrated in FIG. 79 and FIG. 81, an opening edge 309*a* (rear edges of the bottom wall 301*a*, upper wall 301*b*, first side wall 301*c*, and second side wall 301*d*) defining the opening 309 is secured to the inner surface of the sixth cover 143F (hood 201), so that the air intake box 301 is provided at the sixth cover 143F. The opening 309 faces the hole 303, and the opening edge 309*a* is secured around the hole 303 by welding. In other words, in this embodiment, the air intake box 301 is secured to the sixth cover 143F (hood 201) by welding. Accordingly, the air intake box 301 and the prime mover room E2 are separated from each other, so that the hot air in the prime mover room E2 can be prevented from being taken into the air intake chamber 307. In other words, the hot air in the prime mover room E2 can be prevented from being suctioned into the prime mover E1. Furthermore, even in the configuration where the inlet path 298 is disposed at the downstream side of the cooling air F1 of the exhaust gas purifier 26, the hot air at the exhaust gas purifier 26 side is prevented from being taken in. Moreover, the air intake box 301 can suppress outward leakage of noise in the prime mover room E2 (noise of, for example, the prime mover E1 and the cooling fan 14) through the air inlet 128.

In this embodiment, the air intake chamber 307 communicates with the air inlet 128 via the opening 309 and the hole 303, and air taken in through the air inlet 128 is introduced to the air intake chamber 307 via the opening 309 and the hole 303.

The air intake box 301 is not limited to being attached to the sixth cover 143F by welding. For example, the opening edge 309*a* may be brought into abutment with the periphery of the hole 303 via a seal member, and a stay member secured to the air intake box 301 may be secured to a boss member secured to the sixth cover 143F by using a bolt, so that the air intake box 301 is detachably attached to the sixth cover 143F.

As illustrated in FIG. 81, the bottom wall 301*a* has a first edge 301*a*1 and a second edge 301*a*2. The first edge 301*al* is a portion of the opening edge 309*a* and is the rear edge of the bottom wall 301*a* in this embodiment. The second edge 301*a*2 is opposite the first edge 301*a*1 and is the front edge of the bottom wall 301*a* in this embodiment. The bottom wall 301*a* is inclined downward as the bottom wall 301*a* extends (rearward) from the second edge 301*a*2 toward the first edge 301*a*1.

As illustrated in FIG. 81, the sixth cover 143F (hood 201) is provided with a drain section 313 that allows water moving on the bottom wall 301*a* to travel outward from the sixth cover 143F (hood 201). In this embodiment, the drain section 313 is a gap between a lower edge 305*al* of the plate member 305 and a peripheral wall 304*al* (front wall 304*a* of the recess 304) surrounding the hole 303 and is a portion of the gap 306 between the outer peripheral edge 305*a* of the plate member 305 and the recess 304.

In this embodiment, the bottom wall 301*a* is downwardly inclined rearward and is provided with the drain section 313, so that if water, such as car-wash water or rainwater, enters the air intake box 301 (air intake chamber 307) through the air inlet 128, the water can be discharged outward from the sixth cover 143F (hood 201).

If the air inlet 128 is to be integrated with the sixth cover 143F (hood 201), the lowermost through-hole 128*a* of the air inlet 128 may serve as the drain section 313.

Figure 78:
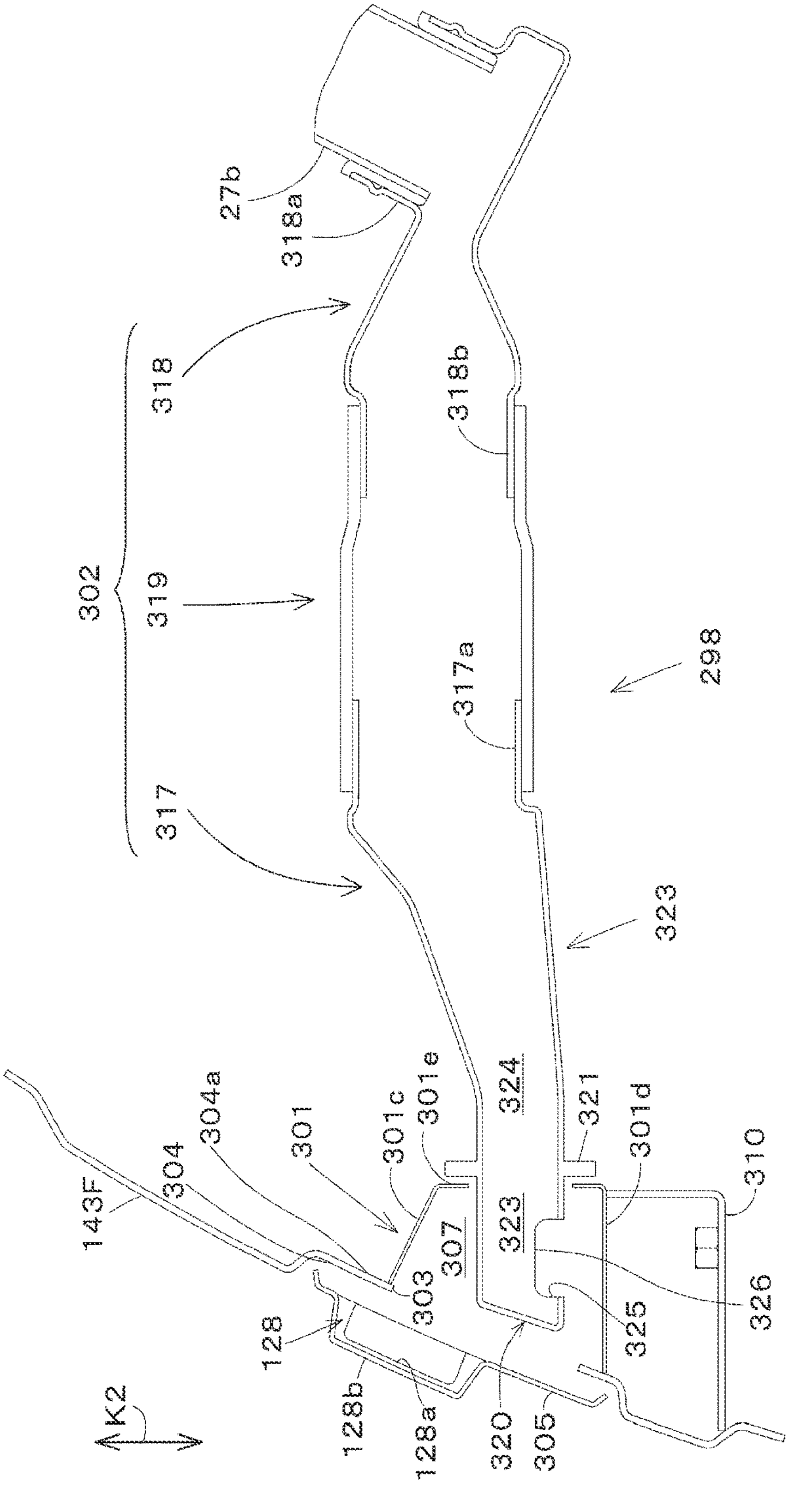
FIG. 78 is a cross-sectional plan view of the inlet path.

As illustrated in FIG. 78 and FIG. 79, the second side wall 301*d* of the air intake box 301 is secured to a bracket member 310 secured to the sixth cover 143F. A striker engaging with a latch provided at the seventh cover 143G is attached to the bracket member 310.

Figure 80:
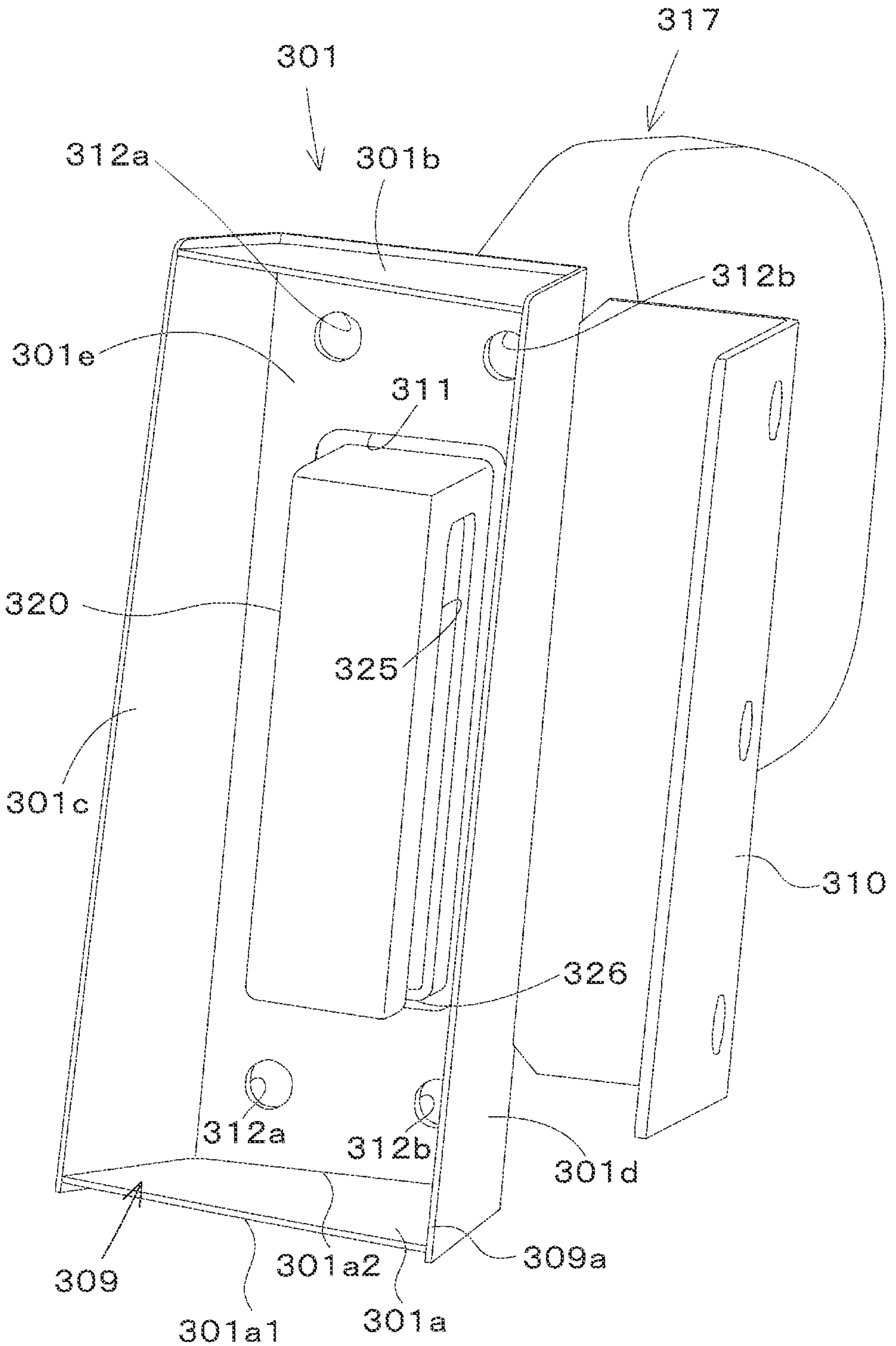
FIG. 80 is a perspective view of an air intake box.

As illustrated in FIG. 79, FIG. 80, and FIG. 81, the front wall 301*e* of the air intake box 301 is provided with a rectangular insertion hole 311 that is long in the up-down direction. The upper and lower portions of the front wall 301*e* are provided with a pair of left and right bolt insertion holes 312*a* and 312*b*. A nut (not illustrated) is secured to the rear surface of the front wall 301*e* at a position corresponding to the right bolt insertion hole 312*b*.

As illustrated in FIG. 76, FIG. 77, and FIG. 78, the connection duct 302 has a first duct member 317 connected to the air intake box 301, a second duct member 318 connected to the air cleaner 27, and a third duct member 319 that connects the first duct member 317 and the second duct member 318 to each other.

As illustrated in FIG. 76, FIG. 77, and FIG. 78, the first duct member 317 has an insertion section 320, a flanged section 321, and a main duct section 322. The insertion section 320, the flanged section 321, and the main duct section 322 are disposed in that order from the rear side toward the front side.

As illustrated in FIG. 79 and FIG. 81, the insertion section 320 is inserted into the air intake box 301 (air intake chamber 307) via the insertion hole 311 provided in the front wall 301*e* of the air intake box 301. The insertion section 320 is offset in the horizontal direction from the air inlet 128. As illustrated in FIG. 78 and FIG. 79, in this embodiment, the insertion section 320 is offset rightward (in the machine-body width direction K2) from the air inlet 128, but is not limited thereto. For example, the insertion section 320 may be offset upward from the air inlet 128.

As illustrated in FIG. 79 and FIG. 81, the insertion section 320 has a lower wall 320*a* defining the lower surface of an internal space 323 of the insertion section 320, an upper wall 320*b* defining the upper surface of the internal space 323, a first side wall 320*c* defining the left surface of the internal space 323, a second side wall 320*d* defining the right surface of the internal space 323, and a rear wall 320*e* defining the rear surface of the internal space 323. The internal space 323 has a front opening and communicates with an internal space 324 of the main duct section 322.

The connection side for the air intake box 301 is provided with a suction port 325 that suctions air in the air intake chamber 307 into the connection duct 302. In this embodiment, the suction port 325 is provided in a wall (second side wall 320*d*) of the insertion section 320 located at the far side from the air inlet 128 in the horizontal direction (machine-body width direction K2). In other words, the suction port 325 is provided in the wall of the insertion section 320 located opposite the air inlet 128. Specifically, the suction port 325 is provided in the second side wall 320*d* of the insertion section 320. Therefore, the suction port 325 is provided in the air intake chamber 307 at a position offset in the horizontal direction (upward) from the air inlet 128. The suction port 325 is oriented away (rightward) from the air inlet 128 in the machine-body width direction K2.

With the suction port 325 being provided at the position offset in the horizontal direction (or upward) from the air inlet 128, even when water, such as car-wash water or rainwater, enters the air intake chamber 307 through the air inlet 128, the water can be prevented from being suctioned through the suction port 325. Furthermore, with the insertion section 320 being offset rightward from the air inlet 128 and the suction port 325 being provided in the wall oriented toward the right side of the insertion section 320, water can be prevented from being suctioned through the suction port 325 more reliably. The air inlet 128 and the suction port 325 are positionally displaced from each other, thereby suppressing leakage of sound from the prime mover room E2 directly to the outside of the hood 201.

As illustrated in FIG. 81, the suction port 325 extends through the second side wall (wall section) 320*d* of the insertion section 320 and extends upward from the lower end of the second side wall 320*d* to near the upper wall 320*b*. The suction port 325 has a rectangular shape that is long in the up-down direction.

As illustrated in FIG. 79, the lower wall 320*a* of the insertion section 320 is provided with a cutout 326. The cutout 326 communicates with the lower end of the suction port 325. In other words, the suction port 325 and the cutout 326 are continuous. With the cutout 326 provided, if condensation occurs in the insertion section 320, the condensation water can be discharged.

As illustrated in FIG. 76 and FIG. 77, the flanged section 321 extends outward from the first duct member 317. As illustrated in FIG. 76, the upper and lower portions of the flanged section 321 are provided with a pair of left and right bolt insertion holes 321*a* and 321*b*. As illustrated in FIG. 81, the bolt insertion hole 321*a* is aligned with the bolt insertion hole 312*a*, and the bolt insertion hole 321*b* is aligned with the bolt insertion hole 312*b*. The flanged section 321 is secured to the front wall 301*e* of the air intake box 301 by using the bolts 316. The bolt 316 inserted through the right bolt insertion hole 321*b* and the right bolt insertion hole 312*b* is screwed to a nut secured to the rear surface of the front wall 301*e*. The bolt 316 inserted through the left bolt insertion hole 321*a* and the left bolt insertion hole 312*a* is screwed to the nut 315 secured to the rear surface of the attachment wall section 314*b* of each of the attachment stays 314A and 314B. When the plate member 305 is to be removed, each bolt 316 screwed to the corresponding nut 315 is unfastened. Accordingly, the plate member 305 can be removed while the first duct member 317 remains connected to the air intake box 301. The plate member 305 can be removed by, for example, opening the eighth cover 143H or the seventh cover 143G.

The rear portion of the first duct member 317 is provided with a connection pipe 317*a* connected to the third duct member 319.

The second duct member 318 has the front portion thereof provided with a connection pipe 318*a* connected to an inlet pipe 27*b* of the air cleaner 27 and the rear portion thereof provided with a connection pipe 318*b* connected to the third duct member 319. The second duct member 318 narrows midway between the connection pipe 318*b* and the connection pipe 318*a*.

The first duct member 317 and the second duct member 318 are each composed of a rigid material.

Figure 83:
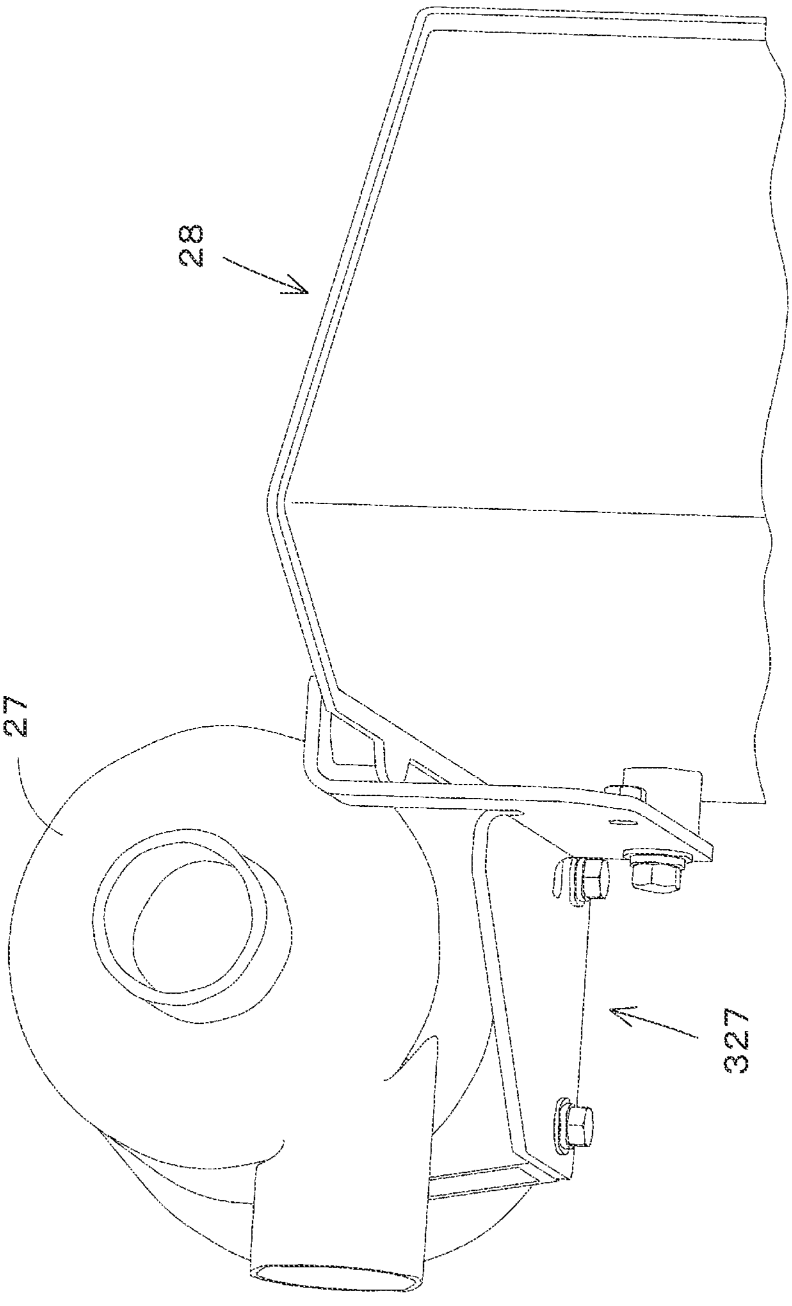
FIG. 83 is a perspective view of an area where the air cleaner is attached.

The third duct member 319 is composed of an elastic material, such as rubber. The third duct member 319 composed of an elastic material can compensate for an assembly error between the first duct member 317 and the second duct member 318. Specifically, as illustrated in FIG. 83, the air cleaner 27 is attached to an attachment bracket 327 attached to the hydraulic fluid tank 28. The air intake box 301 is secured to the hood 201. Therefore, although an assembly error may possibly occur between the first duct member 317 and the second duct member 318, the assembly error can be compensated for by the third duct member 319 composed of an elastic material.

The third duct member 319 narrows at the front portion thereof (before the area connected to the second duct member 318).

The connection duct 302 does not increase the flow speed of suctioned air from the first duct member 317 to the second duct member 318, but increases the flow speed of suctioned air from the front portion of the third duct member 319 to the inlet pipe 27*b* of the air cleaner 27 so that the air is smoothly taken into the air cleaner 27.

Next, an exhaust structure 331 that discharges exhaust gas discharged from the prime mover E1 outward from the prime mover room E2 will be described.

Figure 84:
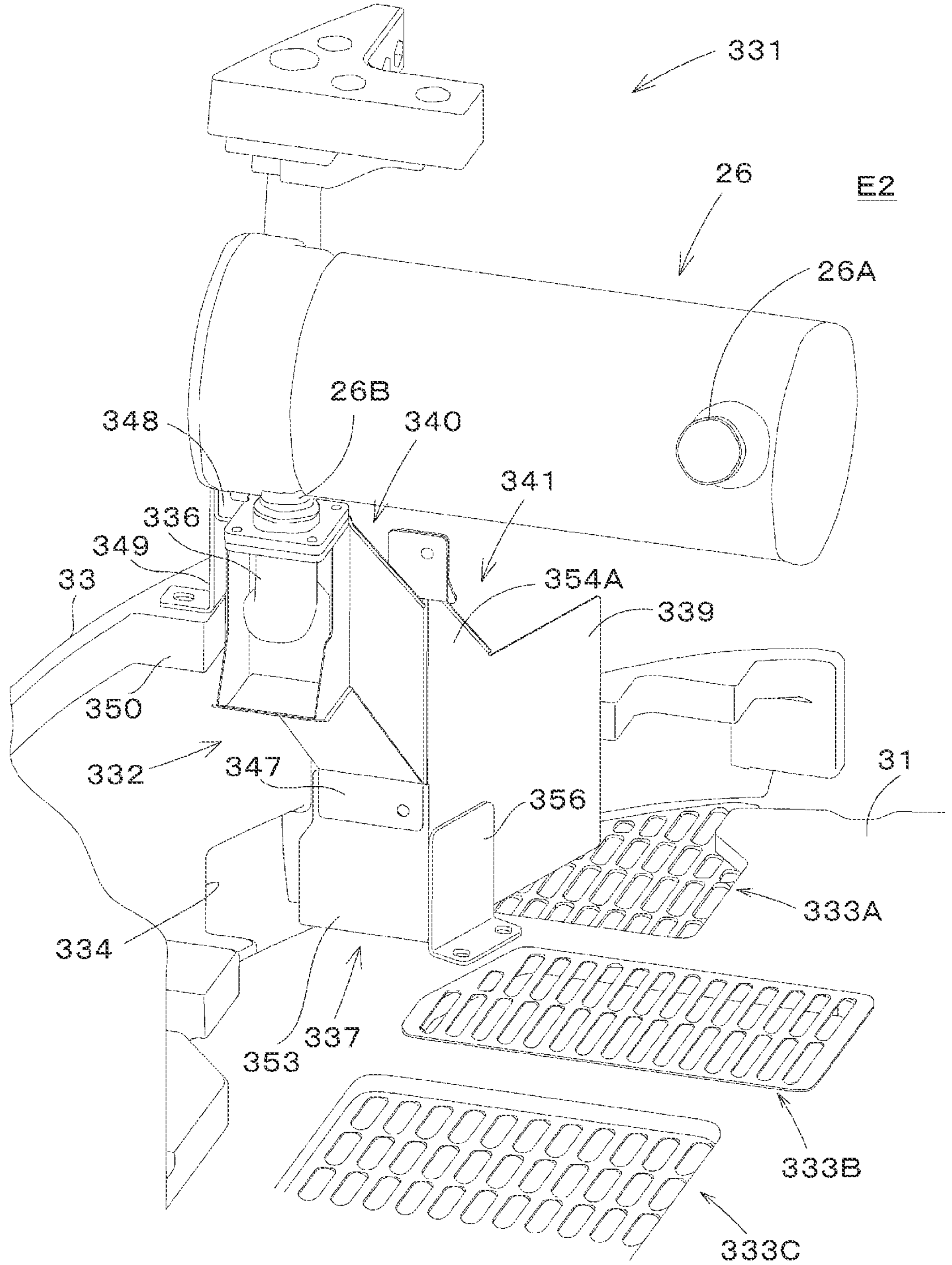
FIG. 84 is a perspective view of the intake structure, as viewed from inside the prime mover room.

As illustrated in FIG. 84, the swivel substrate 31 is provided with a plurality of discharge portions 333A, 333B, and 333C that discharge the cooling air F1 outward from the machine body 2 after the cooling air F1 has cooled, for example, the prime mover E1. The discharge portions 333A, 333B, and 333C fluidly connect the inside and the outside of the prime mover room E2 to each other at the bottom (lower end) of the machine body 2. Each of the discharge portions 333A, 333B, and 333C is formed of a plate member attached to the swivel substrate 31 and having multiple holes provided in the front-rear direction K1 and the machine-body width direction K2. The discharge portions 333A, 333B, and 333C are provided at the rear and left portions of the swivel substrate 31 (at the lower end of the machine body 2 and at the downstream side of the cooling air for the prime mover E1).

As illustrated in FIG. 75, the cooling fan 14 delivers the cooling air F1 from one side toward the other side in the machine-body width direction K2. In this embodiment, the cooling fan 14 delivers the cooling air F1 from right to left.

The cooling air F1 (see FIG. 75) delivered from the cooling fan 14 toward the prime mover E1 travels around the prime mover E1 (the upper, lower, front, and rear sides of the prime mover E1), passes through the discharge portions 333A, 333B, and 333C provided at the swivel substrate 31, and is discharged downward from the machine body 2. The discharge portion (second discharge portion) 333A also discharges a gas mixture having a mixture of the exhaust gas discharged from the exhaust gas purifier 26 and the cooling air F1.

As illustrated in FIG. 38 and FIG. 84, the left portion of the weight 33 defining the rear portion of the machine body 2 is also provided with a discharge portion (first discharge portion) 334 that fluidly connects the inside and the outside of the prime mover room E2 to each other at the lower end of the machine body 2. The discharge portion 334 discharges the gas mixture having the mixture of the exhaust gas discharged from the exhaust gas purifier 26 and the cooling air F1. The discharge portion 334 is formed by cutting out the weight 33 upward from the lower surface of the weight 33.

As illustrated in FIG. 84, the exhaust structure 331 is disposed inside the prime mover room E2 and includes the exhaust gas purifier 26, an exhaust pipe 336, and a flow straightener 332.

The exhaust gas purifier 26 has an exhaust inlet 26A provided at the front portion and an exhaust outlet 26B provided at the rear portion. The exhaust inlet 26A is where exhaust gas discharged from the prime mover E1 is taken in. The exhaust outlet 26B is where purified exhaust gas (purified gas) is discharged. The exhaust outlet 26B extends downward from the lower surface at the rear end of the exhaust gas purifier 26 and is oriented downward.

Figure 86:
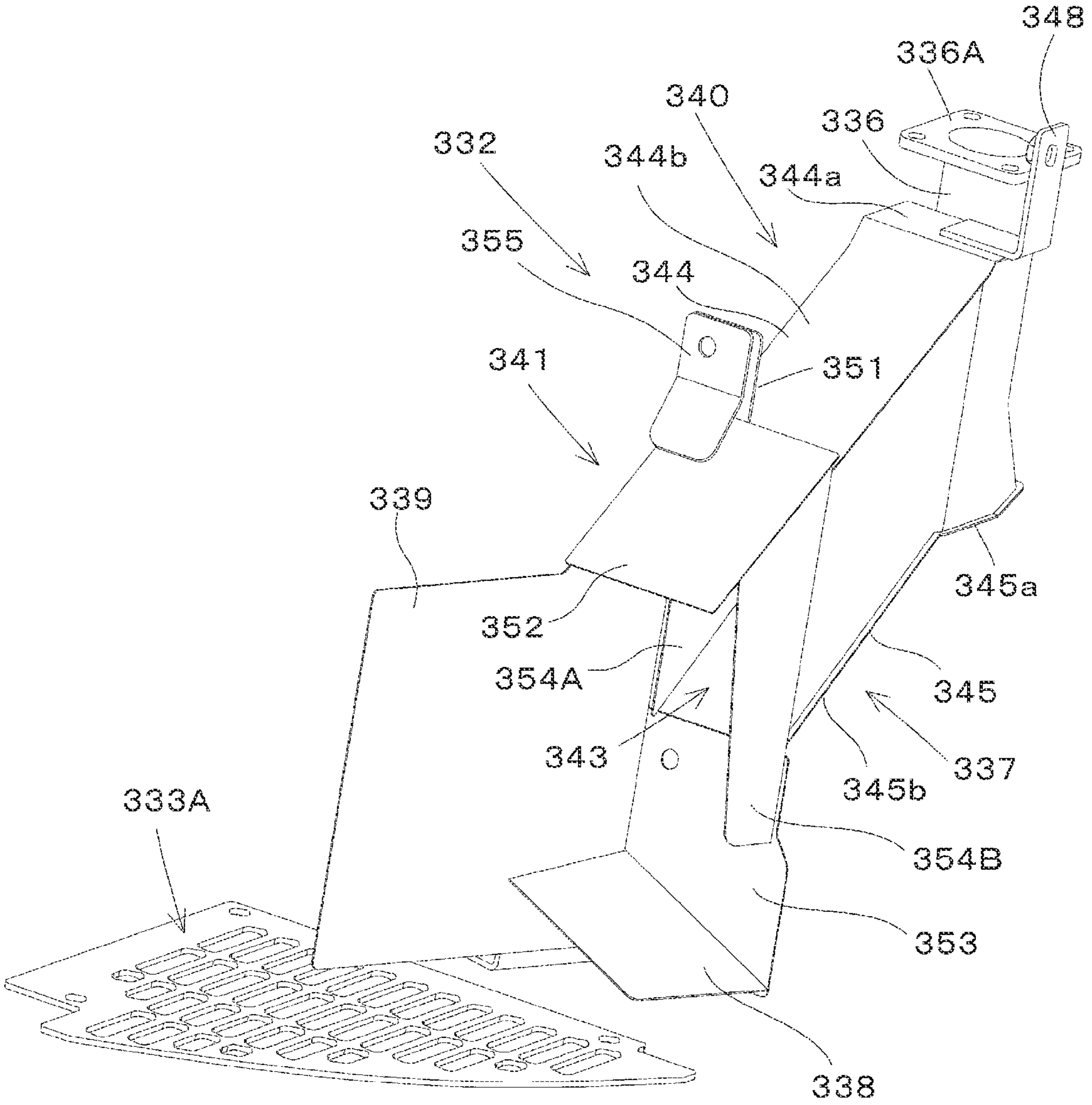
FIG. 86 is a perspective view of a flow straightener.

As illustrated in FIG. 86, the exhaust pipe 336 is disposed below the exhaust outlet 26B and is flange-connected to the exhaust outlet 26B by using a flange 26C of the exhaust outlet 26B and a flange 336A of the exhaust pipe 336.

Figure 87:
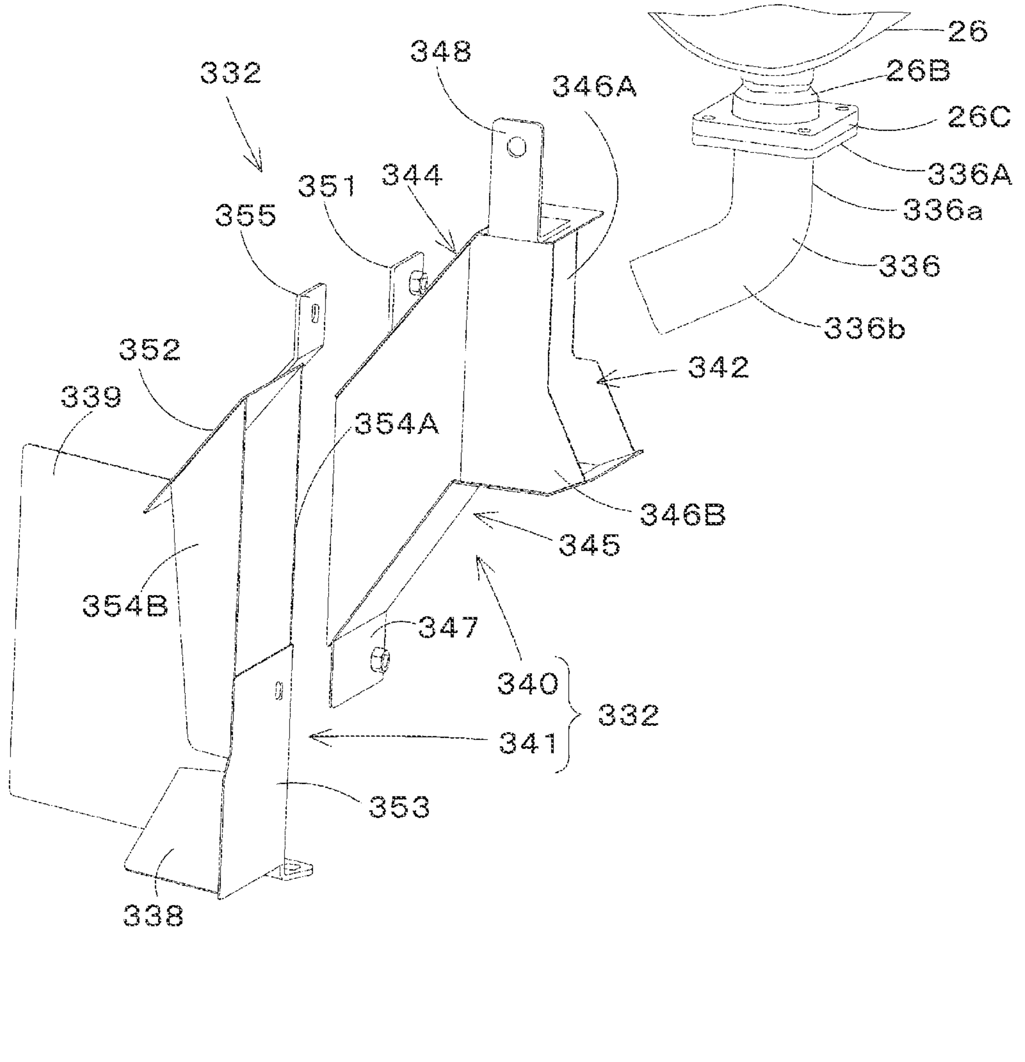
FIG. 87 is an exploded perspective view of the flow straightener.
Figure 89:
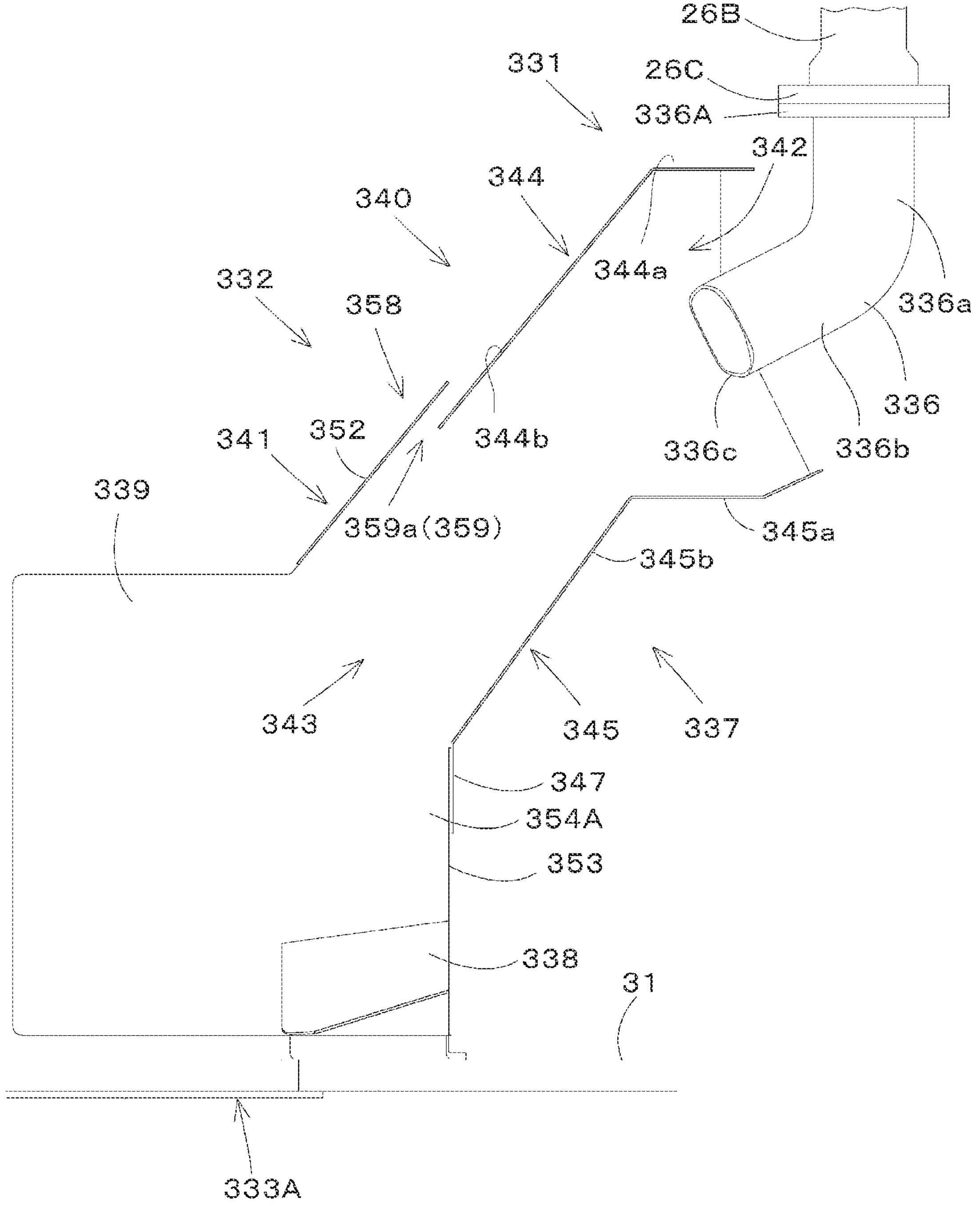
FIG. 89 is a cross-sectional rear view of the flow straightener.
Figure 90:
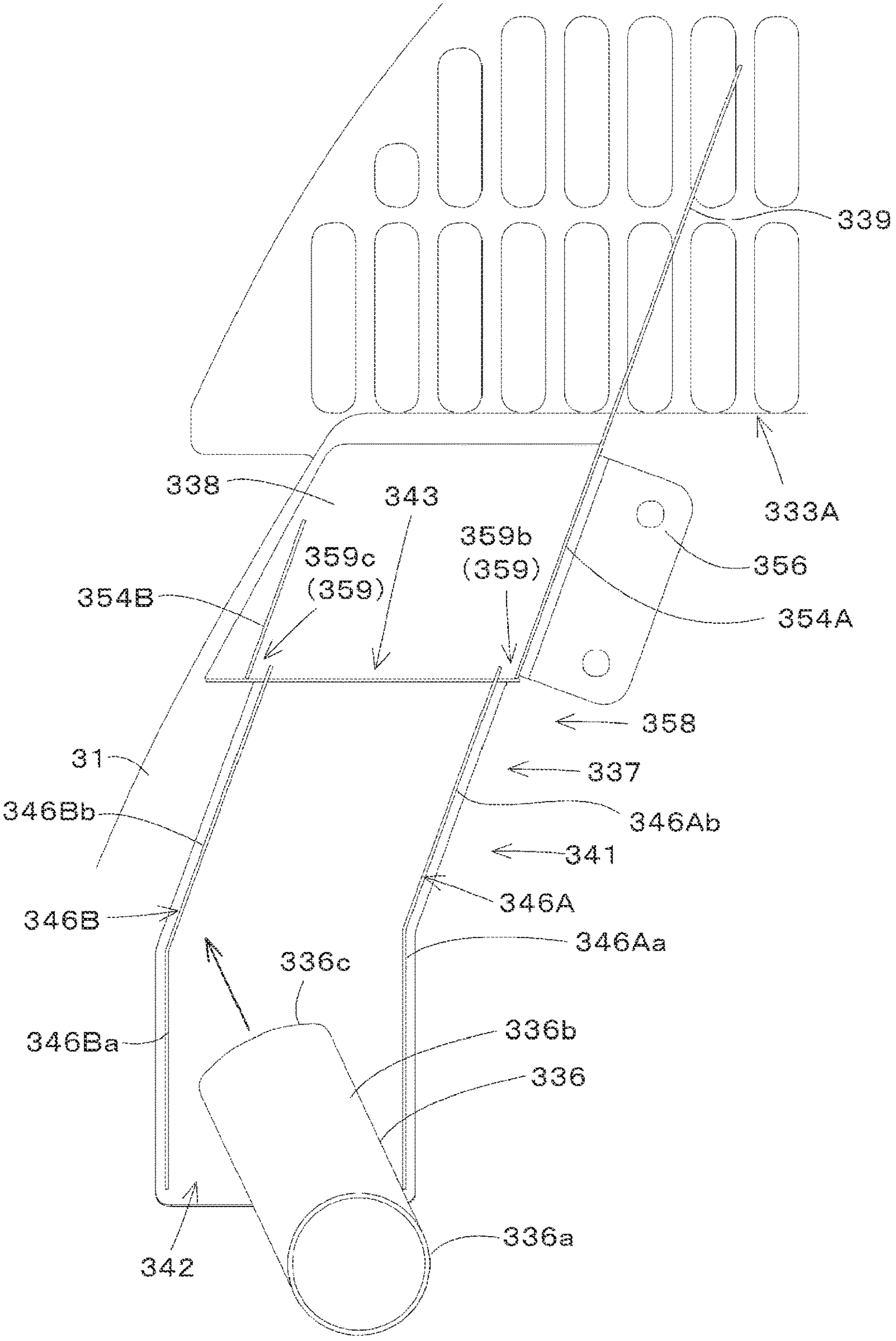
FIG. 90 is a plan view of the flow straightener from which some members are omitted.

As illustrated in FIG. 87 and FIG. 89, the exhaust pipe 336 has a first pipe section 336*a* and a second pipe section 336*b*. The first pipe section 336*a* extends vertically downward from the flange 336A. The second pipe section 336*b* extends downstream of the cooling air F1 from the first pipe section 336*a*. The exhaust pipe 336 is disposed inside the prime mover room E2 and in a space therein that is not separated from the space where the prime mover E1 is disposed. Therefore, the exhaust pipe 336 discharges the exhaust gas discharged from the exhaust gas purifier 26 to the internal space of the prime mover room E2 (the space in the prime mover room E2 not separated from the space where the prime mover E1 is disposed). Specifically, the second pipe section 336*b* is inclined downward as the second pipe section 336*b* extends leftward, as illustrated in FIG. 89, and is inclined rearward as the second pipe section 336*b* extends leftward, as illustrated in FIG. 90. The exhaust pipe 336 discharges the exhaust gas from the exhaust gas purifier 26 downstream from the upstream side of the cooling air F1.

Since the exhaust gas of the prime mover E1 is cleaned by being purified by the exhaust gas purifier 26, the exhaust gas discharged from the exhaust gas purifier 26 via the exhaust pipe 336 is released into the internal space of the prime mover room E2 in the working machine 1 according to this embodiment. However, the exhaust gas discharged from the exhaust gas purifier 26 increases in temperature during the purification process performed by the exhaust gas purifier 26. Moreover, the exhaust pipe 336 is located away from (distant from) the discharge portions 333A and 334. If the exhaust gas discharged from the exhaust pipe 336 is released into the internal space of the prime mover room E2, for example, the prime mover E1 and the hydraulic pump 25 may possibly be adversely affected by the heat. In this embodiment, the exhaust gas discharged from the exhaust pipe 336 is guided to the discharge portions (the discharge portion 334 and the discharge portion 333A) by the flow straightener 332, so that the exhaust gas discharged from the exhaust pipe 336 does not strike against, for example, the prime mover E1 and the hydraulic pump 25. When the exhaust gas is to be guided to the discharge portions 334 and 333A, the exhaust gas discharged from the exhaust pipe 336 and the cooling air F1 are mixed with each other to reduce the exhaust temperature. In other words, the flow straightener 332 guides the gas mixture having the mixture of the exhaust gas discharged from the exhaust pipe 336 and the cooling air F1 to the discharge portions 334 and 333A.

As illustrated in FIG. 84 to FIG. 88, the flow straightener 332 has a cylindrical flow straightener body 337, a guide plate 338, and an extension plate 339. The flow straightener body 337 guides the gas mixture from the exhaust pipe 336 to near the discharge portions 334 and 333A (or to a position located away from the discharge portions 334 and 333A by a predetermined distance) and releases the gas mixture near the discharge portions 334 and 333A (or at a position located away from the discharge portions 334 and 333A by a predetermined distance). The guide plate 338 guides the gas mixture released from the flow straightener body 337 to the discharge portion (first discharge portion) 334. The extension plate 339 guides the gas mixture released from the flow straightener body 337 to the discharge portion (second discharge portion) 333A.

Figure 88:
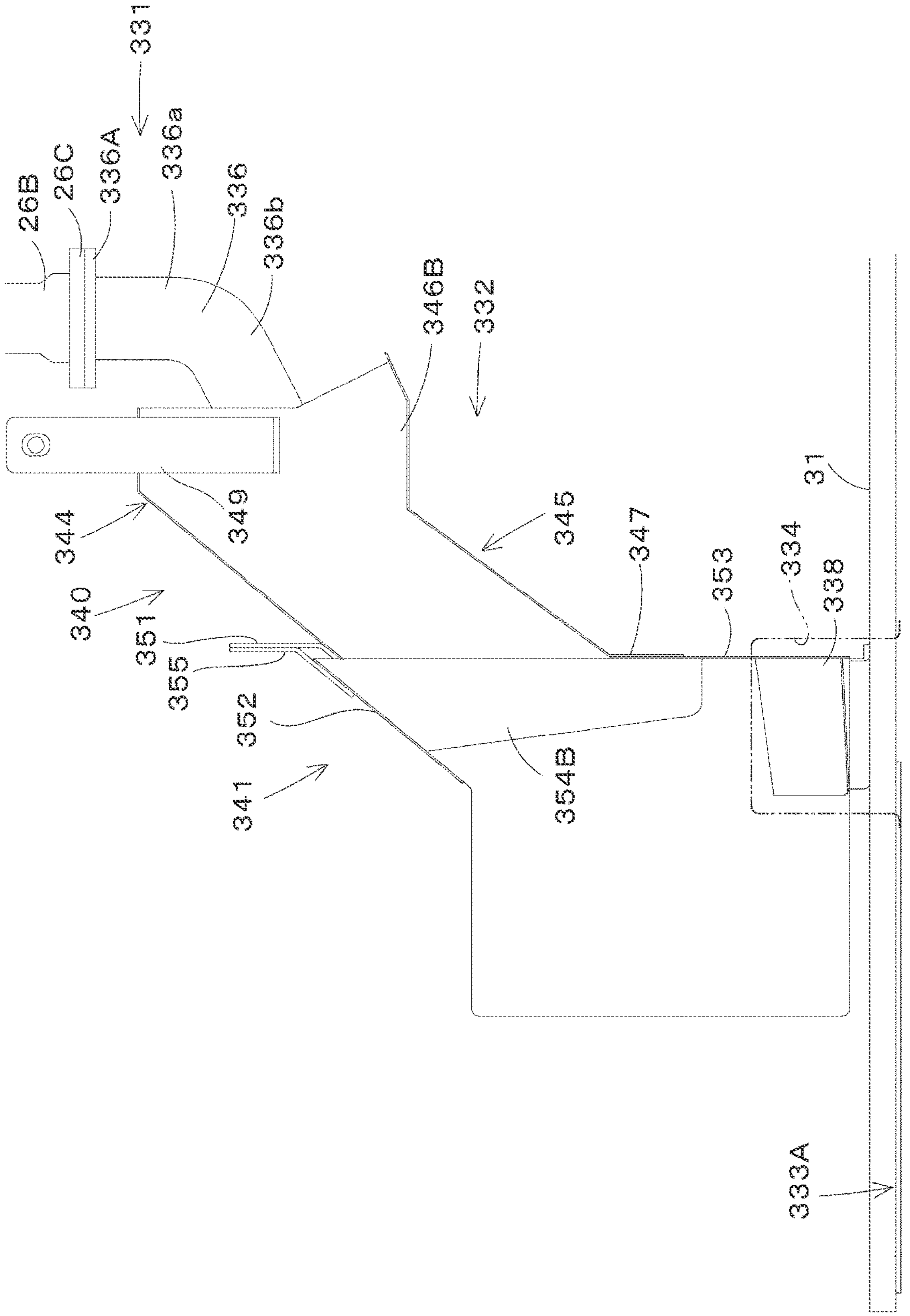
FIG. 88 is a rear view of the flow straightener.

As illustrated in FIG. 88, the flow straightener body 337 is inclined downward from the exhaust pipe 336 toward the discharge portions 334 and 333A as the flow straightener body 337 extends toward the other side (leftward).

As illustrated in FIG. 87 and FIG. 88, the flow straightener body 337 has a first component body 340 and a second component body 341 disposed at the downstream side (the other side) of the cooling air F1 relative to the first component body 340. The first component body 340 and the second component body 341 are connected to each other. In other words, the second component body 341 is connected to a position of the first component body 340 located at the other side.

Figure 91:
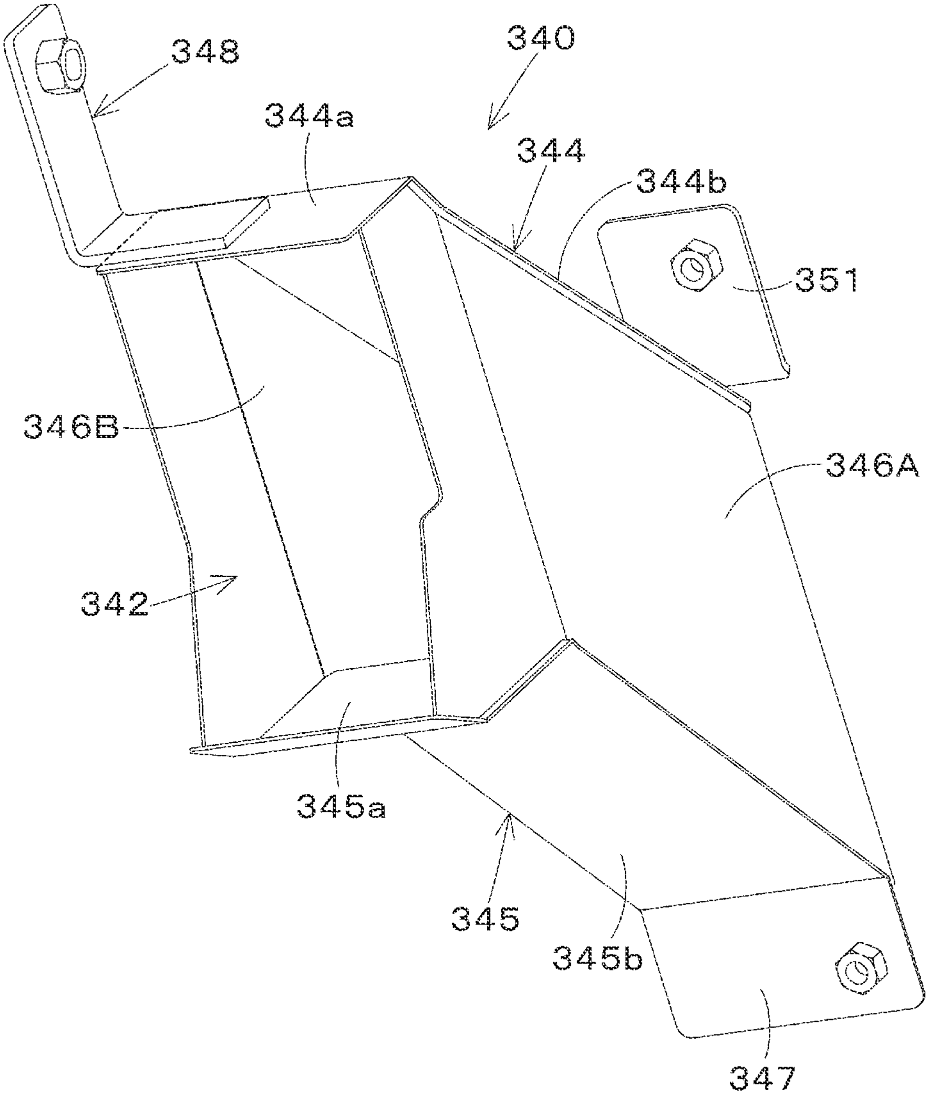
FIG. 91 is a perspective view of a first component body.
Figure 92:
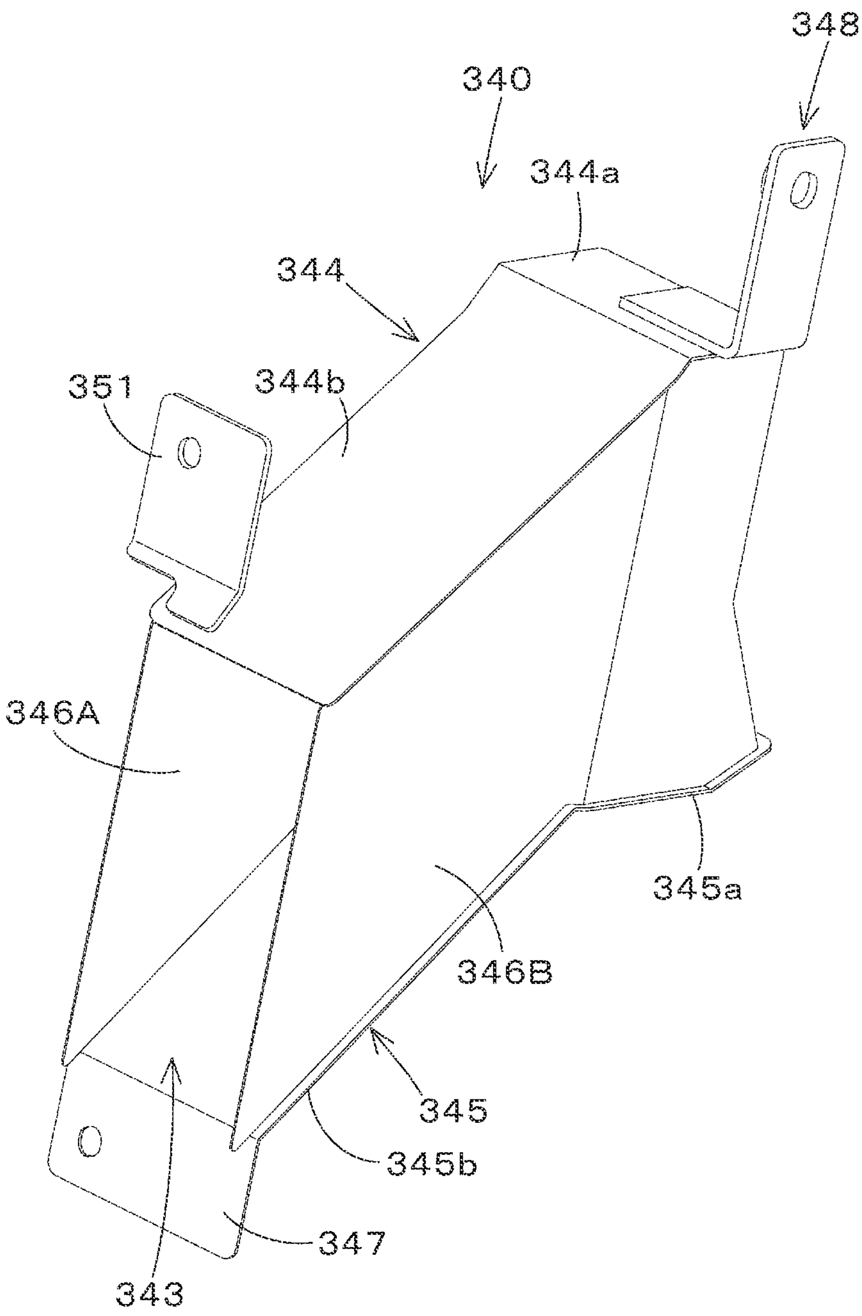
FIG. 92 is a perspective view of the first component body.

As illustrated in FIG. 91 and FIG. 92, the first component body 340 has a cylindrical shape with openings oriented rightward (toward the upstream side of the cooling air F1) and leftward (toward the downstream side of the cooling air F1). The right opening of the first component body 340 is oriented toward one side (rightward, i.e., the exhaust pipe 336 side) and serves as an inlet opening 342 that takes in the cooling air F1. The left opening of the first component body 340 serves as an outlet opening 343 from which the gas mixture having the mixture of the cooling air F1 and the exhaust gas is discharged (released). The inlet opening 342 is oriented toward the upstream side of the cooling air F1, and the outlet opening 343 is oriented toward the downstream side of the cooling air F1. The inlet opening 342 has a rectangular shape that is sufficiently large relative to the diameter of the exhaust pipe 336. Although the size of the inlet opening 342 is not limited, for example, the vertical dimension of the inlet opening 342 is three times or more of the diameter of the exhaust pipe 336, and the horizontal dimension of the inlet opening 342 is two times or more of the diameter of the exhaust pipe 336.

As illustrated in FIG. 89, an outlet 336*c* for the exhaust gas from the exhaust pipe 336 is disposed near the inlet opening 342 or inside the cylindrical flow straightener body 337. In this embodiment, the outlet 336*c* (second pipe section 336*b*) of the exhaust pipe 336 is inserted in the upper portion of the flow straightener body 337 via the inlet opening 342. Therefore, when the exhaust gas is discharged from the exhaust pipe 336, the exhaust gas discharged from the exhaust pipe 336 and the cooling air F1 taken in from the inlet opening 342 are mixed with each other inside the first component body 340 (flow straightener body 337). Accordingly, the exhaust temperature of the exhaust gas can be reduced. The gas mixture having the mixture of the exhaust gas discharged from the exhaust pipe 336 and the cooling air F1 is released from the outlet opening 343.

The outlet 336*c* of the exhaust pipe 336 does not have to be inserted in the upper portion of the flow straightener body 337.

As illustrated in FIG. 91 and FIG. 92, the first component body 340 has an upper plate 344 and a lower plate 345 whose plate surfaces are oriented in the up-down direction, a pair of front and rear vertical plates 346A and 346B whose plate surfaces are oriented in the front-rear direction K1, and a connection plate 347 whose plate surface is oriented in the machine-body width direction K2. A right portion 344*a* of the upper plate 344 has the plate surface thereof oriented in the vertical direction. A left portion 344*b* of the upper plate 344 is inclined downward as the left portion 344*b* extends leftward. A right portion 345*a* of the lower plate 345 is disposed below and facing the right portion 344*a* of the upper plate 344 with a distance therebetween. As illustrated in FIG. 89, a left portion 345*b* of the lower plate 345 is inclined downward as the left portion 345*b* extends leftward, and protrudes leftward (toward the downstream side of the cooling air F1) relative to the left portion of the upper plate 344 in the inclination direction. As illustrated in FIG. 90, in plan view, the left portion 345*b* of the lower plate 345 is inclined forward as the left portion 345*b* extends leftward. Similar to the left portion 345*b* of the lower plate 345, the left portion 344*b* of the upper plate 344 is also inclined forward as the left portion 344*b* extends leftward.

As illustrated in FIG. 91 and FIG. 92, the pair of vertical plates 346A and 346B are disposed with a distance therebetween in the front-rear direction K1 between the upper plate 344 and the lower plate 345, and couple the upper plate 344 and the lower plate 345 to each other. Specifically, the front vertical plate 346A is disposed between the front ends of the upper plate 344 and the lower plate 345 and couples the upper plate 344 and the lower plate 345 to each other, and the rear vertical plate 346B is disposed between the rear ends of the upper plate 344 and the lower plate 345 and couples the upper plate 344 and the lower plate 345 to each other. As illustrated in FIG. 90, with regard to the pair of vertical plates 346A and 346B, right portions 346Aa and 346Ba thereof extend in the machine-body width direction K2, and left portions 346Ab and 346Bb thereof are inclined forward as the left portions 346Ab and 346Bb extend leftward.

As illustrated in FIG. 91, the connection plate 347 extends downward from the left end of the lower plate 345.

As illustrated in FIG. 90, the exhaust gas discharged from the exhaust pipe 336 is blown onto the inner surface of the rear vertical plate 346B in a direction in which the vertical plate 346B is inclined rearward as the vertical plate 346B extends leftward. The exhaust gas discharged from the exhaust pipe 336 strikes against the inner surface of the first component body 340 (flow straightener body 337), so that the flow speed of the exhaust gas discharged from the exhaust pipe 336 can be decreased, thereby favorably mixing the exhaust gas and the cooling air F1 with each other and reducing the exhaust temperature. Moreover, the flow of the exhaust gas can be straightened. The exhaust gas discharged from the exhaust pipe 336 is guided to, for example, the rear vertical plate 346B and the upper plate 344 and is released from the outlet opening 343.

The exhaust gas discharged from the exhaust pipe 336 is not limited to being blown onto the inner surface of the rear vertical plate 346B, and may be blown onto the front vertical plate 346A. In this case, the inner wall surface of the weight 33 may be used as a member equivalent to the rear vertical plate 346B.

Figure 85:
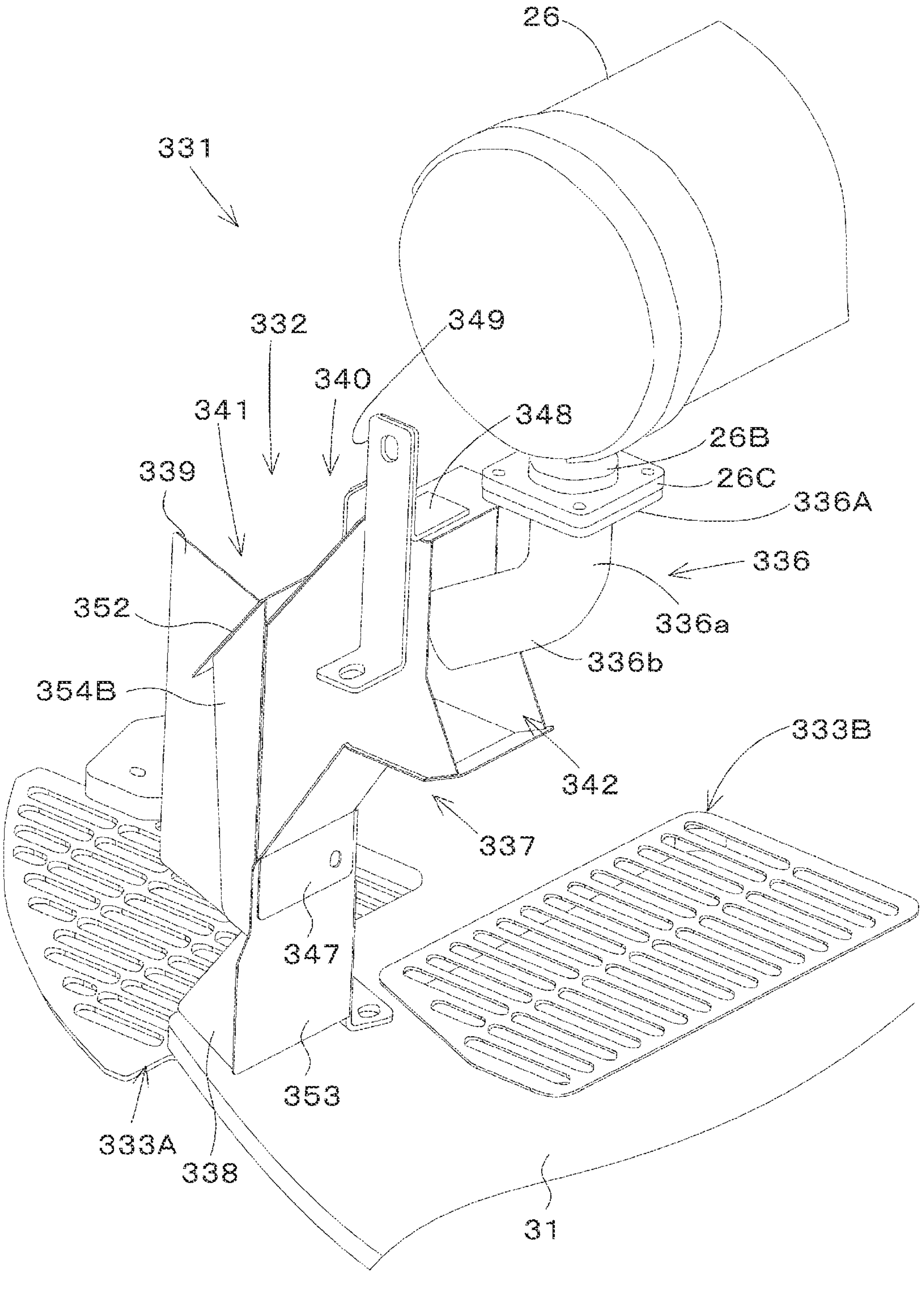
FIG. 85 is a perspective view of the intake structure.

As illustrated in FIG. 91 and FIG. 92, a first attachment stay 348 is secured to the rear area of the right portion 344*a* of the upper plate 344. As illustrated in FIG. 85, a bracket stay 349 is attached to the first attachment stay 348. As illustrated in FIG. 84, the bracket stay 349 is attached to an attachment section 350 provided at the weight 33.

As illustrated in FIG. 91 and FIG. 92, a second attachment stay 351 is secured to the left end of the left portion 344*b* of the upper plate 344.

Figure 93:
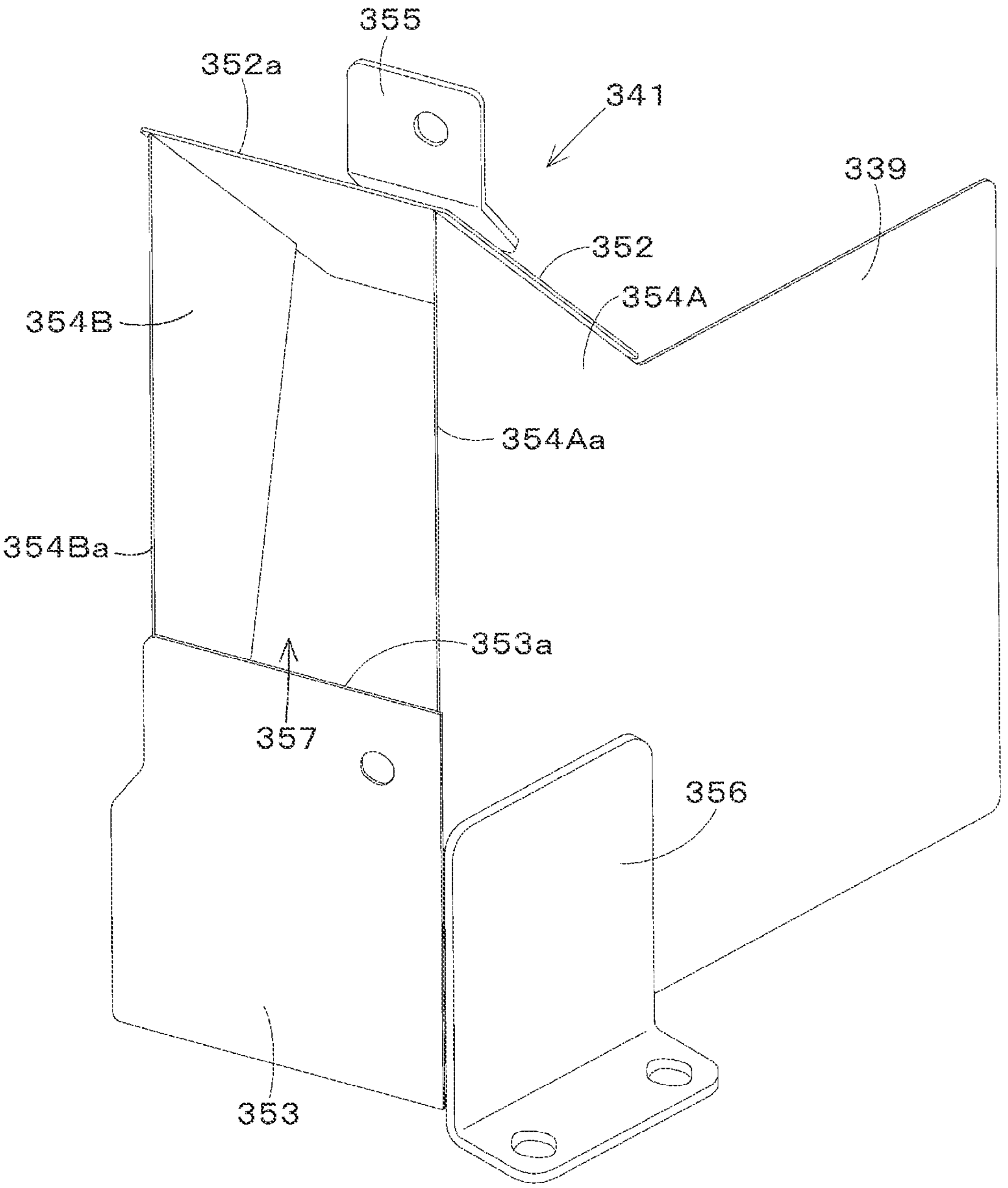
FIG. 93 is a perspective view of a second component body.
Figure 94:
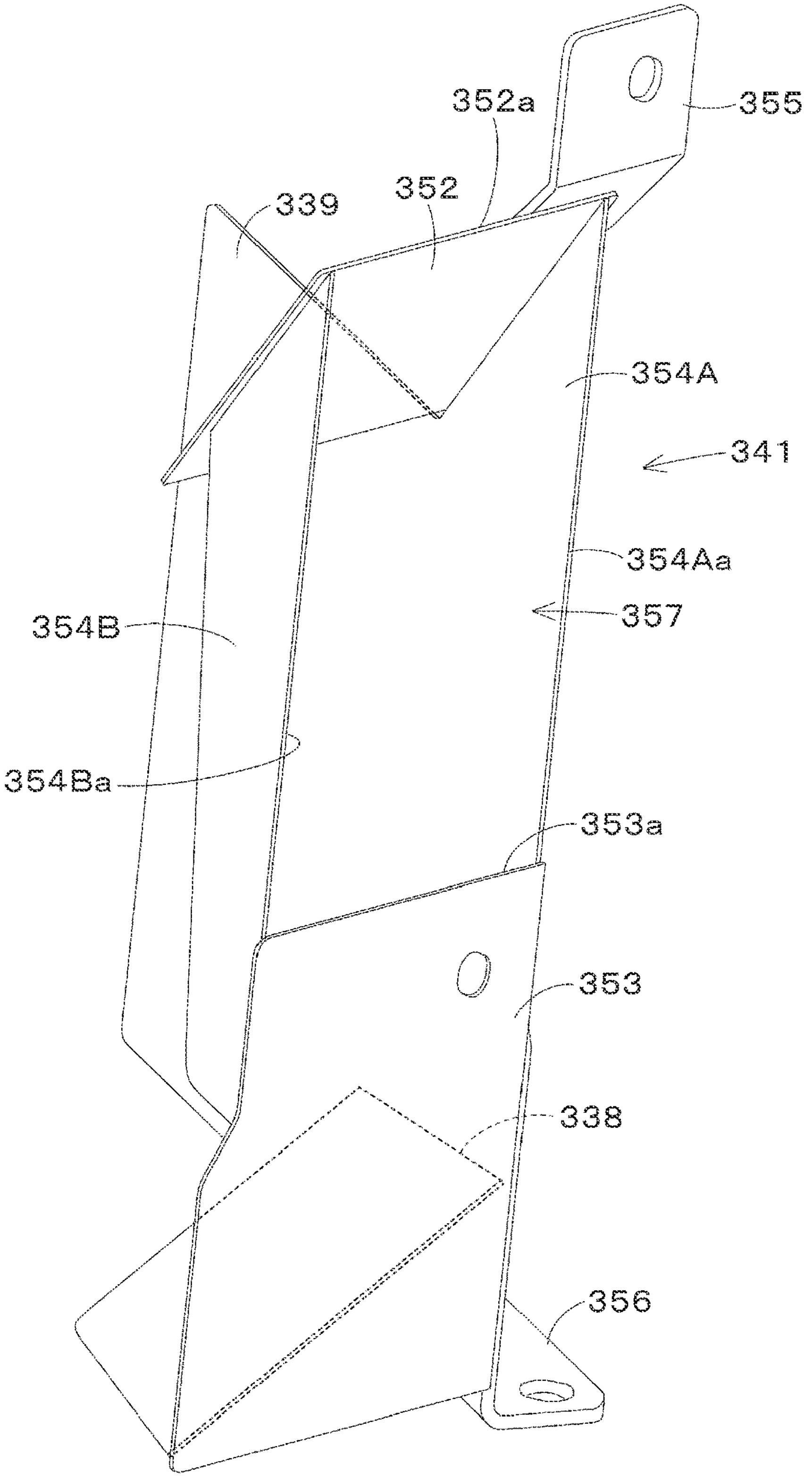
FIG. 94 is a perspective view of the second component body.

As illustrated in FIG. 93, FIG. 94, and FIG. 95, the second component body 341 has an upper plate 352 whose plate surface is oriented in the up-down direction, a side plate 353 whose plate surface is oriented in the machine-body width direction K2, and a pair of front and rear vertical plates 354A and 354B whose plate surfaces are oriented in the front-rear direction K1. The upper plate 352 is inclined downward as the upper plate 352 extends leftward. The side plate 353 is disposed below the right end of the upper plate 352 with a distance therebetween. The front vertical plate 354A is disposed below the front end of the upper plate 352 and has the upper edge thereof secured to the lower surface of the upper plate 352. The lower portion of the front vertical plate 354A is secured to the front end of the side plate 353. The rear vertical plate 354B is disposed below the rear end of the upper plate 352 and has the upper edge thereof secured to the lower surface of the upper plate 352. The lower portion of the rear vertical plate 354B is secured to the upper portion of the rear end of the side plate 353. Therefore, air flows in the front-rear direction K1 below the rear vertical plate 354B (see FIG. 95). As illustrated in FIG. 90, the pair of vertical plates 354A and 354B are inclined forward as the pair of vertical plates 354A and 354B extend leftward.

As illustrated in FIG. 93, a third attachment stay 355 is secured to the right end of the front portion of the upper surface of the upper plate 352. A fourth attachment stay 356 is secured to the lower portion of the front surface of the front vertical plate 354A.

As illustrated in FIG. 93, a right edge 352*a* of the upper plate 352, an upper edge 353*a* of the side plate 353, and right edges 354Aa and 354Ba of the pair of vertical plates 354A and 354B define an opening 357. The opening 357 is larger than the outlet opening 343 of the first component body 340. Accordingly, as illustrated in FIG. 89 and FIG. 90, a gap 359 is provided in a connection area 358 between the first component body 340 and the second component body 341. The gap 359 takes the cooling air F1 into the second component body 341 from one side (right side) and from outside the first component body 340. Specifically, as illustrated in FIG. 89, a gap 359*a* is provided between the upper plate 344 of the first component body 340 and the upper plate 352 of the second component body 341. As illustrated in FIG. 90, a gap 359*b* is provided between the front vertical plate 346A of the first component body 340 and the front vertical plate 354A of the second component body 341, and a gap 359*c* is provided between the rear vertical plate 346B of the first component body 340 and the rear vertical plate 354B of the second component body 341. Therefore, the cooling air F1 is taken into the flow straightener body 337 from upstream by the exhaust gas discharged from the exhaust pipe 336. In other words, the flow straightener body 337 has the gap 359 that takes the cooling air F1 into the connection area 358 between the first component body 340 and the second component body 341 from the upstream side.

With the cooling air F1 being taken in through the gap 359, the temperature of the exhaust gas can be reduced.

As illustrated in FIG. 88, the upper portion of the side plate 353 overlies the left surface of the connection plate 347 and is attached to the connection plate 347. The third attachment stay 355 is attached to the second attachment stay 351. As illustrated in FIG. 84, the fourth attachment stay 356 is attached to the swivel substrate 31.

The upper plate 344 and the upper plate 352 define an upper plate of the flow straightener body 337. The front vertical plate 346A and the vertical plate 354A define a front vertical plate of the flow straightener body 337. The rear vertical plate 346B and the vertical plate 354B define a rear vertical plate of the flow straightener body 337. The lower plate 345 defines the lower plate 345 of the flow straightener body 337.

As illustrated in FIG. 95, the guide plate 338 is disposed behind the lower portion of the front vertical plate 354A of the second component body 341 and to the left of the lower portion of the side plate 353. The guide plate 338 is inclined downward as the guide plate 338 extends rearward from the vertical plate 354A and is also inclined downward as the guide plate 338 extends leftward from the side plate 353. As illustrated in FIG. 95, the front end of the guide plate 338 is secured to the vertical plate 354A, and the right end of the guide plate 338 is secured to the side plate 353.

As illustrated in FIG. 88, the guide plate 338 is disposed at a position corresponding to the discharge portion 334.

As illustrated in FIG. 90, the extension plate 339 extends leftward from the left end of the front vertical plate 354A of the second component body 341. The extension plate 339 extends in the same direction as the front vertical plate 354A. Specifically, the extension plate 339 extends in the direction of forward inclination as the extension plate 339 extends leftward. The extension plate 339 extends above the discharge portion 333A from the vertical plate 354A.

The aforementioned flow straightener 332 mixes the exhaust gas discharged to the upper portion of the flow straightener body 337 from the exhaust pipe 336 with the cooling air F1 taken in from the inlet opening 342, guides the gas mixture to the outlet opening 343, and releases the gas mixture from the outlet opening 343. The gas mixture released from the outlet opening 343 is guided to, for example, the rear vertical plate 354B and the upper plate 352 of the second component body 341 and is released near the discharge portions 334 and 333A. In other words, the flow straightener body 337 guides the gas mixture to near the discharge portions 334 and 333A from the exhaust pipe 336 and releases the gas mixture. The gas mixture released from the flow straightener body 337 decreases in flow speed and is further mixed with the cooling air F1, so that the exhaust temperature can be reduced.

In this embodiment, the exhaust gas discharged from the exhaust pipe 336 is mixed with the cooling air F1 at the upper portion of the flow straightener body 337 and is also mixed with the cooling air F1 near the discharge portions 334 and 333A, so that the exhaust temperature of the exhaust gas discharged from the exhaust gas purifier 26 can be sufficiently reduced. Moreover, the exhaust gas is released from the flow straightener body 337 before being discharged from the discharge portions 334 and 333A, so that the flow speed can be sufficiently decreased.

A portion of the gas mixture released from the flow straightener body 337 is guided to the guide plate 338 and is released outside the machine body 2 from the discharge portion 334, whereas the remaining portion of the gas mixture released from the flow straightener body 337 is guided to the discharge portion 333A by the extension plate 339 and is released below the swivel substrate 31 from the discharge portion 333A together with the cooling air F1 flowing from above the extension plate 339.

When condensation water is discharged from the exhaust pipe 336, the guide plate 338 guides the condensation water to the discharge portion 334. The condensation water guided to the discharge portion 334 is discharged outside the machine body 2 from the discharge portion 334.

The extension plate 339 restricts the flow of the gas mixture released from the flow straightener body 337 to prevent the released gas mixture from flowing toward the hydraulic pump 25.

In the above embodiment, although a portion of the gas mixture released from the flow straightener body 337 is discharged outside the machine body 2 from the discharge portion 334 provided at the weight 33, the discharge portion 334 is sometimes not provided at the weight 33. In this case, the swivel substrate 31 may be provided with a discharge portion equivalent to the discharge portion 334.

Instead of the gas mixture released from the flow straightener body 337 being released before the discharge portion 334, the gas mixture may be discharged from the discharge portion 334 by extending a guide tube from the outlet opening 343 of the flow straightener body 337 to the discharge portion 334.

The working machine 1 may further include: a machine body 2; a support base 52 on the machine body 2; and a tank (fuel tank 19) supported by the support base 52 in a movable manner in a horizontal direction between an installation position S1 and a withdrawn position S2 in which the tank 19 is located when withdrawn from the installation position S1.

This configuration facilitates maintenance of the tank or the devices disposed near the tank by withdrawing the tank from the installation position, thus achieving enhanced maintainability.

The securing device 141 capable of securing the tank 19 in the installation position S1 and the withdrawn position S2 may be also provided.

With this configuration, the tank 19 can be secured in the installation position S1 and the withdrawn position S2, the tank 19 can be stably secured in the installation position S1, and the tank 19 in the withdrawn position S2 can be prevented from falling.

The securing device 141 may include the securing device 160 having the band 161 that secures the tank 19 in the installation position S1.

With this configuration, the tank 19 can be stably secured in the installation position S1.

The first securing device 160 may have the hook member 162 disposed near the lower portion of the tank 19, the securing piece 163 disposed opposite the hook member 162 to sandwich the tank 19, the band 161 extending from the hook member 162 to the securing piece 163 via the upper surface of the tank 19, the band hooking member 164 provided at one longitudinal end of the band 161 and hooked onto the hook member 162, and the band securing member 165 provided at the other longitudinal end of the band 161 and secured to the securing piece 163 by tensioning the band 161.

With this configuration, the tank 19 can be stably secured in the installation position S1.

The securing device 141 may include the engaging sections 171 provided at the support base 52, and the first engagement section 172 and the second engagement section 173 that are provided away from each other in the tank 19 in the movement direction Y3 of the tank 19. The first engagement section 172 may be engaged with the corresponding engaging section 171 when the tank 19 is in the installation position S1 so as to restrict the movement of the tank 19 in the pulling direction Y2 extending from the installation position S1 toward the withdrawn position S2 and in the pressing direction Y1 extending from the withdrawn position S2 toward the installation position S1. The second engagement section 173 may be engaged with the corresponding engaging section 171 when the tank 19 is in the withdrawn position S2 so as to restrict the movement of the tank 19 in the pulling direction Y2 and the pressing direction Y1.

With this configuration, the tank 19 can be readily positioned and secured in the installation position S1 and the withdrawn position S2.

The engaging sections 171 may be rollers provided at the placement sections 55*c*1 and 55*c*2 where the tank 19 is placed on the support base 52. The first engagement section 172 and the second engagement section 173 may be recesses that are provided in the bottom surface of the tank 19 and to which the rollers are fitted.

With this configuration, the tank 19 can be readily moved even when the amount of content in the tank 19 is large.

The first engagement section 172 may have the first restriction surface 172A that restricts the movement of the tank 19 in the pressing direction Y1 by abutting on the front side of the corresponding engaging section 171 in the pulling direction Y2 when the tank 19 is in the installation position S1, and the first guide surface 172B that restricts the movement of the tank 19 in the pulling direction Y2 by abutting on the rear side of the corresponding engaging section 171 in the pulling direction Y2 when the tank 19 is in the installation position S1 and that is inclined toward the pressing direction Y1 as the first guide surface 172B extends downward from the apex of the recess. The second engagement section 173 may have the second restriction surface 173A that restricts the movement of the tank 19 in the pulling direction Y2 by abutting on the front side of the corresponding engaging section 171 in the pressing direction Y1 when the tank 19 is in the withdrawn position S2, and the second guide surface 173B that restricts the movement of the tank 19 in the pressing direction Y1 by abutting on the rear side of the corresponding engaging section 171 in the pressing direction Y1 when the tank 19 is in the withdrawn position S2 and that is inclined toward the pulling direction Y2 as the second guide surface 173B extends downward from the apex of the recess.

With this configuration, the tank 19 that can be positioned and secured in the installation position S1 and the withdrawn position S2 can be readily moved to the installation position S1 and the withdrawn position S2.

The securing device 141 may include the stay member 181 provided at the tank 19 and movable together with the tank 19, the first securing section (stay attachment section 182Ba) and the second securing section (boss member 184) provided at the machine body 2 and away from each other in the movement direction Y3 of the tank 19, and the first securing members (securing members 189) that secure the stay member 181 to the first securing section 182Ba when the tank 19 is in the installation position S1 and that secure the stay member 181 to the second securing section 184 when the tank 19 is in the withdrawn position S2.

With this configuration, the structure of the securing device 141 can be simplified.

The securing device 141 may include the third securing section (first pillar member 183A) and the fourth securing section (second pillar member 183B) provided at the machine body 2 and away from each other in the movement direction Y3 of the tank 19, the second securing member 192A that secures the stay member 181 to the third securing section 183A when the tank 19 is in the installation position S1, and the third securing member 192B that secures the stay member 181 to the fourth securing section 183B when the tank 19 is in the installation position S1. The fourth securing section 183B may be disposed toward the pulling direction Y2, extending from the installation position S1 toward the withdrawn position S2, relative to the third securing section 183A. The stay member 181 is secured to the fourth securing section 183B by the third securing member 192B when the tank 19 is in the withdrawn position S2.

With this configuration, the structure of the securing device 141 can be simplified.

The tank 19 may include the tank body 19A and the protrusion 19C protruding downward from the bottom of the tank body 19A.

With the protrusion 19C provided, this configuration enables separation of water.

The prime mover E1 equipped in the machine body 2 may be provided. The tank 19 may be a fuel tank that stores fuel for the prime mover E1.

The working machine 1 may further include: a machine body 2; a prime mover E1 on the machine body 2; a hood 201 openable and closable and defining the prime mover room E2 to contain the prime mover E1; a cooler 361 disposed between the prime mover E1 and the hood 201 and including a cooling unit (radiator 15) and a cooling fan 14; a stationary duct 261 located on the same side of the cooler 361 as the hood 201; and an openable-closable duct 143D located on the same side of the hood 201 as the cooler 361. The openable-closable duct 143D and the stationary duct 261 may be configured such that, when the hood 201 is closed, the openable-closable duct 143D and the stationary duct 261 are connected to each other and outside air from outside the machine body 2 enters the cooler 361 via the openable-closable duct 143D and the stationary duct 261.

With this configuration, a duct structure is provided between the hood 201 and the cooler 361, so that sound leaking outward from the prime mover room E2 can be suppressed.

The hood 201 may have the side wall (outer wall 143D2) disposed laterally to the cooler 361 and the upper wall 143D1 connected to the upper portion of the side wall 143D2. The outside-air intake portion 125 that takes outside air into the openable-closable duct 143D from outside the machine body 2 may be provided in the upper wall 143D1 at a position higher than the stationary duct 261. The openable-closable duct 143D be provided over the side wall 143D2 and the upper wall 143D1, guide the outside air taken in from the outside-air intake portion 125 downward along the side wall 143D2, and then cause the outside air to flow through the stationary duct 261 connected to the inner side of the openable-closable duct 143D in the machine-body width direction K2.

With this configuration, outward leakage of noise inside the hood 201 can be suppressed.

The openable-closable duct 143D may be formed of the side wall 143D2, the upper wall 143D1, and the partition member 143D3 disposed at the inner side of the machine body 2 relative to the side wall 143D2 and the upper wall 143D1. The partition member 143D3 may have the opening 235 that is provided at a position corresponding to the cooler 361 and that allows the outside air to flow to the stationary duct 261.

With this configuration, the outside air taken in from the outside-air intake portion 125 provided in the upper wall 143D1 can be guided to the stationary duct 261.

The seal member (first seal 243) may be provided to seal the connection area between the openable-closable duct 143D and the stationary duct 261 when the hood 201 is closed.

With this configuration, the outside air can be favorably guided from the openable-closable duct 143D to the cooling unit 15.

The dust-proof net 257 may be provided near the connection area between the stationary duct 261 and the openable-closable duct 143D to collect refuse contained in the outside air flowing from the openable-closable duct 143D toward the stationary duct 261.

With this configuration, the dust-proof net 257 is accessible by opening the openable-closable duct 143D, thereby facilitating, for example, the cleaning process of the dust-proof net 257.

The dust-proof net 257 may be attachable to and detachable from the stationary duct 261 or the openable-closable duct 143D by opening the hood 201.

This configuration facilitates the attachment-detachment process of the dust-proof net 257.

The working machine 1 may further include: a machine body 2; a prime mover E1 on the machine body 2; a cooling fan 14 to deliver cooling air F1 toward the prime mover E1; an air cleaner 27 disposed downstream of the prime mover E1 in a direction of a flow of the cooling air F1; a hood 201 defining the prime mover room E2 to contain the prime mover E1; an air intake portion 200 provided in the hood 201 at an opposite side of the prime mover E1 from the cooling fan 14; and a connection duct 302 connecting the air intake portion 200 and the air cleaner 27 to each other.

With this configuration, the air intake portion 200 is provided in the hood 201 at the opposite side of the prime mover E1 from the cooling fan 14, and the air intake portion 200 and the air cleaner 27 are connected to each other by the connection duct 302, so that the flow of the cooling air F1 can be improved because the flow of the cooling air F1 flowing around the prime mover E1 is not hindered by a path on the intake side of the air cleaner 27.

The air intake portion 200 may include the air intake box 301 defining the air intake chamber 307 that takes in air outside the hood 201. The connection duct 302 may be connected to the air intake box 301.

With this configuration, the outside air can be favorably suctioned into the air cleaner 27 at the opposite side of the prime mover E1 from the cooling fan 14.

The air intake portion 200 may include the air inlet 128 through which the air outside the hood 201 is taken into the air intake chamber 307. The connection duct 302 may have the suction port 325 that suctions the air inside the air intake chamber 307 into the connection duct 302. The suction port 325 may be provided in the air intake chamber 307 at a position offset horizontally or upward from the air inlet 128.

With this configuration, even when water, such as car-wash water or rainwater, enters through the air inlet 128, the water can be prevented from being suctioned into the suction port 325.

The connection duct 302 may have the insertion section 320 inserted in the air intake chamber 307. The insertion section 320 is offset horizontally or upward from the air inlet 128. The suction port 325 may be provided in the wall (second side wall 320*d*) of the insertion section 320 located opposite the air inlet 128.

With this configuration, even when water enters through the air inlet 128, the water can be prevented from being suctioned into the suction port 325 more reliably.

The insertion section 320 may be offset in the horizontal direction from the air inlet 128. The suction port 325 may extend through the wall 320*d* and is oriented upward from the lower end of the wall 320*d*. The insertion section 320 may have the lower wall 320*a* defining the lower surface of the internal space of the insertion section 320. The lower wall 320*a* may have the cutout 326 communicating with the lower end of the suction port 325.

With this configuration, when condensation occurs in the connection duct 302, the condensation water can be discharged from the cutout 326.

The air intake box 301 may have the opening 309 oriented toward the hood 201 and communicating with the air inlet 128, and the opening edge defining the opening 309 is secured to the inner surface of the hood 201.

With this configuration, the interior of the hood 201 and the interior of the air intake chamber 307 can be separated from each other, and hot air inside the hood 201 can be prevented from being suctioned into the prime mover E1. Moreover, leakage of noise inside the hood 201 through the air inlet 128 can be suppressed.

The air intake box 301 may have the bottom wall 301*a* defining the lower surface of the air intake chamber 307. The bottom wall 301*a* may have the first edge 301*al* defining the opening edge 309*a*, also has the second edge 301*a*2 opposite the first edge 301*al*, and is inclined downward as the bottom wall 301*a* extends from the second edge 301*a*2 toward the first edge 301*al*. The hood 201 may have the drain section 313 that allows water moving on the bottom wall 301*a* to travel outward from the hood 201.

With this configuration, even when water enters through the air inlet 128, the water can be discharged outside the hood 201.

The hood 201 may have the hole 303 that faces the opening 309 and around which the opening edge 309*a* is secured, and the plate member 305 that is disposed to externally cover the hole 303 and that is provided with the air inlet 128. The drain section 313 may include the gap 306 between the lower edge 305*al* of the plate member 305 and the peripheral wall 304*al* surrounding the hole 303.

With this configuration, the drain section 313 can be readily provided.

The connection duct 302 may have the first duct member 317 connected to the air intake portion 200, the second duct member 318 connected to the air cleaner 27, and the third duct member 319 composed of an elastic material and connecting the first duct member 317 and the second duct member 318 to each other.

With this configuration, the third duct member 319 can compensate for an assembly error among the air intake box 301, the first duct member 317, the air cleaner 27, and the second duct member 318.

The working machine 1 may further include: a machine body 2; a prime mover E1 on the machine body 2; a prime mover room E2 to contain the prime mover E1; a cooling fan 14 to deliver cooling air toward the prime mover E1; a discharge portion 334, 333A to fluidly connect an inside and an outside of the prime mover room E2 to each other at a bottom of the machine body 2; an exhaust gas purifier 26 to purify exhaust gas discharged from the prime mover E1; an exhaust pipe 336 to discharge the exhaust gas discharged from the exhaust gas purifier 26 at a position in an internal space of the prime mover room E2; and a flow straightener 332 to guide a mixture of the exhaust gas discharged from the exhaust pipe 336 and the cooling air to the discharge portion 334, 333A.

With this configuration, the exhaust gas discharged from the exhaust gas purifier 26 is released into the prime mover room E2, and the released exhaust gas is mixed with the cooling air within the prime mover room E2 before being released outward, thus achieving reduced exhaust temperature and reduced exhaust noise.

The flow straightener 332 may have the cylindrical flow straightener body 337 that takes in the gas mixture from the exhaust pipe 336 and releases the gas mixture near the discharge portions 334 and 333A.

With this configuration, the gas mixture having the mixture of the exhaust gas discharged from the exhaust pipe 336 and the cooling air F1 is released near the discharge portions 334 and 333A, so that the gas mixture is mixed with the cooling air F1 also near the discharge portions 334 and 333A, thereby sufficiently reducing the temperature of the exhaust gas. Moreover, the gas mixture is released near the discharge portions 334 and 333A so that the flow speed of the exhaust gas discharged from the discharge portions 334 and 333A can be decreased.

The cooling fan 14 may deliver the cooling air F1 from one side toward the other side in the machine-body width direction K2. The flow straightener body 337 may be inclined downward from the exhaust pipe 336 toward the discharge portions 334 and 333A as the flow straightener body 337 extends toward the other side, and has the inlet opening 342 that is oriented toward one side, that is, toward the exhaust pipe 336, and that takes in the cooling air F1. The outlet 336*c* for the exhaust gas from the exhaust pipe 336 may be disposed near the inlet opening 342 or inside the cylindrical flow straightener body 337.

With this configuration, a distance is provided between the exhaust pipe 336 and the discharge portions 334 and 333A, and the exhaust gas discharged from the exhaust pipe 336 and the cooling air F1 can be mixed with each other more satisfactorily between the exhaust pipe 336 and the discharge portions 334 and 333A.

The exhaust pipe 336 may be oriented such as to blow the exhaust gas onto the inner surface of the flow straightener body 337.

With this configuration, the flow speed of the exhaust gas can be decreased.

The machine body 2 may have the weight 33 defining the rear portion of the machine body 2. The discharge portions 334 and 333A include the first discharge portion 334 provided at the weight 33. The flow straightener 332 may have the guide plate 338 that extends toward the first discharge portion 334 from the flow straightener body 337 and that guides the gas mixture released from the flow straightener body 337 to the first discharge portion 334.

With this configuration, the gas mixture released near the first discharge portion 334 can be guided to the first discharge portion 334.

The machine body 2 may have the swivel substrate 31 on which the prime mover E1 is installed. The discharge portions 334 and 333A may include the second discharge portion 333A provided in the swivel substrate 31. The flow straightener 332 may have the extension plate 339 that extends above the second discharge portion 333A from the flow straightener body 337 and that guides the gas mixture released from the flow straightener body 337 to the second discharge portion 333A.

With this configuration, the gas mixture released near the second discharge portion 333A can be guided to the second discharge portion 333A.

The cooling fan 14 may deliver the cooling air F1 from one side toward the other side in the machine-body width direction K2. The flow straightener body 337 may have the first component body 340 and the second component body 341 connected to a position at the other side of the first component body 340, and also has the gap 359 that is provided in the connection area between the first component body 340 and the second component body 341 and through which the cooling air F1 is taken into the second component body 341 from one side and from outside the first component body 340.

With this configuration, the temperature of the exhaust gas can be further reduced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
- a machine body;
- a cabin on the machine body;
- an air conditioner body for air conditioning in the cabin; and
- a prime mover room to contain a prime mover on the machine body, wherein
- the cabin includes a plate member protruding rearward from a rear surface of the cabin, the plate member being disposed above a wall with a distance from the wall, the wall defining the prime mover room and covering an upper side of the prime mover, and
- the air conditioner body is installed on an upper side of the plate member, thereby being disposed above the prime mover room with a distance from the prime mover room.

2. A working machine comprising:
- a machine body;
- a cabin on the machine body;
- an air conditioner body for air conditioning in the cabin;
- a prime mover room to contain a prime mover on the machine body; and
- an operator's seat disposed inside the cabin, wherein
- the air conditioner body is disposed above the prime mover room,
- the cabin includes a plate member disposed behind the operator's seat, the plate member having the air conditioner body disposed thereon, and
- the plate member is disposed above the prime mover room with a distance from the prime mover room and is supported by the machine body in a vibration-proof manner via at least one mount member.

3. The working machine according to claim 2, wherein
- the plate member includes a front portion disposed inside the cabin and a rear portion protruding rearward from a rear surface of the cabin.

4. A working machine comprising:
- a machine body;
- a cabin on the machine body;
- an air conditioner body for air conditioning in the cabin;
- a prime mover room to contain a prime mover on the machine body;
- a cooling fan to introduce air outside the prime mover room into the prime mover room;

a compressor to be driven by power from the prime mover to compress a cooling medium; and a route for a cooling medium pipe connected to the compressor, the route having an entrance and an exit, the entrance being in communication with an upper portion of the prime mover room and configured to allow hot air from the prime mover room to enter the route, the exit being in communication with an outside of the prime mover room and configured to allow the hot air having entered the route through the entrance to be discharged, wherein the air conditioner body is disposed above the prime mover room.

5. The working machine according to claim 4, further comprising:

a compressor placement portion for placement of the compressor, wherein the route includes a pair of side walls facing each other with a distance therebetween in a machine-body width direction, a bottom wall closing a gap between lower ends of rear portions of the pair of side walls, and a cover wall closing a gap between upper ends of the pair of side walls and a gap between front ends of the pair of side walls, the entrance is defined by the bottom wall and the cover wall, the exit is provided at a rear portion of the cover wall, and the compressor placement portion is provided lower than the entrance and is in communication with the entrance.

6. The working machine according to claim 5, wherein the compressor placement portion includes a main portion and an openable-closable cover, the main portion having an inspection opening facing forward and being in communication with a space between the pair of side walls, the openable-closable cover being configured to close the inspection opening, and the openable-closable cover is attachable and detachable together with the cover wall.

7. The working machine according to claim 4, wherein a condenser and a receiver are disposed laterally to a front portion of the cabin and in front of the compressor, the condenser being configured to dissipate heat of the cooling medium from the compressor to liquefy the cooling medium, the receiver being configured to store the cooling medium liquefied by the condenser, and the compressor, the condenser, and the receiver are removable together with the cabin from the machine body.

8. The working machine according to claim 4, further comprising:

a compressor placement portion for placement of the compressor, wherein the compressor placement portion is disposed closer to one of opposite sides of the machine body in a machine-body width direction than the cabin is such that the compressor is accessible from an inside the cabin.

9. The working machine according to claim 8, wherein the machine body includes a substrate, a first vertical rib, and a second vertical rib, the first vertical rib being provided on a first portion of the substrate that is closer to the one of the opposite sides of the machine body in the machine-body width direction than a second portion of the substrate is and extending from a front portion toward a rear portion of the substrate, the second vertical rib being provided on the second portion of the substrate that is closer to the other of the opposite sides of the machine body in the machine-body width direction than the first portion is and extending from the front portion toward the rear portion of the substrate, the working machine further comprises:

a hydraulic actuator to be driven by hydraulic fluid;

a hydraulic fluid tank to store hydraulic fluid;

a hydraulic pump to deliver hydraulic fluid from the hydraulic fluid tank;

a control valve to control a flow rate of hydraulic fluid supplied from the hydraulic pump to the hydraulic actuator; and a hydraulic hose connecting the hydraulic pump and the control valve to each other, the hydraulic fluid tank is disposed closer to the other of the opposite sides of the machine body in the machine-body width direction than the second vertical rib is, the control valve is disposed closer to the other of the opposite sides of the machine body in the machine-body width direction than the second vertical rib is and in front of the hydraulic fluid tank, the hydraulic pump is disposed closer to a rear of the machine body than a front end of the hydraulic fluid tank is, and the hydraulic hose is routed between the second vertical rib and the hydraulic fluid tank.

10. The working machine according to claim 9, wherein the prime mover room and the inside of the cabin are separated from each other by a double-walled structure including a partition and an outer wall of the cabin, the partition separating the prime mover room and the outside of the prime mover room from each other, and the hydraulic fluid tank defines a portion of the partition.

11. The working machine according to claim 9, further comprising:

a fuel tank to store fuel for the prime mover, wherein the fuel tank is disposed above the first vertical rib and across the first vertical rib in the machine-body width direction.

12. The working machine according to claim 4, wherein the exit is provided on one of opposite sides of the machine body in a machine-body width direction, the working machine further comprises an intake structure to introduce air into the prime mover, and the intake structure is configured to allow outside air to enter the prime mover from the other of the opposite sides of the machine body in the machine-body width direction.

13. The working machine according to claim 1, comprising:

a traveling device;

the machine body supported in a swivelable manner on the traveling device;

a swivel motor to swivel the machine body;

a tank disposed near the swivel motor; and a support base to support the tank, wherein the tank includes a tank body and an overhanging portion extending from the tank body and overhanging the swivel motor, and is supported by the support base in a movable manner to retract the overhanging portion from a space above the swivel motor.

14. The working machine according to claim 1, further comprising:

a support base on the machine body; and a tank supported by the support base in a movable manner in a horizontal direction between an installation position and a withdrawn position in which the tank is located when withdrawn from the installation position.

15. The working machine according to claim 1, further comprising:

a cooling fan to deliver cooling air toward the prime mover;

a discharge portion to fluidly connect an inside and an outside of the prime mover room to each other at a bottom of the machine body;

an exhaust gas purifier to purify exhaust gas discharged from the prime mover;

an exhaust pipe to discharge the exhaust gas discharged from the exhaust gas purifier at a position in an internal space of the prime mover room; and a flow straightener to guide a mixture of the exhaust gas discharged from the exhaust pipe and the cooling air to the discharge portion.

16. The working machine according to claim 1, further comprising:

a cooling fan to deliver cooling air toward the prime mover;

an air cleaner disposed downstream of the prime mover in a direction of a flow of the cooling air;

a hood defining the prime mover room to contain the prime mover;

an air intake portion provided in the hood at an opposite side of the prime mover from the cooling fan; and a connection duct connecting the air intake portion and the air cleaner to each other.

17. The working machine according to claim 1, further comprising:

a hood openable and closable and defining the prime mover room to contain the prime mover;

a cooler disposed between the prime mover and the hood and including a cooling unit and a cooling fan;

a stationary duct protruding toward the hood from the cooler; and an openable-closable duct protruding toward the cooler from the hood, wherein the openable-closable duct and the stationary duct are configured such that, when the hood is closed, the openable-closable duct and the stationary duct are connected to each other and outside air from outside the machine body enters the cooler via the openable-closable duct and the stationary duct.

* * * * *